US012620155B2

(12) United States Patent
Chand et al.

(10) Patent No.: US 12,620,155 B2
(45) Date of Patent: May 5, 2026

(54) REPRESENTATIONS OF PARTICIPANTS IN REAL-TIME COMMUNICATION SESSIONS

(71) Applicant: Apple Inc., Cupertino, CA (US)

(72) Inventors: Jesse Chand, San Francisco, CA (US); Shih-Sang Chiu, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/242,363

(22) Filed: Sep. 5, 2023

(65) Prior Publication Data

US 2024/0104819 A1 Mar. 28, 2024

Related U.S. Application Data

(60) Provisional application No. 63/470,884, filed on Jun. 3, 2023, provisional application No. 63/439,473, filed on Jan. 17, 2023, provisional application No. 63/409,526, filed on Sep. 23, 2022.

(51) Int. Cl.
| | |
|---|---|
| *G06T 13/40* | (2011.01) |
| *G06T 13/20* | (2011.01) |
| *H04L 65/403* | (2022.01) |

(52) U.S. Cl.
CPC ............ *G06T 13/40* (2013.01); *G06T 13/205* (2013.01); *H04L 65/403* (2013.01)

(58) Field of Classification Search
CPC ..... G06T 13/40; G06T 13/205; H04L 65/403; G06F 3/011; H04N 7/147; H04N 7/15; H04N 7/157
See application file for complete search history.

(56) References Cited

U.S. PATENT DOCUMENTS

| | | | |
|---|---|---|---|
| 102,663 | A | 5/1870 | Dillen |
| 5,617,526 | A | 4/1997 | Oran et al. |
| 5,745,116 | A | 4/1998 | Pisutha-Arnond |
| 5,958,006 | A | 9/1999 | Eggleston et al. |
| 6,025,871 | A | 2/2000 | Kantor et al. |
| 6,219,047 | B1 | 4/2001 | Bell |
| 6,333,973 | B1 | 12/2001 | Smith et al. |

(Continued)

FOREIGN PATENT DOCUMENTS

| | | | |
|---|---|---|---|
| AU | 2015100713 A4 | 6/2015 |
| CA | 2845537 A1 | 9/2014 |

(Continued)

OTHER PUBLICATIONS

GameXPlain: Youtube video titled "Making a Call in the Nintendo Switch Online App (Splatoon 2 Voice Chat Test!)" [online] [ Retrieved Sep. 15, 2025] <URL: https://www.youtube.com/watch? v=HYtBLcw08_s> (Year: 2017).*

(Continued)

*Primary Examiner* — King Y Poon
*Assistant Examiner* — Vincent Alexander Providence
(74) *Attorney, Agent, or Firm* — YHE Law LLP

(57) ABSTRACT

A computer system optionally modifies a representation of a participant based on activity associated with the participant. A computer system optionally displays a self-view representation of an avatar of a user of the computer system. A computer system optionally updates a view of an avatar in a real-time communication session. A computer system optionally displays a representation of a participant in a real-time communication session.

30 Claims, 35 Drawing Sheets

(56) References Cited

U.S. PATENT DOCUMENTS

| | | |
|---|---|---|
| 6,346,962 B1 | 2/2002 | Goodridge |
| 6,726,094 B1 | 4/2004 | Rantze et al. |
| 6,728,784 B1 | 4/2004 | Mattaway |
| 6,731,308 B1 | 5/2004 | Tang et al. |
| 7,102,663 B2 | 9/2006 | Crook |
| 7,148,911 B1 | 12/2006 | Mitsui et al. |
| 7,185,054 B1 | 2/2007 | Ludwig et al. |
| 7,343,561 B1 | 3/2008 | Stochosky et al. |
| 7,571,014 B1 | 8/2009 | Lambourne et al. |
| 7,801,971 B1 | 9/2010 | Amidon et al. |
| 7,876,996 B1 | 1/2011 | Herz |
| 7,903,171 B2 | 3/2011 | Takabatake et al. |
| 7,982,762 B2 | 7/2011 | Chatting et al. |
| 8,169,463 B2 | 5/2012 | Enstad et al. |
| RE43,462 E | 6/2012 | Washino et al. |
| 8,274,544 B2 | 9/2012 | Kurtz et al. |
| 8,370,448 B2 | 2/2013 | Galchev |
| 8,462,961 B1 | 6/2013 | Bywaters et al. |
| 8,502,856 B2 | 8/2013 | Jeong et al. |
| 8,542,265 B1 | 9/2013 | Dodd et al. |
| 8,624,952 B2 | 1/2014 | Currivan et al. |
| 8,725,880 B2 | 5/2014 | Santamaria et al. |
| 8,738,090 B2 | 5/2014 | Kanda et al. |
| 8,799,406 B1 | 8/2014 | Slonh |
| 8,856,105 B2 | 10/2014 | Gargi |
| 8,914,752 B1 | 12/2014 | Spiegel |
| 9,080,736 B1 | 7/2015 | Salzinger et al. |
| 9,185,062 B1 | 11/2015 | Yang et al. |
| 9,253,531 B2 | 2/2016 | Relyea et al. |
| 9,380,264 B1 | 6/2016 | Vakalapudi |
| 9,406,103 B1 | 8/2016 | Gray et al. |
| 9,445,048 B1 | 9/2016 | Nariyawala et al. |
| 9,462,017 B1 | 10/2016 | Siracusano, Jr. |
| 9,635,314 B2 | 4/2017 | Barkley et al. |
| 9,787,938 B2 | 10/2017 | Cranfill et al. |
| 9,800,951 B1 | 10/2017 | Carlson et al. |
| 9,819,877 B1 | 11/2017 | Faulkner et al. |
| 9,992,450 B1 | 6/2018 | Yuan et al. |
| 10,157,040 B2 | 12/2018 | Ballinger et al. |
| 10,194,189 B1 | 1/2019 | Goetz et al. |
| 10,270,983 B1 | 4/2019 | Van Os et al. |
| 10,284,812 B1 | 5/2019 | Van Os et al. |
| 10,300,394 B1 | 5/2019 | Evans et al. |
| 10,339,769 B2 | 7/2019 | Mixter et al. |
| 10,353,532 B1 | 7/2019 | Holz et al. |
| 10,362,272 B1 | 7/2019 | Van Os et al. |
| 10,386,994 B2 | 8/2019 | Singal et al. |
| 10,389,977 B1 | 8/2019 | Van Os et al. |
| 10,410,426 B2 | 9/2019 | Kamini et al. |
| 10,523,625 B1 | 12/2019 | Allen et al. |
| 10,523,976 B2 | 12/2019 | Hemmati et al. |
| 10,645,294 B1 | 5/2020 | Manzari et al. |
| 10,757,366 B1 | 8/2020 | Kwatra et al. |
| 10,771,740 B1 | 9/2020 | Reynolds et al. |
| 10,771,741 B1 | 9/2020 | Reynolds et al. |
| 10,783,883 B2 | 9/2020 | Mixter et al. |
| 10,909,586 B2 | 2/2021 | Avedissian et al. |
| 10,924,446 B1 | 2/2021 | Paul |
| 10,929,099 B2 | 2/2021 | Querze et al. |
| 10,963,145 B1 | 3/2021 | Voss et al. |
| 10,972,655 B1 | 4/2021 | Ostap et al. |
| 11,012,575 B1 | 5/2021 | Leblang et al. |
| 11,024,303 B1 | 6/2021 | Devaraj et al. |
| 11,064,256 B1 | 7/2021 | Voss et al. |
| 11,079,913 B1 | 8/2021 | Kim et al. |
| 11,144,885 B2 | 10/2021 | Rosenberg |
| 11,164,113 B2 | 11/2021 | Howard |
| 11,164,580 B2 | 11/2021 | Kraker |
| 11,176,940 B2 | 11/2021 | Zhong et al. |
| 11,212,449 B1 | 12/2021 | Manzari et al. |
| 11,258,619 B2 | 2/2022 | Libin |
| 11,283,916 B2 | 3/2022 | Coffman et al. |
| 11,290,687 B1 | 3/2022 | Becchetti |
| 11,316,709 B2 | 4/2022 | Brown et al. |
| 11,343,613 B2 | 5/2022 | Gordon et al. |
| 11,360,634 B1 | 6/2022 | Chang et al. |
| 11,449,188 B1 | 9/2022 | Chang et al. |
| 11,523,166 B1 | 12/2022 | Tu et al. |
| 11,621,979 B1 | 4/2023 | Slotznick |
| 11,671,697 B2 | 6/2023 | O'Leary et al. |
| 11,726,647 B2 | 8/2023 | Kim |
| 11,770,600 B2 | 9/2023 | O'Leary et al. |
| 11,955,025 B2 | 4/2024 | Aoki et al. |
| 12,014,118 B2 | 6/2024 | Gruber et al. |
| 12,085,421 B2 | 9/2024 | Yedid et al. |
| 12,218,944 B1 | 2/2025 | Hadley et al. |
| 2001/0021649 A1 | 9/2001 | Kinnunen et al. |
| 2001/0030597 A1 | 10/2001 | Inoue et al. |
| 2001/0041007 A1 | 11/2001 | Aoki |
| 2002/0093531 A1 | 7/2002 | Barile |
| 2002/0101446 A1 | 8/2002 | Tang et al. |
| 2003/0112938 A1 | 6/2003 | Kanakubo et al. |
| 2003/0158886 A1 | 8/2003 | Walls et al. |
| 2003/0160861 A1 | 8/2003 | Barlow et al. |
| 2003/0217096 A1 | 11/2003 | Mckelvie et al. |
| 2003/0225836 A1 | 12/2003 | Lee et al. |
| 2004/0003040 A1 | 1/2004 | Beavers et al. |
| 2004/0048601 A1 | 3/2004 | Lee et al. |
| 2004/0048612 A1 | 3/2004 | Virtanen et al. |
| 2004/0102225 A1 | 5/2004 | Furuta et al. |
| 2004/0162877 A1 | 8/2004 | Van et al. |
| 2004/0218035 A1 | 11/2004 | Crook |
| 2004/0239763 A1 | 12/2004 | Notea et al. |
| 2005/0015286 A1 | 1/2005 | Rudnik et al. |
| 2005/0099492 A1 | 5/2005 | Orr |
| 2005/0120306 A1 | 6/2005 | Klassen et al. |
| 2005/0124365 A1 | 6/2005 | Balasuriya et al. |
| 2005/0138122 A1 | 6/2005 | Boehringer et al. |
| 2005/0144247 A1 | 6/2005 | Christensen et al. |
| 2005/0233780 A1 | 10/2005 | Jani et al. |
| 2006/0002315 A1 | 1/2006 | Theurer et al. |
| 2006/0002523 A1 | 1/2006 | Bettis et al. |
| 2006/0056837 A1 | 3/2006 | Vapaakoski |
| 2006/0098085 A1 | 5/2006 | Nichols et al. |
| 2006/0098634 A1 | 5/2006 | Umemoto et al. |
| 2006/0129947 A1 | 6/2006 | Hamzy et al. |
| 2006/0149399 A1 | 7/2006 | Norhammar et al. |
| 2006/0158730 A1 | 7/2006 | Kira |
| 2006/0256188 A1 | 11/2006 | Mock et al. |
| 2007/0004389 A1 | 1/2007 | Wallace et al. |
| 2007/0040898 A1 | 2/2007 | Lee et al. |
| 2007/0064112 A1 | 3/2007 | Chatting et al. |
| 2007/0115349 A1 | 5/2007 | Currivan et al. |
| 2007/0124783 A1 | 5/2007 | Ahiska et al. |
| 2007/0150842 A1 | 6/2007 | Chaudhri et al. |
| 2007/0156910 A1 | 7/2007 | Alfke et al. |
| 2007/0177025 A1 | 8/2007 | Kopet et al. |
| 2007/0211141 A1 | 9/2007 | Christiansen |
| 2007/0264977 A1 | 11/2007 | Zinn et al. |
| 2007/0279482 A1 | 12/2007 | Oswald et al. |
| 2007/0291736 A1 | 12/2007 | Furlong et al. |
| 2008/0032704 A1 | 2/2008 | Oneil et al. |
| 2008/0036849 A1 | 2/2008 | Oh et al. |
| 2008/0063389 A1 | 3/2008 | Fang et al. |
| 2008/0068447 A1 | 3/2008 | Mattila et al. |
| 2008/0074049 A1 | 3/2008 | Kitai et al. |
| 2008/0074550 A1 | 3/2008 | Park |
| 2008/0084482 A1 | 4/2008 | Hansson et al. |
| 2008/0114716 A1 | 5/2008 | Mock |
| 2008/0117876 A1 | 5/2008 | Hidaka et al. |
| 2008/0122796 A1 | 5/2008 | Jobs et al. |
| 2008/0129816 A1 | 6/2008 | Mattila et al. |
| 2008/0129844 A1 | 6/2008 | Cusack et al. |
| 2008/0134088 A1 | 6/2008 | Tse et al. |
| 2008/0140488 A1 | 6/2008 | Oral et al. |
| 2008/0165388 A1 | 7/2008 | Serlet |
| 2008/0220752 A1 | 9/2008 | Forstall et al. |
| 2008/0246778 A1 | 10/2008 | Ham et al. |
| 2008/0307323 A1 | 12/2008 | Coffman et al. |
| 2008/0308997 A1 | 12/2008 | Keohane et al. |
| 2008/0313278 A1 | 12/2008 | Hochberg |
| 2008/0316183 A1 | 12/2008 | Westerman et al. |
| 2008/0316295 A1 | 12/2008 | King et al. |
| 2009/0005011 A1 | 1/2009 | Christie et al. |

(56)        References Cited

U.S. PATENT DOCUMENTS

| | | |
|---|---|---|
| 2009/0007017 A1 | 1/2009 | Anzures et al. |
| 2009/0015658 A1 | 1/2009 | Enstad et al. |
| 2009/0033737 A1 | 2/2009 | Goose et al. |
| 2009/0046075 A1 | 2/2009 | Kim et al. |
| 2009/0049446 A1 | 2/2009 | Merten et al. |
| 2009/0109276 A1 | 4/2009 | Kim |
| 2009/0117936 A1 | 5/2009 | Maeng |
| 2009/0164322 A1 | 6/2009 | Khan et al. |
| 2009/0164587 A1 | 6/2009 | Gavita et al. |
| 2009/0174680 A1 | 7/2009 | Anzures et al. |
| 2009/0174763 A1 | 7/2009 | Bengtsson et al. |
| 2009/0177981 A1 | 7/2009 | Christie et al. |
| 2009/0183125 A1 | 7/2009 | Magal et al. |
| 2009/0228322 A1 | 9/2009 | Van et al. |
| 2009/0228820 A1 | 9/2009 | Kim et al. |
| 2009/0228825 A1 | 9/2009 | Van Os et al. |
| 2009/0228938 A1 | 9/2009 | White et al. |
| 2009/0232129 A1 | 9/2009 | Wong et al. |
| 2009/0249244 A1 | 10/2009 | Robinson et al. |
| 2009/0256780 A1 | 10/2009 | Small et al. |
| 2009/0262200 A1 | 10/2009 | Takabatake et al. |
| 2009/0262206 A1 | 10/2009 | Park |
| 2009/0287790 A1 | 11/2009 | Upton et al. |
| 2009/0305679 A1 | 12/2009 | Kim |
| 2009/0305732 A1 | 12/2009 | Marcellino et al. |
| 2009/0309897 A1 | 12/2009 | Morita et al. |
| 2010/0009719 A1 | 1/2010 | Oh et al. |
| 2010/0011065 A1 | 1/2010 | Scherpa et al. |
| 2010/0039498 A1 | 2/2010 | Liu et al. |
| 2010/0040292 A1 | 2/2010 | Clarkson |
| 2010/0053212 A1 | 3/2010 | Kang et al. |
| 2010/0058231 A1 | 3/2010 | Duarte et al. |
| 2010/0073454 A1 | 3/2010 | Lovhaugen et al. |
| 2010/0073455 A1 | 3/2010 | Iwabuchi et al. |
| 2010/0085416 A1 | 4/2010 | Hegde et al. |
| 2010/0087230 A1 | 4/2010 | Peh et al. |
| 2010/0097438 A1 | 4/2010 | Ujii |
| 2010/0121636 A1 | 5/2010 | Burke et al. |
| 2010/0123724 A1 | 5/2010 | Moore et al. |
| 2010/0125785 A1 | 5/2010 | Moore et al. |
| 2010/0125811 A1 | 5/2010 | Moore et al. |
| 2010/0146384 A1 | 6/2010 | Peev et al. |
| 2010/0159994 A1 | 6/2010 | Stallings et al. |
| 2010/0159995 A1 | 6/2010 | Stallings et al. |
| 2010/0162171 A1 | 6/2010 | Felt et al. |
| 2010/0169435 A1 | 7/2010 | Osullivan et al. |
| 2010/0177156 A1 | 7/2010 | Kim et al. |
| 2010/0189096 A1 | 7/2010 | Flynn et al. |
| 2010/0238262 A1 | 9/2010 | Kurtz et al. |
| 2010/0246571 A1 | 9/2010 | Geppert et al. |
| 2010/0247077 A1 | 9/2010 | Yamamoto et al. |
| 2010/0251119 A1 | 9/2010 | Geppert et al. |
| 2010/0251158 A1 | 9/2010 | Geppert et al. |
| 2010/0257490 A1 | 10/2010 | Lyon et al. |
| 2010/0262714 A1 | 10/2010 | Hiie |
| 2010/0309284 A1 | 12/2010 | Samadani et al. |
| 2010/0318928 A1 | 12/2010 | Neuman et al. |
| 2010/0318939 A1 | 12/2010 | Moon |
| 2011/0030324 A1 | 2/2011 | Higgins |
| 2011/0032324 A1 | 2/2011 | George et al. |
| 2011/0081889 A1 | 4/2011 | Gao et al. |
| 2011/0085017 A1 | 4/2011 | Robinson et al. |
| 2011/0087970 A1 | 4/2011 | Swink et al. |
| 2011/0105096 A1 | 5/2011 | Dods et al. |
| 2011/0107216 A1 | 5/2011 | Bi |
| 2011/0115875 A1 | 5/2011 | Sadwick et al. |
| 2011/0115876 A1 | 5/2011 | Khot et al. |
| 2011/0115945 A1 | 5/2011 | Takano et al. |
| 2011/0117898 A1 | 5/2011 | Pereira et al. |
| 2011/0126148 A1 | 5/2011 | Krishnaraj et al. |
| 2011/0161836 A1 | 6/2011 | Mu et al. |
| 2011/0164032 A1 | 7/2011 | Shadmi |
| 2011/0167357 A1 | 7/2011 | Benjamin et al. |
| 2011/0184768 A1 | 7/2011 | Norton et al. |
| 2011/0193995 A1 | 8/2011 | Goh et al. |
| 2011/0205333 A1 | 8/2011 | Wu et al. |
| 2011/0209201 A1 | 8/2011 | Chollat |
| 2011/0234746 A1 | 9/2011 | Saleh et al. |
| 2011/0235549 A1 | 9/2011 | Ahlers et al. |
| 2011/0242356 A1 | 10/2011 | Aleksic et al. |
| 2011/0249073 A1 | 10/2011 | Cranfill et al. |
| 2011/0249074 A1 | 10/2011 | Cranfill et al. |
| 2011/0249086 A1 | 10/2011 | Guo et al. |
| 2011/0252146 A1 | 10/2011 | Santamaria et al. |
| 2011/0273526 A1 | 11/2011 | Mehin et al. |
| 2011/0296163 A1 | 12/2011 | Abernethy et al. |
| 2012/0002001 A1 | 1/2012 | Prentice |
| 2012/0019610 A1 | 1/2012 | Hornyak et al. |
| 2012/0033028 A1 | 2/2012 | Murphy et al. |
| 2012/0054278 A1 | 3/2012 | Taleb et al. |
| 2012/0062784 A1 | 3/2012 | Van et al. |
| 2012/0081375 A1 | 4/2012 | Robert et al. |
| 2012/0084691 A1 | 4/2012 | Yun |
| 2012/0092436 A1 | 4/2012 | Pahud et al. |
| 2012/0114108 A1 | 5/2012 | Katis et al. |
| 2012/0173383 A1 | 7/2012 | Badawiyeh et al. |
| 2012/0182381 A1 | 7/2012 | Abate et al. |
| 2012/0185355 A1 | 7/2012 | Kilroy |
| 2012/0185542 A1 | 7/2012 | Vyrros et al. |
| 2012/0188394 A1 | 7/2012 | Park et al. |
| 2012/0201479 A1 | 8/2012 | Zhang et al. |
| 2012/0229591 A1 | 9/2012 | Lee |
| 2012/0233239 A1 | 9/2012 | Urim et al. |
| 2012/0257095 A1 | 10/2012 | Velazquez |
| 2012/0284297 A1 | 11/2012 | Aguera-Arcas et al. |
| 2012/0290950 A1 | 11/2012 | Rapaport et al. |
| 2012/0293605 A1 | 11/2012 | Seferian et al. |
| 2012/0296972 A1 | 11/2012 | Backer |
| 2012/0304079 A1 | 11/2012 | Rideout et al. |
| 2012/0320141 A1 | 12/2012 | Bowen et al. |
| 2013/0007665 A1 | 1/2013 | Chaudhri et al. |
| 2013/0055113 A1 | 2/2013 | Chazin et al. |
| 2013/0061155 A1 | 3/2013 | Hon |
| 2013/0070046 A1 | 3/2013 | Wolf et al. |
| 2013/0073989 A1 | 3/2013 | Harris et al. |
| 2013/0080923 A1 | 3/2013 | Anzures et al. |
| 2013/0088413 A1 | 4/2013 | Raffle et al. |
| 2013/0091214 A1 | 4/2013 | Kellerman et al. |
| 2013/0102281 A1 | 4/2013 | Kanda et al. |
| 2013/0111603 A1 | 5/2013 | Sakai et al. |
| 2013/0124207 A1 | 5/2013 | Sarin et al. |
| 2013/0132865 A1 | 5/2013 | Li |
| 2013/0145295 A1 | 6/2013 | Bocking et al. |
| 2013/0151623 A1 | 6/2013 | Weiser et al. |
| 2013/0162781 A1 | 6/2013 | Hubner et al. |
| 2013/0166580 A1 | 6/2013 | Maharajh et al. |
| 2013/0169742 A1 | 7/2013 | Wu et al. |
| 2013/0185650 A1 | 7/2013 | Gutowitz |
| 2013/0216206 A1 | 8/2013 | Dubin et al. |
| 2013/0219276 A1 | 8/2013 | Shan |
| 2013/0219332 A1 | 8/2013 | Woley et al. |
| 2013/0225140 A1 | 8/2013 | Greisson |
| 2013/0230293 A1 | 9/2013 | Boyle et al. |
| 2013/0282180 A1 | 10/2013 | Layton |
| 2013/0290058 A1 | 10/2013 | Gray et al. |
| 2013/0293777 A1 | 11/2013 | Huber et al. |
| 2013/0325949 A1 | 12/2013 | Virani et al. |
| 2013/0328770 A1 | 12/2013 | Parham |
| 2013/0328997 A1 | 12/2013 | Desai |
| 2013/0332826 A1 | 12/2013 | Karunamuni et al. |
| 2013/0332856 A1 | 12/2013 | Sanders et al. |
| 2013/0346882 A1 | 12/2013 | Shiplacoff et al. |
| 2013/0346892 A1 | 12/2013 | Wren et al. |
| 2013/0346922 A1 | 12/2013 | Shiplacoff et al. |
| 2014/0018053 A1 | 1/2014 | Cho et al. |
| 2014/0024340 A1 | 1/2014 | Raleigh |
| 2014/0026074 A1 | 1/2014 | Cortes et al. |
| 2014/0028781 A1 | 1/2014 | MacDonald |
| 2014/0043424 A1 | 2/2014 | Gava et al. |
| 2014/0055426 A1 | 2/2014 | Park et al. |
| 2014/0063176 A1 | 3/2014 | Modai et al. |
| 2014/0089857 A1 | 3/2014 | Wang et al. |
| 2014/0099004 A1 | 4/2014 | Dibona et al. |
| 2014/0101768 A1 | 4/2014 | Miller et al. |

(56) References Cited

U.S. PATENT DOCUMENTS

| | | |
|---|---|---|
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0118272 A1 | 5/2014 | Gunn |
| 2014/0119531 A1 | 5/2014 | Tuchman et al. |
| 2014/0189524 A1 | 7/2014 | Murarka et al. |
| 2014/0201126 A1 | 7/2014 | Zadeh et al. |
| 2014/0201527 A1 | 7/2014 | Krivorot |
| 2014/0201632 A1 | 7/2014 | Kunigita et al. |
| 2014/0215356 A1 | 7/2014 | Brander et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0229835 A1 | 8/2014 | Ravine |
| 2014/0247368 A1 | 9/2014 | Chinn |
| 2014/0280812 A1 | 9/2014 | Bealkowski et al. |
| 2014/0282084 A1 | 9/2014 | Murarka et al. |
| 2014/0282233 A1 | 9/2014 | Sandler et al. |
| 2014/0310643 A1 | 10/2014 | Karmanenko et al. |
| 2014/0317532 A1 | 10/2014 | Ma et al. |
| 2014/0331149 A1 | 11/2014 | Labey |
| 2014/0335827 A1 | 11/2014 | Tsuda |
| 2014/0349754 A1 | 11/2014 | Kaneoka et al. |
| 2014/0354759 A1 | 12/2014 | Cranfill et al. |
| 2014/0366158 A1 | 12/2014 | Han et al. |
| 2014/0368547 A1 | 12/2014 | Elings |
| 2014/0368600 A1 | 12/2014 | Do et al. |
| 2014/0368719 A1 | 12/2014 | Kaneko et al. |
| 2014/0373081 A1 | 12/2014 | Dodson et al. |
| 2014/0375747 A1 | 12/2014 | Martinez et al. |
| 2014/0378099 A1 | 12/2014 | Huang et al. |
| 2015/0004945 A1 | 1/2015 | Steeves et al. |
| 2015/0019966 A1 | 1/2015 | Jeon et al. |
| 2015/0033149 A1 | 1/2015 | Kuchoor |
| 2015/0040012 A1 | 2/2015 | Faaborg et al. |
| 2015/0058413 A1 | 2/2015 | Ge |
| 2015/0062158 A1 | 3/2015 | Hildreth et al. |
| 2015/0067541 A1 | 3/2015 | Owens et al. |
| 2015/0070272 A1 | 3/2015 | Kim et al. |
| 2015/0078680 A1 | 3/2015 | Shakib et al. |
| 2015/0082255 A1 | 3/2015 | Devries et al. |
| 2015/0082446 A1 | 3/2015 | Flowers et al. |
| 2015/0085057 A1 | 3/2015 | Ouyang et al. |
| 2015/0094120 A1 | 4/2015 | Suh et al. |
| 2015/0095804 A1 | 4/2015 | Grossman et al. |
| 2015/0106720 A1 | 4/2015 | Backer |
| 2015/0109966 A1 | 4/2015 | Hong et al. |
| 2015/0116353 A1 | 4/2015 | Miura et al. |
| 2015/0116363 A1 | 4/2015 | Monte et al. |
| 2015/0116464 A1 | 4/2015 | Tanaka |
| 2015/0121267 A1 | 4/2015 | Wu et al. |
| 2015/0121312 A1 | 4/2015 | Li |
| 2015/0130892 A1 | 5/2015 | Whynot et al. |
| 2015/0135098 A1 | 5/2015 | Geppert et al. |
| 2015/0160832 A1 | 6/2015 | Walkin et al. |
| 2015/0172552 A1 | 6/2015 | Kim |
| 2015/0177914 A1 | 6/2015 | Coyner et al. |
| 2015/0193196 A1 | 7/2015 | Lin et al. |
| 2015/0206529 A1 | 7/2015 | Kwon et al. |
| 2015/0235432 A1 | 8/2015 | Bronder et al. |
| 2015/0248167 A1 | 9/2015 | Turbell et al. |
| 2015/0256796 A1 | 9/2015 | Ma |
| 2015/0264304 A1 | 9/2015 | Chastney et al. |
| 2015/0288868 A1 | 10/2015 | Slavin et al. |
| 2015/0296077 A1 | 10/2015 | Wakeyama et al. |
| 2015/0301338 A1 | 10/2015 | Van Heugten |
| 2015/0304366 A1 | 10/2015 | Bader-Natal et al. |
| 2015/0304413 A1 | 10/2015 | Park |
| 2015/0319006 A1 | 11/2015 | Plummer et al. |
| 2015/0319144 A1 | 11/2015 | Barton et al. |
| 2015/0334140 A1 | 11/2015 | Singh et al. |
| 2015/0334313 A1 | 11/2015 | Chougle et al. |
| 2015/0350143 A1 | 12/2015 | Lemay et al. |
| 2015/0350533 A1 | 12/2015 | Harris et al. |
| 2015/0358484 A1 | 12/2015 | Permude |
| 2015/0358584 A1 | 12/2015 | Mattson |
| 2015/0365306 A1 | 12/2015 | Chaudhri et al. |
| 2015/0370426 A1 | 12/2015 | Carrigan et al. |
| 2015/0373065 A1 | 12/2015 | Holmquist et al. |
| 2015/0373178 A1 | 12/2015 | Felt et al. |
| 2016/0014059 A1 | 1/2016 | Rathod |
| 2016/0014477 A1 | 1/2016 | Siders |
| 2016/0021155 A1 | 1/2016 | Sawato |
| 2016/0028875 A1 | 1/2016 | Brown et al. |
| 2016/0029004 A1 | 1/2016 | Campbell et al. |
| 2016/0048316 A1 | 2/2016 | Bae et al. |
| 2016/0057173 A1 | 2/2016 | Singman et al. |
| 2016/0065832 A1 | 3/2016 | Kim et al. |
| 2016/0072861 A1 | 3/2016 | Woolsey et al. |
| 2016/0073185 A1 | 3/2016 | Kannappan et al. |
| 2016/0099901 A1 | 4/2016 | Allen et al. |
| 2016/0099987 A1 | 4/2016 | Shamma |
| 2016/0110059 A1 | 4/2016 | Li et al. |
| 2016/0124614 A1 | 5/2016 | Bromberg et al. |
| 2016/0127636 A1 | 5/2016 | Ito et al. |
| 2016/0139785 A1 | 5/2016 | Griffin et al. |
| 2016/0142450 A1 | 5/2016 | Paul et al. |
| 2016/0180259 A1 | 6/2016 | Marianko et al. |
| 2016/0210602 A1 | 7/2016 | Siddique et al. |
| 2016/0212374 A1 | 7/2016 | Usbergo et al. |
| 2016/0227095 A1 | 8/2016 | Yoshizawa et al. |
| 2016/0231902 A1 | 8/2016 | Sirpal et al. |
| 2016/0259528 A1 | 9/2016 | Foss et al. |
| 2016/0261653 A1 | 9/2016 | Kim |
| 2016/0266769 A1 | 9/2016 | Oursbourn et al. |
| 2016/0277708 A1 | 9/2016 | Rintel et al. |
| 2016/0277903 A1 | 9/2016 | Poosala et al. |
| 2016/0291824 A1 | 10/2016 | Grossman et al. |
| 2016/0306422 A1 | 10/2016 | Parham et al. |
| 2016/0306504 A1 | 10/2016 | Brunsch et al. |
| 2016/0308920 A1 | 10/2016 | Brunsch et al. |
| 2016/0316038 A1 | 10/2016 | Jolfaei |
| 2016/0320849 A1 | 11/2016 | Koo |
| 2016/0335041 A1 | 11/2016 | Wachter et al. |
| 2016/0344972 A1 | 11/2016 | Missig et al. |
| 2016/0352661 A1 | 12/2016 | Yang et al. |
| 2016/0364106 A1 | 12/2016 | Koum et al. |
| 2016/0380780 A1 | 12/2016 | Stephenson et al. |
| 2017/0006162 A1 | 1/2017 | Bargetzi et al. |
| 2017/0024100 A1 | 1/2017 | Pieper et al. |
| 2017/0031557 A1 | 2/2017 | Xiangli et al. |
| 2017/0034583 A1 | 2/2017 | Long et al. |
| 2017/0048817 A1 | 2/2017 | Yang et al. |
| 2017/0064184 A1 | 3/2017 | Tsai |
| 2017/0083189 A1 | 3/2017 | Yang et al. |
| 2017/0093769 A1 | 3/2017 | Lind et al. |
| 2017/0094019 A1 | 3/2017 | Ahmed et al. |
| 2017/0097621 A1 | 4/2017 | Ackmann et al. |
| 2017/0097715 A1 | 4/2017 | Kim et al. |
| 2017/0111587 A1 | 4/2017 | Herbst et al. |
| 2017/0111595 A1 | 4/2017 | Soni et al. |
| 2017/0126592 A1 | 5/2017 | El |
| 2017/0150099 A1 | 5/2017 | Duckworth et al. |
| 2017/0150904 A1 | 6/2017 | Park et al. |
| 2017/0206779 A1 | 7/2017 | Lee et al. |
| 2017/0220212 A1 | 8/2017 | Yang et al. |
| 2017/0230585 A1 | 8/2017 | Nash et al. |
| 2017/0230705 A1 | 8/2017 | Pardue et al. |
| 2017/0244932 A1 | 8/2017 | Pistilli et al. |
| 2017/0280098 A1 | 9/2017 | Sethuraman et al. |
| 2017/0280494 A1 | 9/2017 | Jung et al. |
| 2017/0309174 A1 | 10/2017 | Gonzales et al. |
| 2017/0324784 A1 | 11/2017 | Taine et al. |
| 2017/0336960 A1 | 11/2017 | Chaudhri et al. |
| 2017/0344253 A1 | 11/2017 | Zhang |
| 2017/0353508 A1 | 12/2017 | Yoakum |
| 2017/0357382 A1 | 12/2017 | Miura et al. |
| 2017/0357425 A1 | 12/2017 | Smith et al. |
| 2017/0357434 A1 | 12/2017 | Coffman et al. |
| 2017/0357917 A1 | 12/2017 | Holmes et al. |
| 2017/0359191 A1 | 12/2017 | Smith et al. |
| 2017/0359285 A1 | 12/2017 | Weinig et al. |
| 2017/0367484 A1 | 12/2017 | Salvoni et al. |
| 2017/0371496 A1 | 12/2017 | Denoue et al. |

(56) References Cited

U.S. PATENT DOCUMENTS

| | | |
|---|---|---|
| 2017/0373868 A1 | 12/2017 | Deets, Jr. |
| 2018/0013799 A1 | 1/2018 | Davies |
| 2018/0020530 A1 | 1/2018 | Scordato et al. |
| 2018/0047200 A1 | 2/2018 | O'hara et al. |
| 2018/0048820 A1 | 2/2018 | Hinkel et al. |
| 2018/0061158 A1 | 3/2018 | Greene |
| 2018/0070144 A1 | 3/2018 | Tang et al. |
| 2018/0081522 A1 | 3/2018 | Greenberg et al. |
| 2018/0091732 A1 | 3/2018 | Wilson et al. |
| 2018/0095616 A1 | 4/2018 | Valdivia et al. |
| 2018/0095634 A1 | 4/2018 | Alexander |
| 2018/0095636 A1 | 4/2018 | Valdivia et al. |
| 2018/0101297 A1 | 4/2018 | Yang et al. |
| 2018/0103074 A1 | 4/2018 | Rosenberg |
| 2018/0121074 A1 | 5/2018 | Peron et al. |
| 2018/0122378 A1 | 5/2018 | Mixter et al. |
| 2018/0123986 A1 | 5/2018 | Faulkner et al. |
| 2018/0124128 A1 | 5/2018 | Faulkner et al. |
| 2018/0124359 A1 | 5/2018 | Faulkner |
| 2018/0131732 A1 | 5/2018 | Aronoff et al. |
| 2018/0131907 A1 | 5/2018 | Schmirler et al. |
| 2018/0139374 A1 | 5/2018 | Yu |
| 2018/0144590 A1 | 5/2018 | Mixter et al. |
| 2018/0150433 A1 | 5/2018 | Sowden et al. |
| 2018/0157333 A1 | 6/2018 | Ross et al. |
| 2018/0157455 A1 | 6/2018 | Troy et al. |
| 2018/0160072 A1 | 6/2018 | Cranfill et al. |
| 2018/0165002 A1 | 6/2018 | Yang et al. |
| 2018/0183849 A1 | 6/2018 | Shin et al. |
| 2018/0191965 A1 | 7/2018 | Faulkner et al. |
| 2018/0199164 A1 | 7/2018 | Bargetzi et al. |
| 2018/0203577 A1 | 7/2018 | Astavans et al. |
| 2018/0204111 A1 | 7/2018 | Zadeh et al. |
| 2018/0205797 A1 | 7/2018 | Faulkner |
| 2018/0213144 A1 | 7/2018 | Kim et al. |
| 2018/0213396 A1 | 7/2018 | Segal et al. |
| 2018/0227341 A1 | 8/2018 | Rizzi |
| 2018/0228003 A1 | 8/2018 | O'driscoll et al. |
| 2018/0228006 A1 | 8/2018 | Baker et al. |
| 2018/0249047 A1 | 8/2018 | Marlatt |
| 2018/0253152 A1 | 9/2018 | Forsblom et al. |
| 2018/0267774 A1 | 9/2018 | Williams et al. |
| 2018/0286395 A1 | 10/2018 | Li et al. |
| 2018/0288104 A1 | 10/2018 | Padilla et al. |
| 2018/0293959 A1 | 10/2018 | Monga et al. |
| 2018/0295079 A1 | 10/2018 | Longo |
| 2018/0308480 A1 | 10/2018 | Jang et al. |
| 2018/0309801 A1 | 10/2018 | Rathod |
| 2018/0332559 A1 | 11/2018 | Gudivada et al. |
| 2018/0338038 A1 | 11/2018 | Ly et al. |
| 2018/0341448 A1 | 11/2018 | Behzadi et al. |
| 2018/0348764 A1 | 12/2018 | Zhang et al. |
| 2018/0359293 A1 | 12/2018 | Faulkner et al. |
| 2018/0364665 A1 | 12/2018 | Clymer et al. |
| 2018/0367483 A1 | 12/2018 | Rodriguez et al. |
| 2018/0367484 A1 | 12/2018 | Rodriguez et al. |
| 2018/0375676 A1 | 12/2018 | Bader-natal et al. |
| 2019/0005419 A1 | 1/2019 | Howard |
| 2019/0018586 A1 | 1/2019 | Yang et al. |
| 2019/0025943 A1 | 1/2019 | Jobs et al. |
| 2019/0028419 A1 | 1/2019 | Sullivan |
| 2019/0034849 A1 | 1/2019 | Romaine et al. |
| 2019/0037173 A1 | 1/2019 | Lee et al. |
| 2019/0065027 A1 | 2/2019 | Hauenstein et al. |
| 2019/0068670 A1 | 2/2019 | Adam et al. |
| 2019/0102049 A1 | 4/2019 | Anzures et al. |
| 2019/0102145 A1 | 4/2019 | Wilberding et al. |
| 2019/0110087 A1 | 4/2019 | Parasseeri et al. |
| 2019/0124021 A1 | 4/2019 | Demattei |
| 2019/0138951 A1 | 5/2019 | Brownhill et al. |
| 2019/0149768 A1 | 5/2019 | Mcardle |
| 2019/0149887 A1 | 5/2019 | Williams et al. |
| 2019/0173939 A1 | 6/2019 | Lewis et al. |
| 2019/0199963 A1 | 6/2019 | Ahn et al. |
| 2019/0199993 A1 | 6/2019 | Babu J D et al. |
| 2019/0205861 A1 | 7/2019 | Bace |
| 2019/0215503 A1 | 7/2019 | Monson et al. |
| 2019/0222775 A1 | 7/2019 | Ahn |
| 2019/0228495 A1 | 7/2019 | Tremblay et al. |
| 2019/0236142 A1 | 8/2019 | Balakrishnan et al. |
| 2019/0246238 A1 | 8/2019 | Crutchfield et al. |
| 2019/0279634 A1 | 9/2019 | Tak et al. |
| 2019/0297039 A1 | 9/2019 | Rodriguez et al. |
| 2019/0303861 A1 | 10/2019 | Mathias et al. |
| 2019/0332400 A1 | 10/2019 | Spoor et al. |
| 2019/0339769 A1 | 11/2019 | Cox et al. |
| 2019/0339825 A1 | 11/2019 | Anzures et al. |
| 2019/0342507 A1 | 11/2019 | Dye et al. |
| 2019/0342519 A1 | 11/2019 | Van Os et al. |
| 2019/0342621 A1 | 11/2019 | Carrigan et al. |
| 2019/0347181 A1 | 11/2019 | Cranfill et al. |
| 2019/0354252 A1 | 11/2019 | Badr |
| 2019/0361575 A1 | 11/2019 | Ni et al. |
| 2019/0361694 A1 | 11/2019 | Gordon et al. |
| 2019/0362555 A1 | 11/2019 | Chen et al. |
| 2019/0369862 A1 | 12/2019 | De Vries |
| 2019/0370805 A1 | 12/2019 | Van Os et al. |
| 2020/0004401 A1 | 1/2020 | Hwang et al. |
| 2020/0005539 A1 | 1/2020 | Hwang et al. |
| 2020/0034033 A1 | 1/2020 | Chaudhri et al. |
| 2020/0045245 A1 | 2/2020 | Van Os et al. |
| 2020/0050502 A1 | 2/2020 | Ghafourifar et al. |
| 2020/0055515 A1 | 2/2020 | Herman et al. |
| 2020/0059628 A1 | 2/2020 | Cranfill et al. |
| 2020/0106952 A1 | 4/2020 | Missig et al. |
| 2020/0106965 A1 | 4/2020 | Malia et al. |
| 2020/0112690 A1 | 4/2020 | Harrison et al. |
| 2020/0127988 A1 | 4/2020 | Bradley et al. |
| 2020/0135191 A1 | 4/2020 | Nourbakhsh |
| 2020/0142667 A1 | 5/2020 | Querze et al. |
| 2020/0143593 A1 | 5/2020 | Rudman et al. |
| 2020/0152186 A1 | 5/2020 | Koh et al. |
| 2020/0183548 A1 | 6/2020 | Anzures et al. |
| 2020/0186378 A1 | 6/2020 | Six et al. |
| 2020/0186576 A1 | 6/2020 | Gopal et al. |
| 2020/0195887 A1 | 6/2020 | Van Os et al. |
| 2020/0213530 A1 | 7/2020 | Ahn |
| 2020/0226896 A1 | 7/2020 | Robertson et al. |
| 2020/0242788 A1 | 7/2020 | Jacobs et al. |
| 2020/0274726 A1 | 8/2020 | Setteboun et al. |
| 2020/0279279 A1 | 9/2020 | Chaudhuri |
| 2020/0296329 A1 | 9/2020 | Tang et al. |
| 2020/0302913 A1 | 9/2020 | Marcinkiewicz |
| 2020/0312318 A1 | 10/2020 | Olson et al. |
| 2020/0335187 A1 | 10/2020 | Lefkofsky et al. |
| 2020/0371673 A1 | 11/2020 | Faulkner |
| 2020/0383157 A1 | 12/2020 | Lee et al. |
| 2020/0385116 A1 | 12/2020 | Sabripour et al. |
| 2020/0395012 A1 | 12/2020 | Kim et al. |
| 2020/0400957 A1 | 12/2020 | Van Heugten |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0096703 A1 | 4/2021 | Anzures et al. |
| 2021/0097768 A1 | 4/2021 | Malia et al. |
| 2021/0099829 A1 | 4/2021 | Soto et al. |
| 2021/0136129 A1 | 5/2021 | Ponnusamy et al. |
| 2021/0144336 A1 | 5/2021 | Van Os et al. |
| 2021/0152503 A1 | 5/2021 | Rodriguez et al. |
| 2021/0158622 A1 | 5/2021 | Leelaphattarakij et al. |
| 2021/0158830 A1 | 5/2021 | Boehlke |
| 2021/0176204 A1 | 6/2021 | Geppert et al. |
| 2021/0182169 A1 | 6/2021 | Mardente et al. |
| 2021/0195084 A1 | 6/2021 | Olajos et al. |
| 2021/0203878 A1 | 7/2021 | Lee et al. |
| 2021/0217106 A1 | 7/2021 | Hauser et al. |
| 2021/0233325 A1* | 7/2021 | Kawakami ............. G06V 40/23 |
| 2021/0265032 A1 | 8/2021 | Burgess et al. |
| 2021/0266274 A1 | 8/2021 | Liu et al. |
| 2021/0306288 A1 | 9/2021 | Boyd et al. |
| 2021/0321197 A1 | 10/2021 | Annamraju |
| 2021/0323406 A1 | 10/2021 | So et al. |
| 2021/0333864 A1 | 10/2021 | Harvey et al. |
| 2021/0349680 A1 | 11/2021 | Kim et al. |

(56)        References Cited

U.S. PATENT DOCUMENTS

| | | |
|---|---|---|
| 2021/0352172 A1 | 11/2021 | Kim et al. |
| 2021/0360192 A1 | 11/2021 | Cranfill et al. |
| 2021/0360199 A1 | 11/2021 | Oz et al. |
| 2021/0373672 A1 | 12/2021 | Schwarz et al. |
| 2021/0409359 A1 | 12/2021 | Eirinberg et al. |
| 2022/0004356 A1 | 1/2022 | Kim et al. |
| 2022/0006946 A1 | 1/2022 | Missig et al. |
| 2022/0014715 A1 | 1/2022 | Tamura et al. |
| 2022/0021680 A1 | 1/2022 | Roedel et al. |
| 2022/0046186 A1 | 2/2022 | Fayad et al. |
| 2022/0046222 A1 | 2/2022 | Meier |
| 2022/0050578 A1 | 2/2022 | Waldman et al. |
| 2022/0053142 A1 | 2/2022 | Manzari et al. |
| 2022/0086203 A1* | 3/2022 | Morris .................. H04N 7/157 |
| 2022/0100362 A1 | 3/2022 | Kim |
| 2022/0103784 A1 | 3/2022 | Pollefeys |
| 2022/0122089 A1 | 4/2022 | Bonilla Kuhlmann et al. |
| 2022/0141259 A1* | 5/2022 | Copley ................. H04L 65/765 |
| | | 348/14.08 |
| 2022/0166918 A1* | 5/2022 | Burger ............... H04N 21/4314 |
| 2022/0180862 A1 | 6/2022 | Sharifi et al. |
| 2022/0199267 A1 | 6/2022 | Subramanian et al. |
| 2022/0244836 A1 | 8/2022 | O'leary et al. |
| 2022/0247587 A1 | 8/2022 | Rolin et al. |
| 2022/0247918 A1 | 8/2022 | O'leary et al. |
| 2022/0247919 A1 | 8/2022 | O'leary et al. |
| 2022/0253136 A1 | 8/2022 | Holder et al. |
| 2022/0253195 A1 | 8/2022 | Stevens et al. |
| 2022/0254074 A1 | 8/2022 | Berliner et al. |
| 2022/0269882 A1 | 8/2022 | Proschowsky et al. |
| 2022/0278992 A1 | 9/2022 | Baker et al. |
| 2022/0286314 A1 | 9/2022 | Meyer et al. |
| 2022/0303150 A1 | 9/2022 | Jensen et al. |
| 2022/0343569 A1 | 10/2022 | Karri et al. |
| 2022/0365643 A1 | 11/2022 | Triverio et al. |
| 2022/0365739 A1 | 11/2022 | Chang et al. |
| 2022/0365740 A1 | 11/2022 | Chang et al. |
| 2022/0368548 A1 | 11/2022 | Chang et al. |
| 2022/0368659 A1 | 11/2022 | Chang et al. |
| 2022/0368742 A1 | 11/2022 | Chang et al. |
| 2022/0374136 A1 | 11/2022 | Chang et al. |
| 2022/0375358 A1 | 11/2022 | Shimomura et al. |
| 2023/0004264 A1 | 1/2023 | Anzures et al. |
| 2023/0041125 A1 | 2/2023 | Kim et al. |
| 2023/0086248 A1 | 3/2023 | Puyol et al. |
| 2023/0092103 A1 | 3/2023 | Puyol et al. |
| 2023/0094453 A1 | 3/2023 | O'leary et al. |
| 2023/0098395 A1 | 3/2023 | O'leary et al. |
| 2023/0109787 A1 | 4/2023 | O'leary et al. |
| 2023/0143275 A1 | 5/2023 | Opara et al. |
| 2023/0188674 A1 | 6/2023 | Van Os et al. |
| 2023/0213764 A1 | 7/2023 | Arngren et al. |
| 2023/0236723 A1 | 7/2023 | Yang et al. |
| 2023/0246857 A1 | 8/2023 | Boucheron et al. |
| 2023/0262196 A1 | 8/2023 | Cranfill et al. |
| 2023/0262317 A1 | 8/2023 | O'leary et al. |
| 2023/0319413 A1 | 10/2023 | Manzari et al. |
| 2023/0370507 A1 | 11/2023 | Chang et al. |
| 2023/0386145 A1* | 11/2023 | Faulkner ............... H04N 7/157 |
| 2023/0388357 A1* | 11/2023 | Faulkner ............. H04N 13/366 |
| 2024/0036804 A1 | 2/2024 | Chang et al. |
| 2024/0048600 A1 | 2/2024 | Yerli |
| 2024/0064270 A1 | 2/2024 | Van Os et al. |
| 2024/0064395 A1 | 2/2024 | O'Leary et al. |
| 2024/0103677 A1 | 3/2024 | Mckenzie et al. |
| 2024/0118793 A1 | 4/2024 | Triverio et al. |
| 2024/0259669 A1 | 8/2024 | Missig et al. |
| 2024/0377922 A1 | 11/2024 | Rajam et al. |
| 2025/0039011 A1 | 1/2025 | Meyer et al. |
| 2025/0138697 A1 | 5/2025 | Smith et al. |
| 2025/0165123 A1 | 5/2025 | Anzures et al. |
| 2025/0202961 A1 | 6/2025 | Triverio et al. |
| 2025/0224859 A1 | 7/2025 | Kim et al. |
| 2025/0294237 A1 | 9/2025 | Manzari et al. |
| 2025/0330554 A1 | 10/2025 | Cranfill et al. |

FOREIGN PATENT DOCUMENTS

| | | |
|---|---|---|
| CA | 2917174 A1 | 1/2015 |
| CN | 1473430 A | 2/2004 |
| CN | 1689327 A | 10/2005 |
| CN | 1801926 A | 7/2006 |
| CN | 1890996 A | 1/2007 |
| CN | 1985319 A | 6/2007 |
| CN | 101075173 A | 11/2007 |
| CN | 101296356 A | 10/2008 |
| CN | 101431564 A | 5/2009 |
| CN | 101443727 A | 5/2009 |
| CN | 101566866 A | 10/2009 |
| CN | 101682622 A | 3/2010 |
| CN | 101853132 A | 10/2010 |
| CN | 101854247 A | 10/2010 |
| CN | 101854261 A | 10/2010 |
| CN | 101917529 A | 12/2010 |
| CN | 101950236 A | 1/2011 |
| CN | 102111454 A | 6/2011 |
| CN | 102111505 A | 6/2011 |
| CN | 102215217 A | 10/2011 |
| CN | 102239740 A | 11/2011 |
| CN | 102317887 A | 1/2012 |
| CN | 102572369 A | 7/2012 |
| CN | 102651731 A | 8/2012 |
| CN | 102821180 A | 12/2012 |
| CN | 102929917 A | 2/2013 |
| CN | 103019681 A | 4/2013 |
| CN | 103039064 A | 4/2013 |
| CN | 103049274 A | 4/2013 |
| CN | 103179283 A | 6/2013 |
| CN | 103222247 A | 7/2013 |
| CN | 103235688 A | 8/2013 |
| CN | 103237191 A | 8/2013 |
| CN | 103384235 A | 11/2013 |
| CN | 103442774 A | 12/2013 |
| CN | 103458215 A | 12/2013 |
| CN | 103649985 A | 3/2014 |
| CN | 103718152 A | 4/2014 |
| CN | 103748610 A | 4/2014 |
| CN | 104010158 A | 8/2014 |
| CN | 104035663 A | 9/2014 |
| CN | 104081335 A | 10/2014 |
| CN | 104090720 A | 10/2014 |
| CN | 104169855 A | 11/2014 |
| CN | 104270597 A | 1/2015 |
| CN | 104317516 A | 1/2015 |
| CN | 104331246 A | 2/2015 |
| CN | 104375741 A | 2/2015 |
| CN | 104427288 A | 3/2015 |
| CN | 104469143 A | 3/2015 |
| CN | 104503689 A | 4/2015 |
| CN | 104584488 A | 4/2015 |
| CN | 104602133 A | 5/2015 |
| CN | 104615430 A | 5/2015 |
| CN | 104869046 A | 8/2015 |
| CN | 104980578 A | 10/2015 |
| CN | 105094957 A | 11/2015 |
| CN | 105141498 A | 12/2015 |
| CN | 105204846 A | 12/2015 |
| CN | 105264473 A | 1/2016 |
| CN | 105308634 A | 2/2016 |
| CN | 105389173 A | 3/2016 |
| CN | 105391778 A | 3/2016 |
| CN | 105554429 A | 5/2016 |
| CN | 105578111 A | 5/2016 |
| CN | 105900376 A | 8/2016 |
| CN | 106210855 A | 12/2016 |
| CN | 106303648 A | 1/2017 |
| CN | 106471793 A | 3/2017 |
| CN | 106664389 A | 5/2017 |
| CN | 106713946 A | 5/2017 |
| CN | 106716954 A | 5/2017 |
| CN | 106843626 A | 6/2017 |
| CN | 107066523 A | 8/2017 |
| CN | 107122049 A | 9/2017 |
| CN | 107491257 A | 12/2017 |
| CN | 107533417 A | 1/2018 |

(56) References Cited

FOREIGN PATENT DOCUMENTS

| | | | |
|---|---|---|---|
| CN | 107534656 A | 1/2018 |
| CN | 107704177 A | 2/2018 |
| CN | 107728876 A | 2/2018 |
| CN | 104025538 B | 4/2018 |
| CN | 107992248 A | 5/2018 |
| CN | 108933965 A | 12/2018 |
| CN | 109196825 A | 1/2019 |
| CN | 110456971 A | 11/2019 |
| CN | 111095165 A | 5/2020 |
| CN | 111108740 A | 5/2020 |
| CN | 111601065 A | 8/2020 |
| CN | 111913630 A | 11/2020 |
| CN | 112088530 A | 12/2020 |
| CN | 112214275 A | 1/2021 |
| CN | 112261338 A | 1/2021 |
| CN | 112416223 A | 2/2021 |
| EP | 1903791 A2 | 3/2008 |
| EP | 1986431 A2 | 10/2008 |
| EP | 2056568 A1 | 5/2009 |
| EP | 2219105 A1 | 8/2010 |
| EP | 2237534 A1 | 10/2010 |
| EP | 2237536 A1 | 10/2010 |
| EP | 2521080 A2 | 11/2012 |
| EP | 2600584 A1 | 6/2013 |
| EP | 2787465 A1 | 10/2014 |
| EP | 2446619 B1 | 10/2015 |
| EP | 3038427 A1 | 6/2016 |
| EP | 2761582 B1 | 3/2017 |
| EP | 2258103 B1 | 5/2018 |
| EP | 3163866 B1 | 5/2020 |
| EP | 4109891 A1 | 12/2022 |
| IN | 1038MUM2005 A | 6/2007 |
| JP | 6-113297 A | 4/1994 |
| JP | 6-276335 A | 9/1994 |
| JP | 6-276515 A | 9/1994 |
| JP | 6-282405 A | 10/1994 |
| JP | 7-135594 A | 5/1995 |
| JP | 8-279998 A | 10/1996 |
| JP | 9-182046 A | 7/1997 |
| JP | 9-233384 A | 9/1997 |
| JP | 9-247655 A | 9/1997 |
| JP | 9-265457 A | 10/1997 |
| JP | 2001-67099 A | 3/2001 |
| JP | 2001-169166 A | 6/2001 |
| JP | 2002-251365 A | 9/2002 |
| JP | 2002-320140 A | 10/2002 |
| JP | 2002-351802 A | 12/2002 |
| JP | 2003-101981 A | 4/2003 |
| JP | 2003-134382 A | 5/2003 |
| JP | 2003-189168 A | 7/2003 |
| JP | 2003-274376 A | 9/2003 |
| JP | 2003-299050 A | 10/2003 |
| JP | 2003-299051 A | 10/2003 |
| JP | 2003-348444 A | 12/2003 |
| JP | 2004-101708 A | 4/2004 |
| JP | 2004-187273 A | 7/2004 |
| JP | 2004-193860 A | 7/2004 |
| JP | 2004-221738 A | 8/2004 |
| JP | 2005-159567 A | 6/2005 |
| JP | 2005-260289 A | 9/2005 |
| JP | 2005-286445 A | 10/2005 |
| JP | 2005-303736 A | 10/2005 |
| JP | 2006-135495 A | 5/2006 |
| JP | 2006-166414 A | 6/2006 |
| JP | 2006-222822 A | 8/2006 |
| JP | 2006-245732 A | 9/2006 |
| JP | 2006-246019 A | 9/2006 |
| JP | 2006-254350 A | 9/2006 |
| JP | 2005-94696 A | 10/2006 |
| JP | 2006-319742 A | 11/2006 |
| JP | 2007-88630 A | 4/2007 |
| JP | 2007-140060 A | 6/2007 |
| JP | 2007-150877 A | 6/2007 |
| JP | 2007-150917 A | 6/2007 |
| JP | 2007-150921 A | 6/2007 |
| JP | 2007-200329 A | 8/2007 |
| JP | 2007-201727 A | 8/2007 |
| JP | 2007-274034 A | 10/2007 |
| JP | 2007-282263 A | 10/2007 |
| JP | 2007-300452 A | 11/2007 |
| JP | 2008-28586 A | 2/2008 |
| JP | 2008-99330 A | 4/2008 |
| JP | 2008-125105 A | 5/2008 |
| JP | 2008-136119 A | 6/2008 |
| JP | 2008-533838 A | 8/2008 |
| JP | 2008-289014 A | 11/2008 |
| JP | 2009-502048 A | 1/2009 |
| JP | 2009-159253 A | 7/2009 |
| JP | 2009-188975 A | 8/2009 |
| JP | 2009-232290 A | 10/2009 |
| JP | 2009-265692 A | 11/2009 |
| JP | 2009-296583 A | 12/2009 |
| JP | 2010-15239 A | 1/2010 |
| JP | 2010-206745 A | 9/2010 |
| JP | 2010-541398 A | 12/2010 |
| JP | 2012-244340 A | 12/2012 |
| JP | 2013-524683 A | 6/2013 |
| JP | 2014-71835 A | 4/2014 |
| JP | 2014-87126 A | 5/2014 |
| JP | 2014-170982 A | 9/2014 |
| JP | 2015-11507 A | 1/2015 |
| JP | 2015-170234 A | 9/2015 |
| JP | 2015-201087 A | 11/2015 |
| JP | 2016-1446 A | 1/2016 |
| JP | 2016-24557 A | 2/2016 |
| JP | 2016-38615 A | 3/2016 |
| JP | 2016-53929 A | 4/2016 |
| JP | 2016-157292 A | 9/2016 |
| JP | 2016-167806 A | 9/2016 |
| JP | 2016-174282 A | 9/2016 |
| JP | 2017-532645 A | 11/2017 |
| JP | 2017-228843 A | 12/2017 |
| JP | 2017-229060 A | 12/2017 |
| JP | 2018-7158 A | 1/2018 |
| JP | 2018-56719 A | 4/2018 |
| JP | 2018-136828 A | 8/2018 |
| JP | 2018-200624 A | 12/2018 |
| JP | 2019-114282 A | 7/2019 |
| JP | 2020-510929 A | 4/2020 |
| JP | 2021-40300 A | 3/2021 |
| KR | 1997-0031883 A | 6/1997 |
| KR | 1999-0044201 A | 6/1999 |
| KR | 10-2003-0016405 A | 2/2003 |
| KR | 10-2004-0016688 A | 2/2004 |
| KR | 10-2004-0045338 A | 6/2004 |
| KR | 10-2005-0054684 A | 6/2005 |
| KR | 10-2006-0031959 A | 4/2006 |
| KR | 10-2006-0064326 A | 6/2006 |
| KR | 10-2006-0116902 A | 11/2006 |
| KR | 10-2007-0111270 A | 11/2007 |
| KR | 10-2008-0096042 A | 10/2008 |
| KR | 10-2009-0002641 A | 1/2009 |
| KR | 10-2009-0004176 A | 1/2009 |
| KR | 10-2009-0017901 A | 2/2009 |
| KR | 10-2009-0017906 A | 2/2009 |
| KR | 10-2009-0036226 A | 4/2009 |
| KR | 10-2009-0040613 A | 4/2009 |
| KR | 10-2009-0042499 A | 4/2009 |
| KR | 10-0891449 B1 | 4/2009 |
| KR | 10-2009-0122805 A | 12/2009 |
| KR | 10-2009-0126516 A | 12/2009 |
| KR | 10-2013-0090244 A | 8/2013 |
| KR | 10-2013-0138150 A | 12/2013 |
| KR | 10-2016-0092820 A | 8/2016 |
| KR | 10-2017-0128498 A | 11/2017 |
| KR | 10-2018-0085931 A | 7/2018 |
| KR | 10-2019-0033082 A | 3/2019 |
| KR | 10-1989433 B1 | 6/2019 |
| KR | 10-2020-0039030 A | 4/2020 |
| TW | 1321955 B | 3/2010 |
| TW | I321955 B | 3/2010 |
| WO | 01/18665 A1 | 3/2001 |
| WO | 01/27783 A1 | 4/2001 |
| WO | 02-37848 A1 | 5/2002 |

(56) References Cited

FOREIGN PATENT DOCUMENTS

| WO | 02/093344 A1 | 11/2002 |
| WO | 2003/077553 A1 | 9/2003 |
| WO | 2004/032507 A1 | 4/2004 |
| WO | 2005/060501 A2 | 7/2005 |
| WO | 2005/086159 A2 | 9/2005 |
| WO | 2006/063343 A2 | 6/2006 |
| WO | 2007/008321 A2 | 1/2007 |
| WO | 2007/063922 A1 | 6/2007 |
| WO | 2008/040566 A1 | 4/2008 |
| WO | 2009/005914 A1 | 1/2009 |
| WO | 2009/012820 A1 | 1/2009 |
| WO | 2009/042579 A1 | 4/2009 |
| WO | 2010/001672 A1 | 1/2010 |
| WO | 2010/065752 A2 | 6/2010 |
| WO | 2010/065752 A3 | 9/2010 |
| WO | 2010/137513 A1 | 12/2010 |
| WO | 2011/126505 A1 | 10/2011 |
| WO | 2011/146605 A1 | 11/2011 |
| WO | 2011/146839 A1 | 11/2011 |
| WO | 2011/161145 A1 | 12/2011 |
| WO | 2012/037170 A1 | 3/2012 |
| WO | 2012/170118 A1 | 12/2012 |
| WO | 2012/170446 A2 | 12/2012 |
| WO | 2012/172164 A1 | 12/2012 |
| WO | 2013/114821 A1 | 8/2013 |
| WO | 2014/004524 A2 | 1/2014 |
| WO | 2014/052871 A1 | 4/2014 |
| WO | 2014/058937 A1 | 4/2014 |
| WO | 2014/077987 A1 | 5/2014 |
| WO | 2014/101527 A1 | 7/2014 |
| WO | 2014/160327 A1 | 10/2014 |
| WO | 2014/168616 A1 | 10/2014 |
| WO | 2014/200730 A1 | 12/2014 |
| WO | 2016/040535 A1 | 3/2016 |
| WO | 2016/046589 A1 | 3/2016 |
| WO | 2016/168154 A1 | 10/2016 |
| WO | 2017/038261 A1 | 3/2017 |
| WO | 2017/218143 A1 | 12/2017 |
| WO | 2017/218153 A1 | 12/2017 |
| WO | 2018/057272 A1 | 3/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2019/067131 A1 | 4/2019 |
| WO | 2019/217009 A1 | 11/2019 |
| WO | 2019/217477 A1 | 11/2019 |
| WO | 2020/227386 A2 | 11/2020 |
| WO | 2020/227386 A3 | 1/2021 |
| WO | 2020/227386 A4 | 3/2021 |
| WO | 2021/112983 A1 | 6/2021 |

OTHER PUBLICATIONS

Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.
Applicant-Initiated Interview Summary received for U.S. Appl. No. 17/484,899, mailed on Jun. 24, 2024, 4 pages.
Applicant-Initiated Interview Summary received for U.S. Appl. No. 17/970,417, mailed on Jun. 26, 2024, 2 pages.
Avery et al., "Kinect", Wikipedia, Feb. 26, 2015, 14 pages.
Corrected Notice of Allowance received for U.S. Appl. No. 17/903,946, mailed on Apr. 22, 2024, 2 pages.
Cosmic Mook, "LINE laboratory, new function Exhaustive Coverage! LINE 120% Application Guide, Inc.", Jan. 24, 2018, 7 pages (Official Copy Only) See Communication Under Rule 37 CFR § 1.98(a) (3).
Examiner Initiated Interview Summary received for U.S. Appl. No. 17/950,868, mailed on Jul. 5, 2024, 2 pages.
Extended European Search Report received for European Patent Application No. 24160234.1, mailed on May 28, 2024, 6 pages.

International Preliminary Report on Patentability received for PCT Patent Application No. PCT/US2022/044592, mailed on Apr. 4, 2024, 21 pages.
Myoko Mori, "Line Perfect Guidebook [Revised Version]", Sotec Co. Ltd., Dec. 31, 2013, 5 pages (Official Copy Only) See Communication Under Rule 37 CFR § 1.98(a) (3).
Non-Final Office Action received for U.S. Appl. No. 17/484,899, mailed on Mar. 21, 2024, 42 pages.
Non-Final Office Action received for U.S. Appl. No. 17/950,868, mailed on Apr. 24, 2024, 16 pages.
Non-Final Office Action received for U.S. Appl. No. 17/970,417, mailed on Apr. 10, 2024, 16 pages.
Non-Final Office Action received for U.S. Appl. No. 18/067,350, mailed on May 28, 2024, 43 pages.
Non-Final Office Action received for U.S. Appl. No. 18/138,348, mailed on Apr. 30, 2024, 16 pages.
Notice of Acceptance received for Australian Patent Application No. 2023204396, mailed on Apr. 15, 2024, 3 pages.
Notice of Acceptance received for Australian Patent Application No. 2024202768, mailed on Jun. 4, 2024, 3 pages.
Notice of Allowance received for Chinese Patent Application No. 202311042451.7, mailed on May 15, 2024, 4 pages (1 page of English Translation and 3 pages of Official Copy).
Notice of Allowance received for Korean Patent Application No. 10-2023-0001668, mailed on May 22, 2024, 6 pages (2 pages of English Translation and 4 pages of Official Copy).
Notice of Allowance received for Korean Patent Application No. 10-2023-7040599, mailed on Jun. 26, 2024, 7 pages (2 pages of English Translation and 5 pages of Official Copy).
Notice of Allowance received for Korean Patent Application No. 10-2023-7044044, mailed on Mar. 14, 2024, 7 pages (2 pages of English Translation and 5 pages of Official Copy).
Notice of Allowance received for U.S. Appl. No. 17/684,843, mailed on Jun. 5, 2024, 5 pages.
Notice of Allowance received for U.S. Appl. No. 17/903,946, mailed on Apr. 10, 2024, 7 pages.
Octoba, "Enjoy free calls with LINE! Part 2", retrieved from: https://web.archive.org/web/20170923013859/https://octoba.net/archives/line-call2.html, Sep. 23, 2017, 13 pages (Official Copy Only) See Communication Under Rule 37 CFR § 1.98(a) (3).
Office Action received for Chinese Patent Application No. 201910704856.X, mailed on Jun. 11, 2024, 33 pages (1 page of English Translation and 32 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 202311185909.4, mailed on Jun. 12, 2024, 18 pages (10 pages of English Translation and 8 pages of Official Copy).
Office Action received for European Patent Application No. 22705232.1, mailed on May 27, 2024, 7 pages.
Office Action received for European Patent Application No. 22792995.7, mailed on Jun. 24, 2024, 6 pages.
Office Action received for Japanese Patent Application No. 2023-028786, mailed on Mar. 22, 2024, 10 pages (5 pages of English Translation and 5 pages of Official Copy).
Office Action received for Japanese Patent Application No. 2023-097196, mailed on Jun. 7, 2024, 7 pages (3 pages of English Translation and 4 pages of Official Copy).
Office Action received for Japanese Patent Application No. 2023-571161, mailed on May 28, 2024, 4 pages (2 pages of English Translation and 2 pages of Official Copy).
Office Action received for Japanese Patent Application No. 2024-003876, mailed on Jul. 2, 2024, 3 pages (1 page of English Translation and 2 pages of Official Copy).
Office Action received for Korean Patent Application No. 10-2023-7040599, mailed on Mar. 12, 2024, 6 pages (2 pages of English Translation and 4 pages of Official Copy).
"6. Voice chat with friends through QQ", Online available at: https://v.qq.com/x/page/a0166p7xrt0.html, Sep. 22, 2015, 1 page.
Jiutian Technology, "Windows 8 Chinese version from entry to proficiency", Jan. 1, 2014, 5 pages.

(56) References Cited

OTHER PUBLICATIONS

QQ, "Method of QQ voice chat", Online Available at: https://www.taodocs.com/p-47909082.html, May 25, 2016, 3 pages.
Shangmeng, Li, "The Design and Implementation of Mobile Terminal System of Multimedia Conference Based on Symbian Operating System", China Academic Journal Electronic Publishing House, online available at: http://www.cnki.net, 2011, 66 pages.
Song Jianhua, "Guidelines for Network", Feb. 29, 2008, 11 pages.
Advisory Action received for U.S. Appl. No. 17/970,417, mailed on Dec. 12, 2024, 7 pages.
Notice of Allowance received for Korean Patent Application No. 10-2024-0112016, mailed on Dec. 2, 2024, 6 pages (2 pages of English Translation and 4 pages of Official Copy).
Notice of Allowance received for U.S. Appl. No. 17/745,680, mailed on Dec. 12, 2024, 2 pages.
Office Action received for Japanese Patent Application No. 2024-146741, mailed on Nov. 25, 2024, 12 pages (6 pages of English Translation and 6 pages of Official Copy).
Applicant-Initiated Interview Summary received for U.S. Appl. No. 18/067,350, mailed on Nov. 26, 2024, 3 pages.
Applicant-Initiated Interview Summary received for U.S. Appl. No. 18/140,449, mailed on Nov. 26, 2024, 2 pages.
Corrected Notice of Allowance received for U.S. Appl. No. 17/950,868, mailed on Nov. 27, 2024, 3 pages.
Corrected Notice of Allowance received for U.S. Appl. No. 18/138,348, mailed on Nov. 27, 2024, 2 pages.
International Preliminary Report on Patentability received for PCT Patent Application No. PCT/US2023/020569, mailed on Nov. 21, 2024, 16 pages.
Notice of Allowance received for Japanese Patent Application No. 2023-028786, mailed on Dec. 2, 2024, 4 pages (1 page of English Translation and 3 pages of Official Copy).
Notice of Allowance received for U.S. Appl. No. 17/483,679, mailed on Nov. 21, 2024, 8 pages.
Notice of Allowance received for U.S. Appl. No. 18/389,655, mailed on Nov. 27, 2024, 8 pages.
Advisory Action received for U.S. Appl. No. 14/263,889, mailed on May 26, 2016, 4 pages.
Advisory Action received for U.S. Appl. No. 15/725,868, mailed on Dec. 10, 2018, 5 pages.
Advisory Action received for U.S. Appl. No. 16/666,073, mailed on Jul. 7, 2020, 5 pages.
Applicant-Initiated Interview Summary received for U.S. Appl. No. 14/263,889, mailed on Apr. 15, 2016, 3 pages.
Applicant-Initiated Interview Summary received for U.S. Appl. No. 15/725,868, mailed on Jul. 25, 2018, 3 pages.
Applicant-Initiated Interview Summary received for U.S. Appl. No. 15/725,868, mailed on May 13, 2019, 3 pages.
Applicant-Initiated Interview Summary received for U.S. Appl. No. 15/725,868, mailed on Nov. 20, 2018, 3 pages.
Applicant-Initiated Interview Summary received for U.S. Appl. No. 17/970,417, mailed on Nov. 4, 2024, 2 pages.
Applicant-Initiated Interview Summary received for U.S. Appl. No. 18/140,449, mailed on Aug. 27, 2024, 2 pages.
Baudisch et al., "Back-of-device interaction allows creating very small touch devices", Chi 2009—Digital Life, New World:Conference Proceedings And Extended Abstracts; The 27th Annual Chi Conference On Human Factors In Computing Systems. Available online at <http://dx.doi.org/10.1145/1518701.1518995>, Apr. 9, 2009, pp. 1923-1932.
Corrected Notice of Allowance received for U.S. Appl. No. 15/725,868, mailed on Aug. 23, 2019, 2 pages.
Corrected Notice of Allowance received for U.S. Appl. No. 15/725,868, mailed on Sep. 30, 2019, 3 pages.
Corrected Notice of Allowance received for U.S. Appl. No. 16/666,073, mailed on Apr. 6, 2021, 3 pages.
Corrected Notice of Allowance received for U.S. Appl. No. 16/666,073, mailed on Apr. 26, 2021, 4 pages.
Corrected Notice of Allowance received for U.S. Appl. No. 16/666,073, mailed on Feb. 22, 2021, 3 pages.

Corrected Notice of Allowance received for U.S. Appl. No. 16/666,073, mailed on Mar. 11, 2021, 3 pages.
Decision to Grant received for European Patent Application No. 10763539.3, mailed on Jul. 19, 2018, 3 pages.
Decision to Grant received for European Patent Application No. 18188433.9, mailed on Aug. 13, 2020, 3 pages.
Decision to Refuse received for Japanese Patent Application No. 2013-503731, mailed on Jun. 23, 2014, 4 pages (2 pages of English Translation and 2 pages of Official Copy).
Examiner's Pre-Review Report received for Japanese Patent Application No. 2014-212867, mailed on Nov. 4, 2016, 5 pages (2 pages of English Translation and 3 pages of Official Copy).
Extended European Search Report received for European Patent Application No. 18188433.9, mailed on Oct. 29, 2018, 8 pages.
Final Office Action received for U.S. Appl. No. 12/794,766, mailed on Nov. 26, 2012, 23 pages.
Final Office Action received for U.S. Appl. No. 14/263,889, mailed on Jan. 4, 2016, 9 pages.
Final Office Action received for U.S. Appl. No. 15/725,868, mailed on Sep. 27, 2018, 25 pages.
Final Office Action received for U.S. Appl. No. 16/666,073, mailed on Apr. 17, 2020, 18 pages.
Final Office Action received for U.S. Appl. No. 18/067,350, mailed on Oct. 31, 2024, 44 pages.
Final Office Action received for U.S. Appl. No. 18/138,348, mailed on Oct. 18, 2024, 10 pages.
Final Office Action received for U.S. Appl. No. 18/140,449, mailed on Oct. 18, 2024, 11 pages.
Intention to Grant received for European Patent Application No. 10763539.3, mailed on Mar. 15, 2018, 6 pages.
Intention to Grant received for European Patent Application No. 18188433.9, mailed on Apr. 6, 2020, 9 pages.
International Preliminary Report on Patentability received for PCT Patent Application No. PCT/US2010/050311, mailed on Oct. 18, 2012, 11 pages.
International Preliminary Report on Patentability received for PCT Patent Application No. PCT/US2023/017280, mailed on Oct. 17, 2024, 15 pages.
International Search Report and Written Opinion received for PCT Patent Application No. PCT/US2010/050311, mailed on Aug. 24, 2011, 15 pages.
Invitation to Pay Additional Fees and Partial International Search Report received for PCT Patent Application No. PCT/US2010/050311, mailed on Dec. 21, 2010, 6 pages.
Koyama Kaori, "Mac Fan Macintosh Master Book Mac OS X v10.4 "Tiger" & iLife", '06 version, Mainichi Communications Inc. Nobuyuki Nakagawa, Jul. 9, 2007, 4 pages (Official Copy Only) {See Communication Under Rule 37 CFR § 1.98(a) (3)}.
Non-Final Office Action received for U.S. Appl. No. 12/794,766, mailed on Aug. 5, 2013, 9 pages.
Non-Final Office Action received for U.S. Appl. No. 12/794,766, mailed on Jun. 25, 2012, 18 pages.
Non-Final Office Action received for U.S. Appl. No. 12/794,768, mailed on Oct. 10, 2012, 14 pages.
Non-Final Office Action received for U.S. Appl. No. 14/263,889, mailed on Jul. 2, 2015, 9 pages.
Non-Final Office Action received for U.S. Appl. No. 14/263,889, mailed on Jul. 26, 2016, 11 pages.
Non-Final Office Action received for U.S. Appl. No. 15/725,868, mailed on Apr. 27, 2018, 17 pages.
Non-Final Office Action received for U.S. Appl. No. 15/725,868, mailed on Feb. 12, 2019, 26 pages.
Non-Final Office Action received for U.S. Appl. No. 16/666,073, mailed on Dec. 10, 2019, 16 pages.
Non-Final Office Action received for U.S. Appl. No. 18/140,449, mailed on May 24, 2024, 19 pages.
Notice of Acceptance received for Australian Patent Application No. 2010350749, mailed on Jan. 13, 2015, 3 pages.
Notice of Acceptance received for Australian Patent Application No. 2015201127, mailed on Feb. 14, 2017, 3 pages.
Notice of Allowance received for Brazilian Patent Application No. BR112012025746-3, mailed on Jul. 6, 2021, 3 pages (1 page of English Translation and 2 pages of Official Copy).

(56)          References Cited

OTHER PUBLICATIONS

Notice of Allowance received for Chinese Patent Application No. 201010602653.9, mailed on Nov. 15, 2014, 2 pages (1 page of English Translation and 1 page of Official Copy).
Notice of Allowance received for Chinese Patent Application No. 2010106600623.4, mailed on Aug. 11, 2014, 4 pages (1 page of English Translation and 3 pages of Official Copy).
Notice of Allowance received for Chinese Patent Application No. 201410575145.4, mailed on May 10, 2018, 3 pages (1 page of English Translation and 2 pages of Official Copy).
Notice of Allowance received for Japanese Patent Application No. 2014-212867, mailed on Mar. 30, 2018, 3 pages (1 page of English Translation and 2 pages of Official Copy).
Notice of Allowance received for Japanese Patent Application No. 2016-151497, mailed on Jun. 4, 2018, 4 pages (1 page of English Translation and 3 pages of Official Copy).
Notice of Allowance received for Japanese Patent Application No. 2019-182484, mailed on Aug. 30, 2021, 4 pages (1 page of English Translation and 3 pages of Official Copy).
Notice of Allowance received for Japanese Patent Application No. 2022-197327, mailed on May 31, 2024, 4 pages (1 page of English Translation and 3 pages of Official Copy).
Notice of Allowance received for Korean Patent Application No. 10-2012-7028535, mailed on Jul. 16, 2014, 5 pages (1 page of English Translation and 4 pages of Official Copy).
Notice of Allowance received for Korean Patent Application No. 10-2014-7005164, mailed on Dec. 21, 2014, 4 pages (1 page of English Translation and 3 pages of Official Copy).
Notice of Allowance received for Korean Patent Application No. 10-2014-7029838, mailed on Jul. 28, 2015, 4 pages (1 page of English Translation and 3 pages of Official Copy).
Notice of Allowance received for Korean Patent Application No. 10-2015-7007050, mailed on Feb. 26, 2016, 4 pages (1 page of English Translation and 3 pages of Official Copy).
Notice of Allowance received for Korean Patent Application No. 10-2016-7014580, mailed on Dec. 17, 2019, 6 pages (2 pages of English Translation and 4 pages of Official Copy).
Notice of Allowance received for Korean Patent Application No. 10-2018-7036975, mailed on Sep. 18, 2019, 6 pages (2 pages of English Translation and 4 pages of Official Copy).
Notice of Allowance received for Korean Patent Application No. 10-2020-7002845, mailed on Sep. 24, 2020, 5 pages (1 page of English Translation and 4 pages of Official Copy).
Notice of Allowance received for Korean Patent Application No. 10-2023-7005442, mailed on Jan. 22, 2024, 8 pages (2 pages of English Translation and 6 pages of Official Copy).
Notice of Allowance received for Korean Patent Application No. 10-2023-7040599, mailed on Oct. 18, 2024, 7 pages (2 pages of English Translation and 5 pages of Official Copy).
Notice of Allowance received for Mexican Patent Application No. MX/a/2012/011623, mailed on Jan. 16, 2014, 2 pages (1 page of English Translation and 1 page of Official Copy).
Notice of Allowance received for Mexican Patent Application No. MX/a/2014/004295, mailed on May 21, 2015, 2 pages (1 page of English Translation and 1 page of Official Copy).
Notice of Allowance received for Mexican Patent Application No. MX/a/2015/010523, mailed on May 25, 2016, 2 pages (1 page of English Translation and 1 page of Official Copy).
Notice of Allowance received for Mexican Patent Application No. MX/a/2016/012174, mailed on Jan. 17, 2020, 3 pages (1 page of English Translation and 2 pages of Official Copy).
Notice of Allowance received for Taiwanese Patent Application No. 099132253, mailed on Apr. 27, 2016, 3 pages (1 page of English Translation and 2 pages of Official Copy).
Notice of Allowance received for Taiwanese Patent Application No. 099132254, mailed on Feb. 18, 2014, 3 pages (1 page of English Translation and 2 pages of Official Copy).
Notice of Allowance received for U.S. Appl. No. 12/794,766, mailed on Jan. 17, 2014, 6 pages.

Notice of Allowance received for U.S. Appl. No. 12/794,768, mailed on Mar. 22, 2013, 6 pages.
Notice of Allowance received for U.S. Appl. No. 14/263,889, mailed on Feb. 1, 2017, 10 pages.
Notice of Allowance received for U.S. Appl. No. 14/263,889, mailed on Jun. 16, 2017, 6 pages.
Notice of Allowance received for U.S. Appl. No. 15/725,868, mailed on Jun. 12, 2019, 9 pages.
Notice of Allowance received for U.S. Appl. No. 16/666,073, mailed on Jan. 21, 2021, 11 pages.
Notice of Allowance received for U.S. Appl. No. 17/950,868, mailed on Oct. 23, 2024, 10 pages.
Office Action received for Australian Patent Application No. 2010350749, mailed on Oct. 16, 2013, 3 pages.
Office Action received for Australian Patent Application No. 2015201127, mailed on Mar. 21, 2016, 3 pages.
Office Action received for Brazilian Patent Application No. BR112012025746-3, mailed on Jun. 2, 2020, 7 pages (4 pages of English Translation and 3 pages of Official Copy).
Office Action received for Chinese Patent Application No. 201010602653.9, mailed on Apr. 1, 2013, 21 pages (13 pages of English Translation and 8 pages of Official Copy).
Office Action received for Chinese Patent Application No. 201010602653.9, mailed on Dec. 9, 2013, 10 pages (6 pages of English Translation and 4 pages of Official Copy).
Office Action received for Chinese Patent Application No. 201010602653.9, mailed on May 15, 2014, 6 pages (3 pages of English Translation and 3 pages of Official Copy).
Office Action received for Chinese Patent Application No. 2010106600623.4, mailed on Apr. 28, 2014, 7 pages (4 pages of English Translation and 3 pages of Official Copy).
Office Action received for Chinese Patent Application No. 2010106600623.4, mailed on Jan. 24, 2014, 7 pages (4 pages of English Translation and 3 pages of Official Copy).
Office Action received for Chinese Patent Application No. 2010106600623.4, mailed on May 2, 2013, 27 pages (15 pages of English Translation and 12 pages of Official Copy).
Office Action received for Chinese Patent Application No. 201410575145.4, mailed on Feb. 13, 2017, 18 pages (11 pages of English Translation and 7 pages of Official Copy).
Office Action received for Chinese Patent Application No. 201410575145.4, mailed on Nov. 30, 2017, 17 pages (11 pages of English Translation and 6 pages of Official Copy).
Office Action received for European Patent Application No. 10763539.3, mailed on Jun. 13, 2016, 5 pages.
Office Action received for European Patent Application No. 22733778.9, mailed on Oct. 22, 2024, 6 pages.
Office Action received for European Patent Application No. 22792995.7, mailed on Oct. 15, 2024, 8 pages.
Office Action received for Japanese Patent Application No. 2013-503731, mailed on Mar. 3, 2014, 8 pages (2 pages of English Translation and 6 pages of Official Copy).
Office Action received for Japanese Patent Application No. 2013-503731, mailed on Sep. 24, 2013, 3 pages (1 page of English Translation and 2 pages of Official Copy).
Office Action received for Japanese Patent Application No. 2014-212867, mailed on Aug. 18, 2017, 4 pages (1 page of English Translation and 3 pages of Official Copy).
Office Action received for Japanese Patent Application No. 2014-212867, mailed on Jun. 29, 2015, 8 pages (4 pages of English Translation and 4 pages of Official Copy).
Office Action received for Japanese Patent Application No. 2016-151497, mailed on Sep. 25, 2017, 7 pages (2 pages of English Translation and 5 pages of Official Copy).
Office Action received for Japanese Patent Application No. 2018-127760, mailed on Feb. 22, 2019, 10 pages (5 pages of English Translation and 5 pages of Official Copy).
Office Action received for Japanese Patent Application No. 2018-127760, mailed on Jul. 5, 2019, 4 pages (1 page of English Translation and 3 pages of Official Copy).
Office Action received for Japanese Patent Application No. 2019-182484, mailed on Dec. 4, 2020, 6 pages (1 page of English Translation and 5 pages of Official Copy).

(56) References Cited

OTHER PUBLICATIONS

Office Action received for Japanese Patent Application No. 2022-197327, mailed on Mar. 1, 2024, 14 pages (7 pages of English Translation and 7 pages of Official Copy).

Office Action received for Korean Patent Application No. 10-2012-7028535, mailed on Nov. 26, 2013, 10 pages (4 pages of English Translation and 6 pages of Official Copy).

Office Action received for Korean Patent Application No. 10-2014-7005164, mailed on May 23, 2014, 15 pages (6 pages of English Translation and 9 pages of Official Copy).

Office Action received for Korean Patent Application No. 10-2014-7029838, mailed on Dec. 20, 2014, 13 pages (5 pages of English Translation and 8 pages of Official Copy).

Office Action received for Korean Patent Application No. 10-2015-7007050, mailed on Apr. 16, 2015, 14 pages (6 pages of English Translation and 8 pages of Official Copy).

Office Action received for Korean Patent Application No. 10-2015-7007050, mailed on Oct. 23, 2015, 7 pages (3 pages of English Translation and 4 pages of Official Copy).

Office Action received for Korean Patent Application No. 10-2016-7014580, mailed on Jan. 30, 2018, 10 pages (4 pages of English Translation and 6 pages of Official Copy).

Office Action received for Korean Patent Application No. 10-2016-7014580, mailed on Jul. 30, 2018, 7 pages (3 pages of English Translation and 4 pages of Official Copy).

Office Action received for Korean Patent Application No. 10-2016-7014580, mailed on Jun. 29, 2017, 7 pages (1 page of English Translation and 6 pages of Official Copy).

Office Action received for Korean Patent Application No. 10-2016-7014580, mailed on Sep. 19, 2018, 7 pages (3 pages of English Translation and 4 pages of Official Copy).

Office Action received for Korean Patent Application No. 10-2016-7014580, mailed on Sep. 27, 2016, 9 pages (4 pages of English Translation and 5 pages of Official Copy).

Office Action received for Korean Patent Application No. 10-2017-7002774, mailed on Apr. 18, 2017, 10 pages (4 pages of English Translation and 6 pages of Official Copy).

Office Action received for Korean Patent Application No. 10-2017-7002774, mailed on Jul. 30, 2018, 6 pages (3 pages of English Translation and 3 pages of Official Copy).

Office Action received for Korean Patent Application No. 10-2017-7002774, mailed on Sep. 20, 2018, 12 pages (6 pages of English Translation and 6 pages of Official Copy).

Office Action received for Korean Patent Application No. 10-2018-7036975, mailed on Mar. 22, 2019, 11 pages (5 pages of English Translation and 6 pages of Official Copy).

Office Action received for Korean Patent Application No. 10-2020-7002845, mailed on Feb. 17, 2020, 14 pages (6 pages of English Translation and 8 pages of Official Copy).

Office Action received for Korean Patent Application No. 10-2020-7034959, mailed on Jan. 27, 2022, 7 pages (3 pages of English Translation and 4 pages of Official Copy).

Office Action received for Korean Patent Application No. 10-2020-7034959, mailed on Mar. 2, 2021, 12 pages (5 pages of English Translation and 7 pages of Official Copy).

Office Action received for Korean Patent Application No. 10-2020-7034959, mailed on Oct. 27, 2021, 8 pages (4 pages of English Translation and 4 pages of Official Copy).

Office Action received for Korean Patent Application No. 10-2022-7006973, mailed on May 19, 2022, 10 pages (4 pages of English Translation and 6 pages of Official Copy).

Office Action received for Korean Patent Application No. 10-2023-7005442, mailed on Jul. 25, 2023, 10 pages (4 pages of English Translation and 6 pages of Official Copy).

Office Action received for Korean Patent Application No. 10-2024-7019962, mailed on Sep. 25, 2024, 7 pages (2 pages of English Translation and 5 pages of Official Copy).

Office Action received for Mexican Patent Application No. MX/a/2014/004295, mailed on Aug. 21, 2014, 4 pages (2 pages of English Translation and 2 pages of Official Copy).

Office Action received for Mexican Patent Application No. MX/a/2014/004295, mailed on Jan. 20, 2015, 4 pages (1 page of English Translation and 3 pages of Official Copy).

Office Action received for Mexican Patent Application No. MX/a/2015/010523, mailed on Jan. 26, 2016, 4 pages (2 pages of English Translation and 2 pages of Official Copy).

Office Action received for Mexican Patent Application No. MX/a/2016/012174, mailed on Apr. 10, 2019, 7 pages (4 pages of English Translation and 3 pages of Official Copy).

Office Action received for Mexican Patent Application No. MX/a/2016/012174, mailed on Aug. 8, 2019, 7 pages (2 pages of English Translation and 5 pages of Official Copy).

Office Action received for Mexican Patent Application No. MX/a/2020/003290, mailed on Oct. 26, 2022, 8 pages (3 pages of English Translation and 5 pages of Official Copy).

Office Action received for Mexican Patent Application No. MX/a/2023/005388, mailed on Dec. 15, 2023, 18 pages (9 pages of English Translation and 9 pages of Official Copy).

Office Action received for Mexican Patent Application No. MX/a/2023/005388, mailed on Jun. 2, 2023, 24 pages (12 pages of English Translation and 12 pages of Official Copy).

Office Action received for Taiwanese Patent Application No. 099132253, mailed on Jun. 24, 2013, 16 pages (8 pages of English Translation and 8 pages of Official Copy).

Office Action received for Taiwanese Patent Application No. 099132253, mailed on Mar. 27, 2014, 10 pages (4 pages of English Translation and 6 pages of Official Copy).

Office Action received for Taiwanese Patent Application No. 099132254, mailed on May 27, 2013, 24 pages (12 pages of English Translation and 12 pages of Official Copy).

Supplemental Notice of Allowance received for U.S. Appl. No. 17/484,899, mailed on Oct. 29, 2024, 5 pages.

Sharf et al., "SnapPaste:an interactive technique for easy mesh composition", The Visual Computer; International Journal Of Computer Graphics, Springer, Berlin, De, vol. 22, No. 9-11. Available Online at <http://dx.doi.org/10.1007/s00371-006-0068-5>, Aug. 25, 2006, pp. 835-844.

Notice of Allowance received for U.S. Appl. No. 18/138,348, mailed on Mar. 12, 2025, 10 pages.

Office Action received for Chinese Patent Application No. 202311185909.4, mailed on Feb. 13, 2025, 16 pages (10 pages of English Translation and 6 pages of Official Copy).

Office Action received for Chinese Patent Application No. 202410924550.6, mailed on Mar. 1, 2025, 12 pages (5 pages of English Translation and 7 pages of Official Copy).

Office Action received for Chinese Patent Application No. 202410924556.3, mailed on Feb. 28, 2025, 11 pages (5 pages of English Translation and 6 pages of Official Copy).

Office Action received for European Patent Application No. 22729921.1, mailed on Mar. 13, 2025, 8 pages.

Corrected Notice of Allowance received for U.S. Appl. No. 17/970,417, mailed on Feb. 20, 2025, 2 pages.

Corrected Notice of Allowance received for U.S. Appl. No. 18/389,655, mailed on Feb. 24, 2025, 2 pages.

Decision to Grant received for Japanese Patent Application No. 2024-173274, mailed on Feb. 10, 2025, 3 pages (1 page of English Translation and 2 pages of Official Copy).

Examiner-Initiated Interview Summary received for U.S. Appl. No. 18/499,848, mailed on Feb. 14, 2025, 3 pages.

Intention to Grant received for European Patent Application No. 22792995.7, mailed on Feb. 17, 2025, 9 pages.

Non-Final Office Action received for U.S. Appl. No. 17/745,680, mailed on Feb. 20, 2025, 28 pages.

Office Action received for Chinese Patent Application No. 202410030102.1, mailed on Jan. 22, 2025, 14 pages (8 pages of English Translation and 6 pages of Official Copy).

Office Action received for European Patent Application No. 22705232.1, mailed on Feb. 4, 2025, 10 pages.

Office Action received for European Patent Application No. 24160234.1, mailed on Feb. 20, 2025, 3 pages.

Corrected Notice of Allowance received for U.S. Appl. No. 17/684,843, mailed on Oct. 7, 2024, 2 pages.

(56)    References Cited

OTHER PUBLICATIONS

Notice of Allowance received for Chinese Patent Application No. 201910704856.X, mailed on Sep. 30, 2024, 4 pages (1 page of English Translation and 3 pages of Official Copy).

Notice of Allowance received for Korean Patent Application No. 10-2023-7018775, mailed on Sep. 30, 2024, 7 pages (2 pages of English Translation and 5 pages of Official Copy).

Office Action received for European Patent Application No. 22705232.1, mailed on Sep. 26, 2024, 8 pages.

Corrected Notice of Allowance received for U.S. Appl. No. 17/745,680, mailed on Nov. 20, 2024, 2 pages.

Intention to Grant received for European Patent Application No. 24160234.1, mailed on Nov. 4, 2024, 9 pages.

International Search Report and Written Opinion received for PCT Patent Application No. PCT/US2024/023231, mailed on Oct. 23, 2024, 24 pages.

Invitation to Pay Additional Fees and Partial International Search Report received for PCT Patent Application No. PCT/US2024/023231, mailed on Aug. 29, 2024, 17 pages.

Notice of Allowance received for U.S. Appl. No. 17/745,680, mailed on Nov. 12, 2024, 8 pages.

Notice of Allowance received for U.S. Appl. No. 18/138,348, mailed on Nov. 13, 2024, 10 pages.

Cosmic Mook,"LINE laboratory, new function Exhaustive Coverage! LINE 120% Application Guide, Inc.", Jan. 24, 2018, 7 pages.

Myoko Mori, "Line Perfect Guidebook [Revised Version]", Sotec Co. Ltd., Dec. 31, 2013, 5 pages.

Octoba, "Enjoy free calls with LINE! Part 2", retrieved from: https://web.archive.org/web/20170923013859/https://octoba.net/archives/line-call2.html, Sep. 23, 2017, 13 pages.

Koyama, Kaori, "Mac Fan Macintosh Master Book Mac Os X v10.4 "Tiger" & iLife", '06 version, Mainichi Communications Inc. Nobuyuki Nakagawa, Jul. 9, 2007, 4 pages.

Corrected Notice of Allowance received for U.S. Appl. No. 18/138,348, mailed on Apr. 16, 2025, 2 pages.

International Preliminary Report on Patentability received for PCT Patent Application No. PCT/US2023/032792, mailed on Apr. 3, 2025, 10 pages.

Non-Final Office Action received for U.S. Appl. No. 18/067,350, mailed on Apr. 17, 2025, 49 pages.

Non-Final Office Action received for U.S. Appl. No. 18/077,154, mailed on Apr. 10, 2025, 27 pages.

Applicant-Initiated Interview Summary received for U.S. Appl. No. 17/950,868, mailed on Jul. 19, 2024, 2 pages.

Applicant-Initiated Interview Summary received for U.S. Appl. No. 17/950,868, mailed on Sep. 10, 2024, 3 pages.

Applicant-Initiated Interview Summary received for U.S. Appl. No. 18/067,350, mailed on Jul. 29, 2024, 3 pages.

Corrected Notice of Allowance received for U.S. Appl. No. 17/903,946, mailed on Sep. 3, 2024, 2 pages.

Decision to Grant received for Japanese Patent Application No. 2023-571312, mailed on Aug. 29, 2024, 3 pages (1 page of English Translation and 2 pages of Official Copy).

Decision to Grant received for Japanese Patent Application No. 2024-003876, mailed on Sep. 2, 2024, 3 pages (1 page of English Translation and 2 pages of Official Copy).

Extended European Search Report received for European Patent Application No. 24159026.4, mailed on Jul. 10, 2024, 9 pages.

Final Office Action received for U.S. Appl. No. 17/950,868, mailed on Aug. 29, 2024, 13 pages.

International Search Report and Written Opinion received for PCT Patent Application No. PCT/US2024/017017, mailed on Aug. 2, 2024, 27 pages.

Invitation to Pay Additional Fees received for PCT Patent Application No. PCT/US2024/017017, mailed on May 15, 2024, 3 pages.

Non-Final Office Action received for U.S. Appl. No. 18/380,116, mailed on Jul. 18, 2024, 16 pages.

Non-Final Office Action received for U.S. Appl. No. 18/389,655, mailed on Aug. 23, 2024, 23 pages.

Notice of Allowance received for Japanese Patent Application No. 2023-097196, mailed on Jul. 29, 2024, 4 pages (1 page of English Translation and 3 pages of Official Copy).

Notice of Allowance received for Japanese Patent Application No. 2023-571161, mailed on Jul. 30, 2024, 3 pages (1 page of English Translation and 2 pages of Official Copy).

Notice of Allowance received for U.S. Appl. No. 17/484,899, mailed on Aug. 26, 2024, 21 pages.

Notice of Allowance received for U.S. Appl. No. 17/903,946, mailed on Aug. 27, 2024, 5 pages.

Office Action received for Chinese Patent Application No. 202410030102.1, mailed on Jul. 23, 2024, 18 pages (9 pages of English Translation and 9 pages of Official Copy).

Office Action received for Japanese Patent Application No. 2023-028786, mailed on Aug. 23, 2024, 10 pages (5 pages of English Translation and 5 pages of Official Copy).

Office Action received for Japanese Patent Application No. 2023-571312, mailed on Jul. 16, 2024, 4 pages (2 pages of English Translation and 2 pages of Official Copy).

Office Action received for Korean Patent Application No. 10-2024-7019962, mailed on Jul. 16, 2024, 6 pages (2 pages of English Translation and 4 pages of Official Copy).

That Guy who Loves Metv and SSBB Mods, "Kinect Party Gameplay", Available online at: https://youtu.be/bkbOlzfyLzc?si=QAAKh_V4aqY0iegL, Oct. 20, 2021, 2 pages.

Xbox, "Kinect Tips, Part 3: Gesture Controls", Available online at: https://youtu.be/VXhhE-I96qQ?si=gLmHbp9jOm-w0fNW, May 7, 2014, 3 pages.

Applicant-Initiated Interview Summary received for U.S. Appl. No. 18/499,848, mailed on Feb. 12, 2025, 2 pages.

Non-Final Office Action received for U.S. Appl. No. 18/499,848, mailed on Jan. 27, 2025, 18 pages.

Notice of Allowance received for U.S. Appl. No. 17/950,868, mailed on Feb. 12, 2025, 6 pages.

Notice of Allowance received for U.S. Appl. No. 17/970,417, mailed on Feb. 5, 2025, 6 pages.

Office Action received for Chinese Patent Application No. 202311835200.4, mailed on Dec. 26, 2024, 11 pages (6 pages of English Translation and 5 pages of Official Copy).

Office Action received for Japanese Patent Application No. 2023-572748, mailed on Nov. 21, 2024, 31 pages (28 pages of English Translation and 3 pages of Official Copy).

Office Action received for Japanese Patent Application No. 2024-173274, mailed on Jan. 6, 2025, 3 pages (2 pages of English Translation and 1 page of Official Copy).

Supplemental Notice of Allowance received for U.S. Appl. No. 17/484,899, mailed on Feb. 3, 2025, 5 pages.

6. Voice chat with friends through QQ, online available at: https://v.qq.com/x/page/a0166p7xrt0.html, Sep. 22, 2015, 1 page (Official Copy Only) {(See Communication under Rule 37 CFR § 1.98(a)(3))}.

Advisory Action received for U.S. Appl. No. 17/483,679, mailed on Sep. 20, 2022, 8 pages.

Applicant Initiated Interview Summary received for U.S. Appl. No. 16/790,619, mailed on Jul. 28, 2020, 3 pages.

Applicant-Initiated Interview Summary received for U.S. Appl. No. 16/528,941, mailed on Jun. 19, 2020, 3 pages.

Applicant-Initiated Interview Summary received for U.S. Appl. No. 16/528,941, mailed on Nov. 10, 2020, 2 pages.

Applicant-Initiated Interview Summary received for U.S. Appl. No. 16/799,481, mailed on Jul. 24, 2020, 3 pages.

Applicant-Initiated Interview Summary received for U.S. Appl. No. 17/026,818, mailed on Dec. 15, 2020, 7 pages.

Applicant-Initiated Interview Summary received for U.S. Appl. No. 17/026,818, mailed on Mar. 8, 2021, 4 pages.

Applicant-Initiated Interview Summary received for U.S. Appl. No. 17/121,610, mailed on Oct. 29, 2021, 2 pages.

Applicant-Initiated Interview Summary received for U.S. Appl. No. 17/223,794, mailed on Sep. 7, 2021, 3 pages.

Applicant-Initiated Interview Summary received for U.S. Appl. No. 17/476,404, mailed on Dec. 20, 2022, 2 pages.

Applicant-Initiated Interview Summary received for U.S. Appl. No. 17/476,404, mailed on Jul. 27, 2022, 6 pages.

(56) References Cited

OTHER PUBLICATIONS

Applicant-Initiated Interview Summary received for U.S. Appl. No. 17/476,404, mailed on Jun. 2, 2023, 2 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/482,977, mailed on Dec. 5, 2022, 2 pages.
Applicant-Initiated Interview Summary received for U.S. Appl. No. 17/482,987, mailed on Apr. 11, 2022, 4 pages.
Applicant-Initiated Interview Summary received for U.S. Appl. No. 17/483,542, mailed on May 22, 2023, 3 pages.
Applicant-Initiated Interview Summary received for U.S. Appl. No. 17/483,542, mailed on Nov. 23, 2022, 4 pages.
Applicant-Initiated Interview Summary received for U.S. Appl. No. 17/483,564, mailed on Apr. 21, 2023, 5 pages.
Applicant-Initiated Interview Summary received for U.S. Appl. No. 17/483,564, mailed on Jul. 21, 2022, 5 pages.
Applicant-Initiated Interview Summary received for U.S. Appl. No. 17/483,564, mailed on Jun. 21, 2023, 4 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/483,679, mailed on Aug. 18, 2023, 2 pages.
Applicant-Initiated Interview Summary received for U.S. Appl. No. 17/483,679, mailed on Aug. 23, 2022, 3 pages.
Applicant-Initiated Interview Summary received for U.S. Appl. No. 17/483,679, mailed on May 19, 2023, 3 pages.
Applicant-Initiated Interview Summary received for U.S. Appl. No. 17/484,899, mailed on Apr. 27, 2022, 5 pages.
Applicant-Initiated Interview Summary received for U.S. Appl. No. 17/484,899, mailed on Sep. 1, 2022, 5 pages.
Applicant-Initiated Interview Summary received for U.S. Appl. No. 17/484,899, mailed on Sep. 12, 2023, 6 pages.
Applicant-Initiated Interview Summary received for U.S. Appl. No. 17/484,907, mailed on Jan. 10, 2022, 2 pages.
Applicant-Initiated Interview Summary received for U.S. Appl. No. 17/872,736, mailed on Jul. 25, 2023, 2 pages.
Applicant-Initiated Interview Summary received for U.S. Appl. No. 17/950,900, mailed on Jan. 26, 2023, 5 pages.
Brief Communication Regarding Oral Proceedings received for European Patent Application No. 20205496.1, mailed on Apr. 19, 2023, 1 page.
Certificate of Examination received for Australian Patent Application No. 2019100499, mailed on Aug. 15, 2019, 2 pages.
Certificate of Examination received for Australian Patent Application No. 2019101062, mailed on Jun. 2, 2020, 2 pages.
Certificate of Examination received for Australian Patent Application No. 2020101324, mailed on Sep. 7, 2020, 2 pages.
Corrected Notice of Allowance received for U.S. Appl. No. 16/109,552, mailed on Jun. 13, 2019, 2 pages.
Corrected Notice of Allowance received for U.S. Appl. No. 16/144,572, mailed on Mar. 21, 2019, 3 pages.
Corrected Notice of Allowance received for U.S. Appl. No. 16/147,432, mailed on Jan. 18, 2019, 3 pages.
Corrected Notice of Allowance received for U.S. Appl. No. 16/147,432, mailed on Jul. 16, 2019, 3 pages.
Corrected Notice of Allowance received for U.S. Appl. No. 16/511,578, mailed on Feb. 13, 2020, 3 pages.
Corrected Notice of Allowance received for U.S. Appl. No. 16/790,619, mailed on Oct. 13, 2020, 3 pages.
Corrected Notice of Allowance received for U.S. Appl. No. 16/799,481, mailed on Oct. 27, 2020, 3 pages.
Corrected Notice of Allowance received for U.S. Appl. No. 17/027,373, mailed on Jul. 12, 2022, 2 pages.

Corrected Notice of Allowance received for U.S. Appl. No. 17/027,373, mailed on Oct. 26, 2022, 2 pages.
Corrected Notice of Allowance received for U.S. Appl. No. 17/121,610, mailed on Jun. 7, 2022, 4 pages.
Corrected Notice of Allowance received for U.S. Appl. No. 17/121,610, mailed on Mar. 31, 2022, 3 pages.
Corrected Notice of Allowance received for U.S. Appl. No. 17/121,610, mailed on May 20, 2022, 4 pages.
Corrected Notice of Allowance received for U.S. Appl. No. 17/157,166, mailed on Apr. 13, 2022, 4 pages.
Corrected Notice of Allowance received for U.S. Appl. No. 17/157,166, mailed on Apr. 25, 2022, 4 pages.
Corrected Notice of Allowance received for U.S. Appl. No. 17/157,166, mailed on Dec. 9, 2021, 4 pages.
Corrected Notice of Allowance received for U.S. Appl. No. 17/157,166, mailed on Dec. 15, 2021, 4 pages.
Corrected Notice of Allowance received for U.S. Appl. No. 17/157,166, mailed on Jan. 5, 2022, 4 pages.
Corrected Notice of Allowance received for U.S. Appl. No. 17/157,166, mailed on Jun. 29, 2022, 4 pages.
Corrected Notice of Allowance received for U.S. Appl. No. 17/479,897, mailed on Aug. 17, 2023, 2 pages.
Corrected Notice of Allowance received for U.S. Appl. No. 17/482,977, mailed on Apr. 24, 2023, 3 pages.
Corrected Notice of Allowance received for U.S. Appl. No. 17/483,542, mailed on Aug. 25, 2023, 3 pages.
Corrected Notice of Allowance received for U.S. Appl. No. 17/483,549, mailed on Aug. 24, 2022, 3 pages.
Corrected Notice of Allowance received for U.S. Appl. No. 17/483,582, mailed on Feb. 15, 2022, 2 pages.
Corrected Notice of Allowance received for U.S. Appl. No. 17/484,907, mailed on Aug. 26, 2022, 2 pages.
Corrected Notice of Allowance received for U.S. Appl. No. 17/484,907, mailed on Jun. 15, 2022, 2 pages.
Corrected Notice of Allowance received for U.S. Appl. No. 17/484,907, mailed on Mar. 18, 2022, 2 pages.
Corrected Notice of Allowance received for U.S. Appl. No. 17/950,900, mailed on Apr. 14, 2023, 2 pages.
Corrected Notice of Allowance received for U.S. Appl. No. 17/950,900, mailed on Jun. 30, 2023, 2 pages.
Corrected Notice of Allowance received for U.S. Appl. No. 17/950,922, mailed on Apr. 14, 2023, 2 pages.
Corrected Search Report and Opinion received for Danish Patent Application No. PA201870364, mailed on Sep. 5, 2018, 13 pages.
Decision on Appeal received for Korean Patent Application No. 10-2020-7034959, mailed on Jul. 25, 2022, 28 pages (5 pages of English Translation and 23 pages of Official Copy).
Decision to Grant received for Danish Patent Application No. PA201870362, mailed on May 15, 2020, 2 pages.
Decision to Grant received for European Patent Application No. 19729395.4, mailed on Dec. 9, 2021, 2 pages.
Decision to Refuse received for European Patent Application No. 20205496.1, mailed on May 12, 2023, 16 pages.
Ex Parte Quayle Action received for U.S. Appl. No. 17/121,610, mailed on Dec. 9, 2021, 7 pages.
Examiner Initiated-Interview Summary received for U.S. Appl. No. 16/528,941, mailed on Dec. 1, 2020, 2 pages.
Examiner Interview Summary received for U.S. Appl. No. 17/903,946, mailed on Jun. 28, 2023, 2 pages.
Examiner-Initiated Interview Summary received for U.S. Appl. No. 17/027,373, mailed on Mar. 31, 2022, 4 pages.
Ex-Parte Quayle Action received for U.S. Appl. No. 17/903,946, mailed on Aug. 4, 2023, 4 pages.
Extended European Search Report received for European Patent Application No. 20166552.8, mailed on Jun. 12, 2020, 9 pages.
Extended European Search Report received for European Patent Application No. 20205496.1, mailed on Mar. 11, 2021, 11 pages.
Final Office Action received for U.S. Appl. No. 16/528,941, mailed on Jul. 13, 2020, 15 pages.
Final Office Action received for U.S. Appl. No. 17/026,818, mailed on Jan. 29, 2021, 21 pages.
Final Office Action received for U.S. Appl. No. 17/332,829, mailed on Feb. 6, 2023, 19 pages.

(56)        References Cited

OTHER PUBLICATIONS

Final Office Action received for U.S. Appl. No. 17/476,404, mailed on May 5, 2022, 30 pages.
Final Office Action received for U.S. Appl. No. 17/476,404, mailed on Sep. 12, 2023, 30 pages.
Final Office Action received for U.S. Appl. No. 17/479,897, mailed on Jan. 10, 2023, 15 pages.
Final Office Action received for U.S. Appl. No. 17/483,564, mailed on Apr. 18, 2022, 23 pages.
Final Office Action received for U.S. Appl. No. 17/483,564, mailed on May 25, 2023, 26 pages.
Final Office Action received for U.S. Appl. No. 17/483,679, mailed on Jun. 13, 2023, 33 pages.
Final Office Action received for U.S. Appl. No. 17/483,679, mailed on May 24, 2022, 21 pages.
Final Office Action received for U.S. Appl. No. 17/484,899, mailed on May 12, 2022, 29 pages.
Final Office Action received for U.S. Appl. No. 17/950,900, mailed on Jan. 23, 2023, 14 pages.
Hearing Notice received for Indian Patent Application No. 201814036860, mailed on Sep. 8, 2023, 2 pages.
HuddleCamHD SimplTrack2 Auto Tracking Camera Installation & Operation Manual, Available Online at: https://huddlecamhd.com/wp-content/uploads/2021/01/SimplTrack2-User-Manual-v1_2-6-20.pdf, Jun. 2020, 41 pages.
Intention to Grant received for Danish Patent Application No. PA201870362, mailed on Feb. 14, 2020, 2 pages.
Intention to Grant received for Danish Patent Application No. PA202070617, mailed on Nov. 15, 2021, 2 pages.
Intention to Grant received for European Patent Application No. 19729395.4, mailed on Jul. 23, 2021, 10 pages.
Intention to Grant received for European Patent Application No. 20166552.8, mailed on Jun. 29, 2023, 8 pages.
Intention to Grant received for European Patent Application No. 21728781.2, mailed on Jul. 28, 2023, 9 pages.
International Preliminary Report on Patentability received for PCT Patent Application No. PCT/US2018/048151, mailed on Apr. 9, 2020, 14 pages.
International Preliminary Report on Patentability received for PCT Patent Application No. PCT/US2019/031202, mailed on Nov. 19, 2020, 13 pages.
International Preliminary Report on Patentability received for PCT Patent Application No. PCT/US2021/031760, mailed on Nov. 24, 2022, 11 pages.
International Preliminary Report on Patentability received for PCT Patent Application No. PCT/US2022/014271, mailed on Aug. 10, 2023, 17 pages.
International Search Report and Written Opinion received for PCT Patent Application No. PCT/US2018/048151, mailed on Jan. 10, 2019, 23 pages.
International Search Report and Written Opinion received for PCT Patent Application No. PCT/US2019/031202, mailed on Oct. 4, 2019, 19 pages.
International Search Report and Written Opinion received for PCT Patent Application No. PCT/US2021/031760, mailed on Sep. 16, 2021, 18 pages.
International Search Report and Written Opinion received for PCT Patent Application No. PCT/US2022/014271, mailed on Jul. 4, 2022, 23 pages.
International Search Report and Written Opinion received for PCT Patent Application No. PCT/US2022/029261, mailed on Oct. 20, 2022, 18 pages.
International Search Report and Written Opinion received for PCT Patent Application No. PCT/US2022/029273, mailed on Oct. 27, 2022, 19 pages.
International Search Report and Written Opinion received for PCT Patent Application No. PCT/US2022/029580, mailed on Nov. 7, 2022, 20 pages.

International Search Report and Written Opinion received for PCT Patent Application No. PCT/US2022/044592, mailed on Mar. 14, 2023, 22 pages.
Invitation to Pay Additional Fees and Partial International Search Report received for PCT Patent Application No. PCT/US2022/014271, mailed on May 12, 2022, 20 pages.
Invitation to Pay Additional Fees and Partial International Search Report received for PCT Patent Application No. PCT/US2022/029261, mailed on Aug. 29, 2022, 16 pages.
Invitation to Pay Additional Fees and Partial International Search Report received for PCT Patent Application No. PCT/US2022/029580, mailed on Sep. 5, 2022, 13 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/031202, mailed on Aug. 8, 2019, 12 pages.
Invitation to Pay Additional Fees received for PCT Patent Application No. PCT/US2022/029273, mailed on Sep. 2, 2022, 13 pages.
Invitation to Pay Additional Fees received for PCT Patent Application No. PCT/US2022/044592, mailed on Jan. 16, 2023, 21 pages.
Invitation to Pay Search Fees received for European Patent Application No. 21728781.2, mailed on Dec. 2, 2022, 3 pages.
Minutes of the Oral Proceedings received for European Patent Application No. 19729395.4, mailed on Jul. 21, 2021, 6 pages.
Minutes of the Oral Proceedings received for European Patent Application No. 20205496.1, mailed on May 9, 2023, 7 pages.
Non Final Office Action received for U.S. Appl. No. 16/035,422, mailed on Nov. 30, 2018, 13 Pages.
Non Final Office Action received for U.S. Appl. No. 17/157,166, mailed on Jul. 9, 2021, 12 pages.
Non-Final Office Action received for U.S. Appl. No. 16/109,552, mailed on Oct. 17, 2018, 16 pages.
Non-Final Office Action received for U.S. Appl. No. 16/144,572, mailed on Nov. 30, 2018, 8 pages.
Non-Final Office Action received for U.S. Appl. No. 16/383,403, mailed on Aug. 23, 2019, 10 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/790,619, mailed on May 4, 2020, 13 pages.
Non-Final Office Action received for U.S. Appl. No. 16/799,481, mailed on May 1, 2020, 13 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/121,610, mailed on May 13, 2021, 17 pages.
Non-Final Office Action received for U.S. Appl. No. 17/223,794, mailed on Jun. 16, 2021, 32 pages.
Non-Final Office Action received for U.S. Appl. No. 17/332,829, mailed on Aug. 1, 2022, 17 pages.
Non-Final Office Action received for U.S. Appl. No. 17/476,404, mailed on Feb. 8, 2022, 26 pages.
Non-Final Office Action received for U.S. Appl. No. 17/476,404, mailed on Mar. 30, 2023, 29 pages.
Non-Final Office Action received for U.S. Appl. No. 17/476,404, mailed on Sep. 14, 2022, 31 pages.
Non-Final Office Action received for U.S. Appl. No. 17/479,897, mailed on Apr. 25, 2023, 14 pages.
Non-Final Office Action received for U.S. Appl. No. 17/479,897, mailed on Aug. 30, 2022, 10 pages.
Non-Final Office Action received for U.S. Appl. No. 17/482,977, mailed on Oct. 13, 2022, 20 pages.
Non-Final Office Action received for U.S. Appl. No. 17/482,987, mailed on Jan. 18, 2022, 25 pages.
Non-Final Office Action received for U.S. Appl. No. 17/483,542, mailed on Jan. 31, 2023, 14 pages.
Non-Final Office Action received for U.S. Appl. No. 17/483,542, mailed on Sep. 22, 2022, 18 pages.

(56) References Cited

OTHER PUBLICATIONS

Non-Final Office Action received for U.S. Appl. No. 17/483,549, mailed on Jan. 11, 2022, 5 pages.

Non-Final Office Action received for U.S. Appl. No. 17/483,564, mailed on Jan. 6, 2022, 23 pages.

Non-Final Office Action received for U.S. Appl. No. 17/483,564, mailed on Nov. 28, 2022, 24 pages.

Non-Final Office Action received for U.S. Appl. No. 17/483,679, mailed on Dec. 9, 2022, 31 pages.

Non-Final Office Action received for U.S. Appl. No. 17/483,679, mailed on Feb. 1, 2022, 19 pages.

Non-Final Office Action received for U.S. Appl. No. 17/483,679, mailed on Sep. 13, 2023, 32 pages.

Non-Final Office Action received for U.S. Appl. No. 17/484,899, mailed on Jan. 24, 2022, 24 pages.

Non-Final Office Action received for U.S. Appl. No. 17/484,899, mailed on Jun. 14, 2023, 41 pages.

Non-Final Office Action received for U.S. Appl. No. 17/484,907, mailed on Nov. 19, 2021, 24 pages.

Non-Final Office Action received for U.S. Appl. No. 17/684,843, mailed on Aug. 11, 2023, 23 pages.

Non-Final Office Action received for U.S. Appl. No. 17/732,204, mailed on Aug. 4, 2023, 18 pages.

Non-Final Office Action received for U.S. Appl. No. 17/740,104, mailed on Aug. 2, 2023, 15 pages.

Non-Final Office Action received for U.S. Appl. No. 17/872,736, mailed on May 11, 2023, 17 pages.

Non-Final Office Action received for U.S. Appl. No. 17/903,946, mailed on Apr. 14, 2023, 17 pages.

Non-Final Office Action received for U.S. Appl. No. 17/950,900, mailed on Dec. 1, 2022, 14 pages.

Notice of Acceptance received for Australian Patent Application No. 2019266225, mailed on Dec. 23, 2020, 3 pages.

Notice of Acceptance received for Australian Patent Application No. 2020239711, mailed on Dec. 16, 2021, 3 pages.

Notice of Acceptance received for Australian Patent Application No. 2021200789, mailed on Feb. 26, 2021, 3 pages.

Notice of Acceptance received for Australian Patent Application No. 2021203903, mailed on May 25, 2022, 3 pages.

Notice of Acceptance received for Australian Patent Application No. 2022201532, mailed on May 22, 2023, 3 pages.

Notice of Allowance received for Australian Patent Application No. 2022228207, mailed on Jul. 3, 2023, 3 pages.

Notice of Allowance received for Chinese Patent Application No. 201910400179.2, mailed on Oct. 9, 2022, 4 pages (1 page of English Translation and 3 pages of Official Copy).

Notice of Allowance received for Chinese Patent Application No. 201880056514.5, mailed on Jan. 11, 2021, 2 pages (1 page of English Translation and 1 page of Official Copy).

Notice of Allowance received for Chinese Patent Application No. 201910400180.5, mailed on Nov. 5, 2020, 2 pages (1 page of English Translation and 1 page of Official Copy).

Notice of Allowance received for Chinese Patent Application No. 202011243876.0, mailed on Sep. 8, 2021, 4 pages (1 page of English Translation and 3 pages of Official Copy).

Notice of Allowance received for Chinese Patent Application No. 202110328601.5, mailed on Jul. 5, 2023, 5 pages (1 page of English Translation and 4 pages of Official Copy).

Notice of Allowance received for Japanese Patent Application No. 2018-183504, mailed on Sep. 27, 2019, 4 pages (1 page of English Translation and 3 pages of Official Copy).

Notice of Allowance received for Japanese Patent Application No. 2019-194597, mailed on Nov. 19, 2021, 4 pages (1 page of English Translation and 3 pages of Official Copy).

Notice of Allowance received for Japanese Patent Application No. 2020-159840, mailed on Jul. 8, 2022, 4 pages (1 page of English Translation and 3 pages of Official Copy).

Notice of Allowance received for Japanese Patent Application No. 2021-154573, mailed on Nov. 11, 2022, 4 pages (1 page of English Translation and 3 pages of Official Copy).

Notice of Allowance received for Japanese Patent Application No. 2021-206121, mailed on May 15, 2023, 4 pages (1 page of English Translation and 3 pages of Official Copy).

Notice of Allowance received for Japanese Patent Application No. 2022-125792, mailed on Jan. 27, 2023, 4 pages (1 page of English Translation and 3 pages of Official Copy).

Notice of Allowance received for Korean Patent Application No. 10-2020-0123805, mailed on Jun. 19, 2022, 5 pages (2 pages of English Translation and 3 pages of Official Copy).

Notice of Allowance received for Korean Patent Application No. 10-2020-7032110, mailed on Mar. 8, 2021, 4 pages (1 page of English Translation and 3 pages of Official Copy).

Notice of Allowance received for Korean Patent Application No. 10-2021-7017731, mailed on Feb. 28, 2023, 5 pages (2 pages of English Translation and 3 pages of Official Copy).

Notice of Allowance received for Korean Patent Application No. 10-2022-0091730, mailed on Oct. 4, 2022, 5 pages (2 pages of English Translation and 3 pages of Official Copy).

Notice of Allowance received for Mexican Patent Application No. MX/a/2020/003290, mailed on Feb. 9, 2023, 4 pages (1 page of English Translation and 3 pages of Official Copy).

Notice of Allowance received for U.S. Appl. No. 16/035,422, mailed on Apr. 10, 2019, 6 pages.

Notice of Allowance received for U.S. Appl. No. 16/528,941, mailed on Aug. 10, 2021, 5 pages.

Notice of Allowance received for U.S. Appl. No. 16/528,941, mailed on May 19, 2021, 5 pages.

Notice of Allowance received for U.S. Appl. No. 17/157,166, mailed on Nov. 16, 2021, 6 pages.

Notice of Allowance received for U.S. Appl. No. 16/109,552, mailed on Mar. 13, 2019, 25 pages.

Notice of Allowance received for U.S. Appl. No. 16/109,552, mailed on May 13, 2019, 2 pages.

Notice of Allowance received for U.S. Appl. No. 16/144,572, mailed on Feb. 28, 2019, 7 pages.

Notice of Allowance received for U.S. Appl. No. 16/147,432, mailed on Dec. 18, 2018, 13 pages.

Notice of Allowance received for U.S. Appl. No. 16/147,432, mailed on May 20, 2019, 6 pages.

Notice of Allowance received for U.S. Appl. No. 16/383,403, mailed on Jan. 10, 2020, 11 pages.

Notice of Allowance received for U.S. Appl. No. 16/511,578, mailed on Nov. 18, 2019, 12 pages.

Notice of Allowance received for U.S. Appl. No. 16/790,619, mailed on Sep. 8, 2020, 6 pages.

Notice of Allowance received for U.S. Appl. No. 16/799,481, mailed on Sep. 8, 2020, 6 pages.

Notice of Allowance received for U.S. Appl. No. 17/026,818, mailed on May 13, 2021, 10 pages.

Notice of Allowance received for U.S. Appl. No. 17/027,373, mailed on Aug. 2, 2022, 2 pages.

Notice of Allowance received for U.S. Appl. No. 17/027,373, mailed on Jun. 3, 2022, 8 pages.

Notice of Allowance received for U.S. Appl. No. 17/027,373, mailed on Oct. 3, 2022, 5 pages.

Notice of Allowance received for U.S. Appl. No. 17/121,610, mailed on Jul. 7, 2022, 5 pages.

Notice of Allowance received for U.S. Appl. No. 17/121,610, mailed on Jul. 13, 2022, 4 pages.

Notice of Allowance received for U.S. Appl. No. 17/121,610, mailed on Mar. 11, 2022, 5 pages.

Notice of Allowance received for U.S. Appl. No. 17/157,166, mailed on Mar. 30, 2022, 6 pages.

Notice of Allowance received for U.S. Appl. No. 17/479,897, mailed on Jul. 26, 2023, 7 pages.

Notice of Allowance received for U.S. Appl. No. 17/482,977, mailed on Jan. 24, 2023, 10 pages.

Notice of Allowance received for U.S. Appl. No. 17/482,987, mailed on Jun. 23, 2022, 9 pages.

Notice of Allowance received for U.S. Appl. No. 17/482,987, mailed on May 11, 2022, 10 pages.

Notice of Allowance received for U.S. Appl. No. 17/483,542, mailed on Aug. 11, 2023, 9 pages.

(56) References Cited

OTHER PUBLICATIONS

Notice of Allowance received for U.S. Appl. No. 17/483,549, mailed on Apr. 15, 2022, 10 pages.

Notice of Allowance received for U.S. Appl. No. 17/483,564, mailed on Jul. 17, 2023, 46 pages.

Notice of Allowance received for U.S. Appl. No. 17/483,582, mailed on Apr. 19, 2022, 5 pages.

Notice of Allowance received for U.S. Appl. No. 17/483,582, mailed on Jan. 20, 2022, 10 pages.

Notice of Allowance received for U.S. Appl. No. 17/484,907, mailed on Jul. 25, 2022, 10 pages.

Notice of Allowance received for U.S. Appl. No. 17/484,907, mailed on Mar. 2, 2022, 13 pages.

Notice of Allowance received for U.S. Appl. No. 17/484,907, mailed on May 20, 2022, 13 pages.

Notice of Allowance received for U.S. Appl. No. 17/872,736, mailed on Aug. 21, 2023, 6 pages.

Notice of Allowance received for U.S. Appl. No. 17/872,736, mailed on Aug. 30, 2023, 4 pages.

Notice of Allowance received for U.S. Appl. No. 17/950,900, mailed on Jun. 16, 2023, 6 pages.

Notice of Allowance received for U.S. Appl. No. 17/950,900, mailed on Mar. 7, 2023, 10 pages.

Notice of Allowance received for U.S. Appl. No. 17/950,922, mailed on Apr. 5, 2023, 10 pages.

Notice of Allowance received for U.S. Appl. No. 17/950,922, mailed on Sep. 20, 2023, 6 pages.

Office Action received for Australian Patent Application No. 2019100499, mailed on Jun. 28, 2019., 4 pages.

Office Action received for Australian Patent Application No. 2019101062, mailed on Apr. 22, 2020, 2 pages.

Office Action received for Australian Patent Application No. 2019101062, mailed on Dec. 5, 2019, 3 pages.

Office Action received for Australian Patent Application No. 2019266225, mailed on Nov. 23, 2020, 4 pages.

Office Action received for Australian Patent Application No. 2020239711, mailed on Sep. 13, 2021, 5 pages.

Office Action received for Australian Patent Application No. 2021203903, mailed on Feb. 24, 2022, 3 pages.

Office Action received for Australian Patent Application No. 2022201532, mailed on Dec. 19, 2022, 5 pages.

Office Action received for Australian Patent Application No. 2022228207, mailed on Apr. 28, 2023, 3 pages.

Office Action received for Chinese Patent Application No. 201880056514.5, mailed on Sep. 2, 2020, 7 pages (1 page of English Translation and 6 pages of Official Copy).

Office Action received for Chinese Patent Application No. 201910400179.2, mailed on Dec. 27, 2021, 32 pages (13 pages of English Translation and 19 pages of Official Copy).

Office Action received for Chinese Patent Application No. 201910400180.5, mailed on Jun. 1, 2020, 11 pages (5 pages of English Translation and 6 pages of Official Copy).

Office Action received for Chinese Patent Application No. 201910704856.X, mailed on Apr. 6, 2021, 13 pages (7 pages of English Translation and 6 pages of Official Copy).

Office Action received for Chinese Patent Application No. 201910704856.X, mailed on Dec. 9, 2020, 23 pages (13 pages of English Translation and 10 pages of Official Copy).

Office Action received for Chinese Patent Application No. 201910704856.X, mailed on May 27, 2020, 26 pages (14 pages of English Translation and 12 pages of Official Copy).

Office Action received for Chinese Patent Application No. 202010126661.4, mailed on Feb. 3, 2021, 16 pages (9 pages of English Translation and 7 pages of Official Copy).

Office Action received for Chinese Patent Application No. 202010126661.4, mailed on Jun. 2, 2022, 11 pages (7 pages of English Translation and 4 pages of Official Copy).

Office Action received for Chinese Patent Application No. 202010126661.4, mailed on Mar. 4, 2022, 13 pages (8 pages of English Translation and 5 pages of Official Copy).

Office Action received for Chinese Patent Application No. 202011243876.0, mailed on Apr. 6, 2021, 11 pages (5 pages of English Translation and 6 pages of Official Copy).

Office Action received for Chinese Patent Application No. 202110327012.5, mailed on Apr. 29, 2022, 17 pages (10 pages of English Translation and 7 pages of Official Copy).

Office Action received for Chinese Patent Application No. 202110327012.5, mailed on Mar. 16, 2023, 12 pages (7 pages of English Translation and 5 pages of Official Copy).

Office Action received for Chinese Patent Application No. 202110327012.5, mailed on Nov. 28, 2022, 16 pages (10 pages of English Translation and 6 pages of Official Copy).

Office Action received for Chinese Patent Application No. 202110328597.2, mailed on Apr. 15, 2022, 18 pages (9 pages of English Translation and 9 pages of Official Copy).

Office Action received for Chinese Patent Application No. 202110328597.2, mailed on Jul. 18, 2023, 21 pages (6 pages of English Translation and 15 pages of Official Copy).

Office Action received for Chinese Patent Application No. 202110328597.2, mailed on May 15, 2023, 13 pages (6 pages of English Translation and 7 pages of Official Copy).

Office Action received for Chinese Patent Application No. 202110328597.2, mailed on Oct. 10, 2022, 13 pages (7 pages of English Translation and 6 pages of Official Copy).

Office Action received for Chinese Patent Application No. 202110328601.5, mailed on Apr. 27, 2022, 25 pages (14 pages of English Translation and 11 pages of Official Copy).

Office Action received for Chinese Patent Application No. 202110328601.5, mailed on Mar. 24, 2023, 25 pages (15 pages of English Translation and 10 pages of Official Copy).

Office Action received for Chinese Patent Application No. 202110328601.5, mailed on Nov. 2, 2022, 29 pages (19 pages of English Translation and 10 pages of Official Copy).

Office Action received for Chinese Patent Application No. 202110328602.X, mailed on Dec. 1, 2022, 28 pages (17 pages of English Translation and 11 pages of Official Copy).

Office Action received for Chinese Patent Application No. 202110328602.X, mailed on Jun. 29, 2023, 27 pages (18 pages of English Translation and 9 pages of Official Copy).

Office Action received for Chinese Patent Application No. 202110328602.X, mailed on Mar. 24, 2022, 6 pages (3 pages of English Translation and 3 pages of Official Copy).

Office Action received for Chinese Patent Application No. 202111652452.4, mailed on Aug. 29, 2022, 23 pages (12 pages of English Translation and 11 pages of Official Copy).

Office Action received for Chinese Patent Application No. 202111652452.4, mailed on Feb. 11, 2023, 28 pages (13 pages of English Translation and 15 pages of Official Copy).

Office Action received for Chinese Patent Application No. 202111652452.4, mailed on May 19, 2023, 15 pages (8 pages of English Translation and 7 pages of Official Copy).

Office Action received for Danish Patent Application No. PA201870362, mailed on Aug. 22, 2019, 4 pages.

Office Action received for Danish Patent Application No. PA201870362, mailed on Dec. 18, 2018, 2 pages.

Office Action received for Danish Patent Application No. PA201870363, mailed on Mar. 26, 2019, 3 pages.

Office Action received for Danish Patent Application No. PA201870364, mailed on Jan. 28, 2019, 8 pages.

Office Action received for Danish Patent Application No. PA201870364, mailed on Jun. 11, 2019, 11 pages.

Office Action received for Danish Patent Application No. PA202070617, mailed on Sep. 24, 2021, 4 pages.

Office Action received for European Patent Application No. 18779093.6, mailed on Dec. 11, 2020, 4 pages.

Office Action received for European Patent Application No. 18779093.6, mailed on Jun. 28, 2023, 4 pages.

Office Action received for European Patent Application No. 18779093.6, mailed on Mar. 17, 2022, 4 pages.

Office Action received for European Patent Application No. 19729395.4, mailed on Jul. 15, 2020, 4 pages.

Office Action received for European Patent Application No. 19729395.4, mailed on Sep. 29, 2020, 10 pages.

(56) References Cited

OTHER PUBLICATIONS

Office Action received for European Patent Application No. 20166552. 8, mailed on Mar. 24, 2021, 8 pages.

Office Action received for European Patent Application No. 20205496. 1, mailed on Nov. 10, 2021, 5 pages.

Office Action received for European Patent Application No. 21728781. 2, mailed on Mar. 1, 2023, 13 pages.

Office Action received for Indian Patent Application No. 201814036860, mailed on Jul. 29, 2021, 8 pages.

Office Action received for Indian Patent Application No. 202014041529, mailed on Dec. 6, 2021, 6 pages.

Office Action received for Indian Patent Application No. 202015013360, mailed on Mar. 17, 2023, 7 pages.

Office Action received for Indian Patent Application No. 202215025360, mailed on Mar. 29, 2023, 6 pages.

Office Action received for Indian Patent Application No. 202215025361, mailed on Mar. 29, 2023, 6 pages.

Office Action received for Indian Patent Application No. 202215025363, mailed on Mar. 29, 2023, 6 pages.

Office Action received for Indian Patent Application No. 202215025364, mailed on Mar. 29, 2023, 6 pages.

Office Action received for Japanese Patent Application No. 2019-194597, mailed on Jan. 18, 2021, 10 pages (5 pages of English Translation and 5 pages of Official Copy).

Office Action received for Japanese Patent Application No. 2020-159840, mailed on Dec. 10, 2021, 13 pages (7 pages of English Translation and 6 pages of Official Copy).

Office Action received for Japanese Patent Application No. 2020-159840, mailed on Mar. 28, 2022, 6 pages (3 pages of English Translation and 3 pages of Official Copy).

Office Action received for Japanese Patent Application No. 2021-206121, mailed on Feb. 20, 2023, 7 pages (3 pages of English Translation and 4 pages of Official Copy).

Office Action received for Korean Patent Application No. 10-2020-7032110, mailed on Dec. 15, 2020, 6 pages (2 pages of English Translation and 4 pages of official Copy).

Office Action received for Korean Patent Application No. 10-2021-7017731, mailed on May 30, 2022, 5 pages (2 pages of English Translation and 3 pages of Official Copy).

Office Action received for Korean Patent Application No. 10-2022-7006973, mailed on Nov. 24, 2022, 6 pages (3 pages of English Translation and 3 pages of Official Copy).

Office Action received for Mexican Patent Application No. MX/a/2020/003290, mailed on Nov. 11, 2022, 7 pages (2 pages of English Translation and 5 pages of Official Copy).

Result of Consultation received for European Patent Application No. 19729395.4, mailed on Jun. 22, 2021, 3 pages.

Result of Consultation received for European Patent Application No. 19729395.4, mailed on Jun. 23, 2021, 3 pages.

Result of Consultation received for European Patent Application No. 20205496.1, mailed on Apr. 18, 2023, 3 pages.

Search Report and Opinion received for Danish Patent Application No. PA201870362, mailed on Sep. 7, 2018, 9 pages.

Search Report and Opinion received for Danish Patent Application No. PA201870363, mailed on Sep. 11, 2018, 12 pages.

Search Report and Opinion received for Danish Patent Application No. PA201870364, mailed on Sep. 4, 2018, 12 pages.

Search Report and Opinion received for Danish Patent Application No. PA202070617, mailed on Dec. 23, 2020, 8 pages.

Summons to Attend Oral Proceedings received for European Patent Application No. 19729395.4, mailed on Mar. 11, 2021, 7 pages.

Summons to Attend Oral Proceedings received for European Patent Application No. 19729395.4, mailed on Mar. 19, 2021, 9 pages.

Summons to Attend Oral Proceedings received for European Patent Application No. 20205496.1, mailed on Sep. 8, 2022, 9 pages.

Androidcentral, "How do i respond to group messages from notification bar?", Available online at: https://forums.androidcentral.com/ask-question/952030-how-do-i-respond-group-messages-notification-bar.html, Mar. 25, 2019, 3 pages.

Abdulezer et al., "Skype For Dummies", Available Online at: https://ixn.es/Skype%20For%20Dummies.pdf, 2007, 361 pages.

Dolan Tim, "How To Make a Laptop Webcam into a Document Camera—IPEVO Mirror-Cam Review", Retrieved from the Internet: URL: https ://www.youtube.com/watch?v=-K8jyZ1hbbg, Aug. 29, 2020, 1 page.

Garrison Dr., "An Analysis and Evaluation of Audio Teleconferencing to Facilitate Education at a Distance", Online Available at: https://doi.org/10.1080/08923649009526713, American journal of distance education, Jol. 4, No. 3, Sep. 24, 2009, 14 pages.

Jiutian Technology, "Windows 8 Chinese version from entry to proficiency", Jan. 1, 2014, 5 pages (Official Copy Only) {(See Communication under Rule 37 CFR § 1.98(a) (3))}.

Larson Tom, "How to Turn your Webcam into a Document Camera", Retrieved from the Internet: URL: https://www.youtube.com/watchv=UlaW22FxRZM, Nov. 7, 2020, 1 page.

QQ, "Method of QQ voice chat", Online Available at: https://www.taodocs.com/p-47909082.html, May 25, 2016, 3 pages (Official Copy only) {(See Communication under Rule 37 CFR § 1.98(a) (3))}.

Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.

Senicar et al., "User-Centered Design and Development of an Intelligent Light Switch for Sensor Systems", Technical Gazette, vol. 26, No. 2, available online at: https://hrcak.srce.hr/file/320403, 2019, pp. 339-345.

Shangmeng Li, "The Design and Implementation of Mobile Terminal System of Multimedia Conference Based on Symbian Operating System", China Academic Journal Electronic Publishing House, online available at: http://www.cnki.net, 2011, 66 pages (Official Copy only) {(See Communication under Rule 37 CFR § 1.98(a) (3)}.

Song Jianhua, "Guidelines for Network", Feb. 29, 2008, 11 pages (Official Copy Only) {(See Communication under Rule 37 CFR § 1.98(a) (3))}.

Advisory Action received for U.S. Appl. No. 17/950,868, mailed on Sep. 24, 2024, 3 pages.

Applicant-Initiated Interview Summary received for U.S. Appl. No. 18/389,655, mailed on Sep. 20, 2024, 6 pages.

Final Office Action received for U.S. Appl. No. 17/970,417, mailed on Sep. 18, 2024, 24 pages.

Intention to Grant received for European Patent Application No. 22734711.9, mailed on Sep. 13, 2024, 7 pages.

Notice of Allowance received for U.S. Appl. No. 17/684,843, mailed on Sep. 17, 2024, 5 pages.

Office Action received for Chinese Patent Application No. 202311753064.4, mailed on Aug. 23, 2024, 18 pages (11 pages of English Translation and 7 pages of Official Copy).

Office Action received for Chinese Patent Application No. 202311831154.0, mailed on Aug. 30, 2024, 13 pages (7 pages of English Translation and 6 pages of Official Copy).

Office Action received for Chinese Patent Application No. 202311835200.4, mailed on Aug. 29, 2024, 16 pages (7 pages of English Translation and 9 pages of Official Copy).

Office Action received for Japanese Patent Application No. 2023-572748, mailed on Jul. 29, 2024, 4 pages (2 pages of English Translation and 2 pages of Official Copy).

Supplemental Notice of Allowance received for U.S. Appl. No. 17/484,899, mailed on Sep. 30, 2024, 5 pages.

Extended European Search Report received for European Patent Application No. 24215184.3, mailed on Jan. 24, 2025, 11 pages.

Final Office Action received for U.S. Appl. No. 18/380,116, mailed on Jan. 30, 2025, 17 pages.

Notice of Allowance received for Chinese Patent Application No. 202311831154.0, mailed on Jan. 17, 2025, 4 pages (1 page of English Translation and 3 pages of Official Copy).

Notice of Allowance received for U.S. Appl. No. 17/483,679, mailed on Jan. 29, 2025, 5 pages.

Notice of Allowance received for U.S. Appl. No. 17/484,899, mailed on Jan. 16, 2025, 16 pages.

(56)　　　　　References Cited

OTHER PUBLICATIONS

Notice of Allowance received for U.S. Appl. No. 18/140,449, mailed on Jan. 21, 2025, 10 pages.

Office Action received for Chinese Patent Application No. 202110327012.5, mailed on Feb. 10, 2025, 22 pages (13 pages of English Translation and 9 pages of Official Copy).

Office Action received for European Patent Application No. 22733778. 9, mailed on Feb. 20, 2025, 4 pages.

Corrected Notice of Allowance received for U.S. Appl. No. 18/138,348, mailed on Mar. 26, 2025, 2 pages.

International Preliminary Report on Patentability received for PCT Patent Application No. PCT/US2023/032911, mailed on Apr. 3, 2025, 13 pages.

Notice of Allowance received for U.S. Appl. No. 18/140,449, mailed on Mar. 26, 2025, 10 pages.

Notice of Allowance received for U.S. Appl. No. 18/499,848, mailed on Apr. 2, 2025, 11 pages.

Office Action received for Japanese Patent Application No. 2024-146741, mailed on Mar. 28, 2025, 10 pages (5 pages of English Translation and 5 pages of Official Copy).

Office Action received for Korean Patent Application No. 10-2024-7043493, mailed on Mar. 19, 2025, 11 pages (4 pages of English Translation and 7 pages of Official Copy).

Result of Consultation received for European Patent Application No. 22705232.1, mailed on Mar. 26, 2025, 3 pages.

Applicant-Initiated Interview Summary received for U.S. Appl. No. 17/476,404, mailed on Oct. 31, 2023, 4 pages.

Applicant-Initiated Interview Summary received for U.S. Appl. No. 17/483,679, mailed on Dec. 18, 2023, 2 pages.

Applicant-Initiated Interview Summary received for U.S. Appl. No. 17/484,899, mailed on Feb. 14, 2024, 8 pages.

Applicant-Initiated Interview Summary received for U.S. Appl. No. 17/684,843, mailed on Oct. 5, 2023, 4 pages.

Applicant-Initiated Interview Summary received for U.S. Appl. No. 18/067,350, mailed on Mar. 13, 2024, 4 pages.

Applicant-Initiated Interview Summary received for U.S. Appl. No. 18/067,350, mailed on Sep. 11, 2023, 4 pages.

Corrected Notice of Allowance received for U.S. Appl. No. 17/483,542, mailed on Feb. 5, 2024, 3 pages.

Corrected Notice of Allowance received for U.S. Appl. No. 17/684,843, mailed on Mar. 4, 2024, 2 pages.

Corrected Notice of Allowance received for U.S. Appl. No. 17/732,204, mailed on Dec. 4, 2023, 5 pages.

Corrected Notice of Allowance received for U.S. Appl. No. 17/732,204, mailed on Jan. 18, 2024, 5 pages.

Corrected Notice of Allowance received for U.S. Appl. No. 17/732,204, mailed on Nov. 16, 2023, 6 pages.

Corrected Notice of Allowance received for U.S. Appl. No. 17/740,104, mailed on Jan. 2, 2024, 2 pages.

Corrected Notice of Allowance received for U.S. Appl. No. 17/872,736, mailed on Oct. 13, 2023, 4 pages.

Corrected Notice of Allowance received for U.S. Appl. No. 17/950,922, mailed on Oct. 2, 2023, 3 pages.

Decision to Grant received for European Patent Application No. 21728781.2, mailed on Feb. 8, 2024, 3 pages.

Extended European Search Report received for European Patent Application No. 23172038.4, mailed on Oct. 11, 2023, 10 pages.

Extended European Search Report received for European Patent Application No. 23203414.0, mailed on Jan. 26, 2024, 10 pages.

Final Office Action received for U.S. Appl. No. 17/483,679, mailed on Feb. 6, 2024, 45 pages.

Final Office Action received for U.S. Appl. No. 17/484,899, mailed on Nov. 6, 2023, 39 pages Final Office Action received for U.S. Appl. No. 18/067,350, mailed on Dec. 13, 2023, 44 pages.

Intention to Grant received for European Patent Application No. 21728781.2, mailed on Dec. 12, 2023, 9 pages.

International Preliminary Report on Patentability received for PCT Patent Application No. PCT/US2022/029261, mailed on Nov. 30, 2023, 12 pages.

International Preliminary Report on Patentability received for PCT Patent Application No. PCT/US2022/029273, mailed on Nov. 30, 2023, 14 pages.

International Preliminary Report on Patentability received for PCT Patent Application No. PCT/US2022/029580, mailed on Nov. 30, 2023, 14 pages.

International Search Report and Written Opinion received for PCT Patent Application No. PCT/US2023/017280, mailed on Jun. 26, 2023, 20 pages.

International Search Report and Written Opinion received for PCT Patent Application No. PCT/US2023/020569, mailed on Nov. 13, 2023, 23 pages.

International Search Report and Written Opinion received for PCT Patent Application No. PCT/US2023/032792, mailed on Jan. 19, 2024, 15 pages.

International Search Report and Written Opinion received for PCT Patent Application No. PCT/US2023/032911, mailed on Jan. 4, 2024, 18 pages.

Invitation to Pay Additional Fees and Partial International Search Report received for PCT Patent Application No. PCT/US2023/020569, mailed on Sep. 21, 2023, 14 pages.

Non-Final Office Action received for U.S. Appl. No. 18/067,350, mailed on Aug. 3, 2023, 41 pages.

Notice of Acceptance received for Australian Patent Application No. 2023248185, mailed on Jan. 23, 2024, 3 pages.

Notice of Allowance received for Korean Patent Application No. 10-2023-7024157, mailed on Sep. 19, 2023, 7 pages (2 pages of English Translation and 5 pages of Official Copy).

Notice of Allowance received for Korean Patent Application No. 10-2023-7039382, mailed on Feb. 13, 2024, 6 pages (2 pages of English Translation and 4 pages of Official Copy).

Notice of Allowance received for Korean Patent Application No. 10-2024-7000870, mailed on Feb. 13, 2024, 5 pages (2 pages of English Translation and 3 pages of Official Copy).

Notice of Allowance received for U.S. Appl. No. 17/479,897, mailed on Oct. 3, 2023, 5 pages.

Notice of Allowance received for U.S. Appl. No. 17/483,542, mailed on Dec. 20, 2023, 6 pages.

Notice of Allowance received for U.S. Appl. No. 17/684,843, mailed on Feb. 14, 2024, 8 pages.

Notice of Allowance received for U.S. Appl. No. 17/732,204, mailed on Oct. 12, 2023, 8 pages.

Notice of Allowance received for U.S. Appl. No. 17/740,104, mailed on Oct. 4, 2023, 5 pages.

Office Action received for Australian Patent Application No. 2023204396, mailed on Jan. 8, 2024, 5 pages.

Office Action received for Australian Patent Application No. 2023248185, mailed on Nov. 22, 2023, 2 pages.

Office Action received for Australian Patent Application No. 2023248185, mailed on Oct. 20, 2023, 3 pages.

Office Action received for Chinese Patent Application No. 201910704856.X, mailed on Mar. 8, 2024, 13 pages (7 pages of English Translation and 6 pages of Official Copy).

Office Action received for European Patent Application No. 20166552. 8, mailed on Nov. 3, 2023, 3 pages.

Office Action received for Korean Patent Application No. 10-2023-0001668, mailed on Nov. 3, 2023, 5 pages (2 pages of English Translation and 3 pages of Official Copy).

Office Action received for Korean Patent Application No. 10-2023-7018775, mailed on Feb. 28, 2024, 8 pages (3 pages of English Translation and 5 pages of Official Copy).

Decision to Grant received for European Patent Application No. 22734711.9, mailed on Jan. 7, 2025, 2 pages.

Notice of Hearing received for Indian Patent Application No. 202015013360, mailed on Dec. 26, 2024, 2 pages.

Intention to Grant received for European Patent Application No. 22792995.7, mailed on Jun. 10, 2025, 9 pages.

Intention to Grant received for European Patent Application No. 24160234.1, mailed on Jun. 20, 2025, 9 pages.

Notice of Allowance received for U.S. Appl. No. 18/499,848, mailed on Jun. 16, 2025, 7 pages.

(56) References Cited

OTHER PUBLICATIONS

Office Action received for Korean Patent Application No. 10-2023-7039401, mailed on May 19, 2025, 7 pages (3 pages of English Translation and 4 pages of Official Copy).

Result of Consultation received for European Patent Application No. 22729921.1, mailed on Jun. 12, 2025, 3 pages.

Applicant-Initiated Interview Summary received for U.S. Appl. No. 17/745,680, mailed on Jun. 30, 2025, 2 pages.

Applicant-Initiated Interview Summary received for U.S. Appl. No. 18/077,154, mailed on Jul. 2, 2025, 2 pages.

Applicant-Initiated Interview Summary received for U.S. Appl. No. 18/367,977, mailed on Jul. 3, 2025, 5 pages.

Examiner-Initiated Interview Summary received for U.S. Appl. No. 18/067,350, mailed on Jun. 26, 2025, 4 pages.

Office Action received for European Patent Application No. 22733778.9, mailed on Jun. 20, 2025, 4 pages.

Office Action received for Indian Patent Application No. 202315041189, mailed on Jun. 26, 2025, 7 pages.

Office Action received for Japanese Patent Application No. 2024-146741, mailed on Jun. 20, 2025, 6 pages (3 pages of English Translation and 3 pages of Official Copy).

Result of Consultation received for European Patent Application No. 22729921.1, mailed on Jun. 27, 2025, 3 pages.

Applicant-Initiated Interview Summary received for U.S. Appl. No. 17/745,680, mailed on Apr. 24, 2025, 2 pages.

Board Decision received for Chinese Patent Application No. 201810375380.5, mailed on Jul. 6, 2022, 2 pages (1 page of English Translation and 1 page of Official Copy).

CNET, "Android Lollipop Lock-Screen Notification Tips", Available online at: https://www.youtube.com/watch?v=LZTxHBOwzIU, Nov. 13, 2014, 3 pages.

Decision on Appeal received for U.S. Appl. No. 16/136,178, mailed on Jun. 2, 2022, 10 pages,.

Decision to Grant received for Danish Patent Application No. 201570874, mailed on Jan. 26, 2018, 2 pages.

Decision to Grant received for Danish Patent Application No. PA201570865, mailed on Mar. 19, 2018, 2 pages.

Decision to Grant received for Danish Patent Application No. PA201570867, mailed on Mar. 13, 2018, 2 pages.

Decision to Grant received for Danish Patent Application No. PA201570871, mailed on Mar. 19, 2018, 2 pages.

Decision to Grant received for European Patent Application No. 16728165.8, mailed on Sep. 12, 2019, 2 pages.

Decision to Grant received for European Patent Application No. 18196448.7, mailed on Aug. 6, 2020, 2 pages.

Decision to Grant received for European Patent Application No. 20193661.4, mailed on Sep. 7, 2023, 2 pages.

Extended European Search Report received for European Patent Application No. 18196448.7, mailed on Oct. 16, 2018, 9 pages.

Extended European Search Report received for European Patent Application No. 20193661.4, mailed on Feb. 2, 2021, 10 pages.

Final Office Action received for U.S. Appl. No. 15/835,366, mailed on Apr. 5, 2019, 17 pages.

Final Office Action received for U.S. Appl. No. 15/835,366, mailed on Oct. 21, 2019, 18 pages.

Final Office Action received for U.S. Appl. No. 15/835,382, mailed on Apr. 8, 2019, 20 pages.

Final Office Action received for U.S. Appl. No. 16/136,178, mailed on Jul. 10, 2020, 17 pages.

Final Office Action received for U.S. Appl. No. 18/127,535, mailed on Jul. 19, 2024, 26 pages.

Intention to Grant received for Danish Patent Application No. PA201570865, mailed on Jan. 3, 2018, 2 pages.

Intention to Grant received for Danish Patent Application No. PA201570867, mailed on Sep. 22, 2017, 2 pages.

Intention to Grant received for Danish Patent Application No. PA201570871, mailed on Jan. 15, 2018, 2 pages.

Intention to Grant received for Danish Patent Application No. PA201570874, mailed on Nov. 16, 2017, 2 pages.

Intention to Grant received for Danish Patent Application No. PA201570880, mailed on May 9, 2018, 2 pages.

Intention to Grant received for European Patent Application No. 16728165.8, mailed on Apr. 30, 2019, 7 pages.

Intention to Grant received for European Patent Application No. 18196448.7, mailed on Jun. 19, 2020, 7 pages.

Intention to Grant received for European Patent Application No. 20166552.8, mailed on Apr. 30, 2025, 9 pages.

International Preliminary Report on Patentability received for PCT Patent Application No. PCT/US2016/033528, mailed on Dec. 12, 2017, 30 pages.

International Search Report and Written Opinion received for PCT Patent Application No. PCT/US2016/033528, mailed on Feb. 6, 2017, 43 pages.

International Search Report and Written Opinion received for PCT Patent Application No. PCT/US2024/053247, mailed on Jan. 28, 2025, 13 pages.

Non-Final Office Action received for U.S. Appl. No. 15/835,366, mailed on Feb. 6, 2020, 15 pages.

Non-Final Office Action received for U.S. Appl. No. 15/835,366, mailed on Jun. 26, 2019, 19 pages.

Non-Final Office Action received for U.S. Appl. No. 15/835,366, mailed on Nov. 16, 2018, 14 pages.

Non-Final Office Action received for U.S. Appl. No. 15/835,382, mailed on Nov. 29, 2018, 14 pages.

Non-Final Office Action received for U.S. Appl. No. 16/136,178, mailed on Jan. 6, 2020, 15 pages.

Non-Final Office Action received for U.S. Appl. No. 17/745,680, mailed on May 2, 2025, 27 pages.

Non-Final Office Action received for U.S. Appl. No. 18/127,535, mailed on Dec. 20, 2023, 20 pages.

Notice of Acceptance received for Australian Patent Application No. 2016276028, mailed on Aug. 6, 2019, 3 pages.

Notice of Allowance received for Chinese Patent Application No. 201680026995.6, mailed on Mar. 18, 2020, 2 pages (1 page of English Translation and 1 page of Official Copy).

Notice of Allowance received for Chinese Patent Application No. 201810368058.X, mailed on Jul. 30, 2021, 2 pages (1 page of English Translation and 1 page of Official Copy).

Notice of Allowance received for Chinese Patent Application No. 201810375380.5, mailed on Jul. 25, 2022, 1 pages (1 page of English Translation and 1 page of Official Copy).

Notice of Allowance received for Chinese Patent Application No. 201810760112.5, mailed on Sep. 21, 2020, 4 pages (1 page of English Translation and 3 pages of Official Copy).

Notice of Allowance received for U.S. Appl. No. 15/835,366, mailed on Jul. 23, 2020, 10 pages.

Notice of Allowance received for U.S. Appl. No. 16/136,178, mailed on Dec. 5, 2022, 9 pages.

Notice of Allowance received for U.S. Appl. No. 16/136,178, mailed on Sep. 9, 2022, 8 pages.

Office Action received for Australian Patent Application No. 2016276028, mailed on Aug. 9, 2018, 4 pages.

Office Action received for Australian Patent Application No. 2016276028, mailed on May 13, 2019, 4 pages.

Office Action received for Australian Patent Application No. 2019257353, mailed on Sep. 7, 2020, 4 pages.

Office Action received for Chinese Patent Application No. 201680026995.6, mailed on Oct. 22, 2019, 15 pages (6 pages of English Translation and 9 pages of Official Copy).

Office Action received for Chinese Patent Application No. 201810368058.X, mailed on Mar. 20, 2020, 15 pages (7 pages of English Translation and 8 pages of Official Copy).

Office Action received for Chinese Patent Application No. 201810368058.X, mailed on May 8, 2021, 6 pages (3 pages of English Translation and 3 pages of Official Copy).

Office Action received for Chinese Patent Application No. 201810368058.X, mailed on Nov. 3, 2020, 16 pages (7 pages of English Translation and 9 pages of Official Copy).

Office Action received for Chinese Patent Application No. 201810375380.5, mailed on Apr. 2, 2022, 11 pages (6 pages of English Translation and 5 pages of Official Copy).

(56)                References Cited

OTHER PUBLICATIONS

Office Action received for Chinese Patent Application No. 201810375380.5, mailed on Jan. 14, 2022, 16 pages (8 pages of English Translation and 8 pages of Official Copy).
Office Action received for Chinese Patent Application No. 201810375380.5, mailed on Mar. 3, 2020, 13 pages (6 pages of English Translation and 7 pages of Official Copy).
Office Action received for Chinese Patent Application No. 201810375380.5, mailed on Nov. 12, 2020, 16 pages (8 pages of English Translation and 8 pages of Official Copy).
Office Action received for Chinese Patent Application No. 201810375380.5, mailed on Sep. 15, 2021, 10 pages (5 pages of English Translation and 5 pages of Official Copy).
Office Action received for Chinese Patent Application No. 201810760112.5, mailed on Feb. 26, 2020, 11 pages (5 pages of English Translation and 6 pages of Official Copy).
Office Action received for Chinese Patent Application No. 201810760112.5, mailed on Jul. 21, 2020, 6 pages (3 pages of English Translation and 3 pages of Official Copy).
Office Action received for Chinese Patent Application No. 202110327012.5, mailed on Mar. 31, 2025, 19 pages (1 page of English Translation and 18 pages of Official Copy).
Office Action received for Danish Patent Application No. PA201570865, mailed on Mar. 8, 2017, 5 pages.
Office Action received for Danish Patent Application No. PA201570865, mailed on Oct. 10, 2017, 2 pages.
Office Action received for Danish Patent Application No. PA201570865, mailed on Sep. 2, 2016, 4 pages.
Office Action received for Danish Patent Application No. PA201570867, mailed on Feb. 21, 2017, 2 pages.
Office Action received for Danish Patent Application No. PA201570867, mailed on Sep. 7, 2016, 3 pages.
Office Action received for Danish Patent Application No. PA201570871, mailed on Jun. 12, 2017, 3 pages.
Office Action received for Danish Patent Application No. PA201570871, mailed on Oct. 18, 2016, 4 pages.
Office Action received for Danish Patent Application No. PA201570874, mailed on Aug. 31, 2016, 4 pages.
Office Action received for Danish Patent Application No. PA201570874, mailed on May 15, 2017, 4 pages.
Office Action received for Danish Patent Application No. PA201570880, mailed on Feb. 1, 2018, 2 pages.
Office Action received for Danish Patent Application No. PA201570880, mailed on Mar. 31, 2017, 5 pages.
Office Action received for Danish Patent Application No. PA201570880, mailed on Oct. 24, 2017, 4 pages.
Office Action received for Danish Patent Application No. PA201570880, mailed on Sep. 7, 2016, 3 pages.
Office Action received for European Patent Application No. 16728165.8, mailed on Aug. 29, 2018, 4 pages.
Office Action received for European Patent Application No. 18196448.7, mailed on Sep. 16, 2019, 4 pages.
Office Action received for European Patent Application No. 20193661.4, mailed on Sep. 13, 2021, 6 pages.
Pre-Appeal Review Report received for Japanese Patent Application No. 2023-572748, mailed on Apr. 1, 2025, 4 pages (2 pages of English Translation and 2 pages of Official Copy).
Schulzrinne H, "Indication of Message Composition for Instant Messaging", Network Working Group, Columbia University, Jan. 2005, 14 pages.
Search Report and Opinion received for Danish Patent Application No. PA201570865, mailed on Mar. 30, 2016, 6 pages.
Search Report and Opinion received for Danish Patent Application No. PA201570867, mailed on Apr. 1, 2016, 6 pages.
Search Report and Opinion received for Danish Patent Application No. PA201570871, mailed on Apr. 12, 2016, 7 pages.
Search Report and Opinion received for Danish Patent Application No. PA201570874, mailed on Mar. 30, 2016, 7 pages.
Search Report and Opinion received for Danish Patent Application No. PA201570880, mailed on Apr. 4, 2016, 6 pages.

Advisory Action received for U.S. Appl. No. 18/380,116, mailed on May 21, 2025, 4 pages.
Corrected Notice of Allowance received for U.S. Appl. No. 18/499,848, mailed on May 19, 2025, 3 pages.
Intention to Grant received for European Patent Application No. 18779093.6, mailed on May 9, 2025, 9 pages.
Non-Final Office Action received for U.S. Appl. No. 18/367,977, mailed on May 29, 2025, 20 pages.
Notice of Allowance received for Chinese Patent Application No. 202311185909.4, mailed on Apr. 30, 2025, 3 pages (2 pages of English Translation and 1 page of Official Copy).
Notice of Allowance received for Chinese Patent Application No. 202311753064.4, mailed on May 12, 2025, 6 pages (2 pages of English Translation and 4 pages of Official Copy).
Office Action received for Chinese Patent Application No. 202311835200.4, mailed on Apr. 29, 2025, 9 pages (5 pages of English Translation and 4 pages of Official Copy).
Office Action received for Chinese Patent Application No. 202410030102.1, mailed on Apr. 24, 2025, 11 pages (6 pages of English Translation and 5 pages of Official Copy).
Office Action received for European Patent Application No. 23172038.4, mailed on May 22, 2025, 6 pages.
Board Opinion received for Chinese Patent Application No. 202010126661.4, mailed on Jul. 31, 2025, 16 pages (9 pages of English Translation and 7 pages of Official Copy).
Corrected Notice of Allowance received for U.S. Appl. No. 17/745,680, mailed on Jul. 28, 2025, 3 pages.
Corrected Notice of Allowance received for U.S. Appl. No. 18/498,779, mailed on Aug. 6, 2025, 2 pages.
Non-Final Office Action received for U.S. Appl. No. 18/416,784, mailed on Aug. 22, 2025, 23 pages.
Notice of Allowance received for Korean Patent Application No. 10-2025-0026405, mailed on Jul. 22, 2025, 7 pages (2 pages of English Translation and 5 pages of Official Copy).
Notice of Allowance received for U.S. Appl. No. 18/077,154, mailed on Jul. 28, 2025, 14 pages.
Office Action received for Chinese Patent Application No. 202310585927.5, mailed on Jun. 27, 2025, 17 pages (9 pages of English Translation and 8 pages of Official Copy).
Office Action received for European Patent Application No. 23203414.0, mailed on Jul. 29, 2025, 6 pages.
Office Action received for Japanese Patent Application No. 2024-106235, mailed on Jul. 22, 2025, 14 pages (7 pages of English Translation and 7 pages of Official Copy).
Result of Consultation received for European Patent Application No. 22733778.9, mailed on Jul. 21, 2025, 3 pages.
Summons to Attend Oral Proceedings received for European Patent Application No. 22705232.1, mailed on Jul. 23, 2025, 12 pages.
Extended European Search Report received for European Patent Application No. 25170895.4, mailed on Jul. 3, 2025, 11 pages.
Notice of Allowance received for Chinese Patent Application No. 202410924550.6, mailed on Jun. 30, 2025, 4 pages (1 page of English Translation and 3 pages of Official Copy).
Notice of Allowance received for Chinese Patent Application No. 202410924556.3, mailed on Jun. 30, 2025, 4 pages (1 page of English Translation and 3 pages of Official Copy).
Notice of Allowance received for U.S. Appl. No. 17/745,680, mailed on Jul. 18, 2025, 8 pages.
Notice of Allowance received for U.S. Appl. No. 18/498,779, mailed on Jul. 14, 2025, 9 pages.
Decision to Grant received for European Patent Application No. 20166552.8, mailed on Aug. 28, 2025, 4 pages.
International Preliminary Report on Patentability received for PCT Patent Application No. PCT/US2024/017017, mailed on Sep. 4, 2025, 23 pages.
Notice of Allowance received for Korean Patent Application No. 10-2024-7043493, mailed on Aug. 26, 2025, 7 pages (2 pages of English Translation and 5 pages of Official Copy).
Office Action received for European Patent Application No. 24215184.3, mailed on Sep. 5, 2025, 6 pages.
Office Action received for Japanese Patent Application No. 2024-146741, mailed on Aug. 25, 2025, 4 pages (2 pages of English Translation and 2 pages of Official Copy).

(56)                    References Cited

OTHER PUBLICATIONS

Decision on Appeal received for Mexican Patent Application No. MX/a/2023/005388, mailed on Jan. 7, 2025, 36 pages.
Extended European Search Report received for European Patent Application No. 25201240.6, mailed on Dec. 23, 2025, 7 pages.
Notice of Allowance received for Korean Patent Application No. 10-2023-7039401, mailed on Aug. 25, 2025, 6 pages (1 page of English Translation and 5 pages of Official Copy).
Notice of Allowance received for Korean Patent Application No. 10-2024-7015406, mailed on Sep. 22, 2025, 6 pages (2 pages of English Translation and 4 pages of Official Copy).
Extended European Search Report received for European Patent Application No. 25203910.2, mailed on Nov. 25, 2025, 11 pages.
Intention to Grant received for European Patent Application No. 22705232.1, mailed on Nov. 26, 2025, 9 pages.
Notice of Allowance received for Japanese Patent Application No. 2024-146741, mailed on Nov. 25, 2025, 4 pages (1 page of English Translation and 3 pages of Official Copy).
Office Action received for Chinese Patent Application No. 202310585927.5, mailed on Oct. 30, 2025, 7 pages (4 pages of English Translation and 3 pages of Official Copy).
Office Action received for Indian Patent Application No. 202318051670, mailed on Nov. 28, 2025, 7 pages.
Office Action received for Japanese Patent Application No. 2023-572748, mailed on Oct. 30, 2025, 6 pages (3 pages of English Translation and 3 pages of Official Copy).
Applicant-Initiated Interview Summary received for U.S. Appl. No. 18/416,784, mailed on Dec. 19, 2025, 2 pages.
Corrected Notice of Allowance received for U.S. Appl. No. 18/380,116, mailed on Dec. 22, 2025, 20 pages.
Decision to Refuse received for Japanese Patent Application No. 2024-106235, mailed on Dec. 12, 2025, 23 pages (11 pages of English Translation and 12 pages of Official Copy).
Office Action received for Korean Patent Application No. 10-2024-7013375, mailed on Dec. 2, 2025, 13 pages (5 pages of English Translation and 8 pages of Official Copy).
Brief Communication Regarding Oral Proceedings received for European Patent Application No. 22705232.1, mailed on Nov. 10, 2025, 11 pages.

Examiner-Initiated Interview Summary received for U.S. Appl. No. 18/428,549, mailed on Nov. 20, 2025, 2 pages.
Final Office Action received for U.S. Appl. No. 18/416,784, mailed on Nov. 13, 2025, 28 pages.
International Preliminary Report on Patentability received for PCT Patent Application No. PCT/US2024/023231, mailed on Nov. 20, 2025, 19 pages.
Notice of Allowance received for U.S. Appl. No. 18/077,154, mailed on Nov. 25, 2025, 14 pages.
Office Action received for Chinese Patent Application No. 202510503352.7, mailed on Nov. 4, 2025, 12 pages (6 pages of English Translation and 6 pages of Official Copy).
Office Action received for European Patent Application No. 22733778.9, mailed on Nov. 18, 2025, 8 pages.
Office Action received for European Patent Application No. 25170895.4, mailed on Nov. 21, 2025, 9 pages.
Applicant-Initiated Interview Summary received for U.S. Appl. No. 18/416,784, mailed on Sep. 25, 2025, 2 pages.
Board Decision received for Chinese Patent Application No. 202010126661.4, mailed on Sep. 26, 2025, 27 pages (11 pages of English Translation and 16 pages of Official Copy).
Corrected Notice of Allowance received for U.S. Appl. No. 18/380,116, mailed on Oct. 14, 2025, 20 pages.
Corrected Notice of Allowance received for U.S. Appl. No. 18/498,779, mailed on Sep. 17, 2025, 4 pages.
Corrected Notice of Allowance received for U.S. Appl. No. 18/498,779, mailed on Sep. 30, 2025, 3 pages.
Decision to Grant received for European Patent Application No. 22792995.7, mailed on Oct. 9, 2025, 4 pages.
Decision to Grant received for European Patent Application No. 24160234.1, mailed on Oct. 2, 2025, 4 pages.
Extended European Search Report received for European Patent Application No. 25201688.6, mailed on Sep. 29, 2025, 9 pages.
Final Office Action received for U.S. Appl. No. 18/067,350, mailed on Oct. 16, 2025, 55 pages.
Non-Final Office Action received for U.S. Appl. No. 18/428,549, mailed on Sep. 24, 2025, 13 pages.
Notice of Allowance received for U.S. Appl. No. 18/367,977, mailed on Oct. 20, 2025, 9 pages.
Notice of Allowance received for U.S. Appl. No. 18/380,116, mailed on Oct. 6, 2025, 25 pages.

* cited by examiner 6-100

1-338　6-102

Display Generation Component 120

Memory 320

Operating System 330

XR Experience Module 340

Data Obtaining Unit 342

XR Presenting Unit 344

XR Map Generating Unit 346

Data Transmitting Unit 348

XR Display(s) 312

Image Sensor(s) 314

Comm. Interface(s) 308

Programming Interface(s) 310

Processing Unit(s) 302

I/O Devices & Sensors 306

304

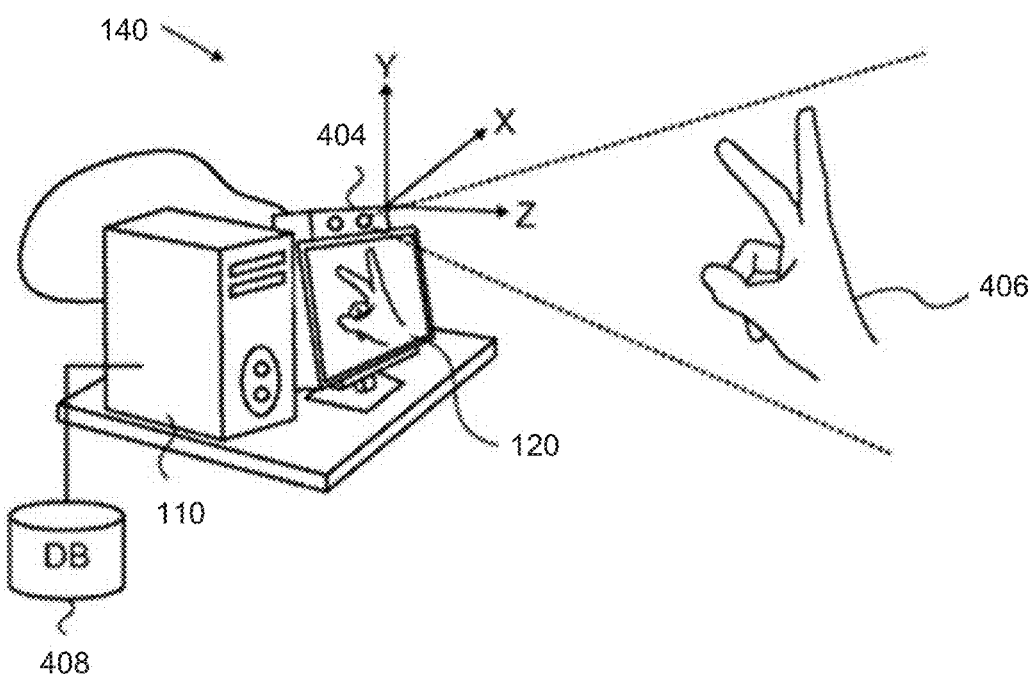
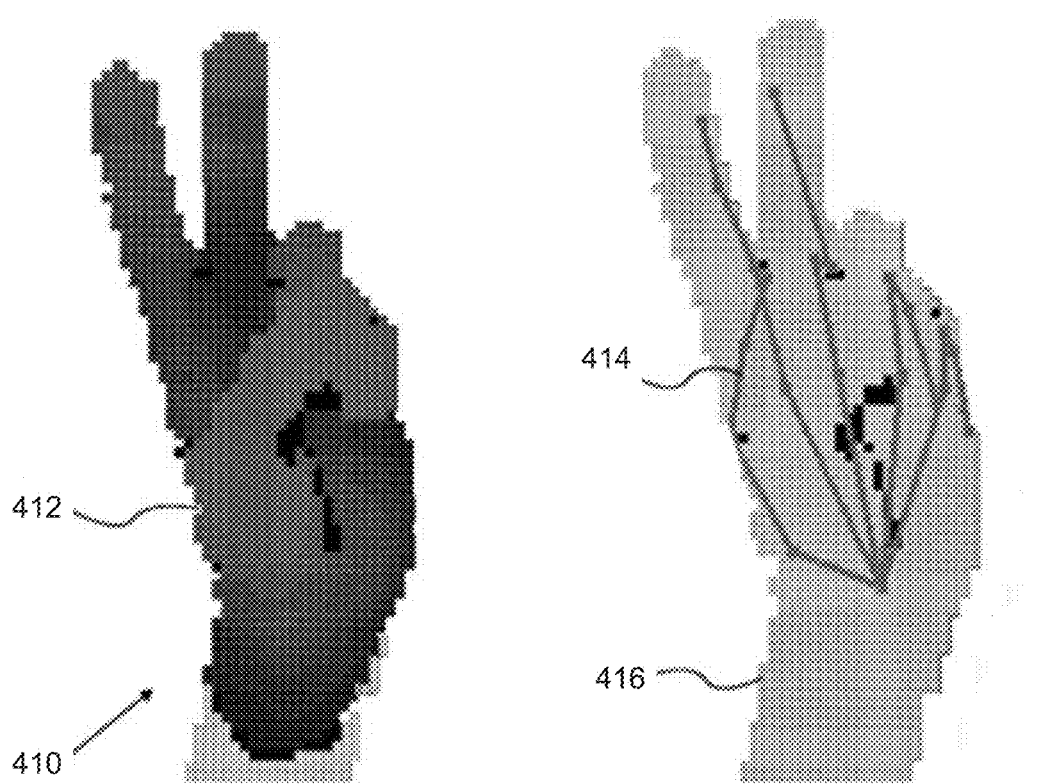
*FIG. 4*

TOP-DOWN VIEW

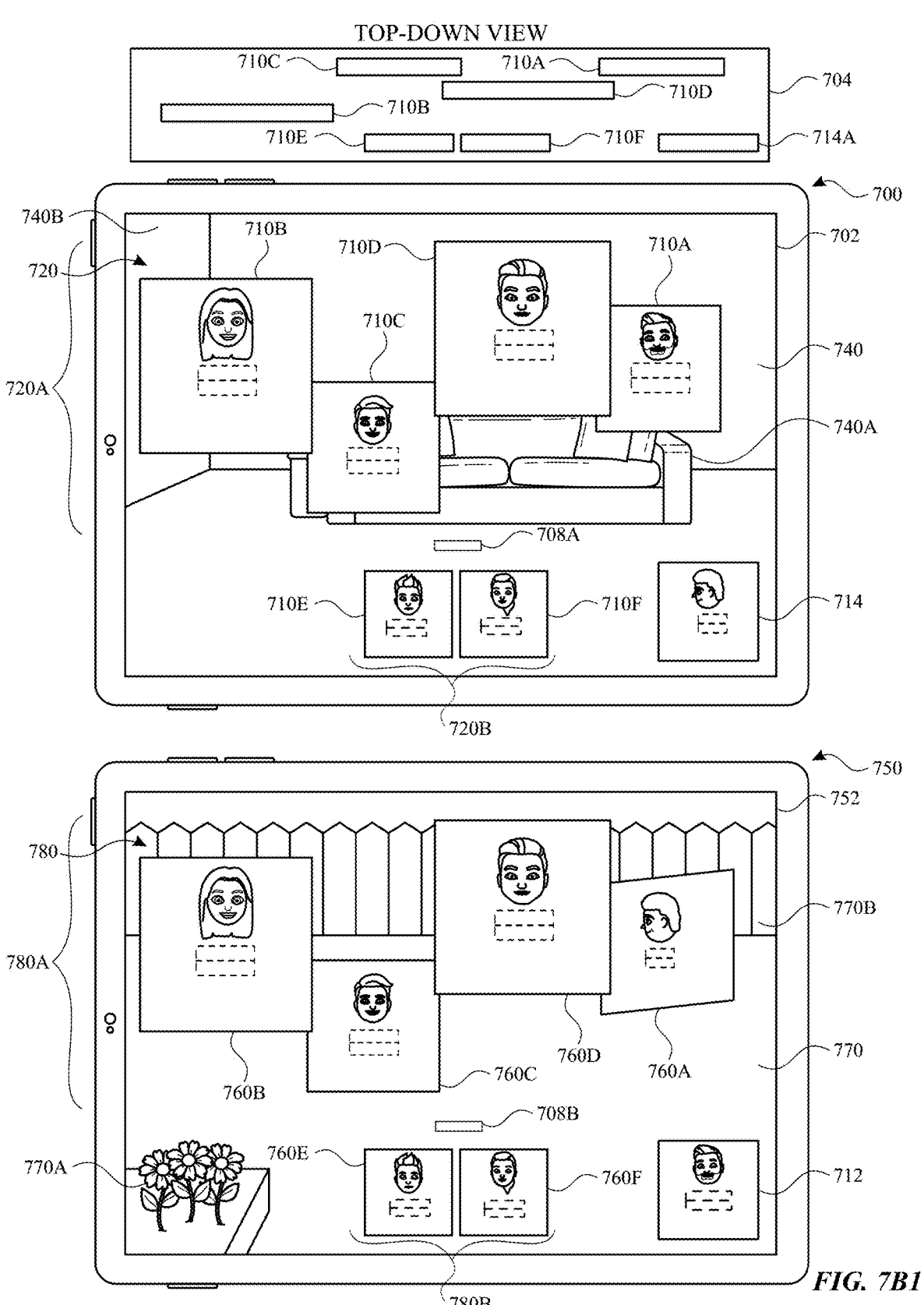
FIG. 7B1

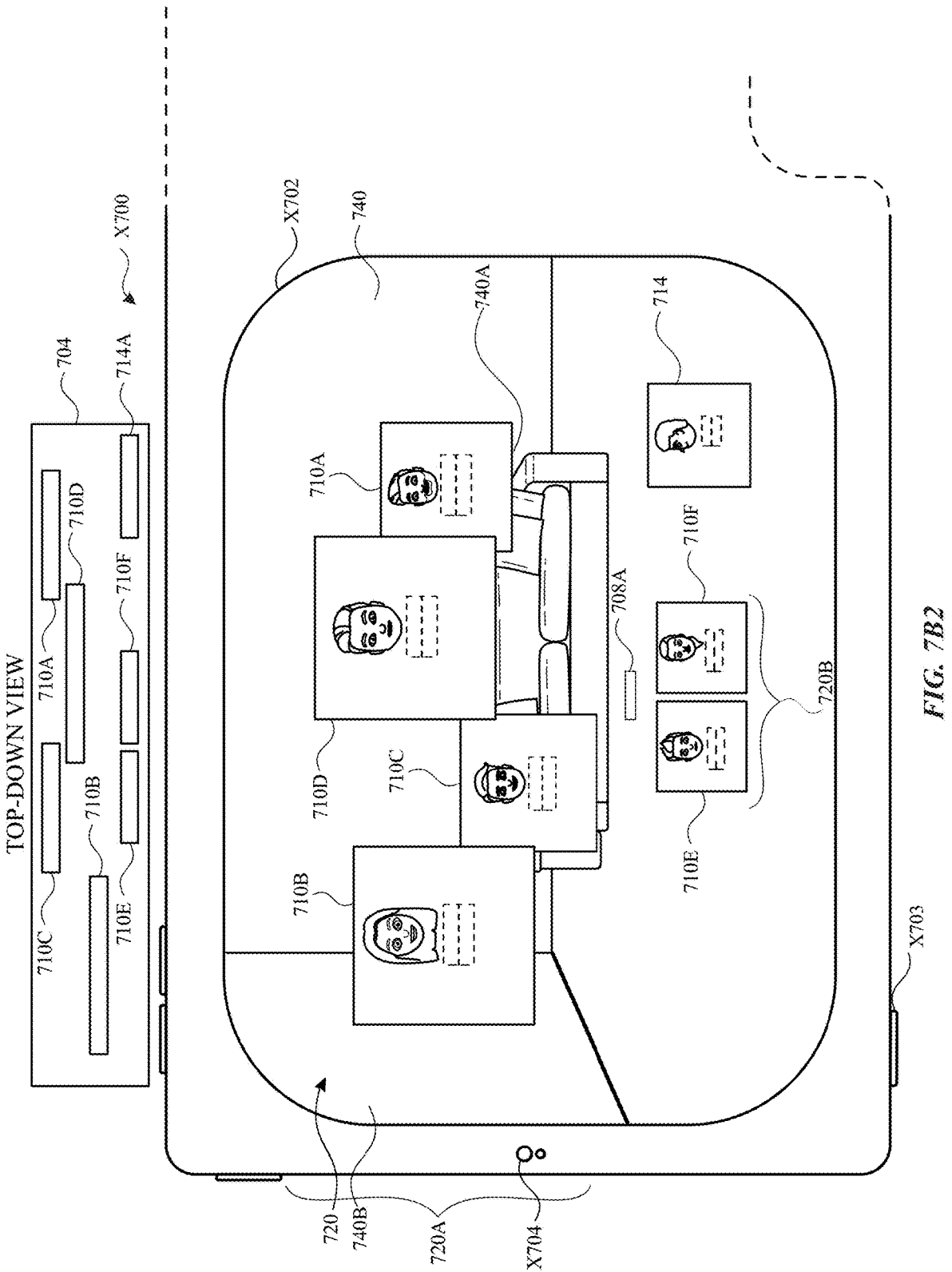
FIG. 7B2

Figure 8:
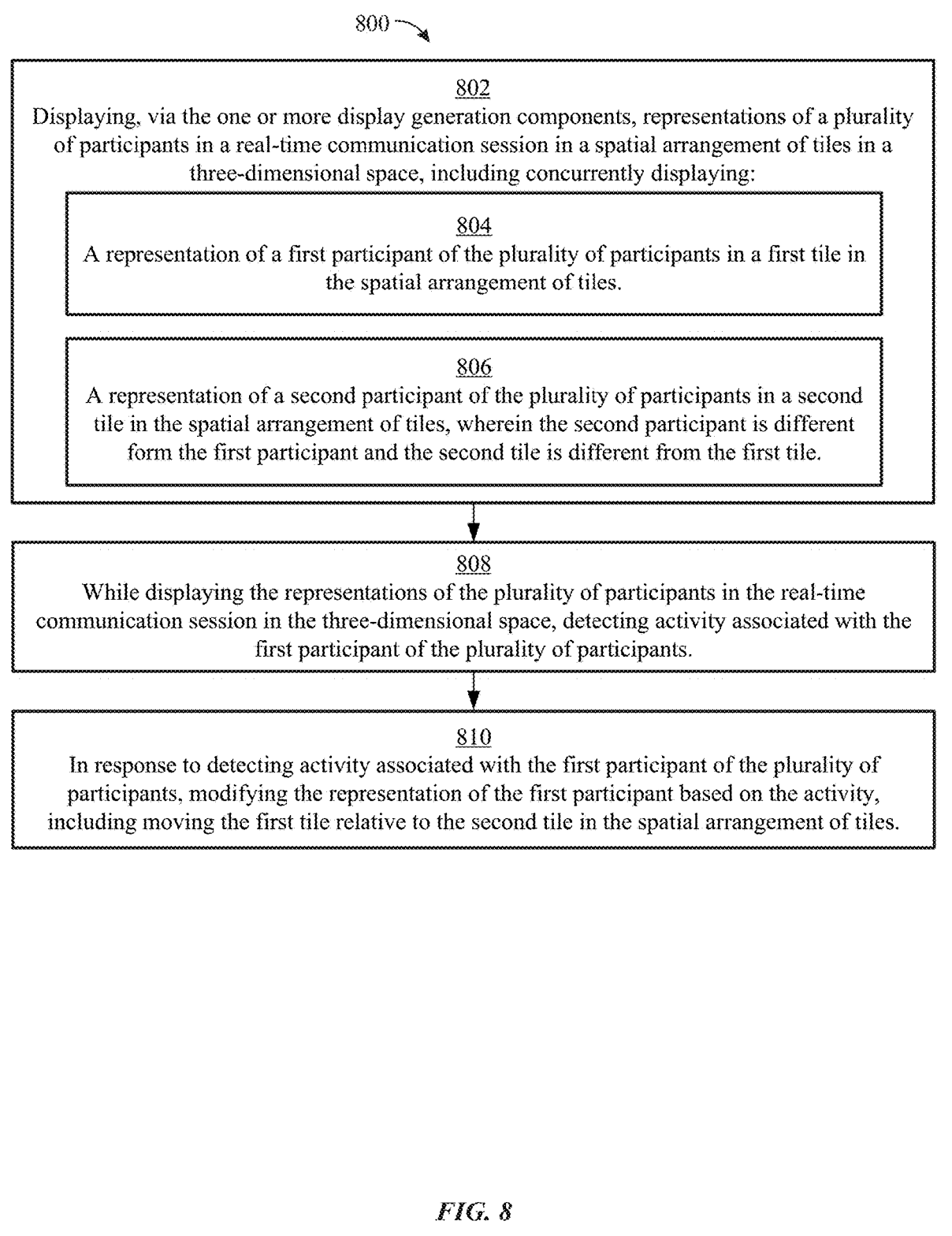

800 ⟶

802
Displaying, via the one or more display generation components, representations of a plurality of participants in a real-time communication session in a spatial arrangement of tiles in a three-dimensional space, including concurrently displaying:

804
A representation of a first participant of the plurality of participants in a first tile in the spatial arrangement of tiles.

806
A representation of a second participant of the plurality of participants in a second tile in the spatial arrangement of tiles, wherein the second participant is different form the first participant and the second tile is different from the first tile.

808
While displaying the representations of the plurality of participants in the real-time communication session in the three-dimensional space, detecting activity associated with the first participant of the plurality of participants.

810
In response to detecting activity associated with the first participant of the plurality of participants, modifying the representation of the first participant based on the activity, including moving the first tile relative to the second tile in the spatial arrangement of tiles.

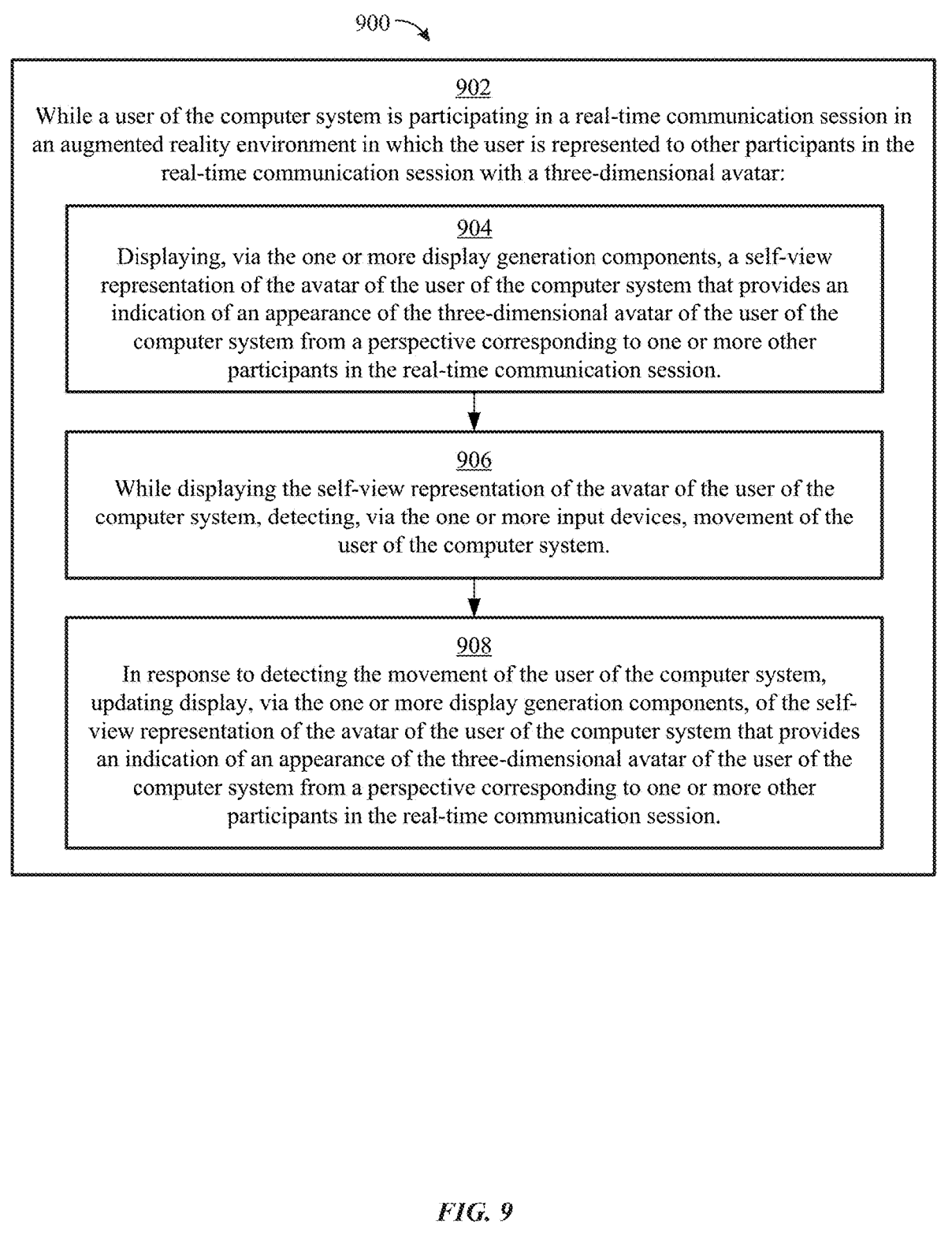

902
While a user of the computer system is participating in a real-time communication session in an augmented reality environment in which the user is represented to other participants in the real-time communication session with a three-dimensional avatar:

904
Displaying, via the one or more display generation components, a self-view representation of the avatar of the user of the computer system that provides an indication of an appearance of the three-dimensional avatar of the user of the computer system from a perspective corresponding to one or more other participants in the real-time communication session.

↓

906
While displaying the self-view representation of the avatar of the user of the computer system, detecting, via the one or more input devices, movement of the user of the computer system.

↓

908
In response to detecting the movement of the user of the computer system, updating display, via the one or more display generation components, of the self-view representation of the avatar of the user of the computer system that provides an indication of an appearance of the three-dimensional avatar of the user of the computer system from a perspective corresponding to one or more other participants in the real-time communication session.

*FIG. 9*

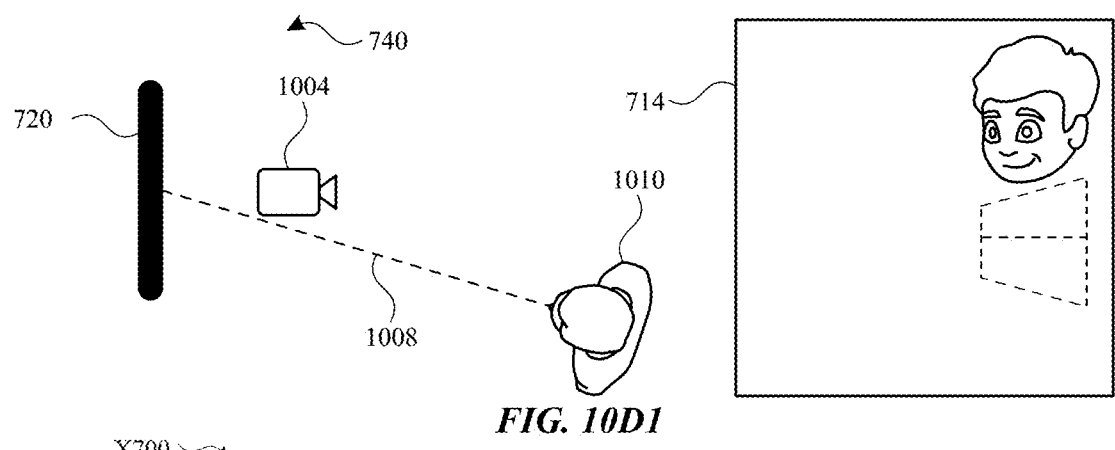
FIG. 10D1
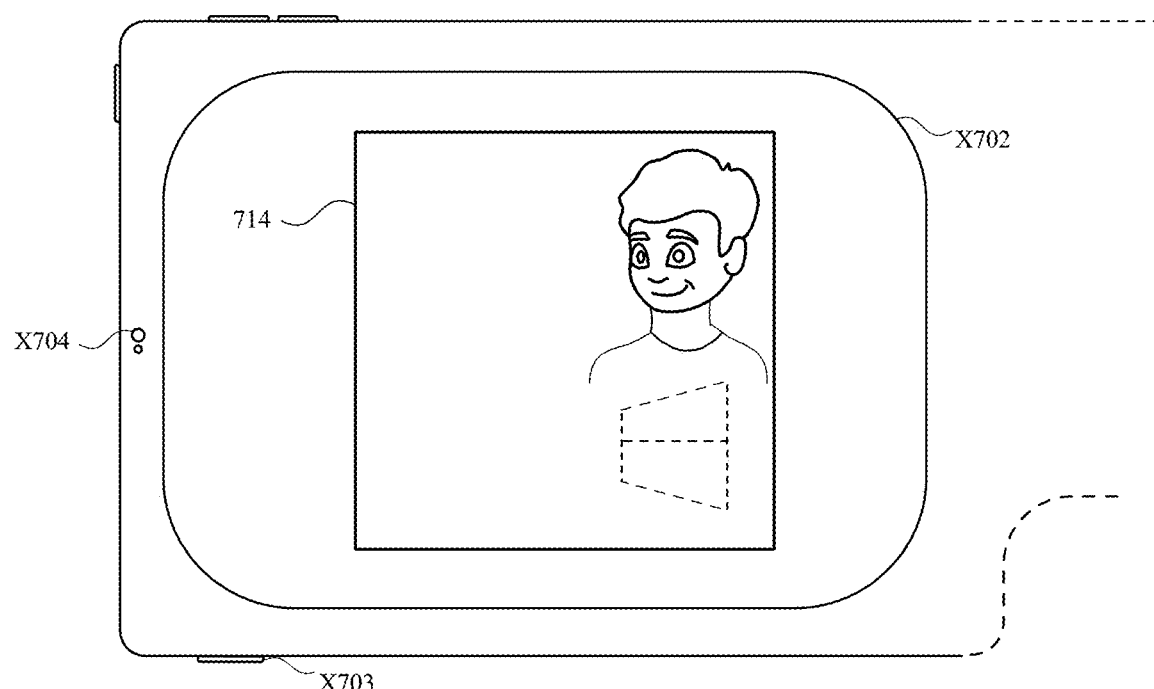
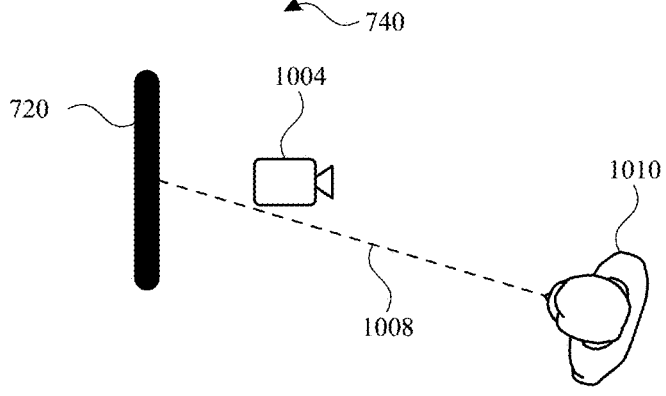
FIG. 10D2

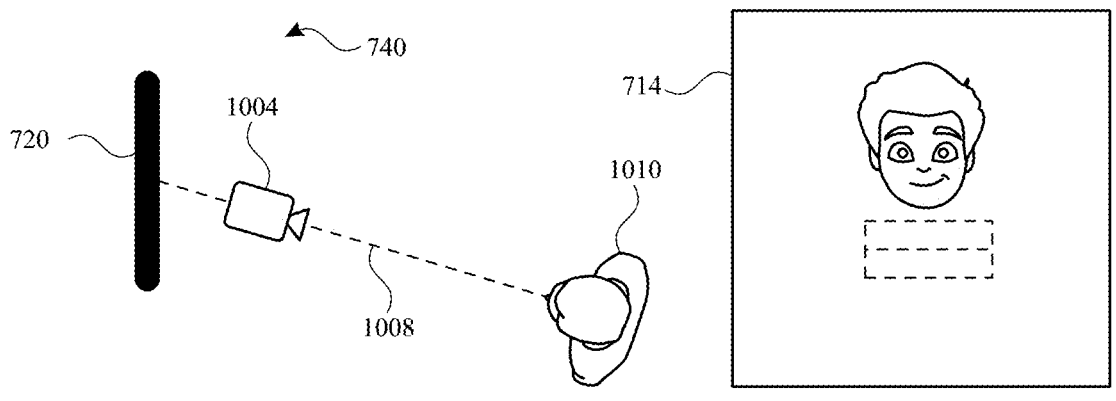
*FIG. 10E1*
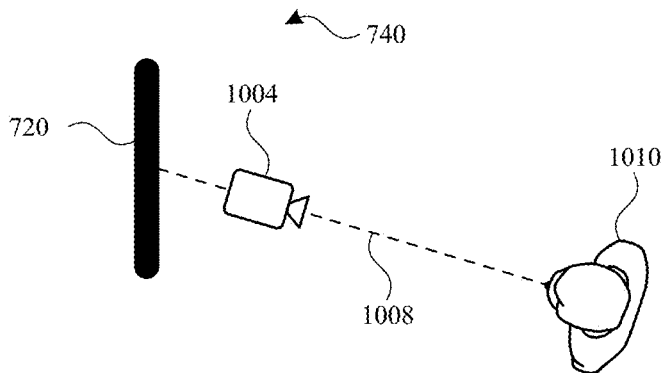
*FIG. 10E2*

1100 ⟍

<div style="border:1px solid #000;">

1102
Displaying, via the one or more display generation components, a view of a three-dimensional avatar, in a real-time communication session, that corresponds to a participant in the real-time communication session, wherein the view of the three-dimensional avatar is determined based on a virtual camera located at a first position in a three-dimensional environment that the participant is using to participate in the real-time communication session.

</div>

<div style="border:1px solid #000;">

1104
While displaying the view of the three-dimensional avatar in the real-time communication session, a change in a viewpoint of the participant relative to a representation of the real-time communication session occurs in the three-dimensional environment that the participant is using to participate in the real-time communication session.

</div>

<div style="border:1px solid #000;">

1106
In response to the occurrence of the change in the viewpoint of the participant relative to the representation of the real-time communication session in the three-dimensional environment that the participant is using to participate in the real-time communication session, updating the view of the three-dimensional avatar in the real-time communication session, wherein the view of the three-dimensional avatar is determined based on a virtual camera located at a second position in a three-dimensional environment that the participant is using to participate in the real-time communication session, wherein the second position is based on the change in the viewpoint of the participant relative to the representation of the real-time communication session in the three-dimensional environment that the participant is using to participate in the real-time communication session.

</div>

*FIG. 11*

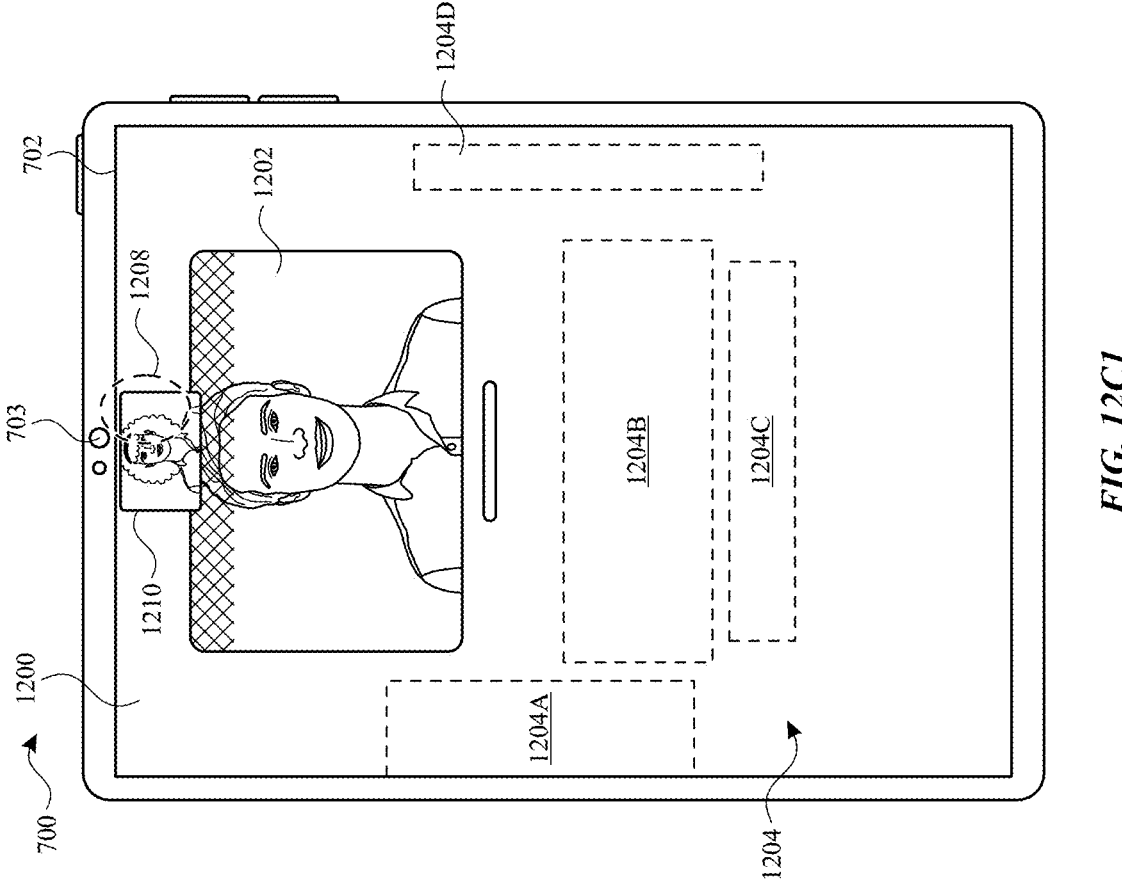
*FIG. 12C1*

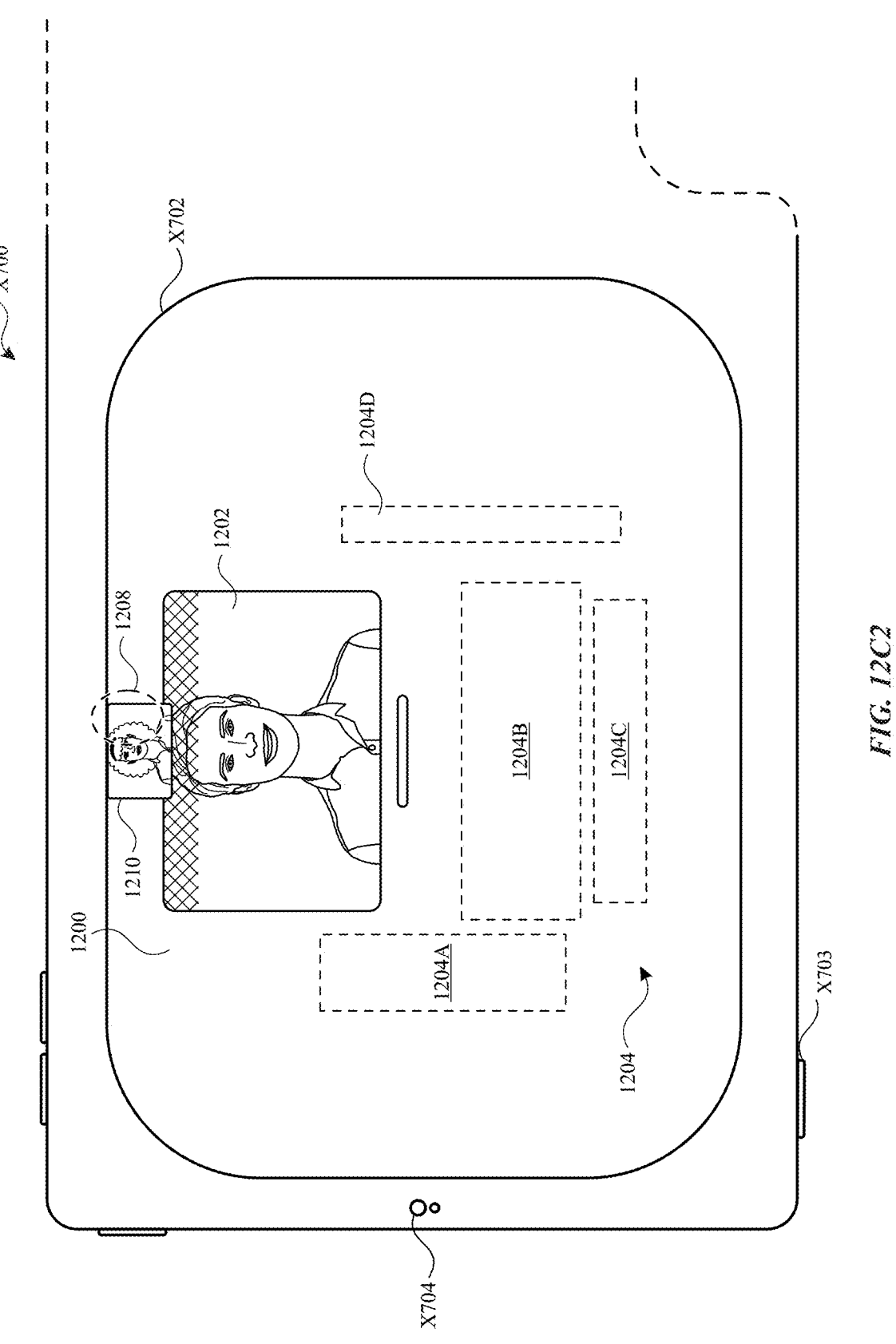
*FIG. 12C2*

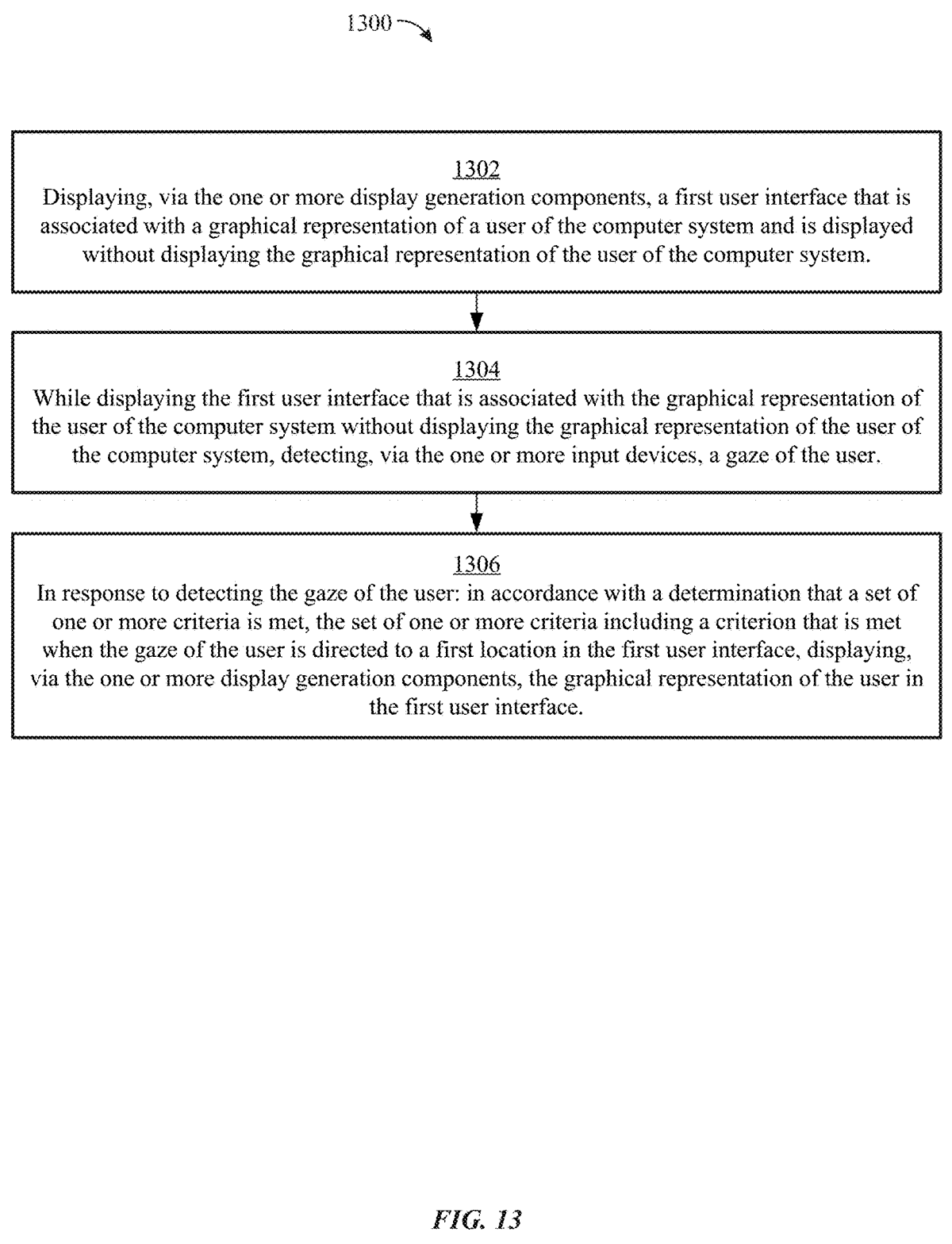

1300 ⟍

1302
Displaying, via the one or more display generation components, a first user interface that is associated with a graphical representation of a user of the computer system and is displayed without displaying the graphical representation of the user of the computer system.

↓

1304
While displaying the first user interface that is associated with the graphical representation of the user of the computer system without displaying the graphical representation of the user of the computer system, detecting, via the one or more input devices, a gaze of the user.

↓

1306
In response to detecting the gaze of the user: in accordance with a determination that a set of one or more criteria is met, the set of one or more criteria including a criterion that is met when the gaze of the user is directed to a first location in the first user interface, displaying, via the one or more display generation components, the graphical representation of the user in the first user interface.

*FIG. 13*

REPRESENTATIONS OF PARTICIPANTS IN REAL-TIME COMMUNICATION SESSIONS

CROSS REFERENCE TO RELATED APPLICATIONS

This application claims priority to the following applications: U.S. Application No. 63/470,884, entitled "REPRESENTATIONS OF PARTICIPANTS IN REAL-TIME COMMUNICATION SESSIONS," filed on Jun. 3, 2023, U.S. Application No. 63/439,473, entitled "REPRESENTATIONS OF PARTICIPANTS IN REAL-TIME COMMUNICATION SESSIONS," filed on Jan. 17, 2023, and U.S. Application No. 63/409,526, entitled "REPRESENTATIONS OF PARTICIPANTS IN REAL-TIME COMMUNICATION SESSIONS," filed on Sep. 23, 2022. The entire contents of each of these applications are hereby incorporated by reference in their entireties.

TECHNICAL FIELD

The present disclosure relates generally to computer systems that are in communication with one or more display generation components and, optionally, one or more input devices that provide computer-generated experiences, including, but not limited to, electronic devices that provide virtual reality and mixed reality experiences via a display.

BACKGROUND

The development of computer systems for extended reality has increased significantly in recent years. Extended reality environment refers to a wholly or partially simulated environment that people sense and/or interact with via a computer system. Input devices, such as cameras, controllers, joysticks, touch-sensitive surfaces, and touch-screen displays for computer systems and other electronic computing devices are used to interact with extended reality environments that include virtual elements. Example virtual elements include virtual objects, such as digital images, video, text, icons, and control elements such as buttons and other graphics.

SUMMARY

Some methods and interfaces for managing representations of participants in real-time communication sessions are cumbersome, inefficient, and limited. For example, systems that provide insufficient feedback for performing actions associated with representations of participants of real-time communication sessions, systems that require a series of inputs to achieve a desired outcome in the real-time communication session, and systems in which manipulation of representations of participants of real-time communication sessions are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for managing representations of participants of real-time communication sessions to make interactions with the computer systems more efficient and intuitive for a user. Such methods and interfaces optionally complement or replace conventional methods for managing representations of participants in real-time communication sessions. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for managing representations of participants in real-time communication sessions. Such methods and interfaces may complement or replace conventional methods for managing representations of participants in real-time communication sessions. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

In some embodiments, a method is described. The method comprises: at a computer system that is in communication with one or more display generation components: displaying, via the one or more display generation components, representations of a plurality of participants in a real-time communication session in a spatial arrangement of tiles in a three-dimensional space, including concurrently displaying: a representation of a first participant of the plurality of participants in a first tile in the spatial arrangement of tiles; and a representation of a second participant of the plurality of participants in a second tile in the spatial arrangement of tiles, wherein the second participant is different form the first participant and the second tile is different from the first tile; while displaying the representations of the plurality of participants in the real-time communication session in the three-dimensional space, detecting activity associated with the first participant of the plurality of participants; and in response to detecting activity associated with the first participant of the plurality of participants, modifying the representation of the first participant based on the activity, including moving the first tile relative to the second tile in the spatial arrangement of tiles.

In some embodiments, a non-transitory computer-readable storage medium is described. The non-transitory computer-readable storage medium stores one or more programs configured to be executed by one or more processors of a computer system that is in communication with one or more display generation components, the one or more programs including instructions for: displaying, via the one or more display generation components, representations of a plurality of participants in a real-time communication session in a spatial arrangement of tiles in a three-dimensional space, including concurrently displaying: a representation of a first participant of the plurality of participants in a first tile in the spatial arrangement of tiles; and a representation of a second participant of the plurality of participants in a second tile in the spatial arrangement of tiles, wherein the second participant is different form the first participant and the second tile is different from the first tile; while displaying the representations of the plurality of participants in the real-time communication session in the three-dimensional space, detecting activity associated with the first participant of the plurality of participants; and in response to detecting activity associated with the first participant of the plurality of participants, modifying the representation of the first participant based on the activity, including moving the first tile relative to the second tile in the spatial arrangement of tiles.

In some embodiments, a transitory computer-readable storage medium is described. The transitory computer-readable storage medium stores one or more programs configured to be executed by one or more processors of a computer system that is in communication with one or more display generation components, the one or more programs including instructions for: displaying, via the one or more display generation components, representations of a plurality of participants in a real-time communication session in a spatial arrangement of tiles in a three-dimensional space, including concurrently displaying: a representation of a first participant of the plurality of participants in a first tile in the spatial arrangement of tiles; and a representation of a second participant of the plurality of participants in a second tile in the spatial arrangement of tiles, wherein the second participant is different form the first participant and the second tile is different from the first tile; while displaying the representations of the plurality of participants in the real-time communication session in the three-dimensional space, detecting activity associated with the first participant of the plurality of participants; and in response to detecting activity associated with the first participant of the plurality of participants, modifying the representation of the first participant based on the activity, including moving the first tile relative to the second tile in the spatial arrangement of tiles.

In some embodiments, a computer system is described. The computer system is configured to communicate with one or more display generation components. The computer system comprises: one or more processors; and memory storing one or more programs configured to be executed by the one or more processors, the one or more programs including instructions for: displaying, via the one or more display generation components, representations of a plurality of participants in a real-time communication session in a spatial arrangement of tiles in a three-dimensional space, including concurrently displaying: a representation of a first participant of the plurality of participants in a first tile in the spatial arrangement of tiles; and a representation of a second participant of the plurality of participants in a second tile in the spatial arrangement of tiles, wherein the second participant is different form the first participant and the second tile is different from the first tile; while displaying the representations of the plurality of participants in the real-time communication session in the three-dimensional space, detecting activity associated with the first participant of the plurality of participants; and in response to detecting activity associated with the first participant of the plurality of participants, modifying the representation of the first participant based on the activity, including moving the first tile relative to the second tile in the spatial arrangement of tiles.

In some embodiments, a computer system is described. The computer system is configured to communicate with one or more display generation components. The computer system comprises: means for displaying, via the one or more display generation components, representations of a plurality of participants in a real-time communication session in a spatial arrangement of tiles in a three-dimensional space, including concurrently displaying: a representation of a first participant of the plurality of participants in a first tile in the spatial arrangement of tiles; and a representation of a second participant of the plurality of participants in a second tile in the spatial arrangement of tiles, wherein the second participant is different form the first participant and the second tile is different from the first tile; means, while displaying the representations of the plurality of participants in the real-time communication session in the three-dimensional space, for detecting activity associated with the first participant of the plurality of participants; and means, responsive to detecting activity associated with the first participant of the plurality of participants, for modifying the representation of the first participant based on the activity, including moving the first tile relative to the second tile in the spatial arrangement of tiles.

In some embodiments, a computer program product is described. The computer program product comprises one or more programs configured to be executed by one or more processors of a computer system that is in communication with one or more display generation components, the one or more programs including instructions for: displaying, via the one or more display generation components, representations of a plurality of participants in a real-time communication session in a spatial arrangement of tiles in a three-dimensional space, including concurrently displaying: a representation of a first participant of the plurality of participants in a first tile in the spatial arrangement of tiles; and a representation of a second participant of the plurality of participants in a second tile in the spatial arrangement of tiles, wherein the second participant is different form the first participant and the second tile is different from the first tile; while displaying the representations of the plurality of participants in the real-time communication session in the three-dimensional space, detecting activity associated with the first participant of the plurality of participants; and in response to detecting activity associated with the first participant of the plurality of participants, modifying the representation of the first participant based on the activity, including moving the first tile relative to the second tile in the spatial arrangement of tiles.

In some embodiments, a method is described. The method comprises: at a computer system that is in communication with one or more display generation components and one or more input devices: while a user of the computer system is participating in a real-time communication session in an augmented reality environment in which the user is represented to other participants in the real-time communication session with a three-dimensional avatar: displaying, via the one or more display generation components, a self-view representation of the avatar of the user of the computer system that provides an indication of an appearance of the three-dimensional avatar of the user of the computer system from a perspective corresponding to one or more other participants in the real-time communication session; while displaying the self-view representation of the avatar of the user of the computer system, detecting, via the one or more input devices, movement of the user of the computer system; and in response to detecting the movement of the user of the computer system, updating display, via the one or more display generation components, of the self-view representation of the avatar of the user of the computer system that provides an indication of an appearance of the three-dimensional avatar of the user of the computer system from a perspective corresponding to one or more other participants in the real-time communication session.

In some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: while a user of the computer system is participating in a real-time communication session in an augmented reality environment in which the user is represented to other participants in the real-time communication session with a three-dimensional avatar: displaying, via the one or more display generation components, a self-view representation of the avatar of the user of the computer system that provides an indication of an appearance of the three-dimensional avatar of the user of the computer system from a perspective corresponding to one or more other participants in the real-time communication session; while displaying the self-view representation of the avatar of the user of the computer system, detecting, via the one or more input devices, movement of the user of the computer system; and in response to detecting the movement of the user of the computer system, updating display, via the one or more display generation components, of the self-view representation of the avatar of the user of the computer system that provides an indication of an appearance of the three-dimensional avatar of the user of the computer system from a perspective corresponding to one or more other participants in the real-time communication session.

In some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: while a user of the computer system is participating in a real-time communication session in an augmented reality environment in which the user is represented to other participants in the real-time communication session with a three-dimensional avatar: displaying, via the one or more display generation components, a self-view representation of the avatar of the user of the computer system that provides an indication of an appearance of the three-dimensional avatar of the user of the computer system from a perspective corresponding to one or more other participants in the real-time communication session; while displaying the self-view representation of the avatar of the user of the computer system, detecting, via the one or more input devices, movement of the user of the computer system; and in response to detecting the movement of the user of the computer system, updating display, via the one or more display generation components, of the self-view representation of the avatar of the user of the computer system that provides an indication of an appearance of the three-dimensional avatar of the user of the computer system from a perspective corresponding to one or more other participants in the real-time communication session.

In some embodiments, a computer system is described. The computer system is configured to communicate with one or more display generation components and one or more input devices. The computer system comprises: one or more processors; and memory storing one or more programs configured to be executed by the one or more processors, the one or more programs including instructions for: while a user of the computer system is participating in a real-time communication session in an augmented reality environment in which the user is represented to other participants in the real-time communication session with a three-dimensional avatar: displaying, via the one or more display generation components, a self-view representation of the avatar of the user of the computer system that provides an indication of an appearance of the three-dimensional avatar of the user of the computer system from a perspective corresponding to one or more other participants in the real-time communication session; while displaying the self-view representation of the avatar of the user of the computer system, detecting, via the one or more input devices, movement of the user of the computer system; and in response to detecting the movement of the user of the computer system, updating display, via the one or more display generation components, of the self-view representation of the avatar of the user of the computer system that provides an indication of an appearance of the three-dimensional avatar of the user of the computer system from a perspective corresponding to one or more other participants in the real-time communication session.

In some embodiments, a computer system is described. The computer system is configured to communicate with one or more display generation components and one or more input devices. The computer system comprises: means, while a user of the computer system is participating in a real-time communication session in an augmented reality environment in which the user is represented to other participants in the real-time communication session with a three-dimensional avatar, for: displaying, via the one or more display generation components, a self-view representation of the avatar of the user of the computer system that provides an indication of an appearance of the three-dimensional avatar of the user of the computer system from a perspective corresponding to one or more other participants in the real-time communication session; while displaying the self-view representation of the avatar of the user of the computer system, detecting, via the one or more input devices, movement of the user of the computer system; and in response to detecting the movement of the user of the computer system, updating display, via the one or more display generation components, of the self-view representation of the avatar of the user of the computer system that provides an indication of an appearance of the three-dimensional avatar of the user of the computer system from a perspective corresponding to one or more other participants in the real-time communication session.

In some embodiments, a computer program product is described. The computer program product comprises one or more programs configured to be executed by one or more processors of a computer system that is in communication with one or more display generation components and one or more input devices, the one or more programs including instructions for: while a user of the computer system is participating in a real-time communication session in an augmented reality environment in which the user is represented to other participants in the real-time communication session with a three-dimensional avatar: displaying, via the one or more display generation components, a self-view representation of the avatar of the user of the computer system that provides an indication of an appearance of the three-dimensional avatar of the user of the computer system from a perspective corresponding to one or more other participants in the real-time communication session; while displaying the self-view representation of the avatar of the user of the computer system, detecting, via the one or more input devices, movement of the user of the computer system; and in response to detecting the movement of the user of the computer system, updating display, via the one or more display generation components, of the self-view representation of the avatar of the user of the computer system that provides an indication of an appearance of the three-dimensional avatar of the user of the computer system from a perspective corresponding to one or more other participants in the real-time communication session.

In some embodiments, a method is described. The method comprises: at a computer system that is in communication with one or more display generation components: displaying, via the one or more display generation components, a view of a three-dimensional avatar, in a real-time communication session, that corresponds to a participant in the real-time communication session, wherein the view of the three-dimensional avatar is determined based on a virtual camera located at a first position in a three-dimensional environment that the participant is using to participate in the real-time communication session; while displaying the view of the three-dimensional avatar in the real-time communication session, a change in a viewpoint of the participant relative to a representation of the real-time communication session occurs in the three-dimensional environment that the participant is using to participate in the real-time communication session; and in response to the occurrence of the change in the viewpoint of the participant relative to the representation of the real-time communication session in the three-dimensional environment that the participant is using to participate in the real-time communication session, updating the view of the three-dimensional avatar in the real-time communication session, wherein the view of the three-dimensional avatar is determined based on a virtual camera located at a second position in a three-dimensional environment that the participant is using to participate in the real-time communication session, wherein the second position is based on the change in the viewpoint of the participant relative to the representation of the real-time communication session in the three-dimensional environment that the participant is using to participate in the real-time communication session.

In some embodiments, a non-transitory computer-readable media is described. The non-transitory computer-readable storage medium stores one or more programs configured to be executed by one or more processors of a computer system that is in communication with one or more display generation components, the one or more programs including instructions for: displaying, via the one or more display generation components, a view of a three-dimensional avatar, in a real-time communication session, that corresponds to a participant in the real-time communication session, wherein the view of the three-dimensional avatar is determined based on a virtual camera located at a first position in a three-dimensional environment that the participant is using to participate in the real-time communication session; while displaying the view of the three-dimensional avatar in the real-time communication session, a change in a viewpoint of the participant relative to a representation of the real-time communication session occurs in the three-dimensional environment that the participant is using to participate in the real-time communication session; and in response to the occurrence of the change in the viewpoint of the participant relative to the representation of the real-time communication session in the three-dimensional environment that the participant is using to participate in the real-time communication session, updating the view of the three-dimensional avatar in the real-time communication session, wherein the view of the three-dimensional avatar is determined based on a virtual camera located at a second position in a three-dimensional environment that the participant is using to participate in the real-time communication session, wherein the second position is based on the change in the viewpoint of the participant relative to the representation of the real-time communication session in the three-dimensional environment that the participant is using to participate in the real-time communication session.

In some embodiments, a transitory computer-readable media is described. The transitory computer-readable storage medium stores one or more programs configured to be executed by one or more processors of a computer system that is in communication with one or more display generation components, the one or more programs including instructions for: displaying, via the one or more display generation components, a view of a three-dimensional avatar, in a real-time communication session, that corresponds to a participant in the real-time communication session, wherein the view of the three-dimensional avatar is determined based on a virtual camera located at a first position in a three-dimensional environment that the participant is using to participate in the real-time communication session; while displaying the view of the three-dimensional avatar in the real-time communication session, a change in a viewpoint of the participant relative to a representation of the real-time communication session occurs in the three-dimensional environment that the participant is using to participate in the real-time communication session; and in response to the occurrence of the change in the viewpoint of the participant relative to the representation of the real-time communication session in the three-dimensional environment that the participant is using to participate in the real-time communication session, updating the view of the three-dimensional avatar in the real-time communication session, wherein the view of the three-dimensional avatar is determined based on a virtual camera located at a second position in a three-dimensional environment that the participant is using to participate in the real-time communication session, wherein the second position is based on the change in the viewpoint of the participant relative to the representation of the real-time communication session in the three-dimensional environment that the participant is using to participate in the real-time communication session.

In some embodiments, a computer system is described. The computer system is configured to communicate with one or more display generation components. The computer system comprises: one or more processors; and memory storing one or more programs configured to be executed by the one or more processors, the one or more programs including instructions for: displaying, via the one or more display generation components, a view of a three-dimensional avatar, in a real-time communication session, that corresponds to a participant in the real-time communication session, wherein the view of the three-dimensional avatar is determined based on a virtual camera located at a first position in a three-dimensional environment that the participant is using to participate in the real-time communication session; while displaying the view of the three-dimensional avatar in the real-time communication session, a change in a viewpoint of the participant relative to a representation of the real-time communication session occurs in the three-dimensional environment that the participant is using to participate in the real-time communication session; and in response to the occurrence of the change in the viewpoint of the participant relative to the representation of the real-time communication session in the three-dimensional environment that the participant is using to participate in the real-time communication session, updating the view of the three-dimensional avatar in the real-time communication session, wherein the view of the three-dimensional avatar is determined based on a virtual camera located at a second position in a three-dimensional environment that the participant is using to participate in the real-time communication session, wherein the second position is based on the change in the viewpoint of the participant relative to the representation of the real-time communication session in the three-dimensional environment that the participant is using to participate in the real-time communication session.

In some embodiments, a computer system is described. The computer system is configured to communicate with one or more display generation components. The computer system comprises: means for displaying, via the one or more display generation components, a view of a three-dimensional avatar, in a real-time communication session, that corresponds to a participant in the real-time communication session, wherein the view of the three-dimensional avatar is determined based on a virtual camera located at a first position in a three-dimensional environment that the participant is using to participate in the real-time communication session; means, while displaying the view of the three-dimensional avatar in the real-time communication session, for a change in a viewpoint of the participant relative to a representation of the real-time communication session occurs in the three-dimensional environment that the participant is using to participate in the real-time communication session; and means, responsive to the occurrence of the change in the viewpoint of the participant relative to the representation of the real-time communication session in the three-dimensional environment that the participant is using to participate in the real-time communication session, for updating the view of the three-dimensional avatar in the real-time communication session, wherein the view of the three-dimensional avatar is determined based on a virtual camera located at a second position in a three-dimensional environment that the participant is using to participate in the real-time communication session, wherein the second position is based on the change in the viewpoint of the participant relative to the representation of the real-time communication session in the three-dimensional environment that the participant is using to participate in the real-time communication session.

In some embodiments, a computer program product is described. The computer program product comprises one or more programs configured to be executed by one or more processors of a computer system that is in communication with one or more display generation components, the one or more programs including instructions for: displaying, via the one or more display generation components, a view of a three-dimensional avatar, in a real-time communication session, that corresponds to a participant in the real-time communication session, wherein the view of the three-dimensional avatar is determined based on a virtual camera located at a first position in a three-dimensional environment that the participant is using to participate in the real-time communication session; while displaying the view of the three-dimensional avatar in the real-time communication session, a change in a viewpoint of the participant relative to a representation of the real-time communication session occurs in the three-dimensional environment that the participant is using to participate in the real-time communication session; and in response to the occurrence of the change in the viewpoint of the participant relative to the representation of the real-time communication session in the three-dimensional environment that the participant is using to participate in the real-time communication session, updating the view of the three-dimensional avatar in the real-time communication session, wherein the view of the three-dimensional avatar is determined based on a virtual camera located at a second position in a three-dimensional environment that the participant is using to participate in the real-time communication session, wherein the second position is based on the change in the viewpoint of the participant relative to the representation of the real-time communication session in the three-dimensional environment that the participant is using to participate in the real-time communication session.

In some embodiments, a method is described. The method comprises: at a computer system that is in communication with one or more display generation components and one or more input devices: displaying, via the one or more display generation components, a first user interface that is associated with a graphical representation of a user of the computer system and is displayed without displaying the graphical representation of the user of the computer system; while displaying the first user interface that is associated with the graphical representation of the user of the computer system without displaying the graphical representation of the user of the computer system, detecting, via the one or more input devices, a gaze of the user; and in response to detecting the gaze of the user: in accordance with a determination that a set of one or more criteria is met, the set of one or more criteria including a criterion that is met when the gaze of the user is directed to a first location in the first user interface, displaying, via the one or more display generation components, the graphical representation of the user in the first user interface.

In some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components, a first user interface that is associated with a graphical representation of a user of the computer system and is displayed without displaying the graphical representation of the user of the computer system; while displaying the first user interface that is associated with the graphical representation of the user of the computer system without displaying the graphical representation of the user of the computer system, detecting, via the one or more input devices, a gaze of the user; and in response to detecting the gaze of the user: in accordance with a determination that a set of one or more criteria is met, the set of one or more criteria including a criterion that is met when the gaze of the user is directed to a first location in the first user interface, displaying, via the one or more display generation components, the graphical representation of the user in the first user interface.

In some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components, a first user interface that is associated with a graphical representation of a user of the computer system and is displayed without displaying the graphical representation of the user of the computer system; while displaying the first user interface that is associated with the graphical representation of the user of the computer system without displaying the graphical representation of the user of the computer system, detecting, via the one or more input devices, a gaze of the user; and in response to detecting the gaze of the user: in accordance with a determination that a set of one or more criteria is met, the set of one or more criteria including a criterion that is met when the gaze of the user is directed to a first location in the first user interface, displaying, via the one or more display generation components, the graphical representation of the user in the first user interface.

In some embodiments, a computer system is described. The computer system is configured to communicate with one or more display generation components and one or more input devices. The computer system comprises: one or more processors; and memory storing one or more programs configured to be executed by the one or more processors, the one or more programs including instructions for: displaying, via the one or more display generation components, a first user interface that is associated with a graphical representation of a user of the computer system and is displayed without displaying the graphical representation of the user of the computer system; while displaying the first user interface that is associated with the graphical representation of the user of the computer system without displaying the graphical representation of the user of the computer system, detecting, via the one or more input devices, a gaze of the user; and in response to detecting the gaze of the user: in accordance with a determination that a set of one or more criteria is met, the set of one or more criteria including a criterion that is met when the gaze of the user is directed to a first location in the first user interface, displaying, via the one or more display generation components, the graphical representation of the user in the first user interface.

In some embodiments, a computer system is described. The computer system is configured to communicate with one or more display generation components and one or more input devices. The computer system comprises: means for displaying, via the one or more display generation components, a first user interface that is associated with a graphical representation of a user of the computer system and is displayed without displaying the graphical representation of the user of the computer system; means for, while displaying the first user interface that is associated with the graphical representation of the user of the computer system without displaying the graphical representation of the user of the computer system, detecting, via the one or more input devices, a gaze of the user; and means for, in response to detecting the gaze of the user: in accordance with a determination that a set of one or more criteria is met, the set of one or more criteria including a criterion that is met when the gaze of the user is directed to a first location in the first user interface, displaying, via the one or more display generation components, the graphical representation of the user in the first user interface.

In some embodiments, a computer program product is described. The computer program product comprises one or more programs configured to be executed by one or more processors of a computer system that is in communication with one or more display generation components and one or more input devices, the one or more programs including instructions for: displaying, via the one or more display generation components, a first user interface that is associated with a graphical representation of a user of the computer system and is displayed without displaying the graphical representation of the user of the computer system; while displaying the first user interface that is associated with the graphical representation of the user of the computer system without displaying the graphical representation of the user of the computer system, detecting, via the one or more input devices, a gaze of the user; and in response to detecting the gaze of the user: in accordance with a determination that a set of one or more criteria is met, the set of one or more criteria including a criterion that is met when the gaze of the user is directed to a first location in the first user interface, displaying, via the one or more display generation components, the graphical representation of the user in the first user interface.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in some embodiments.

FIGS. 7A-7E illustrate example techniques for displaying a representation of a participant of a real-time communication session, in some embodiments.

FIG. 8 is a flow diagram of methods of modifying a representation of a participant based on activity associated with the participant, in some embodiments.

FIG. 9 is a flow diagram of methods of displaying a self-view representation of an avatar of a user of a computer system, in some embodiments.

FIGS. 10A-10H illustrate example techniques for updating a view of an avatar in a real-time communication session, in some embodiments.

FIG. 11 is a flow diagram of methods of updating a view of an avatar in a real-time communication session, in some embodiments.

FIGS. 12A-12F illustrate example techniques for displaying a representation of a participant in a real-time communication session, in some embodiments.

FIG. 13 is a flow diagram of methods of displaying a representation of a participant in a real-time communication session, in some embodiments.

DESCRIPTION OF EMBODIMENTS

Figure 1A:
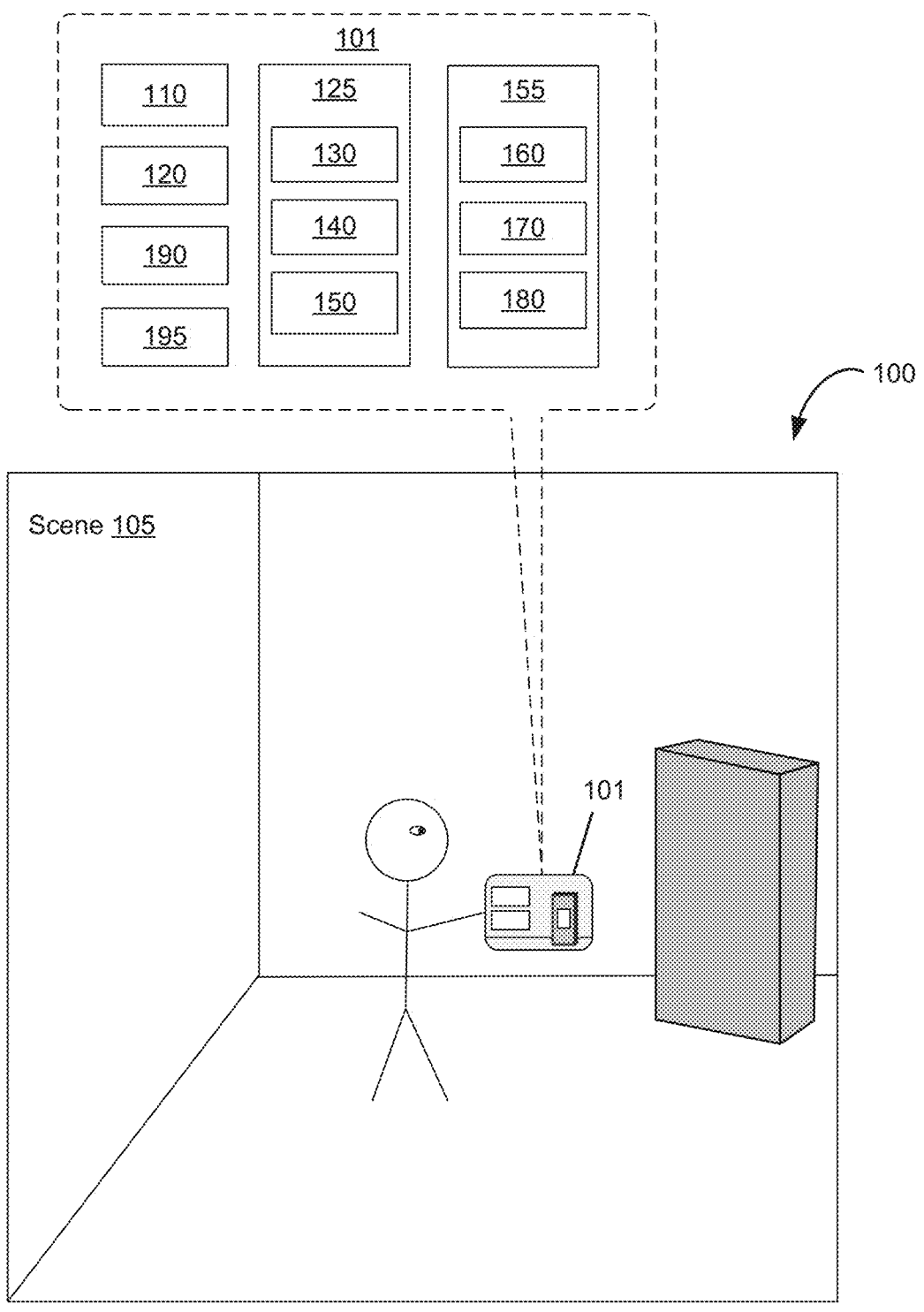
FIG. 1A is a block diagram illustrating an operating environment of a computer system for providing XR experiences in some embodiments.

The present disclosure relates to user interfaces for providing an extended reality (XR) experience to a user, in some embodiments.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

FIGS. 1A-6 provide a description of example computer systems for providing XR experiences to users. FIGS. 7A-7E illustrate example techniques for displaying a representation of a participant of a real-time communication session, in some embodiments. FIG. 8 is a flow diagram of methods of modifying a representation of a participant based on activity associated with the participant, in some embodiments. FIG. 9 is a flow diagram of methods of displaying a self-view representation of an avatar of a user of a computer system, in some embodiments. The user interfaces in FIGS. 7A-7E are used to illustrate the processes in FIGS. 8-9. FIGS. 10A-10H illustrate example techniques for updating a view of an avatar in a real-time communication session, in some embodiments. FIG. 11 is a flow diagram of methods of updating a view of an avatar in a real-time communication session, in some embodiments. The user interfaces in FIGS. 10A-10H are used to illustrate the processes in FIG. 11. FIGS. 12A-12F illustrate example techniques for displaying a representation of a participant of a real-time communication session, in some embodiments. FIG. 13 is a flow diagram of methods of displaying a representation of a participant of a real-time communication session, in some embodiments. The user interfaces in FIGS. 12A-12F are used to illustrate the processes in FIG. 13.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (IMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
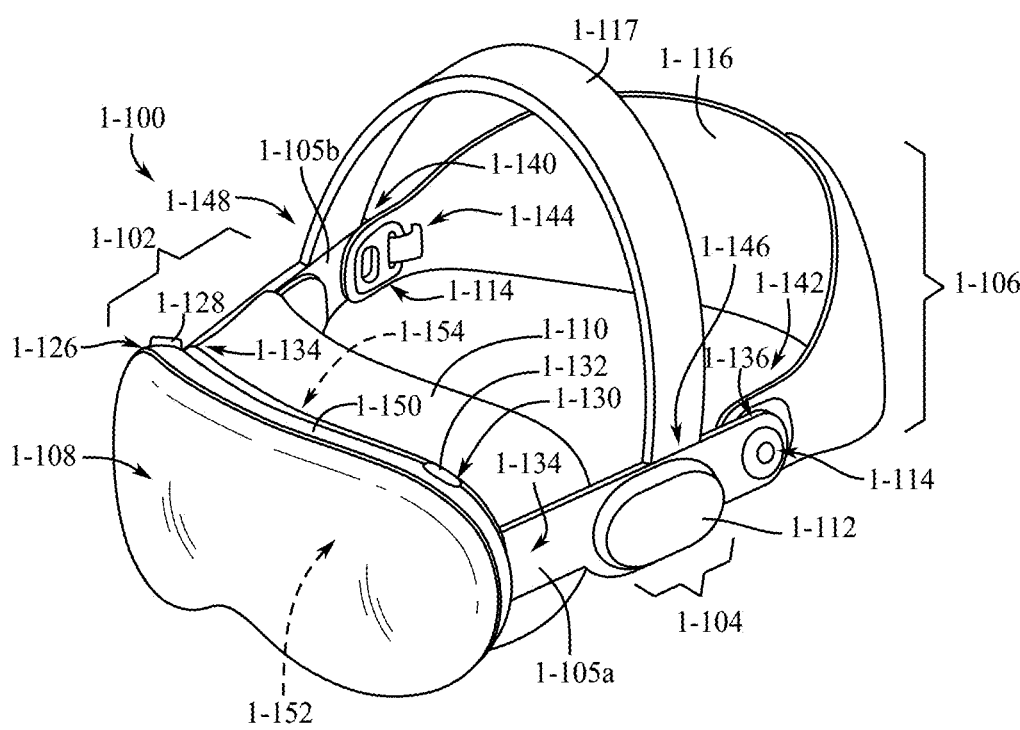
FIGS. 1B-1P are examples of a computer system for providing XR experiences in the operating environment of FIG. 1A.
Figure 1C:
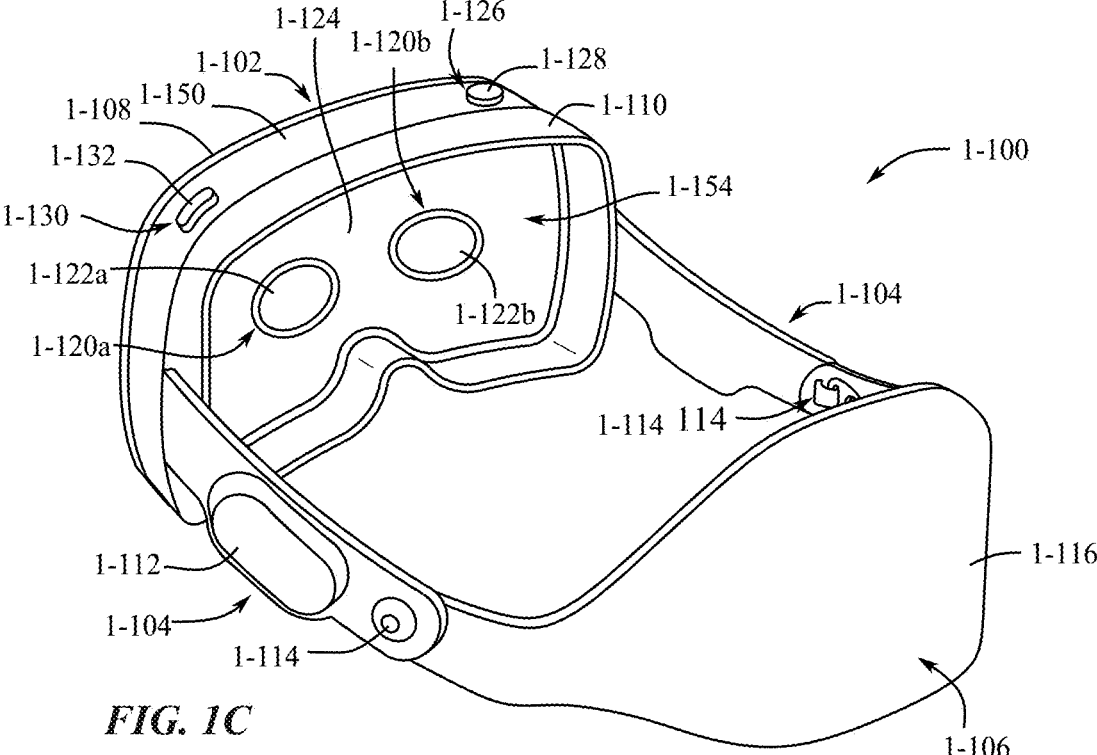
Figure 1D:
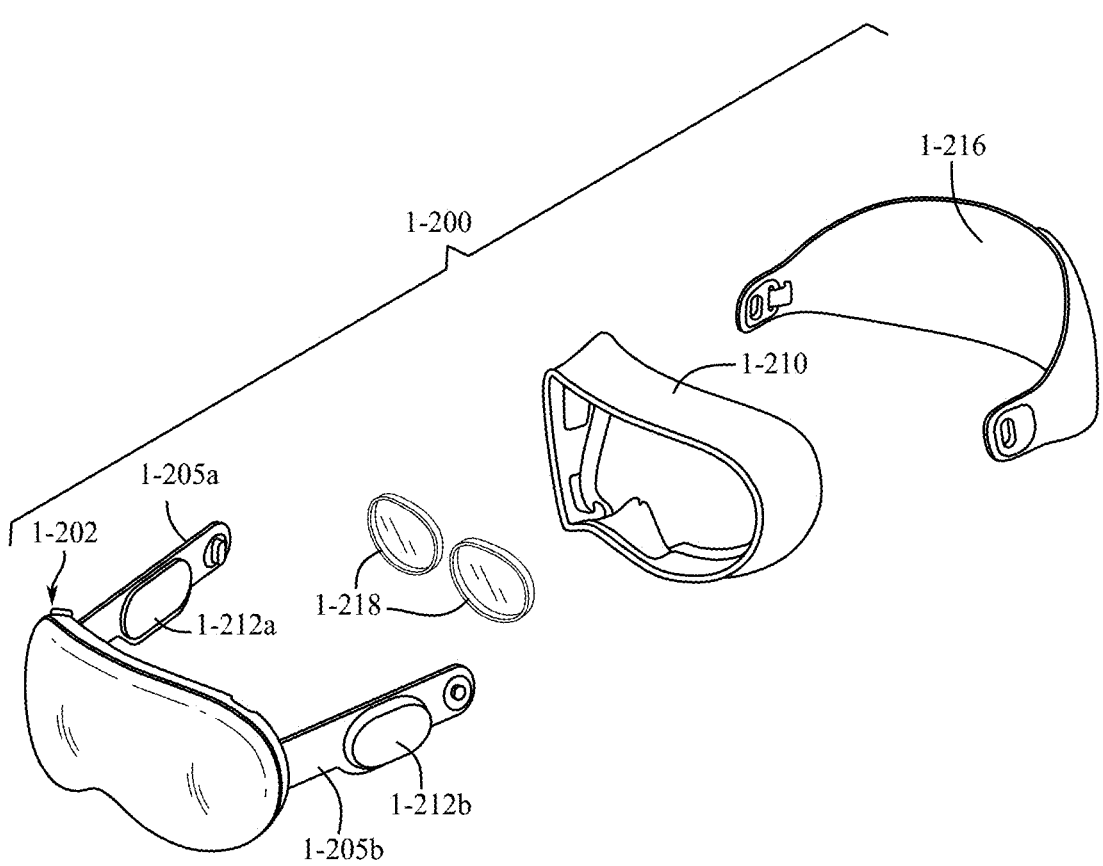
Figure 1E:
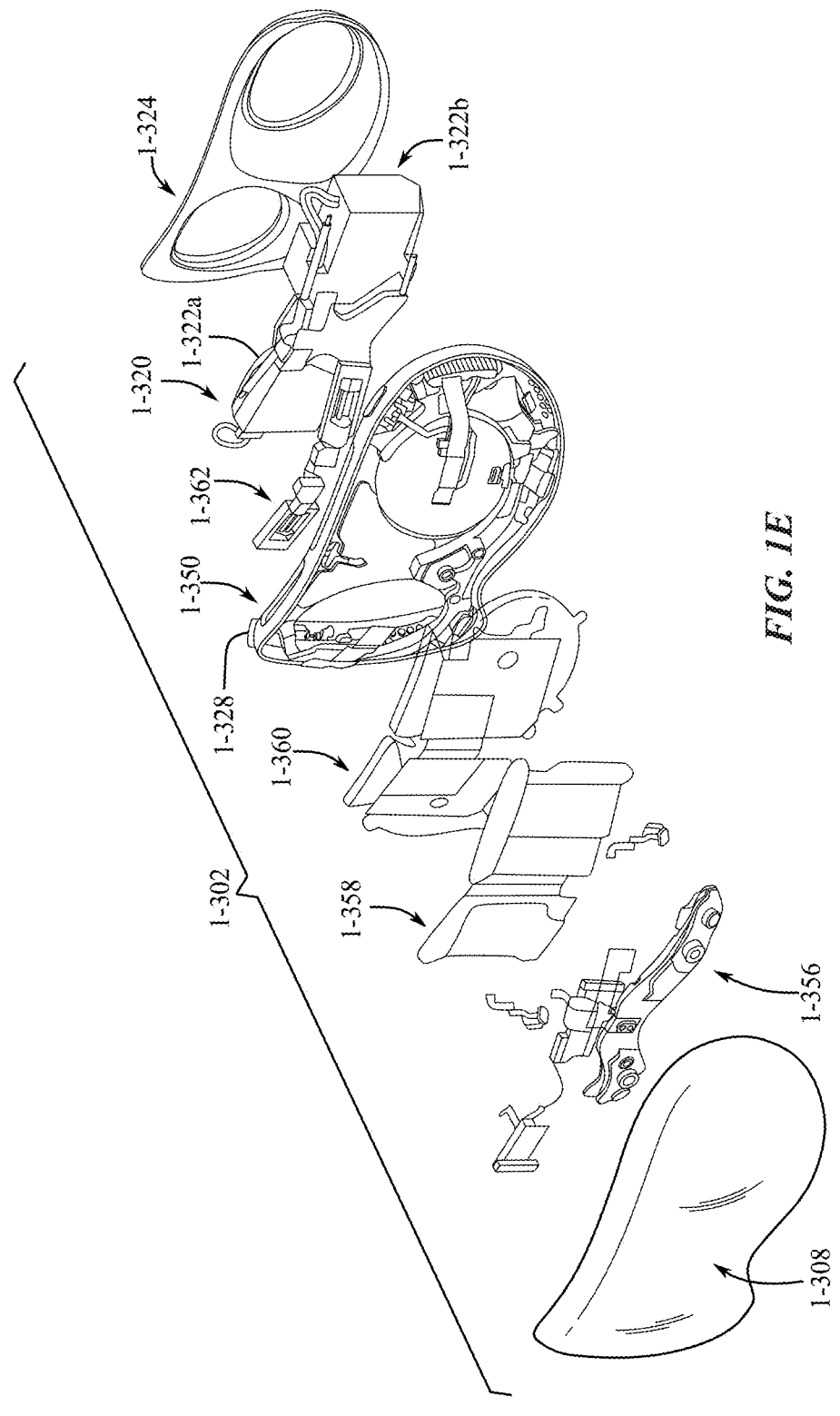
Figure 1F:
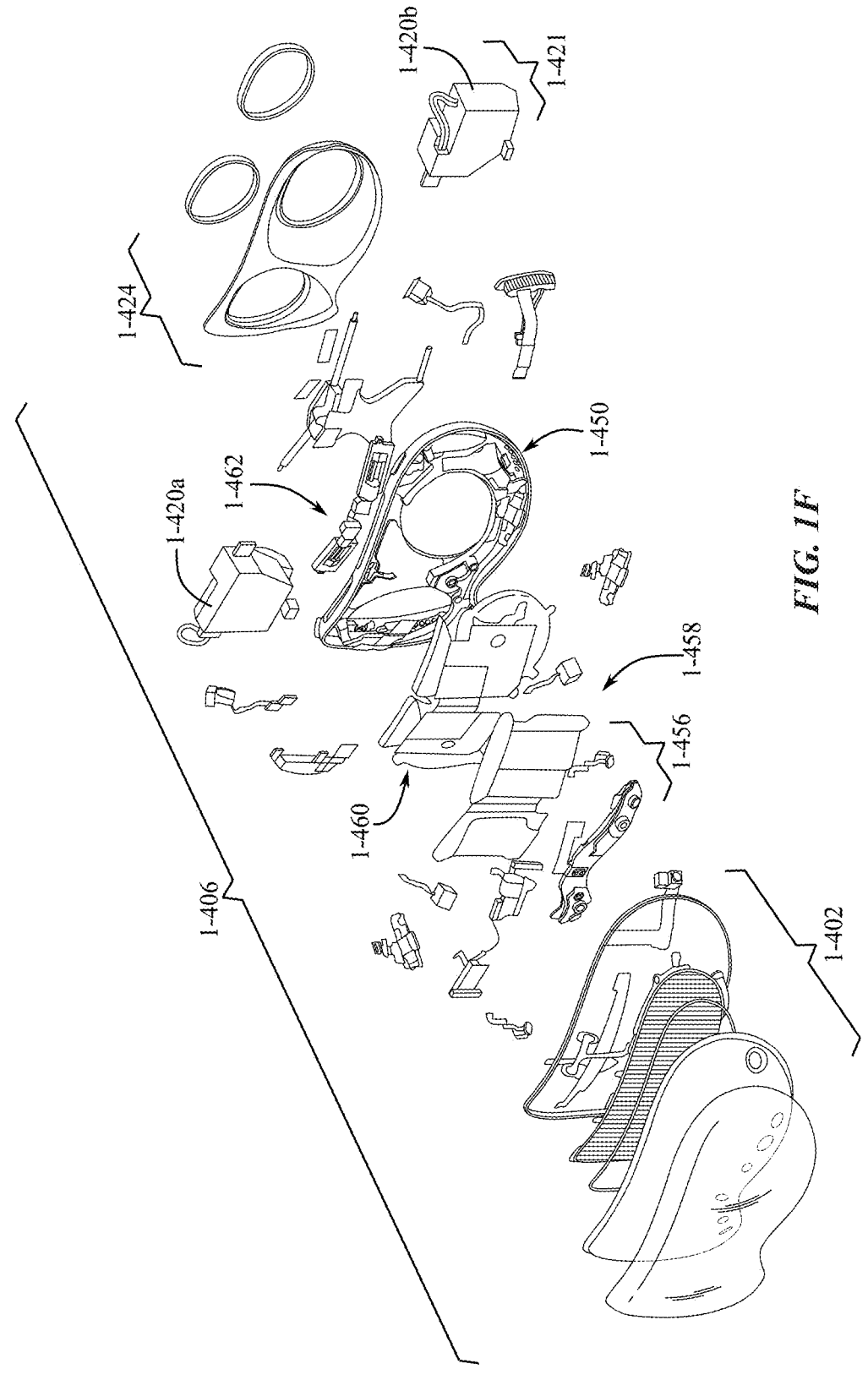
Figure 1G:
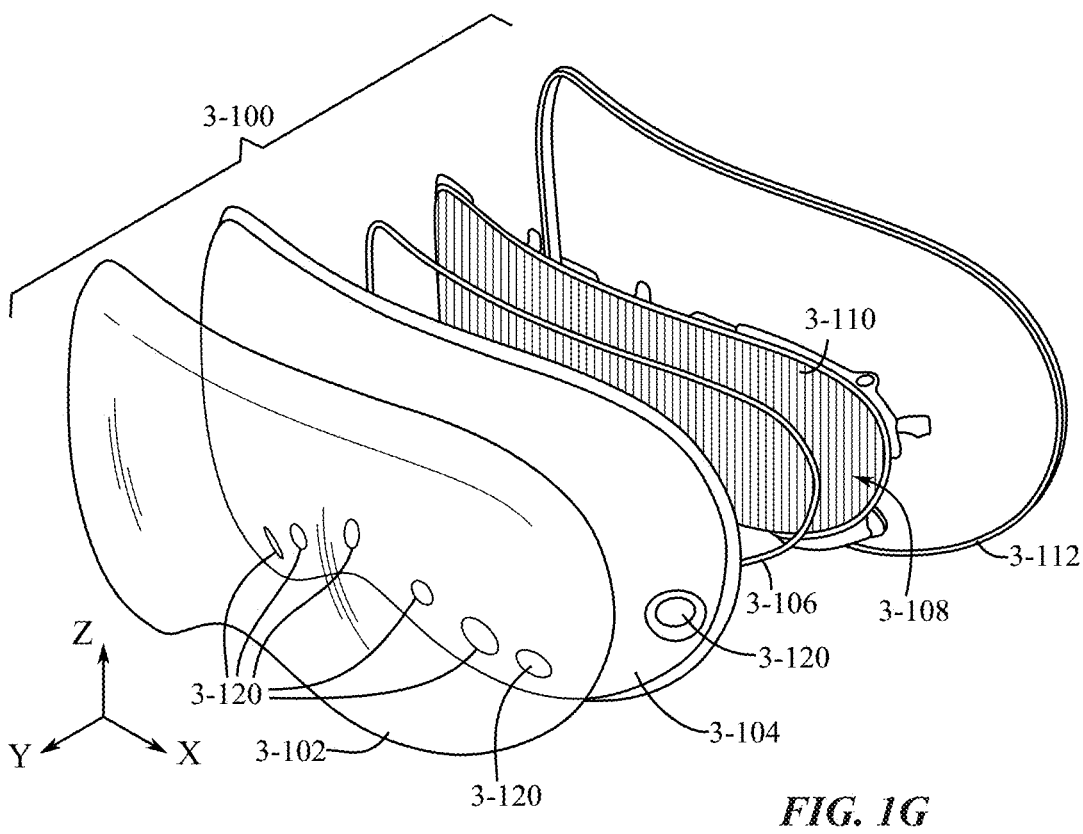
Figure 1H:
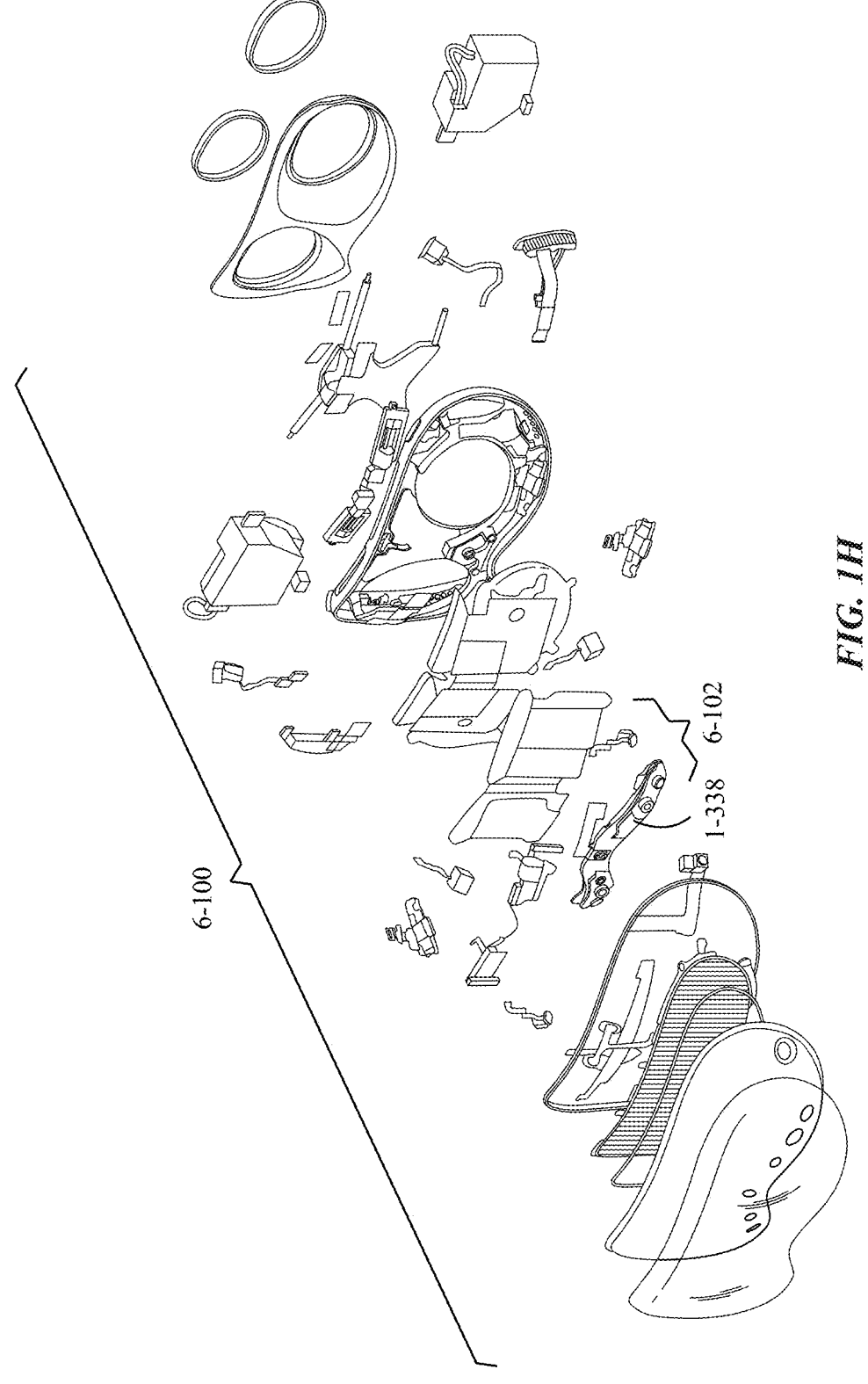
Figure 1I:
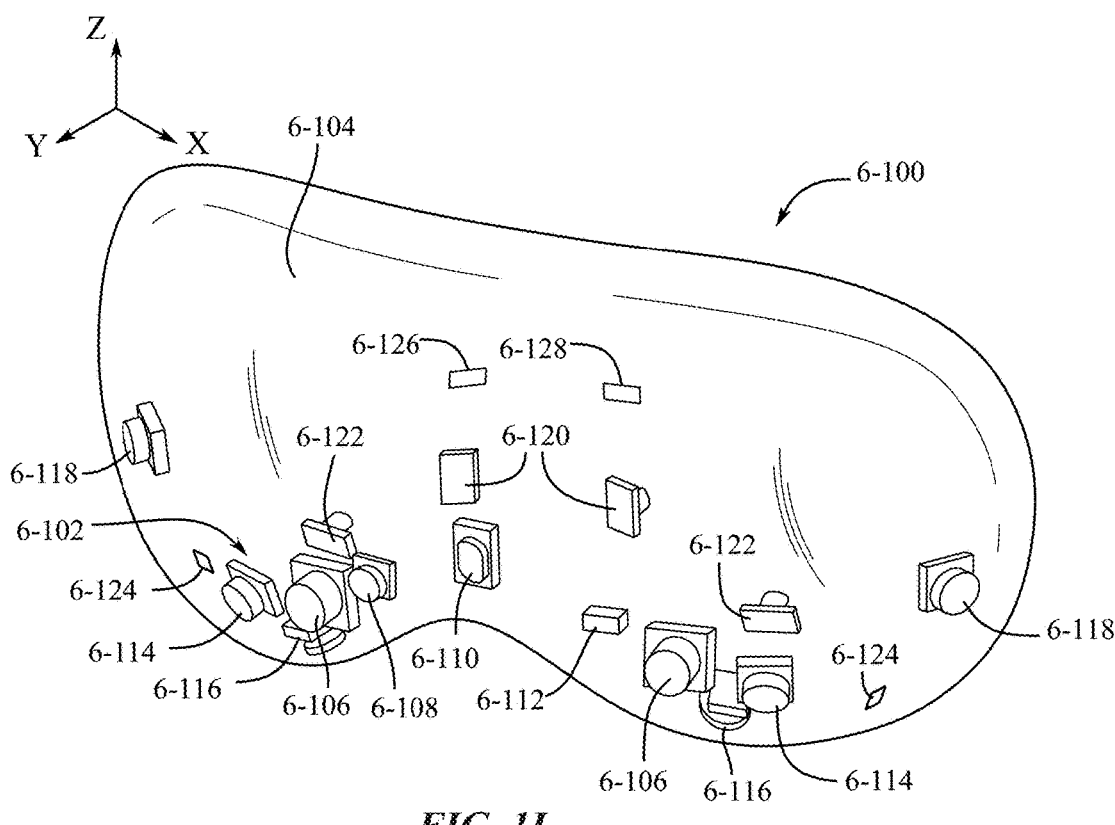
Figure 1J:
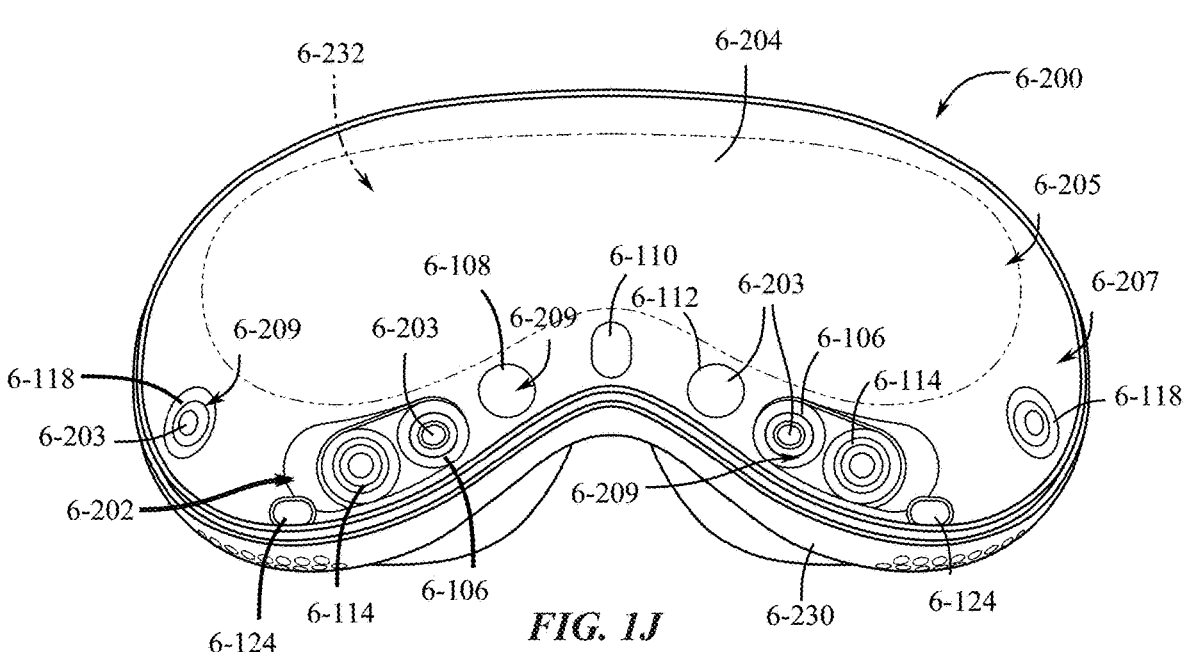
Figure 1K:
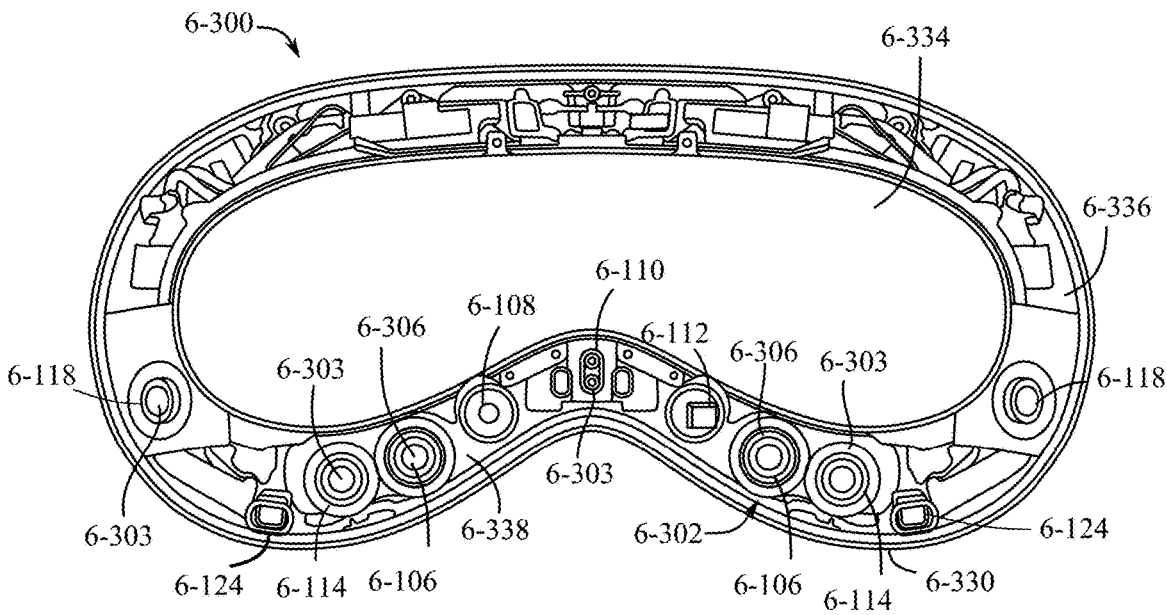
Figure 1L:
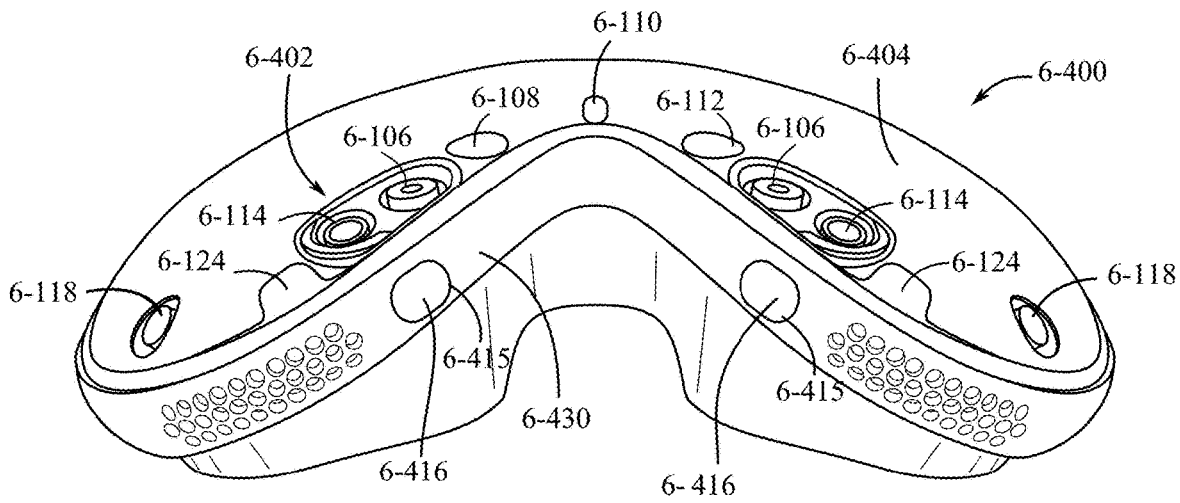
Figure 1M:
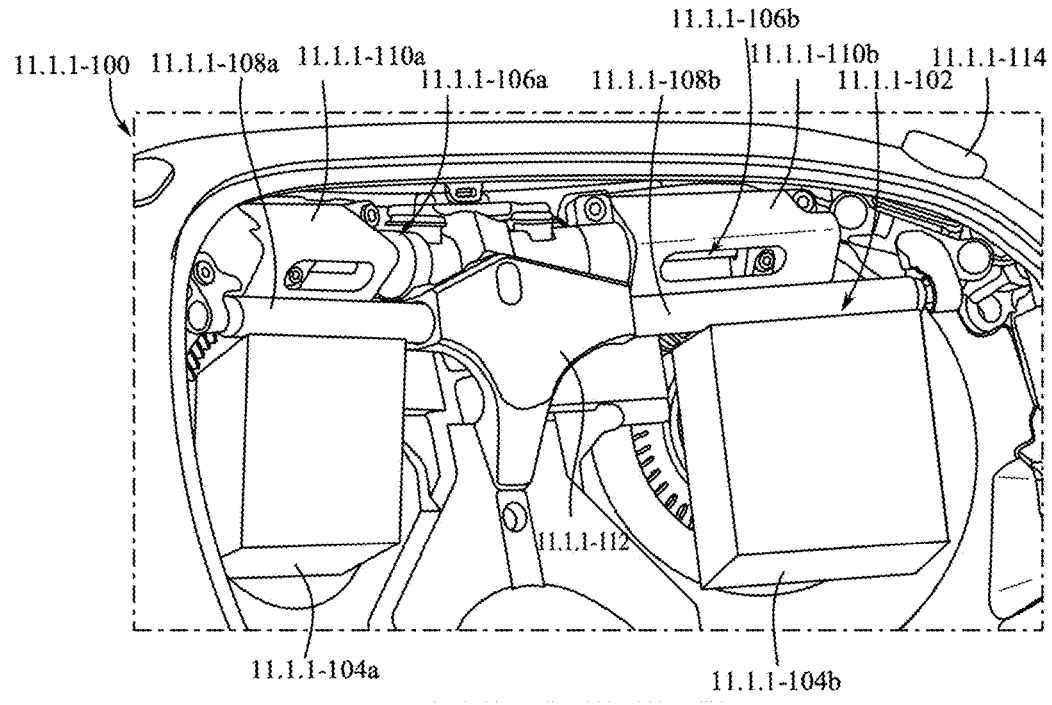
Figure 1N:
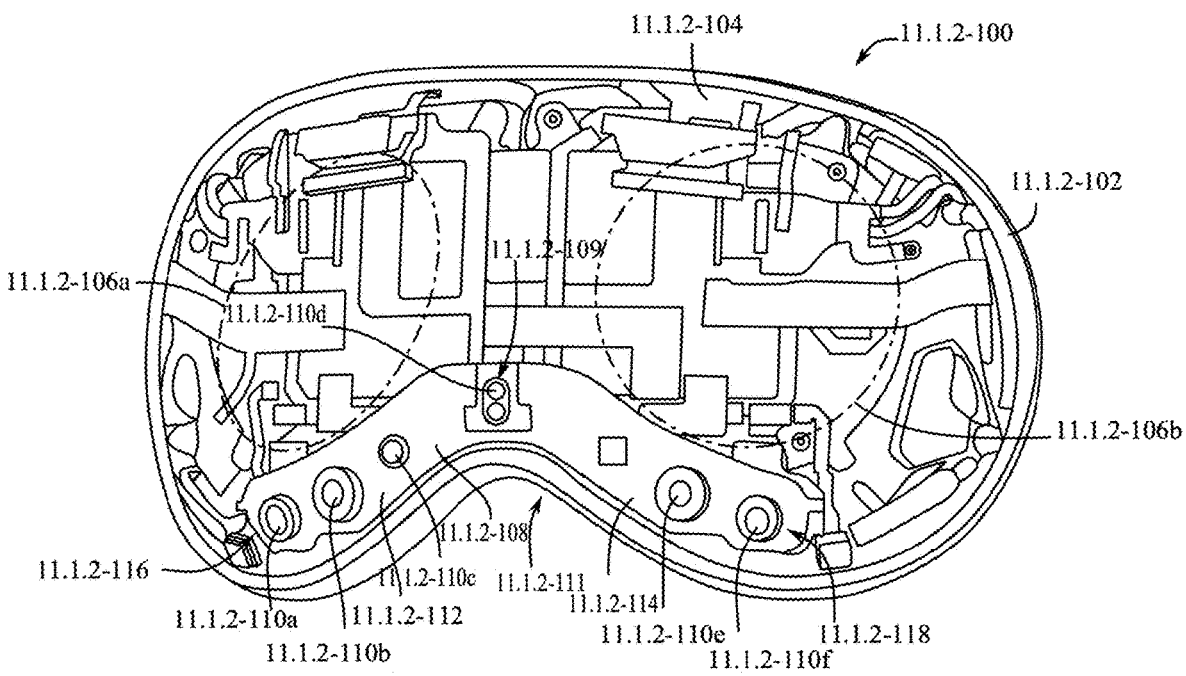
Figure 1O:
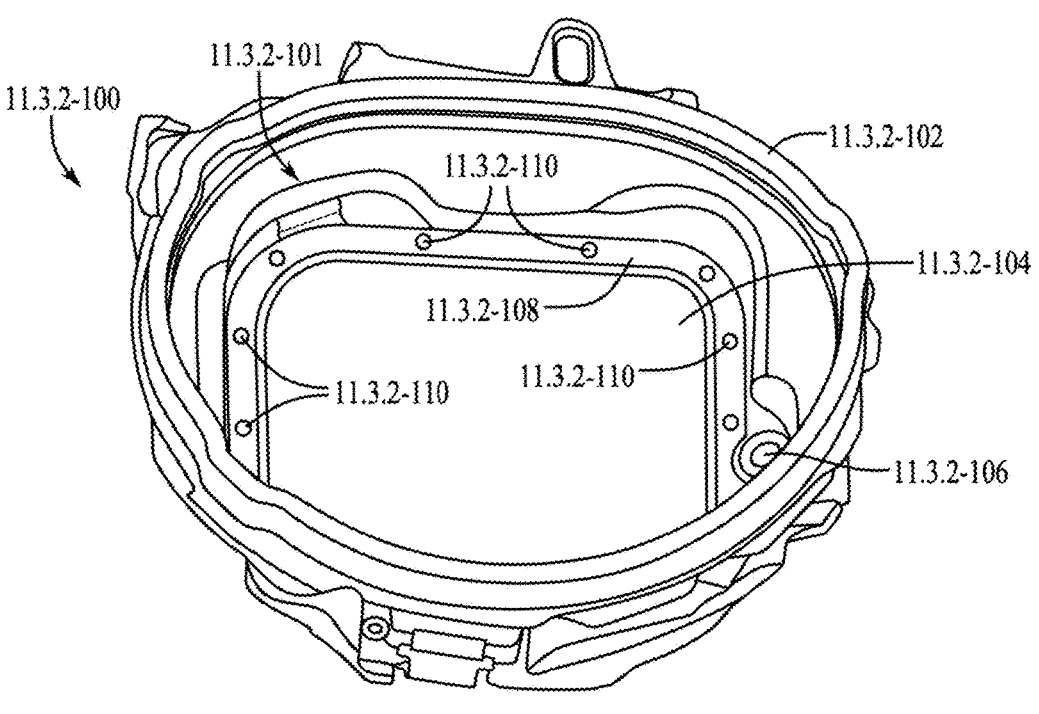
Figure 1P:
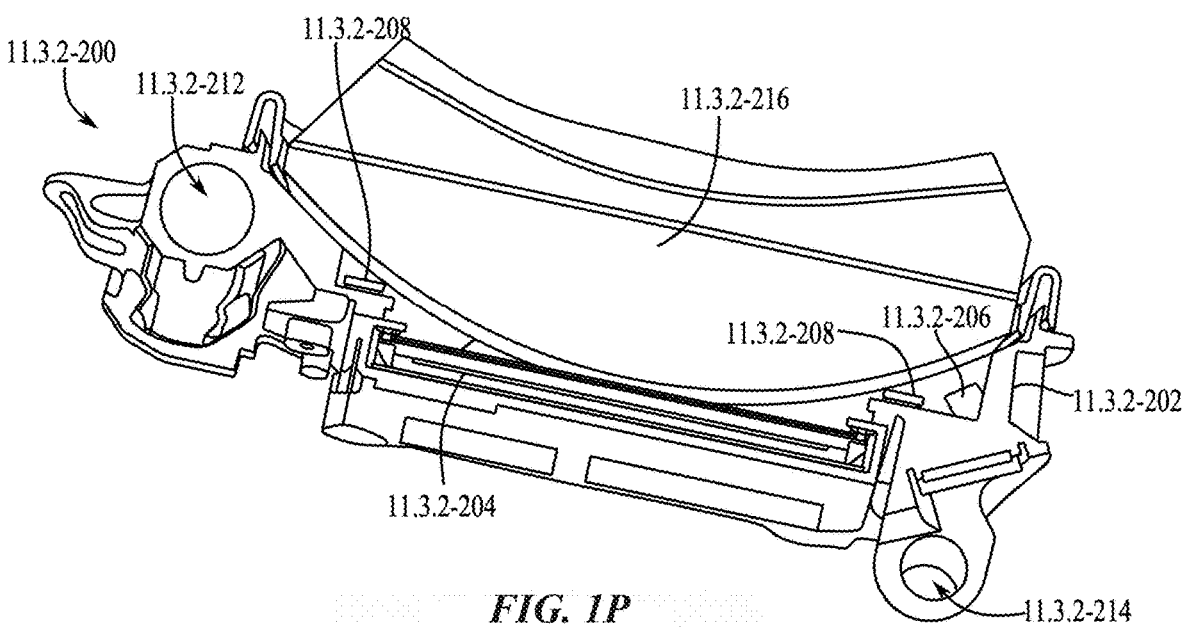

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 11) for detecting information about a physical environment of the device which can be used (optionally in conjunction with one or more illuminators such as the illuminators described in FIG. 11) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 11) that can be used (optionally in conjunction with one or more illuminators such as the illuminators 6-124 described in FIG. 11) to determine when one or more air gestures have been performed. In some embodiments, the computer system includes one or more input devices for detecting input such as one or more sensors for detecting eye movement (e.g., eye tracking and gaze tracking sensors in FIG. 11) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, reattached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 11. FIG. 11 shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features such as nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an interpupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-

202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
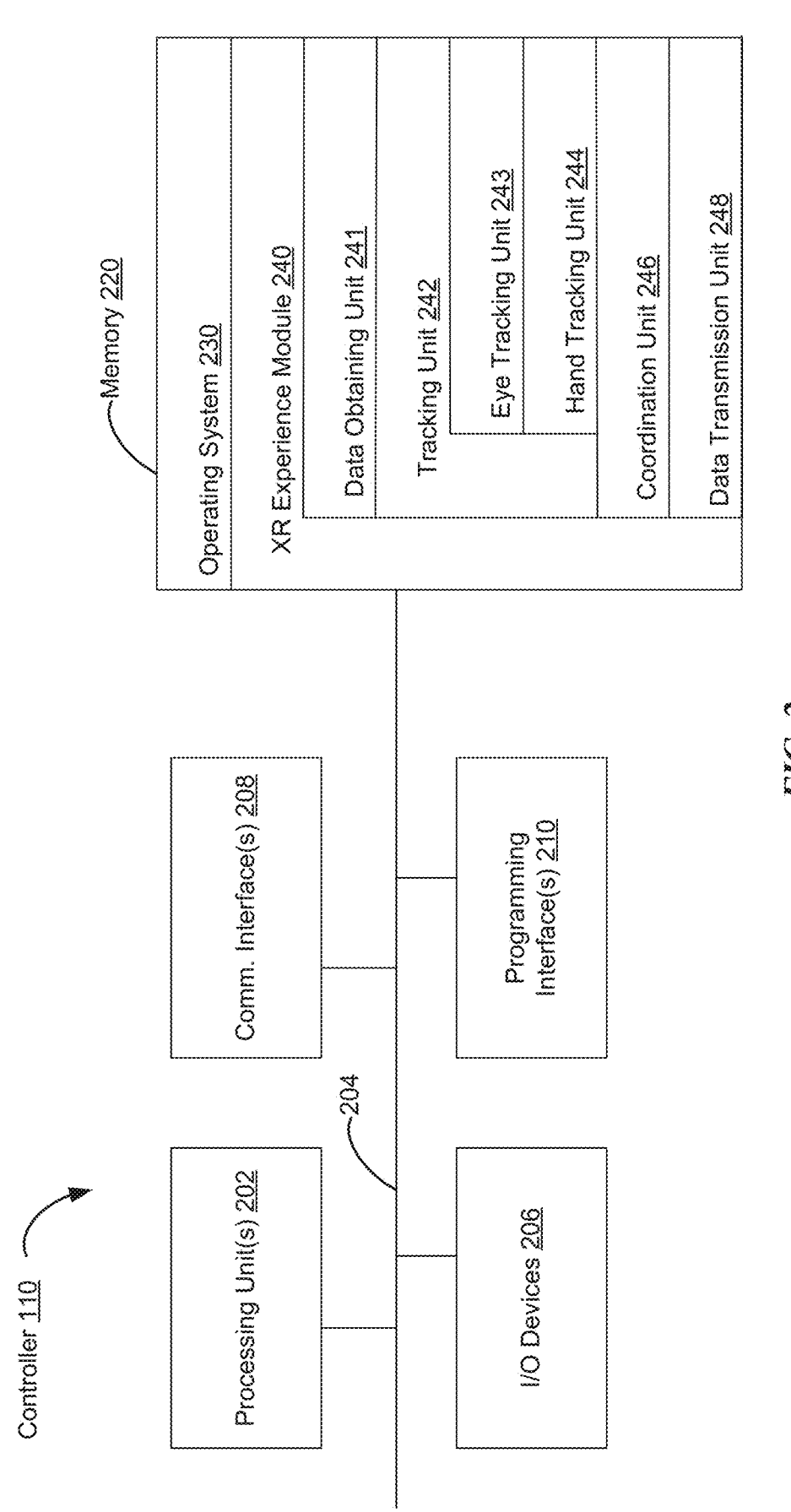
FIG. 2 is a block diagram illustrating a controller of a computer system that is configured to manage and coordinate a XR experience for the user in some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
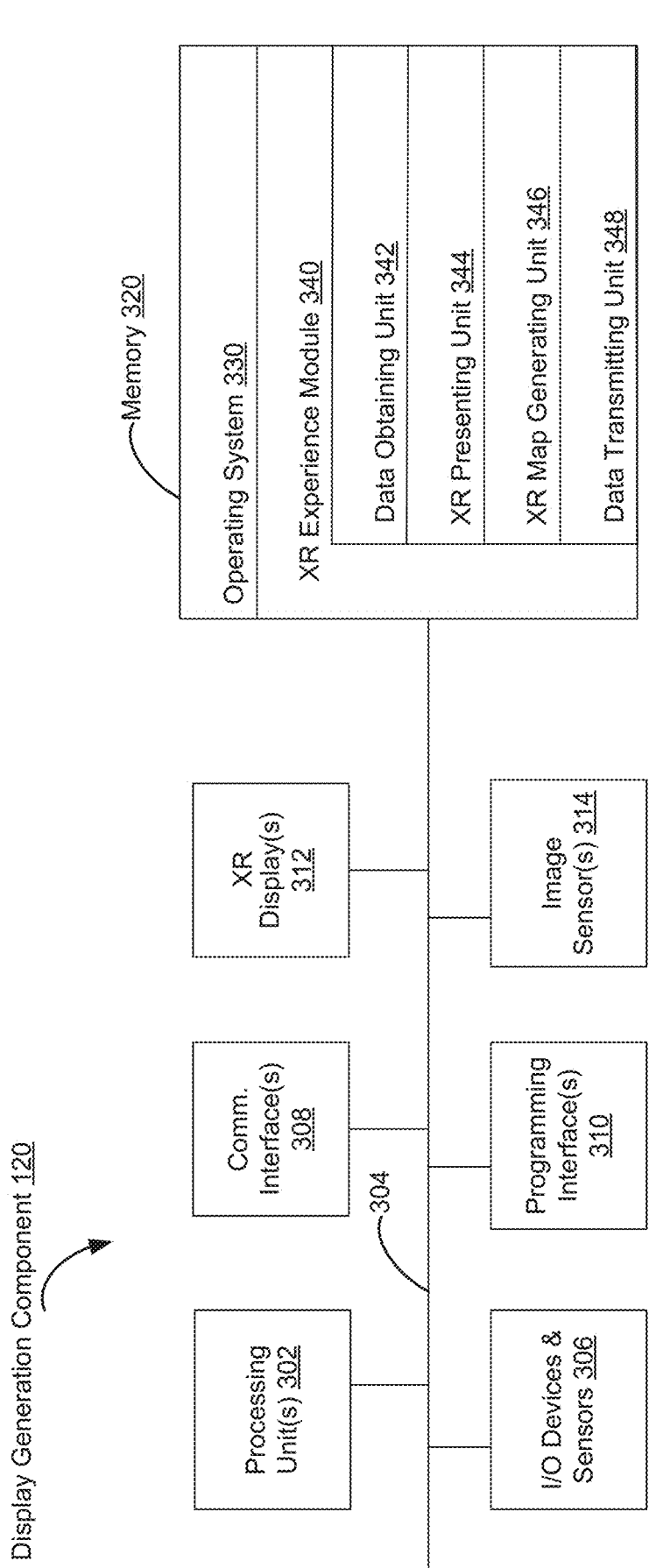
FIG. 3 is a block diagram illustrating a display generation component of a computer system that is configured to provide a visual component of the XR experience to the user in some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. n some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to a user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a pre-defined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
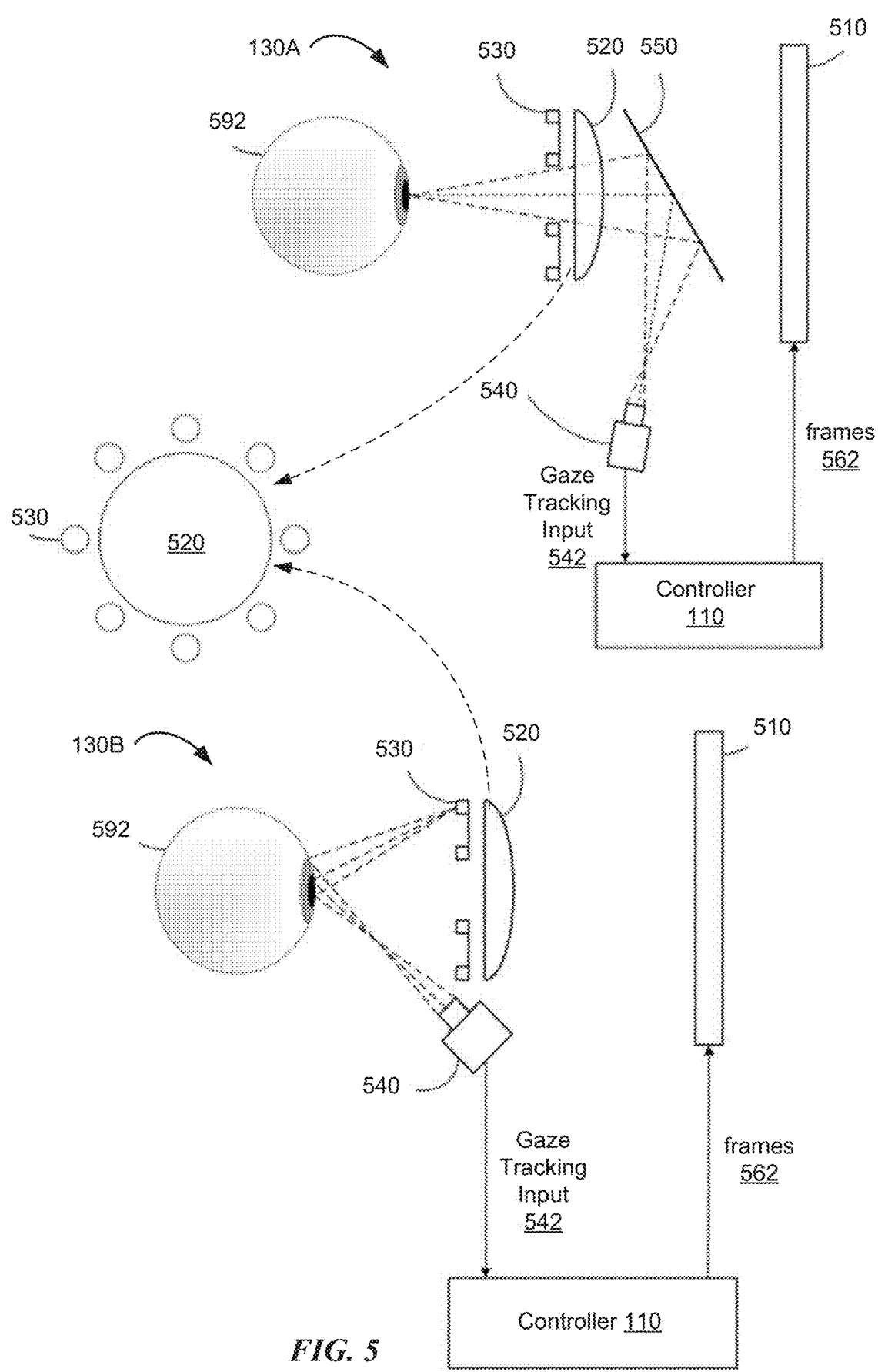
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
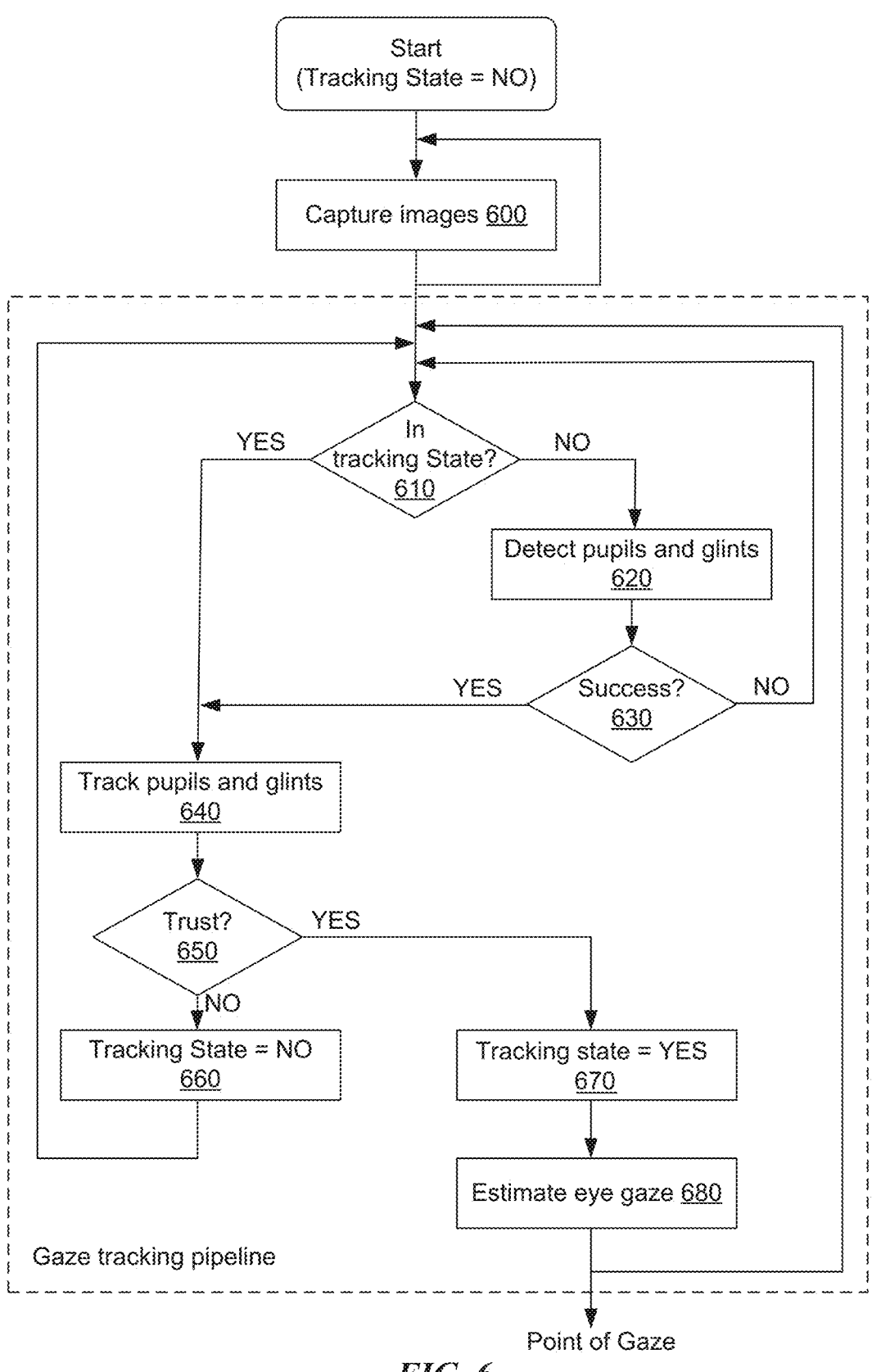
FIG. 6 is a flow diagram illustrating a glint-assisted gaze tracking pipeline in some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with one or more display generation components.

FIGS. 7A-7E illustrate examples of displaying a representation of a participant of a real-time communication session, in some embodiments. FIG. 8 is a flow diagram of exemplary method 800 for modifying a representation of a participant based on activity associated with the participant. FIG. 9 is a flow diagram of exemplary method 900 for displaying a self-view representation of an avatar of a user of a computer system. The user interfaces in FIGS. 7A-7E are used to illustrate the processes described below, including the processes in FIGS. 8-9.

Figure 7A:
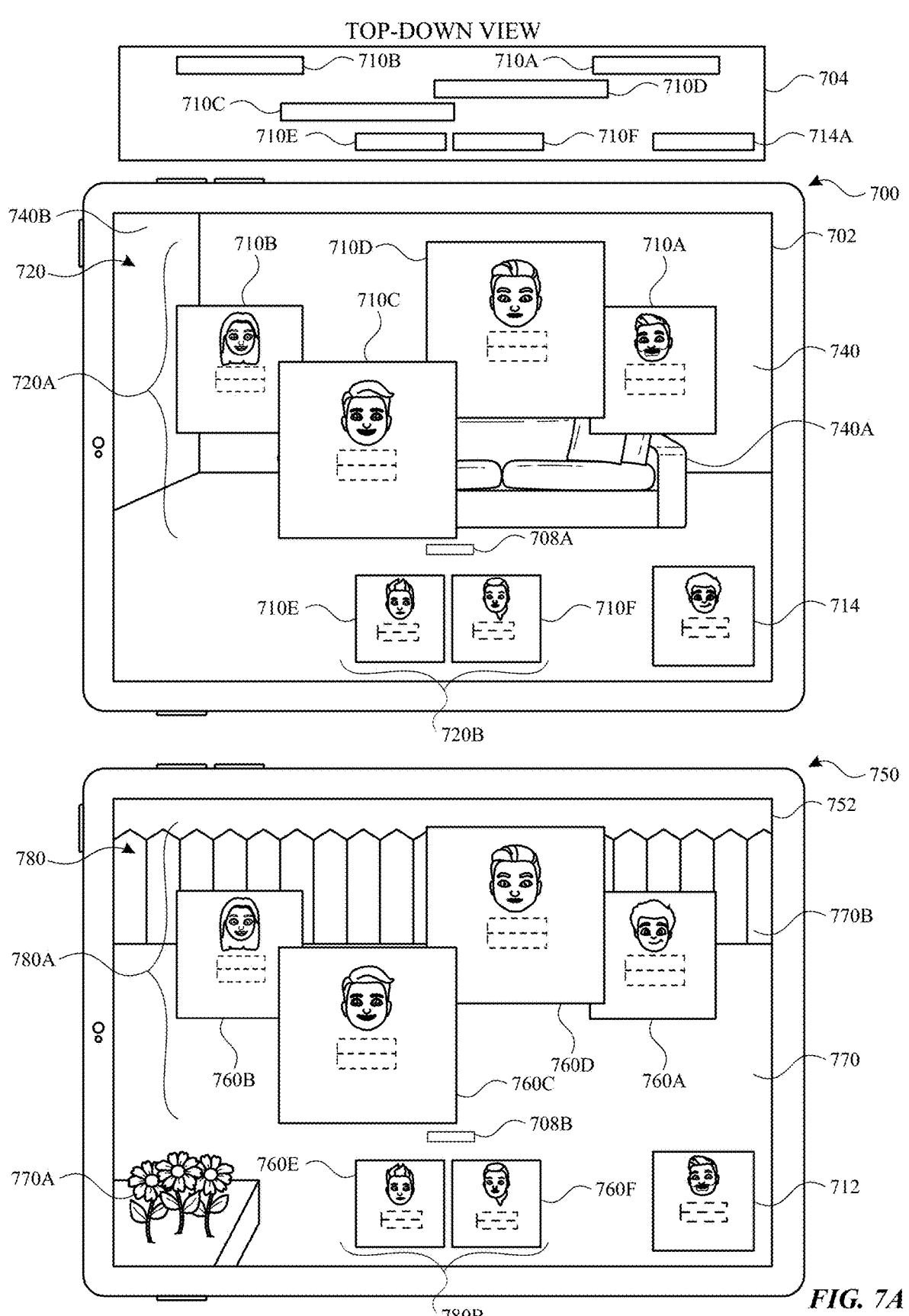

FIG. 7A illustrates first computer system 700 with a display generation component (e.g., display 702) and second computer system 750 with a display generation component (e.g., display 752). Although FIGS. 7A-7E illustrate techniques using first computer system 700 and second computer system 750 that are tablets, the techniques are optionally also applicable to head-mounted devices. In some embodiments where first computer system 700 and/or second computer system 750 are head-mounted devices, each respective computer system optionally includes two displays (one for each eye of each user), with each display displaying respective various content, to enable the respective users to perceive the various depths of the various content (e.g., physical objects and/or virtual objects) of the three-dimensional environments.

First computer system 700 is in use by a first user and second computer system 750 is in use by a second user. In some embodiments, each of first computer system 700 and/or second computer system 750 are configured to present virtual objects on one or more transparent or translucent displays (e.g., 702 and/or 752), so that a person, using the respective system, perceives virtual objects superimposed over the physical environment. In some embodiments, each of first computer system 700 and/or second computer system 750 are configured to use pass-through video, meaning one or more camera or image sensors capture images of the physical environment, and uses those images in presenting the AR environment on the opaque display (e.g., 702 and/or 752). In some embodiments, each of first computer system 700 and/or second computer system 750 are configured to present virtual objects within a virtual environment.

In some embodiments, three-dimensional environment 740 includes physical objects that include couch 740A and walls 740B. In some embodiments, three-dimensional environment 740 is a virtual environment that includes virtual objects, including couch 740A and walls 740B. In some embodiments, three-dimensional environment 740 is an augmented reality environment that includes both virtual objects (e.g., couch 740A) and physical objects (e.g., walls 740B). In some embodiments, three-dimensional environment 770 includes physical objects that include flowers 770A and fence 770B. In some embodiments, three-dimensional environment 770 is a virtual environment that includes virtual objects, including flowers 770A and fence 770B. In some embodiments, three-dimensional environment 770 is an augmented reality environment that includes both virtual objects (e.g., flowers 770A) and physical objects (e.g., fence 770B).

In some embodiments, the objects (physical objects and/or virtual objects) of three-dimensional environment 740 and three-dimensional environment 770 are the same or similar. In some embodiments, as illustrated in FIGS. 7A-7E, first computer system 700 presents a first three-dimensional environment (e.g., including aspects of the physical room that the first user is in) and second computer system 750 presents a second three-dimensional environment (e.g., including aspects of an outdoor space that the second user is in) that is different from the first three-dimensional environment. Regardless of the configuration, both first computer system 700 and second computer system 750 optionally share some aspects of their respective three-dimensional environments (e.g., virtual objects, such as representations of participants of a real-time communication session and/or user interface windows for applications).

At FIG. 7A, at first computer system 700 three-dimensional environment 740 is visible from a first viewpoint in three-dimensional environment 740 and at second computer system 750 three-dimensional environment 770 is visible from a second viewpoint in three-dimensional environment 770 (e.g., that is different from the first viewpoint).

At FIG. 7A, the first user of first computer system 700 and the second user of second computer system 760 are participating in a real-time communication session (along with other participants) that is occurring in extended reality in a three-dimensional environment. First computer system 700 provides audio output (e.g., via speakers and/or headphones of first computer system 700) of audio received from second computer system 750 (e.g., the second user speaking) and from computer systems of other participants. Second computer system 750 provides audio output (e.g., via speakers and/or headphones of second computer system 750) of audio received from first computer system 700 (e.g., the first user speaking) and from computer systems of other participants.

At FIG. 7A, first computer system 700 displays representations 710A-710F of the avatars of the participants of the real-time communication session along with self-view representation 714 of the avatar of the first user of first computer system 700. In some embodiments, each respective representation of a participant in three-dimensional environment 740 is a tile that includes a view of an avatar of the respective participant of the real-time communication session. Self-view representation 714 provides the first user of first computer system 700 with feedback about the appearance of the first user's avatar as it is presented to the other participants of the real-time communication session. For example, at FIG. 7A, second computer system 750 displays representations 760A-760F of the avatars of the participants of the real-time communication session, of which representation 760A corresponds to the avatar of the first user. Accordingly, representation 760A of the first user has the same or similar appearance when displayed by second computer system 750 as self-view representation 714 that is displayed by first computer system 700. At FIG. 7A, second computer system 750 displays representations 760A-760E along with self-view representation 712 of the second user of second computer system 750, which corresponds to (e.g., has the same or similar appearance as) representation 710A of the second user displayed by first computer system 700. Accordingly, self-view representation 712 provides the second user of second computer system 750 with feedback about the appearance of the second user's avatar as it is presented to the other participants of the real-time communication session. In some embodiments, each respective representation of a participant in three-dimensional environment 770 is a tile that includes a view of an avatar of the respective participant of the real-time communication session.

As illustrated in three-dimensional environment 740 of FIG. 7A, representations 710A-710F and 714 of the participants of the real-time communication session are grouped together in a grouped arrangement in three-dimensional environment 740, thereby forming representation 720 of the real-time communication session in three-dimensional environment 740. For example, the first user can cause the avatar (e.g., 1010 at FIGS. 10A-10H) of the first user to move about three-dimensional environment 740, so that, for example, the avatar of the first user gets closer to or further from representation 720 of the real-time communication session. Additionally, the first user can cause the avatar (e.g., 1010 at FIGS. 10A-10H) of the first user to turn in three-dimensional environment 740 with respect to representation 720 of the real-time communication session. In some embodiments, the first user can also move representation 720 of the real-time communication session within three-dimensional environment 740, such as by selecting grabber bar 708A (e.g., via voice command, via touch input, via gaze, and/or gesture, such as an air gesture) and repositioning representation 720 of the real-time communication session in three-dimensional environment 740 with respect to other objects (e.g., couch 740A and walls 740B) in the three-dimensional environment. In some embodiments, other participants (e.g., the second user) of the real-time communication session can also move representation 720 of the real-time communication session in three-dimensional environment 740 (e.g., by using grabber bar 708B).

At FIGS. 7A-7C and 7E, top-down view 704 corresponds to the spatial arrangement of representations of participants of first computer system 700. Top-down view 704 provides additional information about the spatial arrangement of representations 710A-710F and self-view representation 714 within three-dimensional environment 740, including the locations, sizes, and orientations of the representations. Top-down view 704 is illustrated to provide a more detailed explanation of the techniques and is not part of the user interfaces of first computer system 700 or second computer system 750.

As indicated by top-down view 704, representations 710A-710F are displayed at varying depths from a viewpoint in three-dimensional environment 740 of the first user, thereby causing representations 710A-710F. At first computer system 700, representations 710A-710D are grouped together in first region 720A of representation 720 of the real-time communication session and representations 710E-710F are grouped together in second region 720B of representation 720 of the real-time communication session. In some embodiments, first region 720A includes the more active participants of the real-time communication session and second region 720B includes the less active participants of the real-time communication session. As the activity level of the participants changes, the respective representations of the participants optionally transition between first region 720A and second region 720B. Similarly, at second computer system 750, representations 760A-760D are grouped together in first region 780A of representation 780 of the real-time communication session and representations 760E-760F are grouped together in second region 780B of representation 780 of the real-time communication session. In some embodiments, first region 780A includes the more active participants of the real-time communication session and second region 780B includes the less active participants of the real-time communication session. As the activity level of the participants changes, the respective representations of the participants optionally transition between first region 780A and second region 780B. At FIGS. 7A-7C, as illustrated based on the number of representations of participants (including the self-view representation), the real-time communication session includes seven participants. In some embodiments, representations of participants in the second region (e.g., 720B and/or 780B) are not modified based on detecting activity of the respective participant.

At FIG. 7A, the participant represented by representations 710B and 760B becomes more active. For example, the participant represented by representations 710B and 760B begins to talk and/or the participant (or the avatar representing the participant) moves. As illustrated in FIG. 7B1, in response to detecting the activity associated with the participant represented by representations 710B and 760B, first computer system 700 and 750 modify representation 710B and 760B, respectively, based on the activity. More specifically, first computer system 700 moves representation 710B forward in the spatial arrangement of representations of participants of the real-time communication session, such as by moving representation 710B forward as compared to representations 710A and 710D, which have not been modified (e.g., have not moved forward or backward, have not tilted, and have not changed in size). Similarly, second computer system 750 moves representation 760B forward in the spatial arrangement of representations of participants of the real-time communication session, such as by moving representation 710B forward as compared to representations 710A and 710D, which have not been modified (e.g., have not moved forward or backward, have not tilted, and have not changed in size).

Similarly, at FIG. 7A, the participant represented by representations 710C and 760C becomes less active. For example, the participant represented by representations 710C and 760C has talked less than a first threshold amount for a time period and/or the participant (or the avatar representing the participant) has moved less than a threshold amount during the time period. As illustrated in FIG. 7B1, in response to detecting the reduced activity associated with the participant represented by representations 710C and 760C, first computer system 700 and 750 modify representation 710C and 760C, respectively, based on the reduced activity. More specifically, first computer system 700 moves representation 710C backward in the spatial arrangement of representations of participants of the real-time communication session, such as by moving representation 710C backward as compared to representations 710A and 710D, which have not been modified (e.g., have not moved forward or backward, have not tilted, and have not changed in size). Similarly, second computer system 750 moves representation 760C backward in the spatial arrangement of representations of participants of the real-time communication session, such as by moving representation 710C backward as compared to representations 710A and 710D, which have not been modified (e.g., have not moved forward or backward, have not tilted, and have not changed in size). Accordingly, first computer system 700 and 750 modify the representations of participants based on the respective activity of the participants.

Figure 10A:
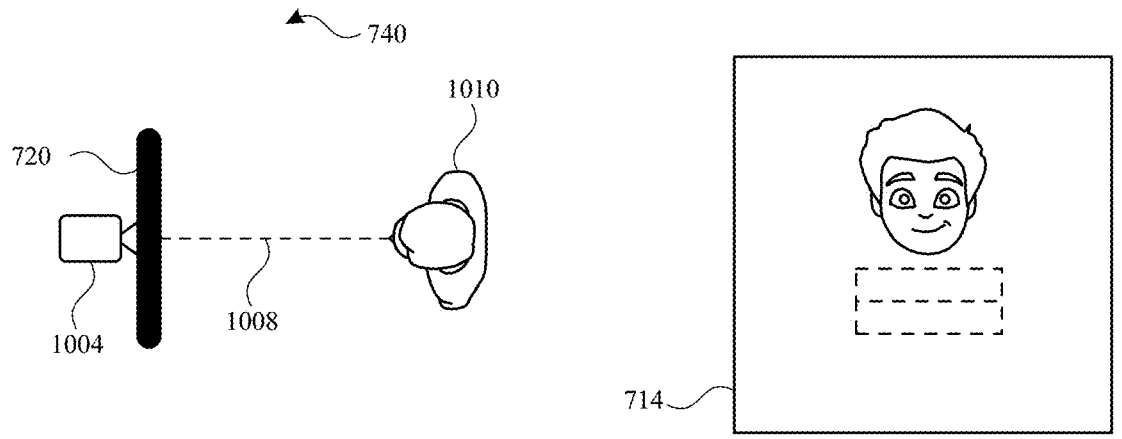
Figure 10B:
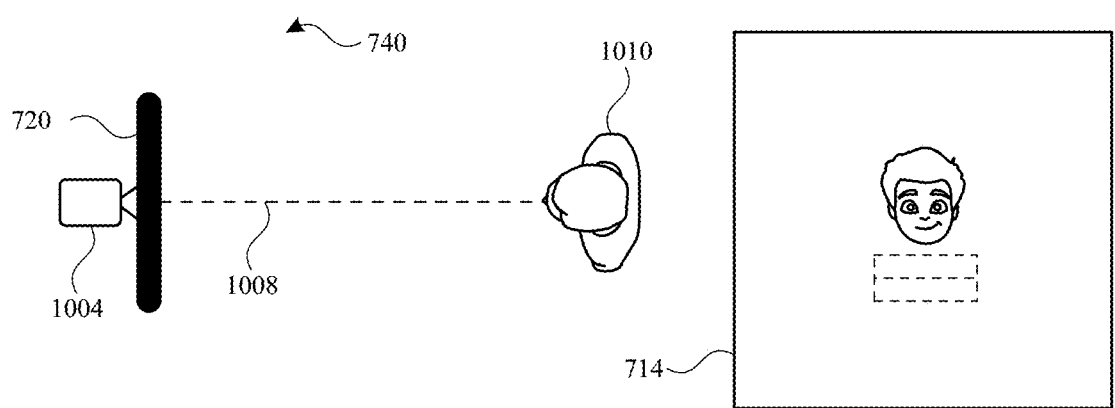
Figure 10C:
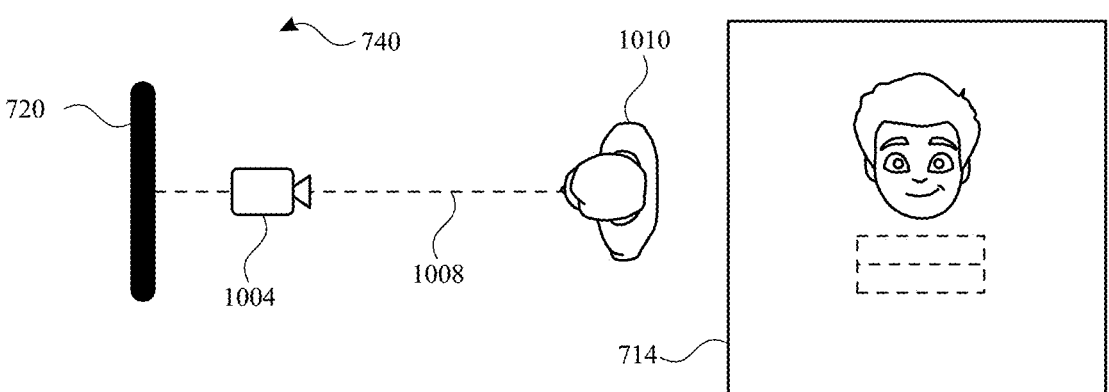
Figure 10F:
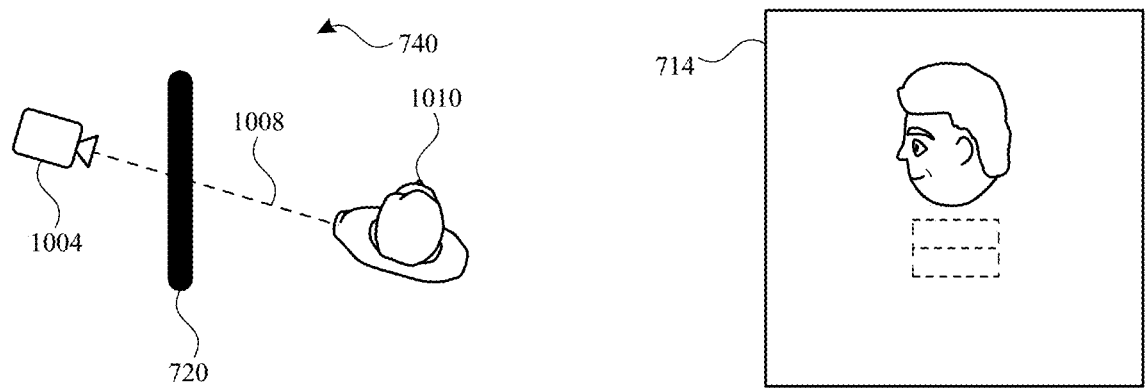

At FIG. 7B1, the avatar of the first user has turned to the right in three-dimensional environment 740 in relation to representation 720 of the real-time communication session, as further described with respect to FIG. 10F. In some embodiments, the avatar (e.g., 1010) of the first user turns based on first computer system 700 detecting (e.g., via one or more camera sensors and/or accelerometers) that the first user has turned in the physical environment (e.g., the first user physically turns their head). In embodiments where first computer system 700 is a head-mounted device, the first user turning their head optionally causes the head of the avatar of the user to turn in the same direction. In some embodiments where first computer system 700 is a head-mounted device, the first user turning their head optionally changes the first user's field of view of three-dimensional environment 740. For example, the first user turns their head to the right, causing their head-mounted device to turn, which causes the first user's avatar to turn their head, resulting in the view being provided to the first user to shift to the right (e.g., so that representation 710B moves off of the left side of the display generation component (e.g., display 702) and additional objects in three-dimensional environment 740 come into view from the right side of the display generation component (e.g., 702)).

At FIG. 7B1, in response to the avatar of the first user turning to the right, second computer system 750 modifies representation 760A of the first user to tilt, as illustrated via the display generation component (e.g., 752) of second computer system 750. In some embodiments, the magnitude of the tilt that second computer system 750 applies to representation 760A of the first user is based on the magnitude of the turn of the head of the avatar representing the first user. In some embodiments, the direction of the tilt that second computer system 750 applies to representation 760A of the first user is based on the direction of the turn of the head of the avatar representing the first user.

In some embodiments, the techniques and user interface(s) described in FIG. 7B1 are provided by one or more of the devices described in FIGS. 1A-1P. FIG. 7B2 illustrates an embodiment in which the content of display 702 in FIG. 7B1 is presented using display module X702 of head-mounted device (HMD) X700. For example, first computer system 700 is implemented as device X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

As illustrated in FIG. 7B2, in response to detecting the activity associated with the participant represented by representation 710B (e.g., the activity discussed above with respect to FIG. 7A), device X700 modifies representation 710B (e.g., relative to representation 710B in FIG. 7A) based on the activity. More specifically, device X700 moves representation 710B forward in the spatial arrangement of representations of participants of the real-time communication session, such as by moving representation 710B forward as compared to representations 710A and 710D, which have not been modified (e.g., have not moved forward or backward, have not tilted, and have not changed in size).

As illustrated in FIG. 7B2, in response to detecting the reduced activity associated with the participant represented by representation 710C (e.g., the reduced activity discussed above with respect to FIG. 7A), device X700 modifies representation 710C (e.g., relative to representation 710C in FIG. 7A) based on the reduced activity. More specifically, device X700 moves representation 710C backward in the spatial arrangement of representations of participants of the real-time communication session, such as by moving representation 710C backward as compared to representations 710A and 710D, which have not been modified (e.g., have not moved forward or backward, have not tilted, and have not changed in size). In some embodiments, the content of display 752 in FIG. 7B1 is presented using another instance of device X700. For example, second computer system 750 is implemented as another instance of device X700. It will be appreciated that the other instance of device X700 can modify representation 760B and representation 760C in a manner analogous to that described above with respect to representation 710B and 710C, respectively.

At FIG. 7B2, the avatar of the first user has turned to the right in three-dimensional environment 740 in relation to representation 720 of the real-time communication session, as further described with respect to FIG. 10F. In some embodiments, the avatar (e.g., 1010) of the first user turns based on device X700 detecting (e.g., via camera X704 and/or one or more accelerometers) that the first user has turned in the physical environment (e.g., the first user physically turns their head). The first user turning their head optionally causes the head of the avatar of the user to turn in the same direction. In some embodiments, the first user turning their head optionally changes the first user's field of view of three-dimensional environment 740. For example, the first user turns their head to the right, causing device X700 to turn, which causes the first user's avatar to turn their head, resulting in the view being provided to the first user to shift to the right (e.g., so that representation 710B moves off of the left side of display module X702 and additional objects in three-dimensional environment 740 come into view from the right side of display module X702)).

In embodiments where the content of display 752 in FIG. 7B1 is presented using another instance of device X700, in response to the avatar of the first user turning to the right, the other instance of device X700 modifies representation 760A of the first user to tilt, e.g., analogously to how second computer system 750 modifies representation 760A of the first user to tilt, as described above with respect to FIG. 7B1.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7C:
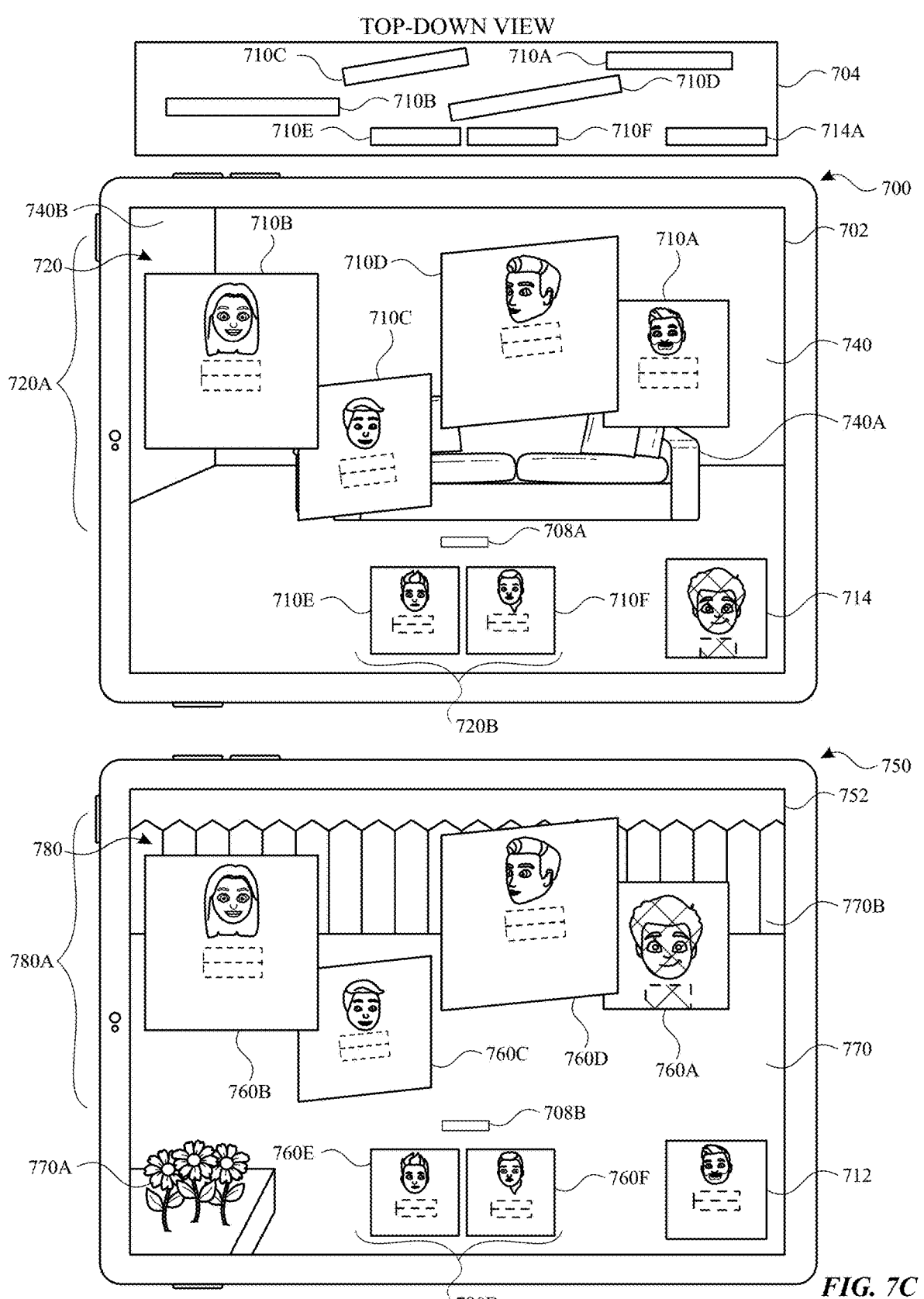

At FIG. 7C, first computer system 700 modifies representation 710C by tilting representation 710C based on the respective avatar and/or the respective user corresponding to representation 710C tilting their head. First computer system 700 also modifies representation 710D by tilting representation 710D based on the respective avatar and/or the respective user corresponding to representation 710D tilting their head. These modifications to representations 710C and 710D are also illustrated as part of top-down view 704. Similarly, at FIG. 7C, second computer system 750 modifies representation 760C by tilting representation 760C based on the respective avatar and/or the respective user corresponding to representation 760C tilting their head. Second computer system 750 also modifies representation 760D by tilting representation 760D based on the respective avatar and/or the respective user corresponding to representation 760D tilting their head. In some embodiments, the magnitude of the tilt that a computer system applies to a representation is based on the magnitude of the turn of the head of the avatar corresponding to the representation. In some embodiments, the direction of the tilt that a computer system applies to a representation is based on the direction of the turn of the head of the avatar corresponding to the representation.

At FIG. 7C, the distance between the avatar (e.g., 1010) of the first user and a virtual camera in three-dimensional environment 740 has been reduced to less than a threshold distance (e.g., based on the avatar of the first user moving toward the virtual camera), such as described with reference to FIG. 10G. As a result, computer system 700 has faded out (e.g., blurred, increasing translucency, and/or darkened) self-view representation 714 of the first user. Similarly, computer system 750 has faded out representation 760A of the first user.

Figure 7D:
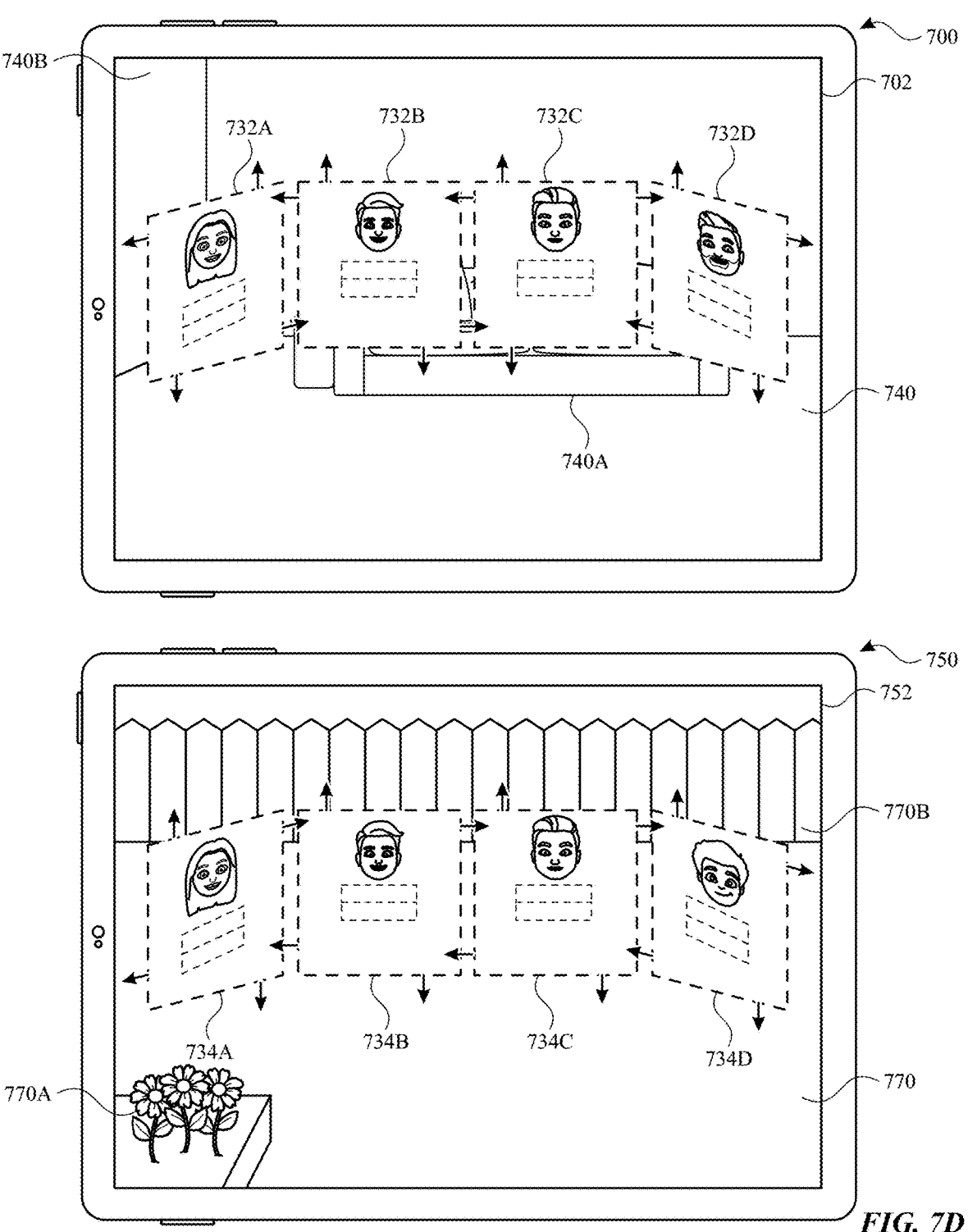

At FIG. 7D, two participants of the real-time communication session have left of the real-time communication session. In particular, the participant corresponding to representation 710E and representation 760E has left the real-time communication session and the participant corresponding to representation 710F and representation 760F has left the real-time communication session. At FIG. 7D, in response to first computer system 700 detecting that the number of participants of the real-time communication session has reduced to below a threshold number of participants, computer system 700 transitions from displaying the representations of participants of the real-time communication session in the grouped arrangement to displaying the representations (e.g., 732A-732D) of the plurality of participants in a spatially distributed arrangement. In some embodiments, computer system 700 does not display a self-view representation when computer system 700 is in a mode in which representations are displayed in the spatially distributed arrangement.

As illustrated in FIG. 7D, representations 732A and 734A correspond to the same user as representations 710B and 760B, representations 732B and 734B correspond to the same user as representations 710C and 760C, representations 732C and 734C correspond to the same user as representations 710D and 760D, representation 732D corresponds to the same user (the second user of second computer system 750) as representations 710A and 712, and representation 734D corresponds to the same user (the first user of first computer system 700) as representations 714 and 760A. In some embodiments, when in the spatial distributed arrangement, the avatars of the participants of the real-time communication session are optionally not displayed in tiles. In some embodiments, when in the spatial distributed arrangement, the participants of the real-time communication session have spatial agency and can move their respective representations 732A-732D and 734A-734D within the spatially distributed arrangement (e.g., to get closer to or further from another user or virtual object in three-dimensional environment 740 and 770), as indicated by the arrows. The arrows within FIG. 7D are illustrated to provide a more detailed explanation and are not part of the user interfaces of first computer system 700 or second computer system 750.

At FIG. 7D, while first computer system 700 displays the representations of participants of the real-time communication session in the spatially distributed arrangement, first computer system 700 forgoes displaying a self-view representation of the first user. Similarly, at FIG. 7D, while second computer system 750 displays the representations of participants of the real-time communication session in the spatially distributed arrangement, second computer system 750 forgoes displaying a self-view representation of the second user. In some embodiments, while in the spatially distributed arrangement, the level of activity of the participant does not cause modifications to the representation of the participant (e.g., the representation of the participant does not move forward, backward, tile, and/or resize based on audio and/or movement activity). In some embodiments, first computer system 700 receives user input requesting to transition between the spatially distributed arrangement and the grouped arrangement and, in response, transitions between the spatially distributed arrangement and the grouped arrangement.

Figure 7E:
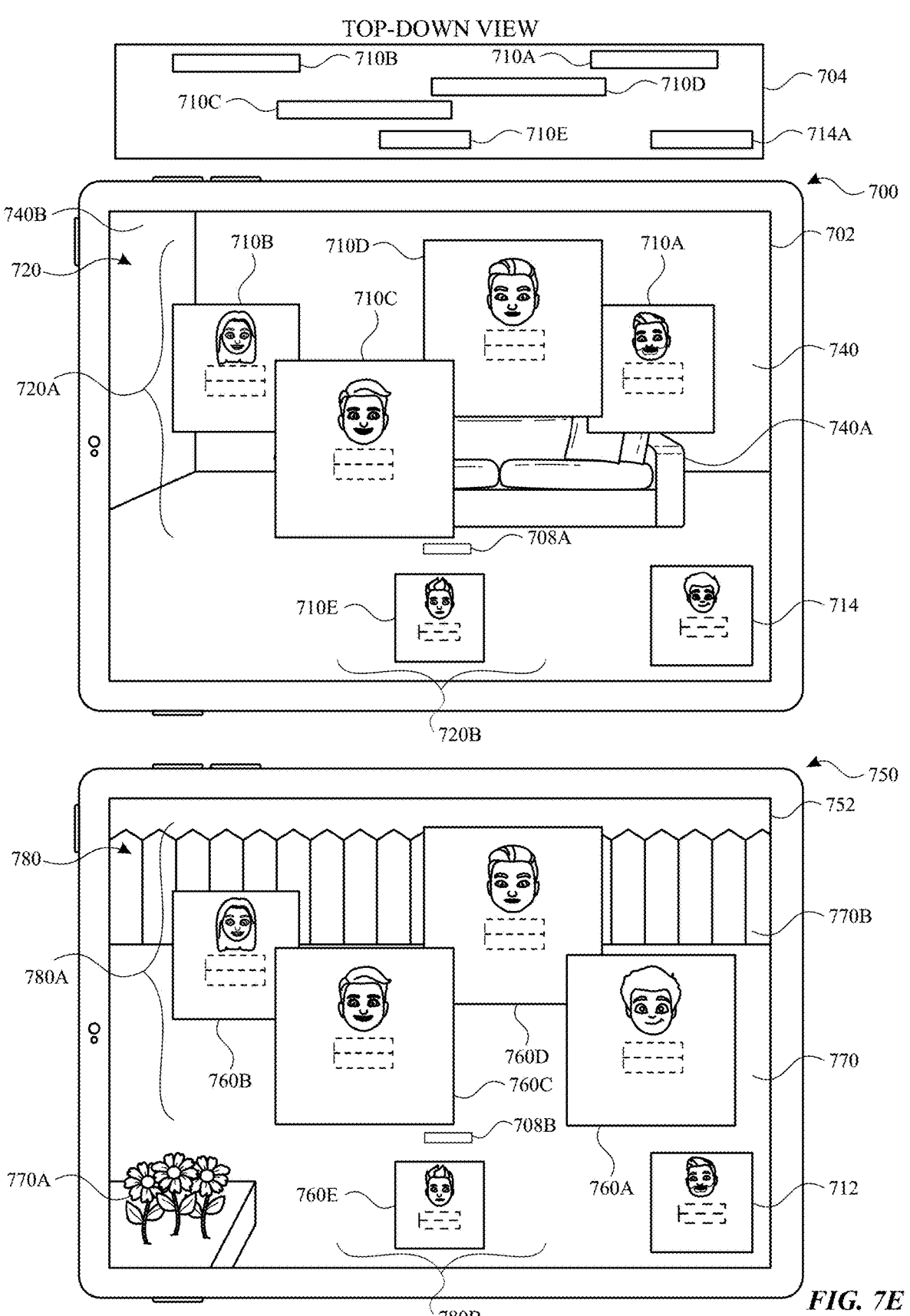

At FIG. 7E, a participant has rejoined the real-time communication session. As a result of the additional participant joining, first computer system 700 (and second computer system 750) determines that the quantity of participants has exceeded the threshold number of participants and first computer system 700 (and second computer system 750) transitions the real-time communication session from displaying the representations (e.g., 732A-732D and 734A-734D) of the plurality of participants in the spatially distributed arrangement to displaying the representations of participants of the real-time communication session in the grouped arrangement. In addition, as shown in FIG. 7E, first computer system 700 displays the self-view representation 714 of the first user and second computer system 750 displays the self-view representation 712 of the second user.

Additional descriptions regarding FIGS. 7A-7E are provided below in reference to method 800 described with respect to FIG. 8, method 900 described with respect to FIG. 9, and method 1100 described with reference to FIG. 11.

FIG. 8 is a flow diagram of an exemplary method 800 for modifying a representation of a participant based on activity associated with the participant, in some embodiments. In some embodiments, method 800 is performed at a computer system (e.g., a smartphone, a tablet, a watch, and/or a head-mounted device) (e.g., computer system 101 in FIG. 1A, first computer system 700, second computer system 750, and/or device X700) including one or more display generation components (e.g., display generation component 120 in FIGS. 1A, 3, and 4, 702,752, and/or X702) (e.g., a visual output device, a 3D display, and/or a display having at least a portion that is transparent or translucent on which images can be projected (e.g., a see-through display), a projector, a heads-up display, and/or a display controller). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

The computer system (e.g., 700,750, and/or X700) displays (802), via the one or more display generation components (e.g., 702, 752, and/or X702), representations (e.g., 710A-710F and/or 760A-760F) (e.g., live camera feed or three-dimensional avatar representation) of a plurality of participants in a real-time communication session in a spatial arrangement (e.g., in a line, in a semi-circle, and/or in an arc) of tiles in a three-dimensional space (e.g., 740 and/or 770) (e.g., a physical environment or a virtual environment). Displaying (802) the representations includes concurrently displaying: a representation (804) (e.g., 710A-710F and/or 760A-760F) of a first participant of the plurality of participants in a first tile in the spatial arrangement of tiles (e.g., 720 and/or 780) and a representation (806) (e.g., 710A-710F and/or 760A-760F) of a second participant of the plurality of participants in a second tile in the spatial arrangement of tiles (e.g., 720 and/or 780), wherein the second participant is different form the first participant and the second tile is different from the first tile. In some embodiments, the tiles are two-dimensional. In some embodiments, the tiles are three-dimensional. In some embodiments, some tiles are two-dimensional and some tiles are three-dimensional. In some embodiments, the tiles are separate objects that include individual representations of different participants of the real-time communication session. In some embodiments, each tile includes a representation of a single participant of the real-time communication session.

While displaying the representations of the plurality of participants in the real-time communication session in the three-dimensional space, the computer system (e.g., 700, 750, and/or X700) detects (808) activity associated with the first participant of the plurality of participants (e.g., 710A-710F and/or 760A-760F).

In response to detecting activity associated with the first participant of the plurality of participants, the computer system (e.g., 700, 750, and/or X700) modifies (810) (e.g., moving forward or backward, changing in size, and/or changing in display angle) the representation of the first participant computer system (e.g., 700, 750, and/or X700) based on the activity, including moving (e.g., as in the transition between FIGS. 7A and 7B1, as in the transition between FIGS. 7A and 7B2, and/or as in the transition between FIGS. 7B1 and 7C) the first tile relative to the second tile in the spatial arrangement of tiles (e.g., 720 and/or 780). In some embodiments, moving the first tile relative to the second tile in the spatial arrangement of tiles includes moving the first tile forward without moving the second tile. In some embodiments, moving the first tile relative to the second tile in the spatial arrangement of tiles includes moving the second tile backward without moving the first tile. In some embodiments, moving the first tile relative to the second tile in the spatial arrangement of tiles includes moving the first tile forward and moving the second backward. Modifying the representation of the participant based on the first participant's activity provides the user with visual feedback about the activity, thereby providing improved visual feedback.

In some embodiments, modifying (810) the representation (e.g., 710B, 710C, 769B, and/or 760C) of the first participant based on the activity includes moving (e.g., as in FIGS. 7A-7B1 or FIGS. 7A to 7B2) the representation (e.g., 710B, 710C, 769B, and/or 760C) of the first participant in the first tile forward or backward relative to the representation (e.g., 710D and/or 760D) of the second participant in the second tile. Moving, based on the activity of the first participant, the representation of the first participant forward or backward relative to the second participant provides the user with visual feedback about the activity, thereby providing an improved control scheme for managing the view of the avatars and providing improved visual feedback.

In some embodiments, modifying (810) the representation (e.g., 710B, 710C, 769B, and/or 760C) of the first participant based on the activity includes changing (e.g., as in FIGS. 7A-7B2) (e.g., increasing or decreasing) a size of the representation (e.g., 710B, 710C, 769B, and/or 760C) of the first participant relative to a size of the representation (e.g., 710D and/or 760D) of the second participant. In some embodiments, modifying the representation of the first participant based on the activity includes changing (e.g., increasing or decreasing) a size of the first tile relative to a size of the second tile. Changing, based on the activity of the first participant, a size of the representation of the first participant relative to the second participant provides the user with visual feedback about the activity, thereby providing an improved control scheme for managing the view of the avatars and providing improved visual feedback.

In some embodiments, modifying (810) the representation (e.g., 710C, 710D, 769C, and/or 760D) of the first participant based on the activity includes changing (e.g., as in FIGS. 7B1-7C) an angle of (e.g., tilting forward, tilting backward, titling left, and/or tilting right) the representation of the first participant (e.g., 710C, 710D, 769C, and/or 760D) relative to an angle of the representation of the second participant (e.g., 710B and/or 760B). In some embodiments, modifying the representation of the first participant based on the activity includes changing an angle of (e.g., tilting forward, tilting backward, titling left, and/or tilting right) the first tile relative to an angle of the second tile. Changing, based on the activity of the first participant, a tilt of the representation of the first participant relative to the second participant provides the user with visual feedback about the activity, thereby providing improved visual feedback.

In some embodiments, detecting activity associated with the first participant (e.g., as represented by representation 710B, 710C, 769B, and/or 760C) includes detecting sounds from the first participant and/or movement of the representation of the first participant. In some embodiments, modifying (e.g., moving forward or backward, changing in size, and/or changing in display angle) the representation of the first participant based on the activity (including moving the first tile relative to the second tile in the spatial arrangement of tiles) includes: in accordance with a determination that the sounds from the first participant have a first magnitude, modifying the representation of the first participant is a first modification (e.g., based on the first magnitude, move a first amount, and/or change to a first size) and in accordance with a determination that the sounds from the first participant have a second magnitude that is different from the first magnitude (e.g., louder or quieter), modifying the representation of the first participant is a second modification (e.g., based on the second magnitude, move a second amount, and/or change to a second size) that is different from the first modification. In some embodiments, modifying (e.g., moving forward or backward, changing in size, and/or changing in display angle) the representation of the first participant based on the activity (including moving the first tile relative to the second tile in the spatial arrangement of tiles) includes: in accordance with a determination that the movements from the first participant have a first magnitude and/or first direction, modifying the representation of the first participant is a first modification (e.g., based on the first magnitude, based on the first direction, move a first amount, and/or change to a first size) and in accordance with a determination that the movements from the first participant have a second magnitude and/or second direction that is different from the first magnitude and/or first direction, modifying the representation of the first participant is a second modification (e.g., based on the second magnitude, based on the second direction, move a second amount, and/or change to a second size) that is different from the first modification. Modifying the representation of the first participant based on the first participant's sounds and/or movements provides the user with visual feedback about the sounds and/or movements, thereby providing improved visual feedback.

In some embodiments, the activity associated with the first participant (e.g., as represented by representation 710B, 710C, 769B, and/or 760C) is based on movement of the first participant relative to a point of reference (e.g., 720, 780, 700, and/or 750) corresponding to the real-time communication session (e.g., a location of a representation of the real-time conversation or a location of the device being used by the first participant to participate in the real-time communication session). In some embodiments, the detected activity associated with the first participant includes movement of the representation of the first participant. In some embodiments, modifying (e.g., moving forward or backward, changing in size, and/or changing in display angle) the representation of the first participant based on the activity (including moving the first tile relative to the second tile in the spatial arrangement of tiles) includes: in accordance with a determination that the movement of the first participant relative to the point of reference has a first magnitude and/or first direction, modifying the representation of the first participant is a first modification (e.g., based on the first magnitude, based on the first direction, move a first amount, and/or change to a first size) and in accordance with a determination that the movement of the first participant relative to the point of reference has a second magnitude and/or second direction that is different from the first magnitude and/or first direction, modifying the representation of the first participant is a second modification (e.g., based on the second magnitude, based on the second direction, move a second amount, and/or change to a second size) that is different from the first modification. Modifying the representation of the first participant based on movement of the first participant relative to a point of reference provides the user with visual feedback about the movement, thereby providing improved visual feedback.

In some embodiments, the movement of the first participant (e.g., as represented by representations 710C, 710D, 760C, and/or 760D) relative to the point of reference (e.g., 720, 780, 700, and/or 750) corresponding to the real-time communication session (e.g., a location of a representation of the real-time conversation or a location of the device being used by the first participant to participate in the real-time communication session) is a change (e.g., as in FIG. 7C) in the orientation of a face of the first participant (e.g., based on a left tilt or a right tilt of a head of the first participant) relative to the point of reference corresponding to the real-time communication session and modifying the representation of the first participant (and/or the first tile) includes tilting (e.g., as in FIG. 7C), based on the change in the orientation, the representation of the first participant (and/or the first tile). In some embodiments, modifying (e.g., moving forward or backward, changing in size, and/or changing in display angle) the representation of the first participant based on the activity (including moving the first tile relative to the second tile in the spatial arrangement of tiles) includes: in accordance with a determination that the change in orientation of the face of the first participant has a first magnitude and/or first direction, modifying the representation of the first participant is a first modification (e.g., based on the first magnitude, based on the first direction, tilt the representation of the first participant a first number of degrees, move a first amount, and/or change to a first size) and in accordance with a determination that the change in orientation of the face of the first participant has a second magnitude and/or second direction that is different from the first magnitude and/or first direction, modifying the representation of the first participant is a second modification (e.g., based on the second magnitude, based on the second direction, tilt the representation of the first participant a second number of degrees, move a second amount, and/or change to a second size) that is different from the first modification. Modifying, based on a change in orientation of the first participant's face, a tilt of the representation of the first participant relative to the second participant provides the user with visual feedback about the activity, thereby providing improved visual feedback.

Figure 10G:
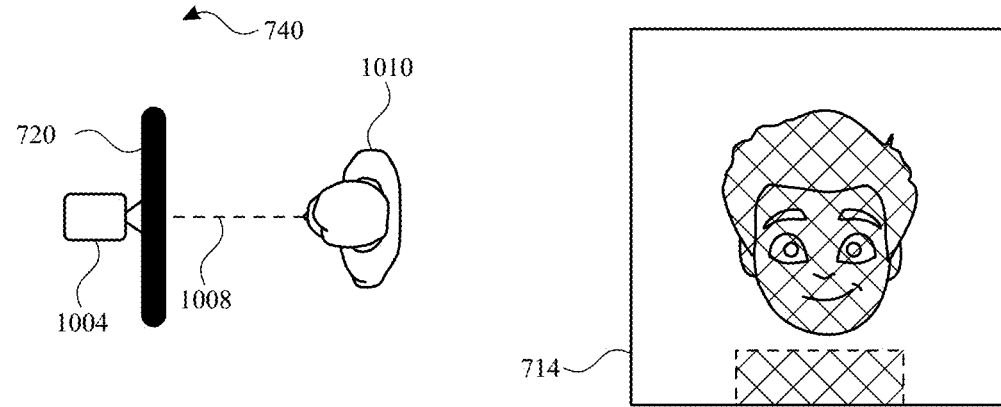

In some embodiments, the activity associated with the first participant (e.g., as represented by representations 760A and/or 714) is based on movement (e.g., as illustrated in FIG. 10G) of a point of reference (e.g., 720) corresponding to the real-time communication session (e.g., a location of a representation of the real-time conversation or a location of the device being used by the first participant to participate in the real-time communication session) relative to the first participant (e.g., 1010 in FIG. 10G) (e.g., while the device is being used by the first participant to participate in the real-time communication session). In some embodiments, the detected activity associated with the first participant includes movement of the representation of the first participant. In some embodiments, modifying (e.g., moving forward or backward, changing in size, and/or changing in display angle) the representation of the first participant based on the activity (including moving the first tile relative to the second tile in the spatial arrangement of tiles) includes: in accordance with a determination that the movement of the point of reference relative to the first participant has a first magnitude and/or first direction, modifying the representation of the first participant is a first modification (e.g., based on the first magnitude, based on the first direction, move a first amount, and/or change to a first size) and in accordance with a determination that the movement of the point of reference relative to the first participant has a second magnitude and/or second direction that is different from the first magnitude and/or first direction, modifying the representation of the first participant is a second modification (e.g., based on the second magnitude, based on the second direction, move a second amount, and/or change to a second size) that is different from the first modification. Modifying the representation of the first participant based on movement of a point of reference relative to the first participant provides the user with visual feedback about the movement, thereby providing improved visual feedback.

In some embodiments, modifying (810) the representation (e.g., 710B, 710C, 769B, and/or 760C) of the first participant based on the activity includes: in accordance with the activity associated with the first participant being the first participant moving closer to a point of reference corresponding to the real-time communication session (e.g., a location of a representation of the real-time conversation or a location of the device being used by the first participant to participate in the real-time communication session), moving (e.g., as in FIG. 7B1 or FIG. 7B2) the representation (e.g., 710C and/or 760C) of the first participant (and/or the first tile) forward relative to the representation (e.g., 710D) of the second participant; and in accordance with the activity associated with the first participant being the first participant moving further from a point of reference corresponding to the real-time communication session (e.g., a location of a representation of the real-time conversation or a location of the device being used by the first participant to participate in the real-time communication session), moving (e.g., as in FIG. 7B1 or FIG. 7B2) the representation (e.g., 710B and/or 769B) of the first participant (and/or the first tile) backward relative to the representation (e.g., 710D) of the second participant. In some embodiments, as a respective user gets closer to a point of reference corresponding to the real-time communication session, the tile of the representation of the respective user moves forward in the spatial arrangement of tiles and as the respective user gets further from the point of reference corresponding to the real-time communication session, the tile of the representation of the respective user moves backward in the spatial arrangement of tiles. In some embodiments, the magnitude and/or speed of the movement of the representation of the first participant is based on a magnitude and/or speed of the movement of the first participant relative to the point of reference corresponding to the real-time communication session. Moving the representation of the first participant based on the participant moving closer to/further from the device provides an improved control scheme for managing the view of the avatars and provides the user with visual feedback about the movement.

In some embodiments, displaying (802) representations (e.g., 710A-710F and/or 760A-760F) (e.g., live camera feed or three-dimensional avatar representation) of the plurality of participants in the real-time communication session in the spatial arrangement (e.g., 720 and/or 780) of tiles in the three-dimensional space (e.g., 740 and/or 770) includes displaying representations (e.g., 710A-710D and/or 760A-760D) of a first subset of the plurality of participants in a first region (e.g., 720A and/or 780A) and displaying representations (e.g., 710E-710F and/or 760E-760F) of a second subset of the plurality of participants, different from the first subset of the plurality of participants, in a second region (e.g., 720B and/or 780B) that is different from the first region (e.g., 720A and/or 780A). The computer system (e.g., 700 and/or 750) detects activity associated with a respective participant of the plurality of participants. In response to detecting activity associated with the respective participant of the plurality of participants: in accordance with a determination that a representation (e.g., 710A-710D and/or 760A-760D) of the respective participant is of the first subset of the plurality of participants that is displayed in the first region, modifying (e.g., moving forward or backward, changing in size, and/or changing in display angle) the representation of the respective participant based on the activity associated with the respective participant; and in accordance with a determination that the representation (e.g., 710E-710F and/or 760E-760F) of the respective participant is of the second subset of the plurality of participants that is displayed in the second region, forgoing modifying (e.g., forgoing moving forward or backward, changing in size, and/or changing in display angle) the representation of the respective participant based on the activity associated with the respective participant. In some embodiments, the representation of the respective participant moves between the first region and the second region based user input (e.g., a request from the first participants) and/or based on activity (or lack of activity) associated with the respective participant. In some embodiments, the representation of the respective participant moves from the first region to the second region based on activity associated with the respective participant that is less than a threshold amount of activity (e.g., over a first period of time). In some embodiments, the representation of the respective participant moves from the second region to the first region based on activity associated with the respective participant that is more than a second threshold amount of activity (e.g., over a second period of time). Displaying some participants (and/or tiles of the participants) such that the participants do not move with respect to detected activity that corresponds to those participants provides an improved control scheme for managing the view of the avatars.

In some embodiments, aspects/operations of methods 800, 900, and 1100 may be interchanged, substituted, and/or added between these methods. For example, the representations of the participants are optionally the same representation. For another example, the self-view representation of the user is optionally the same as a representation of the participant. For another example, the real-time communication sessions are optionally the same real-time communication session and the three-dimensional environments are optionally the same three-dimensional environments. For brevity, these details are not repeated here.

FIG. 9 is a flow diagram of an exemplary method 900 for displaying a self-view representation of an avatar of a user of a computer system, in some embodiments. In some embodiments, method 900 is performed at a computer system (e.g., computer system 101 in FIG. 1A) (e.g., a smartphone, a tablet, a watch, and/or a head-mounted device) that is in communication with one or more display generation components (e.g., display generation component 120 in FIGS. 1A, 3, and 4, 702, 752, and/or X702) (e.g., a visual output device, a 3D display, and/or a display having at least a portion that is transparent or translucent on which images can be projected (e.g., a see-through display), a projector, a heads-up display, and/or a display controller)

and one or more input devices (e.g., one or more cameras and/or an accelerometer). In some embodiments, method 900 is governed by instructions that are stored in a nontransitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

While (902) a user of the computer system (e.g., 700, 750, and/or X700) is participating in a real-time communication session in an augmented reality environment (e.g., in three-dimensional environment 740 and/or 770) in which the user is represented to other participants in the real-time communication session with a three-dimensional avatar (e.g., 1010 as in FIGS. 10A-10H), the computer system (e.g., 700, 750, and/or X700) displays (904), via the one or more display generation components, a self-view representation (e.g., 712 and/or 714) of the avatar of the user of the computer system (e.g., 700, 750, and/or X700) that provides an indication of an appearance of the three-dimensional avatar (e.g., 1010 as in FIGS. 10A-10H) of the user of the computer system (e.g., 700, 750, and/or X700) from a perspective corresponding to one or more other participants (e.g., 710A-710D and/or 760A-760D) in the real-time communication session.

While (902) a user of the computer system (e.g., 700, 750, and/or X700) is participating in a real-time communication session and while displaying the self-view representation of the avatar of the user of the computer system, the computer system (e.g., 700, 750, and/or X700) detects (906), via the one or more input devices, movement of the user of the computer system.

While (902) a user of the computer system (e.g., 700, 750, and/or X700) is participating in a real-time communication session, in response to detecting the movement of the user of the computer system, the computer system (e.g., 700, 750, and/or X700) updates (908) (e.g., changing and/or animating) display, via the one or more display generation components (e.g., 702 and/or 752), of the self-view representation (e.g., 712 and/or 714) of the avatar of the user of the computer system that provides an indication of an appearance of the three-dimensional avatar of the user of the computer system from a perspective corresponding to one or more other participants (e.g., 710A-710D and/or 760A-760D) in the real-time communication session. Updating display of the self-view representation of the avatar of the user in response to detecting movement of the user provides an improved control scheme for managing the view of the three-dimensional avatar and provides the user with visual feedback that the movement of the user has been detected, thereby providing improved visual feedback.

In some embodiments, updating (906) display of the self-view representation (e.g., 712 and/or 714) of the avatar of the user of the computer system that provides an indication of an appearance of the three-dimensional avatar of the user of the computer system from a perspective corresponding to one or more other participants in the real-time communication session includes: in accordance with a determination that the movement of the user of the computer system (e.g., 700, 750, and/or X700) includes a first expression (e.g., a smile, a wink, a frown, a first facial expression, and/or a first movement of facial features of the user of the computer system), the computer system (e.g., 700, 750, and/or X700) updates display of the self-view representation (e.g., 712 and/or 714) of the avatar of the user of the computer system (e.g., 700, 750, and/or X700) based on (e.g., using and/or to reflect) the first expression; and in accordance with a determination that the movement of the user of the computer system (e.g., 700, 750, and/or X700) includes a second expression (e.g., a smile, a wink, a frown, a first facial expression, and/or a first movement of facial features of the user of the computer system) that is different from the first expression, updating display of the self-view representation (e.g., 712 and/or 714) of the avatar of the user of the computer system (e.g., 700, 750, and/or X700) based on (e.g., using and/or to reflect) the second expression. In some embodiments, as the expressions of the user of the computer system changes, the computer system captures the expressions and animates the three-dimensional avatar and the self-view representation of the avatar based on (e.g., to include a representation of) the expressions. Updating the self-view representation of the avatar to have expressions that are based on the user's expressions captured by the computer system provides the user with feedback about what expressions the computer system is capturing and what expressions the other participants in the real-time communication session are seeing, thereby providing an improved control scheme for managing the view of the three-dimensional avatar.

In some embodiments, the avatar of the user of the computer system (e.g., 700, 750, and/or X700) is displayed (e.g., as part of 712 and/or 714) with a background that is simplified as compared to the physical background of the user of the computer system and/or as compared to the background of the augmented reality environment of the avatar. In some embodiments, the simplified background is a background consisting of a solid color. In some embodiments, the simplified background is a background consisting of a color gradient. Displaying the self-view representation of the avatar on a simplified background enables viewers of the self-view representation to better recognize the updates to the self-view representation, thereby providing an improved control scheme for managing the view of the three-dimensional avatar. Further, using a simplified background for the self-view representation of the avatar provides viewers with visual feedback that the representation of the avatar is a self-view and not another avatar, thereby providing an improved control scheme for managing the view of the three-dimensional avatar.

In some embodiments, the avatar of the user of the computer system (e.g., 700, 750, and/or X700) is displayed with a background that does not include elements (e.g., 740A, 740B, 770A, 770B) (e.g., physical elements (e.g., representations of elements from the physical world) and virtual elements) that are behind the three-dimensional avatar in the augmented reality environment (e.g., in the three-dimensional environment 740 and/or 770) in which the user is represented to other participants in the real-time communication session with the three-dimensional avatar. In some embodiments, the computer system forgoes displaying, as part of and/or along with the self-view representations of the avatar, elements that are behind the three-dimensional avatar in the augmented reality environment. Not including elements that are behind the three-dimensional avatar in the augmented reality environment as part of the self-view representation of the avatar enables the computer system to provide the user with a representation of the avatar that the user can more easily examine and provides an improved control scheme for managing the view of the three-dimensional avatar.

In some embodiments, the self-view representation (e.g., 712 and/or 714) of the avatar of the user of the computer system is based on a virtual camera (e.g., 1004 at FIGS. 10A-10H) that is located at a respective location in the augmented reality environment in which the user is represented to other participants in the real-time communication session with the three-dimensional avatar. In some embodiments, the three-dimensional avatar representing the user of the computer system is within a field of view of the virtual camera. In some embodiments, the virtual camera is not visible to participants of the real-time communication session and is not visible in the augmented reality environment. In some embodiments, elements (e.g., physical elements (e.g., representations of elements from the physical world) and/or virtual elements) that are between the virtual camera and the three-dimensional avatar in the augmented reality environment are not included in the self-view representation of the avatar. Displaying the self-view representation of the avatar of the user of the computer system based on a virtual camera that is located at a respective location in the augmented reality environment enables the computer system to provide an accurate representation of the three-dimensional avatar to the user of the computer system and provides an improved control scheme for managing the view of the three-dimensional avatar.

In some embodiments, the respective location in the augmented reality environment is based on a perspective corresponding to representations (e.g., static two-dimensional images and/or animated three-dimensional avatars) of one or more other participants (e.g., 710A-710D and/or 760A-760D) in the real-time communication session. In some embodiments, the respective location is a location in the augmented reality environment at which a representation of an application corresponding to the real-time communication session is displayed. In some embodiments, the self-view representation of the avatar is determined based on a virtual camera located at the respective location (e.g., the first position in a three-dimensional environment that the participant is using to participate in the real-time communication session). In some embodiments, the self-view representation of the avatar (e.g., a three-dimensional avatar) generated by the virtual camera located on the respective position corresponds to the view of the three-dimensional avatar in the real-time communication session that is presented for other participants of the real-time communication session. Displaying the self-view representation of the avatar of the user of the computer system based on a virtual camera that is located at a respective location that is based on a perspective corresponding to representations of one or more other participants in the real-time communication session enables the computer system to provide an accurate representation of the three-dimensional avatar to the user of the computer system from the view of the other participant and provides an improved control scheme for managing the view of the three-dimensional avatar.

In some embodiments, in accordance with a determination that a head of the three-dimensional avatar (and/or a head of the user of the computer system) is turned to a side with respect to the virtual camera, the computer system (e.g., 700, 750, and/or X700) updates (e.g., changing and/or animating) display, via the one or more display generation components (e.g., 702,752, and/or X702), of the self-view representation (e.g., 712 and/or 714) of the avatar of the user of the computer system (e.g., 700, 750, and/or X700) to a view of the side of the head of the three-dimensional avatar (e.g., 714 in FIG. 7B1, FIG. 7B2, and FIG. 10F). In some embodiments, in accordance with a determination that a head of the three-dimensional avatar is facing the virtual camera, the self-view representation of the avatar of the user of the computer system includes a front view the head of the three-dimensional avatar. In some embodiments, the first side of the head is displayed when the avatar turns to the first side and a second side of the head is displayed when the avatar turns to the second side. In some embodiments, movement of the three-dimensional avatar is based on detected movement of the user of the computer system. Displaying a view of the head of the three-dimensional avatar turning provides the user of the computer system (and the participants viewing the representation) with feedback that the avatar has turned away from the location of the virtual camera and provides an improved control scheme for managing the view of the three-dimensional avatar.

In some embodiments, in accordance with a determination that the three-dimensional avatar moves away from the respective location, the computer system (e.g., 700, 750, and/or X700) updates (e.g., changing and/or animating) display, via the one or more display generation components (e.g., 702, 752, and/or X702), of the self-view representation (e.g., 712 and/or 714) of the avatar of the user of the computer system (e.g., 700, 750, and/or X700), including: displaying a view of the three-dimensional avatar moving away from the virtual camera (e.g., as in FIG. 10B) (e.g., the avatar getting smaller and/or more of the avatar being in the field of view of the virtual camera), and subsequent to the view of the three-dimensional avatar moving away from the virtual camera, displaying a view of the virtual camera moving toward the three-dimensional avatar (e.g., the avatar getting larger and/or less of the avatar being in the field of view of the virtual camera) (e.g., as in FIG. 10C and/or 714 at FIG. 7C). Displaying a view of the three-dimensional avatar moving away from the virtual camera provides an improved control scheme for managing the view of the three-dimensional avatar. Displaying a view of the virtual camera moving toward the three-dimensional avatar provides the user of the computer system (and the participants viewing the representation) with a better (e.g., closer and/or more detailed) view of the avatar, thereby providing an improved control scheme for managing the view of the three-dimensional avatar.

In some embodiments, in accordance with a determination that the three-dimensional avatar (and/or a head of the user of the computer system) moves toward the respective location, the computer system (e.g., 700, 750, and/or X700) updates (e.g., changing and/or animating) display, via the one or more display generation components (e.g., 702,752, and/or X702), of the self-view representation (e.g., 712 and/or 714) of the avatar of the user of the computer system (e.g., 700, 750, and/or X700), including: displaying a view of the three-dimensional avatar moving toward the virtual camera (e.g., as in FIG. 10G) (e.g., the avatar getting larger and/or less of the avatar being in the field of view of the virtual camera), and subsequent to the view of the three-dimensional avatar moving toward the virtual camera, displaying a view of (e.g., of the three-dimensional avatar, based on) the virtual camera moving away from the three-dimensional avatar (e.g., as in FIG. 10H) (e.g., the avatar getting smaller and/or more of the avatar being in the field of view of the virtual camera). Displaying a view of the three-dimensional avatar moving toward the virtual camera provides an improved control scheme for managing the view of the three-dimensional avatar. Displaying a view of the virtual camera moving away from the three-dimensional avatar provides the user of the computer system (and the participants viewing the representation) with a better (e.g., wider view) view of the avatar, thereby providing an improved control scheme for managing the view of the three-dimensional avatar.

In some embodiments, in accordance with a determination that a distance between the virtual camera and the three-dimensional avatar is less than a first threshold distance (e.g., a minimum distance), the computer system (e.g., 700, 750, and/or X700) fades out the self-view representation (e.g., 714 at FIG. 7C) of the avatar of the user of the computer system (e.g., 700, 750, and/or X700). In some embodiments, in accordance with a determination that the distance between the virtual camera and the three-dimensional avatar is more than the first threshold distance and, optionally, less than a fourth threshold distance, forgoing fading out the self-view representation of the avatar of the user of the computer system. In some embodiments, while the three-dimensional avatar is within the first threshold distance of the virtual camera, the self-view representation of the avatar is faded out and while the three-dimensional avatar is not within the first threshold distance of the virtual camera, the self-view representation of the avatar is not faded out. In some embodiments, fading or fading out an element/object includes blurring, increasing a translucency, and/or darkening the element/object. Fading out the self-view representation of the avatar of the user of the computer system provides the user with visual feedback that the three-dimensional avatar is too close to the virtual camera, thereby providing an improved control scheme for managing the view of the three-dimensional avatar and providing the user with improved visual feedback.

In some embodiments, fading out the self-view representation (e.g., 714 at FIG. 7C) of the avatar of the user of the computer system in accordance with the determination that the distance between the virtual camera and the three-dimensional avatar is less than the first threshold distance includes: in accordance with a determination that the distance between the virtual camera and the three-dimensional avatar is less than a second threshold distance and more than a third threshold distance, wherein the third threshold distance is less than the second threshold distance, applying a first amount of fading (e.g., blurring such that movements of the user of the computer system are reflected in the self-view representation of the avatar, increasing a translucency, and/or a first amount of darkening) to the self-view representation of the avatar of the user of the computer system; and in accordance with a determination that the distance between the virtual camera and the three-dimensional avatar is less than the third threshold distance, applying a second amount of fading (e.g., such that movements of the user of the computer system are not reflected in the self-view representation of the avatar, further increasing a translucency, and/or a second level of darkening that is more than the first level of darkening) to the self-view representation of the avatar of the user of the computer system that is more than the first amount of fading. Further fading the self-view representation of the avatar of the user of the computer system as the avatar gets closer to the virtual camera provides the user with visual feedback that the user is too close to the virtual camera and is getting closer to the virtual camera, thereby providing an improved control scheme for managing the view of the three-dimensional avatar and providing improved visual feedback.

In some embodiments, in accordance with a determination that a distance between the virtual camera and the three-dimensional avatar is more than a fourth threshold distance, the computer system (e.g., 700, 750, and/or X700) fades out the self-view representation (e.g., 712 and/or 714) of the avatar of the user of the computer system (e.g., 700, 750, and/or X700). In some embodiments, in accordance with a determination that the distance between the virtual camera and the three-dimensional avatar is less than the fourth threshold distance and, optionally, more than the first threshold distance, forgoing fading out the self-view representation of the avatar of the user of the computer system. In some embodiments, while the three-dimensional avatar is outside the fourth threshold distance of the virtual camera, the self-view representation of the avatar is faded out and while the three-dimensional avatar is not outside the fourth threshold distance of the virtual camera, the self-view representation of the avatar is not faded out. Fading out the self-view representation of the avatar of the user of the computer system provides the user with visual feedback that the three-dimensional avatar is too far from the virtual camera, thereby providing an improved control scheme for managing the view of the three-dimensional avatar and providing the user with improved visual feedback.

In some embodiments, fading out the self-view representation (e.g., 712 and/or 714) of the avatar of the user of the computer system in accordance with the determination that the distance between the virtual camera and the three-dimensional avatar is more than the fourth threshold distance includes: in accordance with a determination that the distance between the virtual camera and the three-dimensional avatar is more than a fifth threshold distance and less than a sixth threshold distance, wherein the sixth threshold distance is more than the fifth threshold distance, applying a third amount of fading (e.g., blurring such that movements of the user of the computer system are reflected in the self-view representation of the avatar, increasing a translucency, and/or a first amount of darkening) to the self-view representation (e.g., 712 and/or 714) of the avatar of the user of the computer system; and in accordance with a determination that the distance between the virtual camera and the three-dimensional avatar is more than the sixth threshold distance, applying a fourth amount of fading (e.g., such that movements of the user of the computer system are not reflected in the self-view representation of the avatar, further increasing a translucency, and/or a second level of darkening that is more than the first level of darkening) to the self-view representation (e.g., 712 and/or 714) of the avatar of the user of the computer system that is more than the third amount of fading. Further fading the self-view representation of the avatar of the user of the computer system as the avatar gets further from the virtual camera provides the user with visual feedback that the user is too far from the virtual camera and is getting further from the virtual camera, thereby providing an improved control scheme for managing the view of the three-dimensional avatar and providing improved visual feedback.

In some embodiments, the virtual camera at the respective location is pointing in a first direction. In some embodiments, in accordance with a determination that an angle at the respective location between the first direction and the three-dimensional avatar is more than a first threshold angle, the computer system (e.g., 700, 750, and/or X700) fades out the self-view representation (e.g., 712 and/or 714) of the avatar of the user of the computer system. In some embodiments, in accordance with a determination that the angle at the respective location between the first direction and the three-dimensional avatar is less than the first threshold angle, forgoing fading out the self-view representation of the avatar of the user of the computer system. In some embodiments, while the three-dimensional avatar is offset by more than the first threshold angle from the first direction, the self-view representation of the avatar is faded out and while the three-dimensional avatar is not offset by more than the first threshold angle from the first direction, the self-view representation of the avatar is not faded out. Fading out the self-view representation of the avatar of the user of the computer system provides the user with visual feedback that the three-dimensional avatar is too far offset from the virtual camera, thereby providing an improved control scheme for managing the view of the three-dimensional avatar and providing the user with enhanced visual feedback.

In some embodiments, fading out the self-view representation (e.g., 712 and/or 714) of the avatar of the user of the computer system in accordance with the determination that the angle at the respective location between the first direction and the three-dimensional avatar is more than the first threshold angle includes: in accordance with a determination that the angle at the respective location between the first direction and the three-dimensional avatar is greater than a second threshold angle and less than a third threshold angle, wherein the third threshold angle is greater than the second threshold angle, applying a fifth amount of fading (e.g., blurring such that movements of the user of the computer system are reflected in the self-view representation of the avatar, increasing a translucency, and/or darkening) to the self-view representation (e.g., 712 and/or 714) of the avatar of the user of the computer system; and in accordance with a determination that the angle at the respective location between the first direction and the three-dimensional avatar is greater than the third threshold angle, applying a sixth amount of fading (e.g., such that movements of the user of the computer system are not reflected in the self-view representation of the avatar, further increasing a translucency, and/or a second level of darkening that is more than the first level of darkening) to the self-view representation (e.g., 712 and/or 714) of the avatar of the user of the computer system that is more than the fifth amount of fading. In some embodiments, as the head of the three-dimensional avatar starts to turn, the computer system begins to fad out the self-view representation of the three-dimensional avatar. The further the head of the three-dimensional avatar turns, the more the representation of the self-view representation of the three-dimensional avatar is blurred. Further fading the self-view representation of the avatar of the user of the computer system as the avatar gets further offset from the direction of the virtual camera provides the user with visual feedback that the user is too far offset from the direction of the virtual camera and is getting further offset, thereby providing an improved control scheme for managing the view of the three-dimensional avatar and providing improved visual feedback.

In some embodiments, the computer system (e.g., 700, 750, and/or X700) displays, via the one or more display generation components (e.g., 702, 752, and/or X702) and concurrently with the self-view representation (e.g., 712 and/or 714) of the avatar of the user of the computer system (e.g., 700, 750, and/or X700), representations of a plurality of other participants (e.g., the one or more other participants, less than all other participants, and/or all other participants (not including the user of the computer system)) in the real-time communication session in a grouped arrangement (e.g., 720 and/or 780) in a three-dimensional environment (e.g., 740 and/or 770) of the augmented reality environment.

In some embodiments, displaying the representations of the plurality of other participants in the real-time communication session in the grouped arrangement (e.g., 720 and/or 780) includes displaying the representations of the plurality of other participants facing in substantially the same direction (e.g., the plurality of other participants in the real-time communication session in the grouped arrangement are facing directions that are within a threshold angle of being in the same direction). Having the representations of the plurality of other participants face in substantially the same direction provides the viewer with visual feedback that the representations are part of a grouped arrangement, thereby providing improved feedback.

In some embodiments, the self-view representation (e.g., 712 and/or 714) of the avatar of the user of the computer system (e.g., 700, 750, and/or X700) is displayed as part of the grouped arrangement (e.g., 720 and/or 780) in the three-dimensional environment (e.g., 740 and/or 770). Displaying the self-view representation of the avatar of the user of the computer system as part of the grouped arrangement enables the user to view the representations of the other participants at the same time as the self-view representation, thereby providing an improved control scheme for managing the view of the three-dimensional avatar and providing improved visual feedback.

In some embodiments, while displaying the representations of the plurality of other participants in the real-time communication session in the grouped arrangement (e.g., 720 and/or 780), the computer system (e.g., 700, 750, and/or X700) detects an event (e.g., detecting a participant leave the real-time communication session and/or detect a request to transition to a spatially distributed arrangement). In response to detecting the event: the computer system (e.g., 700, 750, and/or X700)transitions the real-time communication session from displaying the representations of the plurality of other participants in the grouped arrangement (e.g., 720 and/or 780) to displaying the representations of the plurality of other participants in a spatially distributed arrangement (e.g., as in FIG. 7D) and ceases to display the self-view representation (e.g., 712 and/or 714) of the avatar of the user of the computer system. Ceasing to display the self-representation of the avatar provides the user with visual feedback that the computer system has transitioned to displaying the participants in a spatially distributed arrangement. In some embodiments, in response to detecting the event, the representations of the plurality of other participants transition from being grouped together to being in a spatially distributed arrangement (e.g., distributed like people in a room having a conversation). When in the spatially distributed arrangement, those participants optionally have spatial agency and can move their respective representations within the spatially distributed arrangement (e.g., to get closer to or further from another user or virtual object in the three-dimensional environment). In some embodiments, in the spatially distributed arrangement: the representations of the plurality of other participants spaced apart from each other by at least a threshold amount in a first non-vertical direction in the three-dimensional reality environment (e.g., a 3D augmented reality environment); and the representations of the plurality of other participants spaced apart from each other by at least the threshold amount in a second non-vertical direction, different from the first non-vertical direction, in the three-dimensional reality environment. In some embodiments, in the grouped arrangement: the representations of a plurality of the other participants are spaced apart from each other by less than a threshold amount in a first non-vertical direction in the three-dimensional environment; a representation of a first participant in the grouped arrangement has a different position than a representation of the first participant in the spatially distributed arrangement; and a representation of a second participant in the grouped arrangement has a different position than a representation of the second participant in the spatially distributed arrangement.

In some embodiments, while displaying the representations of the plurality of other participants in the real-time communication session in the spatially distributed arrangement (e.g., as in FIG. 7D), the computer system (e.g., 700, 750, and/or X700) detects a second event (e.g., detecting a participant joining the real-time communication session and/or detect a request to transition to the grouped arrangement). In response to detecting the second event, the computer system (e.g., 700, 750, and/or X700) concurrently displays, via the one or more display generation components (e.g., 702, 752, and/or X702): representations of a plurality of other participants in the grouped arrangement (e.g., 720 and/or 780) and the self-view representation (e.g., 712 and/or 714) of the avatar of the user of the computer system (e.g., 700, 750, and/or X700). Re-display the self-representation of the avatar provides the user with visual feedback that the computer system has transitioned to displaying the participants in the grouped arrangement.

In some embodiments, the computer system (e.g., 700, 750, and/or X700) receives user input (e.g., via 708A and/or 708B) corresponding to a request to reposition the grouped arrangement (e.g., 720 and/or 780) of the representations of the plurality of other participants. In response to receiving the user input corresponding to the request to reposition the grouped arrangement of the representations of the plurality of other participants, the computer system (e.g., 700, 750, and/or X700) repositions (e.g., as in the movement of 720 at FIGS. 10A to 10G or 10H) (e.g., moving in unison and/or moving as a group) the grouped arrangement of the representations of the plurality of other participants from a first location in the three-dimensional environment to a second location, different from the first location, in the three-dimensional environment (e.g., 740 and/or 770). Repositioning the grouped arrangement enables the user of the computer system to move the grouped arrangement to a location in the three dimensional environment that best suits the user, thereby improving the man-machine interface.

In some embodiments, the computer system (e.g., 700, 750, and/or X700) receives user input corresponding to a request to change a viewpoint (e.g., of the user of the computer system) in the three-dimensional environment (e.g., 1010 moving in three-dimensional environment 740 in FIGS. 10B, 10D1, 10D2, and/or 10F) from which the grouped arrangement (e.g., 720 and/or 780) of the representations of the plurality of other participants is displayed. In response to receiving user input corresponding to the request to change a viewpoint (e.g., of the user of the computer system) in the three-dimensional environment from which the grouped arrangement of the representations of the plurality of other participants is displayed, the computer system (e.g., 700, 750, and/or X700) updates a viewpoint from which the grouped arrangement (e.g., 720 and/or 780) of the representations of the plurality of other participants is displayed from a first viewpoint in the three-dimensional environment to a second viewpoint, different from the first viewpoint, in the three-dimensional environment (e.g., 740 and/or 770). The viewpoint of the user moving relative to the grouped arrangement of participants (e.g., based on the avatar of the user moving in the three-dimensional environment) enables the user to view different areas in the three-dimensional environment, thereby improving the man-machine interface.

In some embodiments, aspects/operations of methods 800, 900, and 1100 may be interchanged, substituted, and/or added between these methods. For example, the representations of the participants are optionally the same representations of the participants. For another example, the self-view representation of the user is optionally the same as a representation of the participant. For another example, the real-time communication sessions are optionally the same real-time communication session and the three-dimensional environments are optionally the same three-dimensional environments. For brevity, these details are not repeated here.

FIGS. 10A-10H illustrate examples of updating a view (e.g., a self-view) of an avatar in a real-time communication session. FIG. 11 is a flow diagram of an exemplary method 1000 for updating a view of an avatar in a real-time communication session. The user interfaces in FIGS. 10A-10H are used to illustrate the processes described below, including the processes in FIG. 11.

FIG. 10A illustrates representation 720 of a real-time communication session as located in three-dimensional environment 740. Avatar 1010 represents a user, such as first user of first computer system 700. In some embodiments, as illustrated in FIGS. 10A-10H, avatar 1010 is a three-dimensional avatar. First computer system 700 receives user inputs (e.g., voice commands, touch inputs, gaze inputs, and/or gestures, such as air gestures) to manage avatar 1010. For example, first computer system 700 optionally receives user inputs to move avatar 1010 within three-dimensional environment 740. For another example, first computer system 700 optionally receives user inputs (e.g., facial expressions detected by one or more cameras of first computer system) to control the facial expressions of avatar 1010 of the first user.

First computer system 700 places (e.g., in response to detecting that a real-time communication session has started) virtual camera 1004 in three-dimensional environment 740 at a location corresponding to (e.g., at) representation 720 of the real-time communication session. In some embodiments, virtual camera 1004 is not visible to participants of the real-time communication session or other users in three-dimensional environment 740. As virtual camera 1004 and/or avatar 1010 move with respect to each other and/or other objects of three-dimensional environment 740, the view captured by virtual camera 1004 changes. FIGS. 10A-10E2 include self-view representation 714, which illustrates the view that virtual camera 1004 is capturing. In some embodiments, self-view representation 714 is displayed by first computer system 700 to show the first user (in real time) the view of avatar 1010. Line 1008 illustrates a line that intersects representation 720 of the real-time communication session and avatar 1010. As with virtual camera 1004, line 1008 is not a part of the user interface and is not visible to participants of the real-time communication session and/or or users in three-dimensional environment 740. At FIG. 10A, virtual camera 1004 is a first distance from avatar 1010 in three-dimensional environment 740.

At FIG. 10B, first computer system 700 has received user input that caused avatar 1010 to move away from virtual camera 1004 and representation 720 of the real-time communication session. As a result of avatar 1010 moving away from virtual camera 1004, the image of avatar 1010 in representation 714 reduces in size over time (in conjunction with avatar 1010 moving away). After (e.g., in response to detecting that) avatar 1010 has moved away from virtual camera 1004 and representation 720 of the real-time communication session, first computer system 700 moves virtual camera 1004 toward avatar 1010 over a duration of time to cause avatar 1010 in representation 714 to get larger over time, as shown in FIG. 10C. Accordingly, self-view representation 714 (and any other representation based on self-view representation 714, such as representation 760A) provides feedback to the viewer that the first user has stepped back, before first computer system 700 moves virtual camera 1004 such that virtual camera 1004 is the first distance from avatar 1010 in three-dimensional environment 740 (and continues to be pointed at avatar 1010).

At FIG. 10D1, first computer system 700 has received user input that caused avatar 1010 to move the left as compared to virtual camera 1004 and representation 720 of the real-time communication session. As a result of avatar 1010 moving to the left, avatar 1010 in representation 714 moves off to the side of representation 714 over time (in conjunction with avatar 1010 moving to the left). After (e.g., in response to detecting that) avatar 1010 has moved, first computer system 700 moves virtual camera 1004 over a duration of time so that virtual camera 1004 is on line 1008 that intersects representation 720 of the real-time communication session and the avatar 1010 to cause avatar 1010 in representation 714 to become centered, as shown in FIG. 10E1. Accordingly, self-view representation 714 (and any other representation based on self-view representation 714, such as representation 760A) provides feedback to the viewer that the first user has moved to the side, before first computer system 700 moves virtual camera 1004 such that virtual camera 1004 is the first distance from avatar 1010 in three-dimensional environment 740 and pointed at avatar 1010.

In some embodiments, the techniques and user interface(s) described in FIGS. 10D1 and 10E1 are provided by one or more of the devices described in FIGS. 1A-1P. FIGS. 10D2 and 10E2 illustrate an embodiment in which display module X702 of head-mounted device (HMD) X700 provides representation 714. In FIGS. 10D2 and 10E2, display module X702 can provide additional content (e.g., the additional content provided by display 702 of computer system 700 in FIGS. 7A-7E), but FIGS. 10D2 and 10E2 do not illustrate such content to avoid obscuring pertinent aspects of the description. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 10D2, device X700 has received user input that caused avatar 1010 to move the left as compared to virtual camera 1004 and representation 720 of the real-time communication session (e.g., as compared to the position of virtual camera 1004 and representation 720 in FIG. 10C). As a result of avatar 1010 moving to the left, avatar 1010 in representation 714 moves off to the side of representation 714 over time (in conjunction with avatar 1010 moving to the left). After (e.g., in response to detecting that) avatar 1010 has moved, device X700 moves virtual camera 1004 over a duration of time so that virtual camera 1004 is on line 1008 that intersects representation 720 of the real-time communication session and the avatar 1010 to cause avatar 1010 in representation 714 to become centered, as shown in FIG. 10E2. Accordingly, self-view representation 714 (and any other representation based on self-view representation 714, such as representation 760A) provides feedback to the viewer that the first user has moved to the side, before device X700 moves virtual camera 1004 such that virtual camera 1004 is the first distance from avatar 1010 in three-dimensional environment 740 and pointed at avatar 1010.

Any of the features, components, and/or parts, including the arrangements and configurations thereof shown in FIGS.

1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

At FIG. 10F, first computer system 700 has received user input that caused avatar 1010 to move toward virtual camera 1004 and representation 720 of the real-time communication session and to rotate. As a result of avatar 1010 rotating and moving toward virtual camera 1004 and representation 720 of the real-time communication session, avatar 1010 in representation 714 becomes larger over time (in conjunction with avatar 1010 moving forward) and rotates (in conjunction with avatar 1010 rotating). After (e.g., in response to detecting that) avatar 1010 has moved and rotated, first computer system 700 moves virtual camera 1004 backwards over a duration of time such that virtual camera 1004 is the first distance from avatar 1010 in three-dimensional environment 740 and pointed at avatar 1010. Accordingly, self-view representation 714 (and any other representation based on self-view representation 714, such as representation 760A) provides feedback to the viewer that the first user has moved forward and rotated, before first computer system 700 moves virtual camera 1004 such that virtual camera 1004 is the first distance from avatar 1010 in three-dimensional environment 740 and pointed at avatar 1010. For example, self-view representation 714 of FIG. 10F corresponds to self-view representation 714 in FIG. 7B1 and/or FIG. 7B2 and corresponds to representation 760A of the first user in FIG. 7B1.

Returning to FIG. 10A, first computer system 700 receives user input that causes representation 720 of the real-time communication session to move toward avatar 1010, as shown in FIG. 10G. In some embodiments, as shown in FIG. 10G, as representation 720 of the real-time communication session moves, virtual camera 1004 moves in conjunction with representation 720 of the real-time communication session and causes virtual camera 1004 to be less than a threshold distance from avatar 1010. As a result of virtual camera 1004 being within the threshold distance from avatar 1010, self-view representation 714 of the first user begins to fade out. As virtual camera 1004 gets closer to avatar 1010, self-view representation 714 of the first user further fades out, as illustrated in FIG. 10G. Self-view representation 714 at FIG. 10G corresponds to self-view representation 714 at FIG. 7C and representation 760A of the first user at FIG. 7C. In some embodiments, the representation of the respective user fades out when the avatar of the respective user and the virtual camera are too close together or too far apart.

Figure 10H:
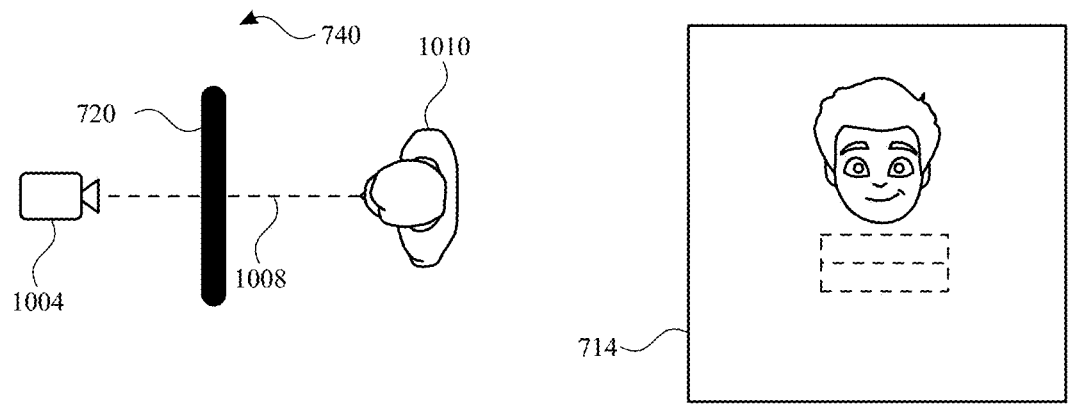

At FIG. 10H, after (e.g., in response to detecting that) representation 720 of the real-time communication session has moved toward avatar 1010, first computer system 700 moves virtual camera 1004 backwards over a duration of time such that virtual camera 1004 is again the first distance from avatar 1010 in three-dimensional environment 740 and pointed at avatar 1010. Accordingly, self-view representation 714 (and any other representation based on self-view representation 714, such as representation 760A) provides feedback to the viewer that the representation 720 of the real-time communication session has moved toward the user, before first computer system 700 moves virtual camera 1004 backwards such that virtual camera 1004 is again the first distance from avatar 1010 in three-dimensional environment 740 and pointed at avatar 1010, as shown in FIG. 10H. For example, self-view representation 714 of FIG. 10H corresponds to self-view representation 714 in FIG. 7E and corresponds to representation 760A of the first user in FIG. 7E.

Returning to FIG. 10A, first computer system 700 receives user input that causes representation 720 of the real-time communication session to move toward avatar 1010, as shown in FIG. 10H. In some embodiments, as shown in FIG. 10H, virtual camera 1004 does not move in conjunction with movement of representation 720 of the real-time communication session. As a result of virtual camera 1004 not moving, self-view representation 714 of the first user remains unchanged. In some embodiments, some objects (e.g., representation 720 of the real-time communication session) in three-dimensional environment 740 do not obstruct the view of virtual camera 1004. In some embodiments, some objects (e.g., flowers 770A and/or couch 740A) in three-dimensional environment 740 do obstruct the view of virtual camera 1004.

Additional descriptions regarding FIGS. 10A-10H are provided below in reference to method 1100 described with respect to FIG. 11.

FIG. 11 is a flow diagram of an exemplary method 1100 for updating a view of an avatar in a real-time communication session, in some embodiments. In some embodiments, method 1100 is performed at a computer system (e.g., computer system 101 in FIG. 1A, 700, X700, and/or 750) (e.g., a smartphone, a tablet, a watch, and/or a head-mounted device) that is in communication with one or more display generation components (e.g., display generation component 120 in FIGS. 1A, 3, and 4) (e.g., a visual output device, a 3D display, and/or a display having at least a portion that is transparent or translucent on which images can be projected (e.g., a see-through display), a projector, a heads-up display, and/or a display controller). In some embodiments, method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

The computer system (e.g., 700, 750, and/or X700) displays (1102), via the one or more display generation components (e.g., 702, 752, and/or X702), a view (e.g., 714) of a three-dimensional avatar (e.g., 1010), in a real-time communication session (e.g., a physical environment or a virtual environment), that corresponds to a participant (e.g., a local participant (a user of the computer system) or a remote participant (a user of a remote computer system)) in the real-time communication session. The view (e.g., 714) of the three-dimensional avatar (e.g., 1010) is determined based on a virtual camera (e.g., 1004) located at a first position in a three-dimensional environment (e.g., 740) that the participant is using to participate in the real-time communication session (e.g., the avatar represents the local participant or a remote participant, the avatar has an appearance that resembles the participant, and/or the avatar moves in response to movements of the user that corresponds to the participant).

While displaying the view of the three-dimensional avatar in the real-time communication session, a change in a viewpoint of the participant (e.g., the viewpoint of the user changing based on movement of the user (corresponding to the participant) in the physical space, based on the position of the avatar in the three-dimensional space changing, and/or based on the representation of the real time communication session moving) relative to a representation (e.g., 720) of the real-time communication session occurs (1104) in the three-dimensional environment (e.g., 740) that the participant is using to participate in the real-time communication session (e.g., a real-time display of one or more participants (e.g., one or more report participants) of the real-time communication session and/or a displayed user interface of the real-time communication session).

In response to the occurrence of the change in the viewpoint of the participant relative to the representation (e.g., 720) of the real-time communication session in the three-dimensional environment (e.g., 740) that the participant is using to participate in the real-time communication session, the computer system (e.g., 700, X700, and/or 750) updates (1106) the view (e.g., 714) of the three-dimensional avatar (e.g., 1010) in the real-time communication session, wherein the view (e.g., 714) of the three-dimensional avatar (e.g., 1010) is determined based on a virtual camera (e.g., 1004) located at a second position in a three-dimensional environment (e.g., 740) that the participant is using to participate in the real-time communication session, wherein the second position is based on the change (e.g., the magnitude of change, the distance of change, and/or the direction of change) in the viewpoint of the participant relative to the representation (e.g., 720) of the real-time communication session in the three-dimensional environment (e.g., 740) that the participant is using to participate in the real-time communication session. Moving a virtual camera in a three-dimensional environment based on a change in the viewpoint of a participant (e.g., the user of the computer system) in the three-dimensional environment enables the computer system to take into account the movements of the participant and the representation of the real-time communication session to provide an improved control scheme for managing the view of the three-dimensional avatar, such as to keep the avatar representation of the participant in a field of view of the virtual camera.

In some embodiments, the first position (and/or second position) of the virtual camera (e.g., 1004 at FIG. 10A) in the three-dimensional environment (e.g., 740) that the participant is using to participate in the real-time communication session is determined based on a location of (e.g., corresponding to a location of and/or using a location of) a representation (e.g., 720) of the real-time communication session in the three-dimensional environment (e.g., 740) that the participant is using to participate in the real-time communication session. In some embodiments, the first position of the virtual camera is at the location of the representation of the real-time communication session. In some embodiments, when the participant joins the real-time communication session, the virtual camera is located at the location of the representation of the real-time communication session and then the camera moves in response to the occurrence of the change in the viewpoint of the participant relative to the representation of the real-time communication session in the three-dimensional environment that the participant is using to participate in the real-time communication session. Placing the virtual camera in the three-dimensional environment at location based on the location of the real-time communication session enables the computer system to take into consideration the location of the representation of the real-time communication (where the user will likely be looking) when placing the virtual camera to provide an improved control scheme for managing the view of the three-dimensional avatar.

In some embodiments, the first position (and/or second position) of the virtual camera (e.g., 1004) in the three-dimensional environment (e.g., 740) that the participant is using to participate in the real-time communication session is determined based on a viewpoint (e.g., a location of the viewpoint) of the participant in the three-dimensional environment (e.g., 740) that the participant is using to participate in the real-time communication session. In some embodiments, the virtual camera moves within the three-dimensional environment to track the movement of the participant in the three-dimensional environment. In some embodiments, the virtual camera moves such that the distance between the virtual camera and the viewpoint of the participant in the three-dimensional environment reaches a respective distance (the same respective distance). Placing the virtual camera in the three-dimensional environment at location based on the location of the viewpoint of the participants enables the computer system to take into consideration the location of the participant of the real-time communication when placing the virtual camera to provide an improved control scheme for managing the view of the three-dimensional avatar.

In some embodiments, the virtual camera (e.g., 1004) moves (e.g., toward the participant and/or away from the participant) on a line (e.g., 1008) that intersects (e.g., on a line that is between) the representation (e.g., 720) of the real-time communication session and the viewpoint (e.g., of 1010) of the participant in the three-dimensional environment (e.g., 740). In some embodiments, the representation of the real-time communication session includes a representation (e.g., an avatar and/or an image) of a second participant (e.g., different from the participant) in the real-time communication session and the virtual camera moves on/along a line that intersects (or is based on a position of) the representation of the second participant (e.g., that intersects a head and/or eyes of the representation of the second participant in the three-dimensional environment, is based on the position of the head and/or eyes of the representation of the second participant in the three-dimensional environment, and/or is based on or at a height in the three-dimensional environment corresponding to the height of the head and/or eyes of the representation of the second participant). Moving the camera along a line that intersects the representation of the real-time communication session and the location of the viewpoint of the participant enables the virtual camera to provide a field-of-view that corresponds to a field-of-view that the representations of the other participants of the real-time communication session displayed in the representation of the real-time communication session use to look at the participant.

In some embodiments, the virtual camera (e.g., 1004) moves within the three-dimensional environment (e.g., 740) (e.g., on the line that intersects the representation of the real-time communication session and the viewpoint of the participant) so that the distance between the virtual camera (e.g., 1004) and the viewpoint (e.g., of 1010) of the participant in the three-dimensional environment reaches a respective distance (e.g., to maintain a fixed distance or substantially fixed distance with less than a threshold amount of variation between the virtual camera and the viewpoint of the participant). Moving the camera within the three-dimensional environment such that the virtual camera is a respective distance from the viewpoint of the participant enables the computer system to revert to the respective distance, thereby achieving a similar field-of-view, regardless of the participant's movements, providing an improved control scheme for managing the view of the three-dimensional avatar.

In some embodiments, the change in the viewpoint (e.g., of 1010) of the participant relative to the representation (e.g., 720) of the real-time communication session is based on movement of the viewpoint (e.g., of 1010) of the participant (e.g., the participant moving forward, backward, left, and/or right) in the three-dimensional environment (e.g., 740) (e.g., the avatar 1010 of the user moves in three-dimensional environment 740). Moving a virtual camera that is used to generate the view of the three-dimensional avatar when the viewpoint of the participant changes enables the computer system to take into account the movements of the participant, such as to keep the participant in a field of view of the virtual camera, to provide an improved control scheme for managing the view of the three-dimensional avatar.

In some embodiments, the change in the viewpoint (e.g., of 1010) of the participant relative to the representation (e.g., 720) of the real-time communication session is based on movement of the representation (e.g., 720) of the real-time communication session (e.g., the representation of the real-time communication session moving forward, backward, left, and/or right) in the three-dimensional environment (e.g., 740) (e.g., representation (e.g., 720) of the real-time communication session moves in three-dimensional environment 740 as in FIG. 10G). Moving the virtual camera that is used to generate the view of the three-dimensional avatar when the representation of the real-time communication session moves enables the computer system to take into account the movements of the representation of the real-time communication session, such as to keep the participant in a field of view of the virtual camera from the direction of the representation of the real-time communication session, to provide an improved control scheme for managing the view of the three-dimensional avatar.

In some embodiments, the change in the viewpoint (e.g., of 1010) of the participant relative to the representation (e.g., 720) of the real-time communication session is based on recentering representations of applications (e.g., including the representation of the real-time communication session and/or including a representation of an application that is different from the real-time communication session) in the three-dimensional environment (e.g., 740). In some embodiments, the representations of applications are automatically recentered when a set of one or more recentering conditions is met. In some embodiments, a first condition of the one or more recentering conditions is met when a field of view of the user does not include the representation of the real-time communication session (e.g., for a threshold period of time). In some embodiments, the representations of applications are recentered in response to a request provided at the computer system by the user of the computer system. Moving the virtual camera that is used to generate the view of the three-dimensional avatar based on recentering representations of applications enables the computer system to take into account the movements of the representation of the real-time communication session, such as to keep the participant in a field of view of the virtual camera from the direction of the representation of the real-time communication session, to provide an improved control scheme for managing the view of the three-dimensional avatar.

In some embodiments, in accordance with a determination that the change in the viewpoint (e.g., of 1010) of the participant relative to the representation (e.g., 720) of the real-time communication session that occurs in the three-dimensional environment (e.g., 740) that the participant is using to participate in the real-time communication session is movement of the participant (e.g., 1010) away from the representation (e.g., 720) of the real-time communication session, the movement of the virtual camera (e.g., 1004) from the first position to the second position in the three-dimensional environment (e.g., 740) that the participant is using to participate in the real-time communication session is movement of the virtual camera (e.g., 1004) toward the viewpoint (e.g., of 1010) of the participant. In some embodiments, the participant moves away from the representation of the real-time communication session (e.g., where the virtual camera is located) and, in response (optionally after the participant has started to move), the virtual camera moves toward the participant. Moving the virtual camera toward the viewpoint of the participant when the participant has moved the viewpoint away from the virtual camera provides participants with feedback that the avatar has moved away from the location of the virtual camera and provides an improved control scheme for managing the view of the three-dimensional avatar. Displaying a view of the virtual camera moving toward the avatar provides the participants with a better (e.g., closer) view of the avatar and provides an improved control scheme for managing the view of the three-dimensional avatar.

In some embodiments, in accordance with a determination that the change in the viewpoint (e.g., of 1010) of the participant relative to the representation (e.g., 720) of the real-time communication session that occurs in the three-dimensional environment (e.g., 740) that the participant is using to participate in the real-time communication session is movement of the participant (e.g., 1010) toward the representation (e.g., 720) of the real-time communication session, the movement of the virtual camera (e.g., 1004) from the first position to the second position in the three-dimensional environment (e.g., 740) that the participant is using to participate in the real-time communication session is movement of the virtual camera (e.g., 1004) away from the viewpoint of the participant (e.g., as in FIG. 10H). In some embodiments, the participant moves toward the representation of the real-time communication session (e.g., where the virtual camera is located) and, in response (optionally after the participant has started to move), the virtual camera moves away from the participant. Moving the virtual camera away from the viewpoint of the participants provides an improved control scheme for managing the view of the three-dimensional avatar and provides the participants with feedback that the avatar has moved toward the location of the virtual camera. Displaying a view of the virtual camera moving away from the avatar provides an improved control scheme for managing the view of the three-dimensional avatar and provides the participants with a better (e.g., wider view) view of the avatar.

In some embodiments, updating the view (e.g., 714) of the three-dimensional avatar (e.g., 1010) in the real-time communication session as the virtual camera (e.g., 1004) moves from the first position to the second position includes animating a change in the view (e.g., 714) of the three-dimensional avatar (e.g., 1010) over a period of time (e.g., the movement of the virtual camera from the first position to the second position in the three-dimensional environment that the participant is using to participate in the real-time communication session is movement over a period of time). In some embodiments, as the virtual camera moves towards the viewpoint of the participant, the view of the three-dimensional avatar includes an animation where the three-dimensional avatar increases in size as the virtual camera moves toward the viewpoint of the participant. In some embodiments, as the virtual camera moves away from the viewpoint of the participant, the view of the three-dimensional avatar includes an animation where the three-dimensional avatar decreases in size as the virtual camera moves away to the viewpoint of the participant. Animating the movement of the virtual camera over time provides an improved control scheme for managing the view of the three-dimensional avatar and provides the participants with visual feedback about the direction of the movement of the virtual camera, thereby indicating the direction that the participant has previously moved.

In some embodiments, animating the change in the view (e.g., 714) of the three-dimensional avatar (e.g., 1010) over the period of time includes: in accordance with a determination that the change in the viewpoint (e.g., of 1010) of the participant relative to the representation (e.g., 720) of the real-time communication session that occurs in the three-dimensional environment (e.g., 740) that the participant is using to participate in the real-time communication session is movement of the participant (e.g., 1010) in the three-dimensional environment (e.g., 740) away from or toward the representation (e.g., 720) of the real-time communication session, the computer system (e.g., 700 and/or 750) animates a first change over the period of time and in accordance with a determination that the change in the viewpoint (e.g., of 1010) of the participant relative to the representation (e.g., 720) of the real-time communication session that occurs in the three-dimensional environment (e.g., 740) that the participant is using to participate in the real-time communication session is movement of the representation of the real-time communication session away from or toward the participant (e.g., 1010) in the three-dimensional environment (e.g., 740), the computer system (e.g., 700 and/or 750) animates a second change over the period of time that is different from the first change. In some embodiments, the movement of the first change is performed at a speed that is different from the speed of movement of the second change. In some embodiments, the first change includes different ramp up and/or ramp down speeds as compared to the second change. In some embodiments, the first change uses a path of movement that is different from the second change. Displaying different animations based on whether the representation of the real-time communication session moved or the avatar of the participant moved (and therefore the viewpoint of the participant) provides an improved control scheme for managing the view of the three-dimensional avatar and provides the participants with visual feedback about which of the two elements moved in the three-dimensional environment.

In some embodiments, animating the change in the view (e.g., 714) of the three-dimensional avatar (e.g., 1010) over the period of time includes: in accordance with a determination that the change in the viewpoint (e.g., of 1010) of the participant relative to the representation (e.g., 720) of the real-time communication session that occurs in the three-dimensional environment (e.g., 740) that the participant is using to participate in the real-time communication session is lateral movement of the participant (e.g., 1010) in the three-dimensional environment (e.g., 740), the computer system (e.g., 700, X700, and/or 750) animates a third change over the period of time and in accordance with a determination that the change in the viewpoint (e.g., of 1010) of the participant relative to the representation (e.g., 720) of the real-time communication session that occurs in the three-dimensional environment (e.g., 740) that the participant is using to participate in the real-time communication session is lateral movement of the representation (e.g., 720) of the real-time communication session, the computer system (e.g., 700, X700, and/or 750) animates the third change over the period of time. Animating the same change over time for lateral movement, regardless of whether the representation of the real-time communication session moved or the viewpoint of the participant moved provides an improved control scheme for managing the view of the three-dimensional avatar and provides the user with feedback that there was lateral movement.

In some embodiments, the period of time is a substantially fixed amount of time (e.g., 0.1, 0.2, 0.5, 1, 2, 3, 5, and/or 10 seconds). In some embodiments, an amount of time is substantially fixed when the amount of time does not deviate (more or less) by more than a threshold amount of time. In some embodiments, the movement of the virtual camera occurs over a substantially fixed amount of time such that movement over a shorter distance occurs at a slower rate as compared to movement over a longer distance. Completing the animation in a substantially fixed amount of time enables the computer system to reach the respective distance between the virtual camera and the viewpoint of the participant in substantially the same amount of time, regardless of whether the distance is long or short, thereby providing an improved control scheme for managing the view of the three-dimensional avatar and improving the man-machine interface.

In some embodiments, updating the view (e.g., 714) of the three-dimensional avatar in the real-time communication session is initiated after a respective delay (e.g., non-zero delay, predetermined delay, and/or calculated delay) after the occurrence of the change in the viewpoint (e.g., of 1010) of the participant relative to the representation of the real-time communication session in the three-dimensional environment (e.g., 740) that the participant is using to participate in the real-time communication session (e.g., as in FIGS. 10A-10C). In some embodiments, the participant moves in the three-dimensional environment and, after the respective delay, the virtual camera moves to update the view of the three-dimensional avatar. Updating the view of the three-dimensional avatar after a respective delay provides an improved control scheme for managing the view of the three-dimensional avatar and enables the computer system to provide the user with visual feedback that the participant has moved with respective to the representation of the real-time communication session.

In some embodiments, while displaying the view (e.g., 714) of the three-dimensional avatar in the real-time communication session based on the virtual camera (e.g., 1004) being located at a third position in the three-dimensional environment (e.g., 740) that the participant is using to participate in the real-time communication session, a rotation of the viewpoint (e.g., rotation in a clockwise direction or a rotation in a counter-clockwise direction) of the participant (e.g., as shown in FIG. 10F) relative to the representation of the real-time communication session occurs in the three-dimensional environment (e.g., 740) that the participant is using to participate in the real-time communication session. In response to the occurrence of the rotation in the viewpoint (e.g., of 1010) of the participant relative to the representation (e.g., 720) of the real-time communication session (e.g., as in FIG. 10F) in the three-dimensional environment that the participant is using to participate in the real-time communication session, the computer system (e.g., 700, X700, and/or 750) updates the view (e.g., 714) of the three-dimensional avatar (e.g., 1010) in the real-time communication session based on the virtual camera (e.g., 1004) being located at the third position in the three-dimensional environment (e.g., 740) that the participant is using to participate in the real-time communication session. In some embodiments, when the participant in the real-time communication session rotates without traversing the three-dimensional environment, the position of the virtual camera does not change based on the rotation. Maintaining a position of the virtual camera when the viewpoint of the avatar of the participant (and therefore the viewpoint of the participant) rotates provides an improved control scheme for managing the view of the three-dimensional avatar and enables the participants to recognize that the avatar of the participant has rotated.

In some embodiments, updating the view (e.g., 714) of the three-dimensional avatar (e.g., 1010) in the real-time communication session based on the virtual camera (e.g., 1004) being located at the third position includes: in accordance with a determination that the viewpoint (e.g., of 1010) of the participant is toward (e.g., as in FIGS. 10A-10C and 10E1-10E2) the representation (e.g., 720) of the real-time communication session (e.g., the participant is facing the representation of the real-time communication session), the view (e.g., 714) of the three-dimensional avatar (e.g., 1010) in the real-time communication session is a front view (e.g., as in FIGS. 10A-10C and 10E1-10E2) of the three-dimensional avatar (e.g., 1010) and in accordance with a determination that the viewpoint (e.g., of 1010) of the participant is not toward the representation (e.g., as in FIG. 10F) of the real-time communication session (e.g., the participant is not facing the representation of the real-time communication session and/or the participant is facing to the side relative to the representation of the real-time communication session), the view (e.g., 714) of the three-dimensional avatar (e.g., 1010) in the real-time communication session is not a front view of the three-dimensional avatar (e.g., 1010) (e.g., is a side view of the three-dimensional avatar) (e.g., as in FIG. 10F). Displaying a view of the three-dimensional avatar that reflects the direction of the viewpoint of the participant provides an improved control scheme for managing the view of the three-dimensional avatar and provides participants with feedback about the direction the viewpoint is facing.

In some embodiments, in accordance with a determination that the change in the viewpoint (e.g., of 1010) of the participant relative to the representation (e.g., 720) of the real-time communication session that occurs in the three-dimensional environment (e.g., 740) that the participant is using to participate in the real-time communication session is movement of the viewpoint (e.g., of 1010) of the participant away from or toward the representation of the real-time communication session (e.g., as in FIG. 10B), the movement of the virtual camera (e.g., 1004) from the first position to the second position in the three-dimensional environment (e.g., 740) that the participant is using to participate in the real-time communication session is movement of the virtual camera (e.g., 740) away from or toward the viewpoint (e.g., of 1010) of the participant. In some embodiments, when the participant moves away from or toward the stationary representation of the real-time communication session, the virtual camera moves away from or toward the participant. In some embodiments, in accordance with a determination that a second change in the viewpoint (e.g., of 1010) of the participant relative to the representation (e.g., 720) of the real-time communication session that occurs in the three-dimensional environment (e.g., 740) that the participant is using to participate in the real-time communication session is movement of the representation (e.g., 720) of the real-time communication session away from or toward the viewpoint (e.g., of 1010) of the participant (e.g., as in FIG. 10H), the location of the virtual camera (e.g., 1004) is maintained (e.g., as in FIG. 10H) in the three-dimensional environment (e.g., 740) that the participant is using to participate in the real-time communication session. In some embodiments, when the representation of the real-time communication session moves away from or toward the stationary viewpoint of the participant, the position of the virtual camera does not change. Moving the virtual camera based on movement of the viewpoint of the participant and not moving the camera based on movement of the representation of the real-time communication session enables participants to differentiate between movement of the viewpoint of the participant and movement of the representation of the real-time communication session, thereby providing an improved control scheme for managing the view of the three-dimensional avatar.

In some embodiments, in accordance with a determination that a change in the viewpoint (e.g., of 1010) of the participant relative to the representation (e.g., 720) of the real-time communication session that occurs in the three-dimensional environment (e.g., 740) that the participant is using to participate in the real-time communication session is lateral movement (e.g., as in FIG. 10D1 and/or FIG. 10D2) of the viewpoint of the participant relative to the representation of the real-time communication session (e.g., viewpoint of the participant moves in the three-dimensional environment and the representation of the real-time communication session does not move), the view (e.g., 714) of the three-dimensional avatar (e.g., 1010) is updated based on movement of the virtual camera (e.g., 1004) (as in FIG. 10E1 and/or FIG. 10E2). In some embodiments, in accordance with a determination that a change in the viewpoint (e.g., of 1010) of the participant relative to the representation (e.g., 720) of the real-time communication session that occurs in the three-dimensional environment (e.g., 740) that the participant is using to participate in the real-time communication session is lateral movement of the representation (e.g., 720) of the real-time communication session relative to the viewpoint of the participant (e.g., viewpoint of the participant does not move in the three-dimensional environment and the representation of the real-time communication session does move), the location of the virtual camera (e.g., 1004) is maintained in the three-dimensional environment (e.g., 740) that the participant is using to participate in the real-time communication session. In some embodiments, when the representation of the real-time communication session moves away from or toward the viewpoint of the participant, the position of the virtual camera does not change. Updating the view of the three-dimensional avatar based on lateral movement of the viewpoint of the participant and lateral movement of the representation of the real-time communication session enables participants to recognize whether the viewpoint of the participant is moving laterally relative to the representation of the real-time communication session, thereby providing an improved control scheme for managing the view of the three-dimensional avatar.

In some embodiments, the representation (e.g., 720) of the real-time communication session includes a representation (e.g., 710A-710D, as shown in FIG. 7A) (e.g., an avatar and/or an image) of a second participant (e.g., different from the participant) in the real-time communication session. The first position of the virtual camera in the three-dimensional environment (e.g., 740) that the participant is using to participate in the real-time communication session is based on the position of the representation (e.g., 710A-710D, as shown in FIG. 7A) of the second participant (e.g., based on the position of the head and/or eyes of the representation of the second participant in the three-dimensional environment, at the position of the head and/or eyes of the representation of the second participant in the three-dimensional environment, and/or at a height in the three-dimensional environment corresponding to the height of the head and/or eyes of the representation of the second participant). In some embodiments, the second position of the virtual camera in the three-dimensional environment that the participant is using to participate in the real-time communication session is based on the position of the representation of the second participant (e.g., based on the position of the head and/or eyes of the representation of the second participant in the three-dimensional environment and/or at a height in the three-dimensional environment corresponding to the height of the head and/or eyes of the representation of the second participant in the three-dimensional environment). In some embodiments, as the representation of the real-time communication session moves in the three-dimensional environment, the virtual camera also moves to remain or return to the position of the representation of the second participant (e.g., to the position of the head and/or eyes of the representation of the second participant in the three-dimensional environment). In some embodiments, the second participants moves (e.g., shifts left or right) to a new position within the representation of the real-time communication session and, in response to detecting that the second participant has moved to the new position within the representation of the real-time communication session, the computer system moves the virtual camera (to the new position or based on the new position) within the representation of the real-time communication session (e.g., to the new position of the head and/or eyes of the second participant in the three-dimensional environment). In some embodiments, the direction that the virtual camera is facing is not based on a direction that the representation of the second participant is looking in the three-dimensional environment. In some embodiments, the direction that the virtual camera is facing is based on a direction that the representation of the second participant is looking in the three-dimensional environment.

In some embodiments, the representation of the real-time communication session includes a representation (e.g., an avatar and/or an image) of a second participant (e.g., different from the participant) in the real-time communication session and the computer system places the virtual camera at a respective position, including: in accordance with a determination that a second participant in the real-time communication session is at a fourth position (e.g., the position of the head and/or eyes of the second participant) in the three-dimensional environment, the respective position is the fourth position and in accordance with a determination that the second participant in the real-time communication session is at a fifth position (e.g., the position of the head and/or eyes of the second participant) in the three-dimensional environment that is different from the fourth position, the respective position is the fifth position. Placing the virtual camera at a location based on the location of the representation of the second participant enables the second participant to know whether the participant (e.g., who is viewing the representation of the real-time communication session and who is optionally wearing a HMD) is making eye contact or is not making eye contact (e.g., because when the participant is making eye contact with the second participant, the participant will be looking at the location of the virtual camera which is based on or at the location of the second participant's eyes). In addition, placing the virtual camera at a location based on the location of the representation of the second participant allows the second participant (who is represented in the representation of the real-time communication session) to control the camera position that determines an appearance of the first participant (e.g., the user who is viewing the representation of the real-time communication session) from the perspective of the second participant (e.g., the user who is represented in the representation of the real-time communication session).

In some embodiments, aspects/operations of methods 800, 900, and 1100 may be interchanged, substituted, and/or added between these methods. For example, the representations of the participants are optionally the same representation. For another example, the self-view representation of the user is optionally the same as a representation of the participant. For another example, the real-time communication sessions are optionally the same real-time communication session and the three-dimensional environments are optionally the same three-dimensional environments. For brevity, these details are not repeated here.

FIGS. 12A-12F illustrate examples of displaying a representation of a participant in a real-time communication session, in some embodiments. FIG. 13 is a flow diagram of exemplary method 1300 for displaying a representation of a participant in a real-time communication session. The user interfaces in FIGS. 12A-12F are used to illustrate the processes described above and below, including the process in FIG. 13.

Figures 12A, 12B:
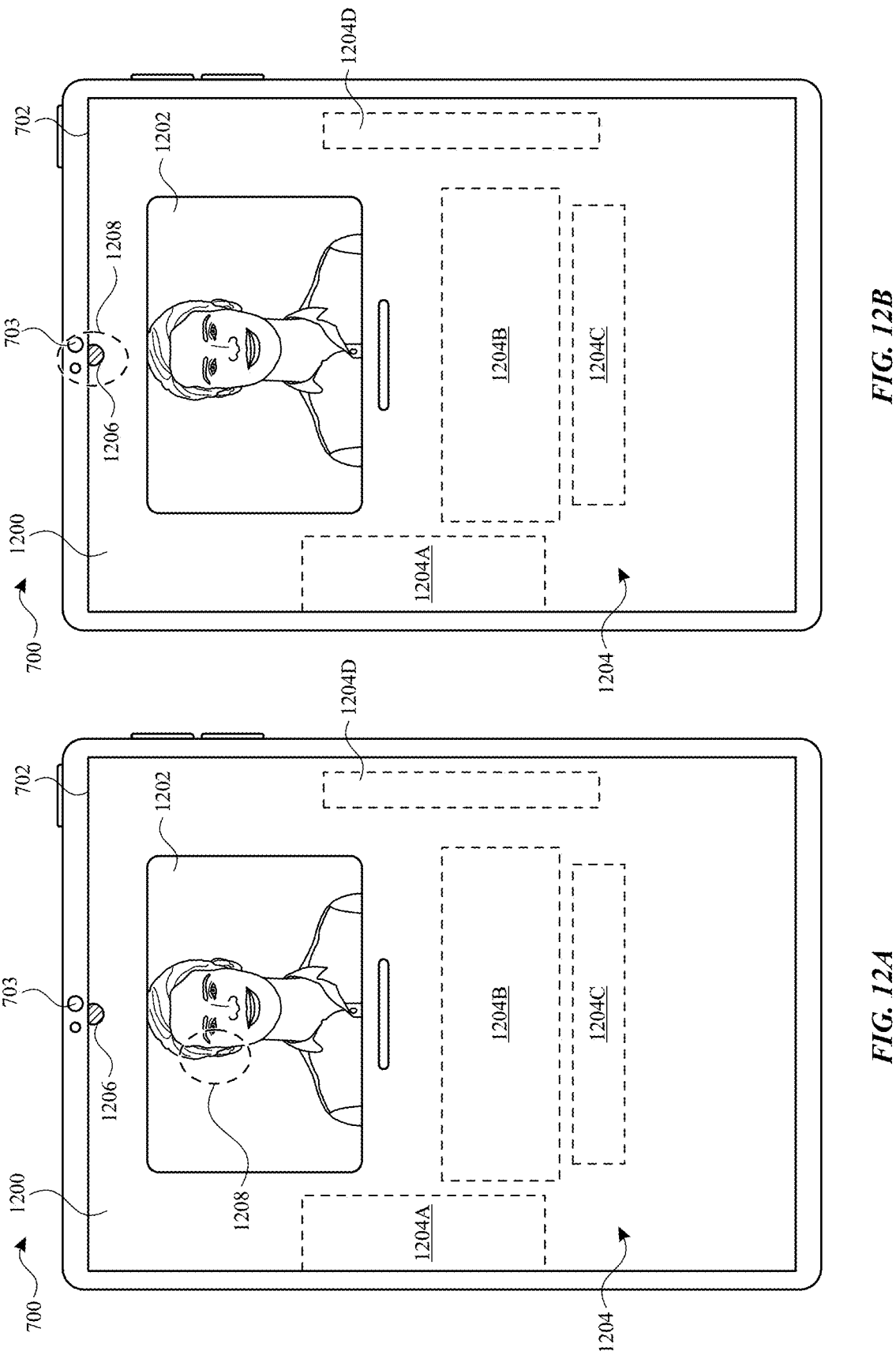

FIG. 12A illustrates computer system 700 with a display generation component (e.g., display 702). Although FIGS. 12A-12F illustrate techniques using computer system 700 that is a tablet, the techniques are optionally also applicable to head-mounted devices. In some embodiments, where computer system 700 is a head-mounted device, computer system 700 optionally includes two displays (one for each eye of the user), with each display displaying respective various content, to enable the user to perceive the various depths of the various content (e.g., physical objects and/or virtual objects) of a three-dimensional environment.

In some embodiments, computer system 700 is configured to present virtual objects on one or more transparent or translucent displays (e.g., 702), so that a person using computer system 700 perceives virtual objects superimposed over the physical environment (e.g., three-dimensional environment 1204). In some embodiments, computer system 700 is configured to use pass-through video, meaning one or more camera or image sensors capture images of the physical environment, and use those images in presenting an AR environment on an opaque display (e.g., 702). In some embodiments, computer system 700 is configured to present virtual objects within a virtual environment.

In some embodiments, three-dimensional environment 1204 includes physical objects (e.g., objects 1204A-1204D). In some embodiments, three-dimensional environment 1204 is a virtual environment that includes virtual objects (e.g., objects 1204A-1204D). In some embodiments, three-dimensional environment 1204 is an augmented reality environment that includes both virtual objects and physical objects.

At FIG. 12A, the user of computer system 700 is participating in a real-time communication session with a second participant. Computer system 700 provides audio output (e.g., via speakers and/or headphones of and/or in communication with computer system 700) of audio received from the second participant's computer system. Computer system 700 displays user interface 1200 corresponding to the real-time communication session, which includes representation 1202 corresponding to the second participant overlaid on three-dimensional environment 1204. In some embodiments, representation 1202 is a video stream that depicts content captured by one or more cameras of the second participant's computer system. In some embodiments, representation 1202 is an avatar of the second participant. In some embodiments, the avatar of the second participant moves based on movements by the second participant (e.g., as captured by one or more sensors and/or cameras of the second participant's computer system).

User interface 1200 also includes object 1206 displayed above representation 1202. In some embodiments, object 1206 provides the user of computer system 700 with an indication of whether and/or when content is being transmitted into the real-time communication session by computer system 700. For example, in some embodiments, object 1206 is displayed in a first manner (e.g., a first color, size, and/or shape) when content (e.g., video content and/or audio content) is being transmitted into the real-time communication session by computer system 700 and a second manner (e.g., a second color, size, and/or shape) when content is not being transmitted into the real-time communication session by computer system 700 (e.g., the user has muted their microphone and/or turned off their video camera). In some embodiments, object 1206 is displayed in a third manner (e.g., a third color, size, and/or shape) when content of a first type (e.g., video and audio content) is being transmitted and a fourth manner (e.g., a fourth color, size, and/or shape) when content of a second type (e.g., only audio content) is being transmitted. As will be described in greater detail below, in some embodiments, object 1206 corresponds to a self-view representation of the user of computer system 700, and the user is able to interact with object 1206 in order to view a self-view representation.

At FIG. 12A, computer system 700 detects (e.g., via one or more sensors 703 (e.g., one or more cameras, one or more eye trackers (e.g., eye trackers 130A and/or 130B) and/or one or more gaze trackers)) that the user is looking at representation 1202, as represented by gaze indication 1208. At FIG. 12B, in response to detecting that the user is looking at representation 1202 in FIG. 12A (and therefore not looking at object 1206), computer system 700 does not replace display of object 1206 with a self-view representation (e.g., self-view representation 1210). At FIG. 12B, computer system 700 detects that the user is now looking at object 1206, as shown by gaze indication 1208 in FIG. 12B.

At FIG. 12C1, in response to detecting that the user is looking at object 1206, computer system 700 replaces display of object 1206 with self-view representation 1210. Similar to self-view representations 712, 714 described above with reference to FIGS. 7A-7E, self-view representation 1210 provides the user of computer system 700 with feedback about the appearance of the user (and/or the user's avatar) as the user's appearance is presented to other participants of the real-time communication session. For example, self-view representation 1210 shows the same content that is being transmitted to and/or displayed by the second participant's computer system. In some embodiments, the features of self-view representation 1210 described herein can also be applied to self-view representations 712 and 714 described above and the features described herein with reference to FIGS. 12A-12F can also be applied to the real-time communication sessions described above in FIGS. 7A-7E and 10A-10H. For example, in some embodiments, self-view representations 712, 714 in FIGS. 7A-7E are not displayed until the user looks at a particular region within the real-time communication session user interface and/or looks at a particular object (e.g., object 1206) within the real-time communication session user interface.

In some embodiments, object 1206 and/or self-view representation 1210 are displayed at a position in user interface 1200 that corresponds to a viewpoint from which the user of computer system 700 is being depicted within the real-time communication session. For example, in some embodiments, object 1206 and/or self-view representation 1210 are displayed at the top of user interface 1200 because the user is being recorded by a camera (e.g., camera 703) that is positioned proximate that location. In some embodiments, object 1206 and/or self-view representation 1210 are displayed at a location in user interface 1200 that corresponds to the viewpoint of a virtual camera that is recording and/or capturing the user and/or an avatar of the user.

It can be seen that in the embodiment shown in FIG. 12C1, self-view representation 1210 partially overlaps representation 1202 of the second participant. In some embodiments, at least a portion of representation 1202 is visually modified (e.g., dimmed, desaturated, made less bright, and/or made darker) while self-view representation 1210 is displayed. For example, in FIG. 12C1, a top portion of representation 1202 is dimmed while self-view representation 1210 is displayed (as represented by hatching lines at the top of representation 1202), while a bottom portion of representation 1202 is not visually modified (e.g., is not dimmed, is not desaturated, is not made less bright, and/or is not made darker).

In some embodiments, while the user maintains his or her gaze on self-view representation 1210, computer system 700 continues to display self-view representation 1210. In some embodiments, when computer system 700 detects that the user has stopped looking at self-view representation 1210 and/or has stopped looking at self-view representation 1210 for greater than a threshold duration of time (e.g., a non-zero duration, 0.1 seconds, 0.5 seconds, or 2 seconds), computer system 700 ceases display of self-view representation 1210. In some embodiments, self-view representation 1210 is larger than object 1206. In some embodiments, self-view representation 1210 is displayed when computer system 700 detects the user looking at object 1206, and display of self-view representation 1210 is maintained so long as computer system 700 continues to detect the user looking at self-view representation 1210. Accordingly, in some embodiments, the region within which a user gaze causes computer system 700 to display self-view representation 1210 (e.g., object 1206) is different in size from (e.g., smaller than) the region within which a user gaze causes computer system 700 to maintain display of self-view representation 1210 (e.g., the entirety of self-view representation 1210).

In some embodiments, the techniques and user interface(s) described in FIG. 12C1 are provided by one or more of the devices described in FIGS. 1A-1P. FIG. 12C2 illustrates an embodiment in which the content of display 702 in FIG. 12C1 is presented using display module X702 of head-mounted device (HMD) X700. For example, computer system 700 is implemented as device X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 12C2, in response to detecting that the user is looking at object 1206, device X700 replaces display of object 1206 with self-view representation 1210. Similar to self-view representations 712, 714 described above with reference to FIGS. 7A-7E, self-view representation 1210 provides the user of device X700 with feedback about the appearance of the user (and/or the user's avatar) as the user's appearance is presented to other participants of the real-time communication session. For example, self-view representation 1210 shows the same content that is being transmitted to and/or displayed by the second participant's computer system. In some embodiments, the features of self-view representation 1210 described herein can also be applied to self-view representations 712 and 714 described above and the features described herein with reference to FIGS. 12A-12F can also be applied to the real-time communication sessions described above in FIGS. 7A-7E and 10A-10H. For example, in some embodiments, self-view representations 712, 714 in FIGS. 7A-7E are not displayed until the user looks at a particular region within the real-time communication session user interface and/or looks at a particular object (e.g., object 1206) within the real-time communication session user interface.

In some embodiments, object 1206 and/or self-view representation 1210 are displayed at a position in user interface 1200 that corresponds to a viewpoint from which the user of device X700 is being depicted within the real-time communication session. For example, object 1206 and/or self-view representation 1210 are displayed at a location in user interface 1200 that corresponds to the viewpoint of a virtual camera that is recording and/or capturing the user and/or an avatar of the user.

It can be seen that in the embodiment shown in FIG. 12C2, self-view representation 1210 partially overlaps representation 1202 of the second participant. In some embodiments, at least a portion of representation 1202 is visually modified (e.g., dimmed, desaturated, made less bright, and/or made darker) while self-view representation 1210 is displayed. For example, in FIG. 12C2, a top portion of representation 1202 is dimmed while self-view representation 1210 is displayed (as represented by hatching lines at the top of representation 1202), while a bottom portion of representation 1202 is not visually modified (e.g., is not dimmed, is not desaturated, is not made less bright, and/or is not made darker).

In some embodiments, while the user maintains his or her gaze on self-view representation 1210 (e.g., as determined using camera X704), device X700 continues to display self-view representation 1210. In some embodiments, when device X700 detects that the user has stopped looking at self-view representation 1210 and/or has stopped looking at self-view representation 1210 for greater than a threshold duration of time (e.g., a non-zero duration, 0.1 seconds, 0.5 seconds, or 2 seconds), device X700 ceases display of self-view representation 1210. In some embodiments, self-view representation 1210 is larger than object 1206. In some embodiments, self-view representation 1210 is displayed when device X700 detects the user looking at object 1206, and display of self-view representation 1210 is maintained so long as device X700 continues to detect the user looking at self-view representation 1210. Accordingly, in some embodiments, the region within which a user gaze causes computer system 700 to display self-view representation 1210 (e.g., object 1206) is different in size from (e.g., smaller than) the region within which a user gaze causes device X700 to maintain display of self-view representation 1210 (e.g., the entirety of self-view representation 1210).

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 12D:
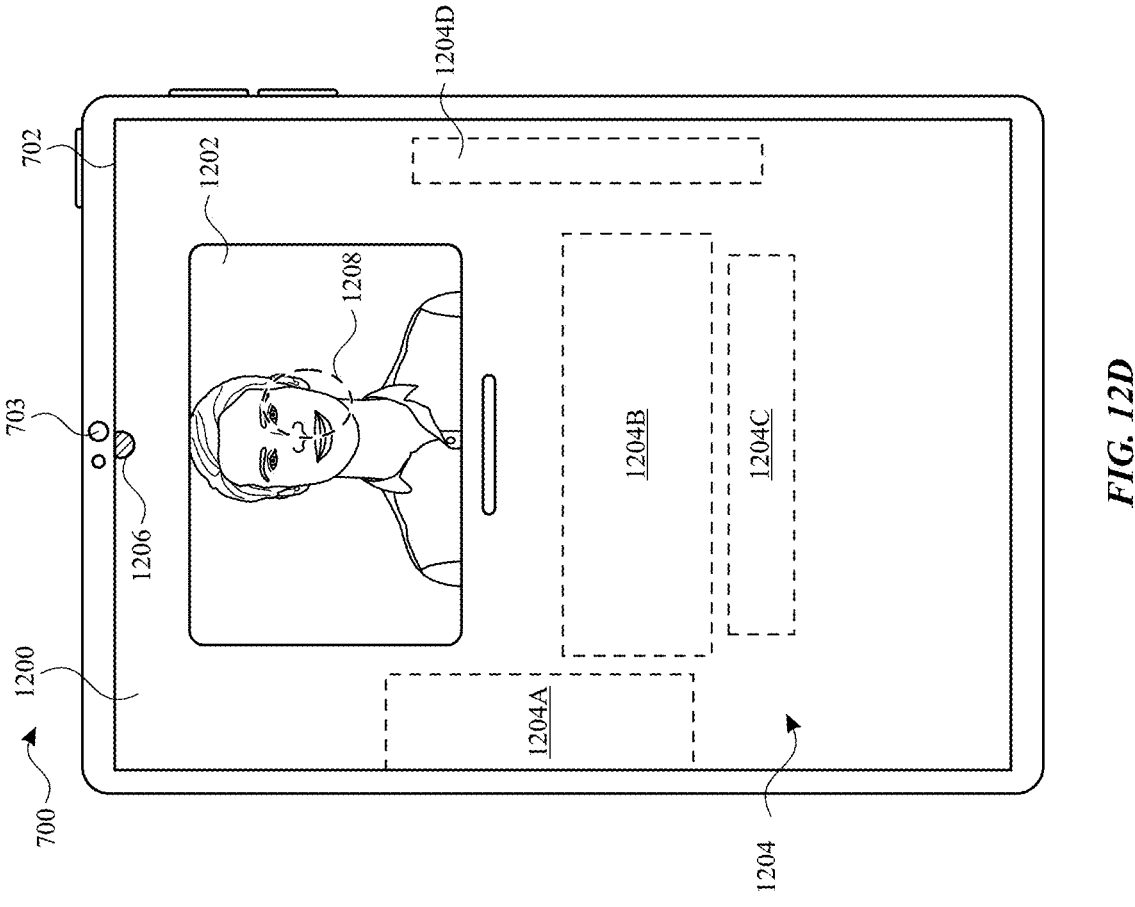

In FIG. 12D, computer system 700 detects that the user is now looking at representation 1202, as indicated by gaze indication 1208. In response to a determination that the user is not looking at self-view representation 1210, computer system 700 ceases display of self-view representation 1210 and re-displays object 1206. Additionally, now that self-view representation 1210 is no longer displayed, the top portion of representation 1202 is no longer dimmed.

Figures 12E, 12F:
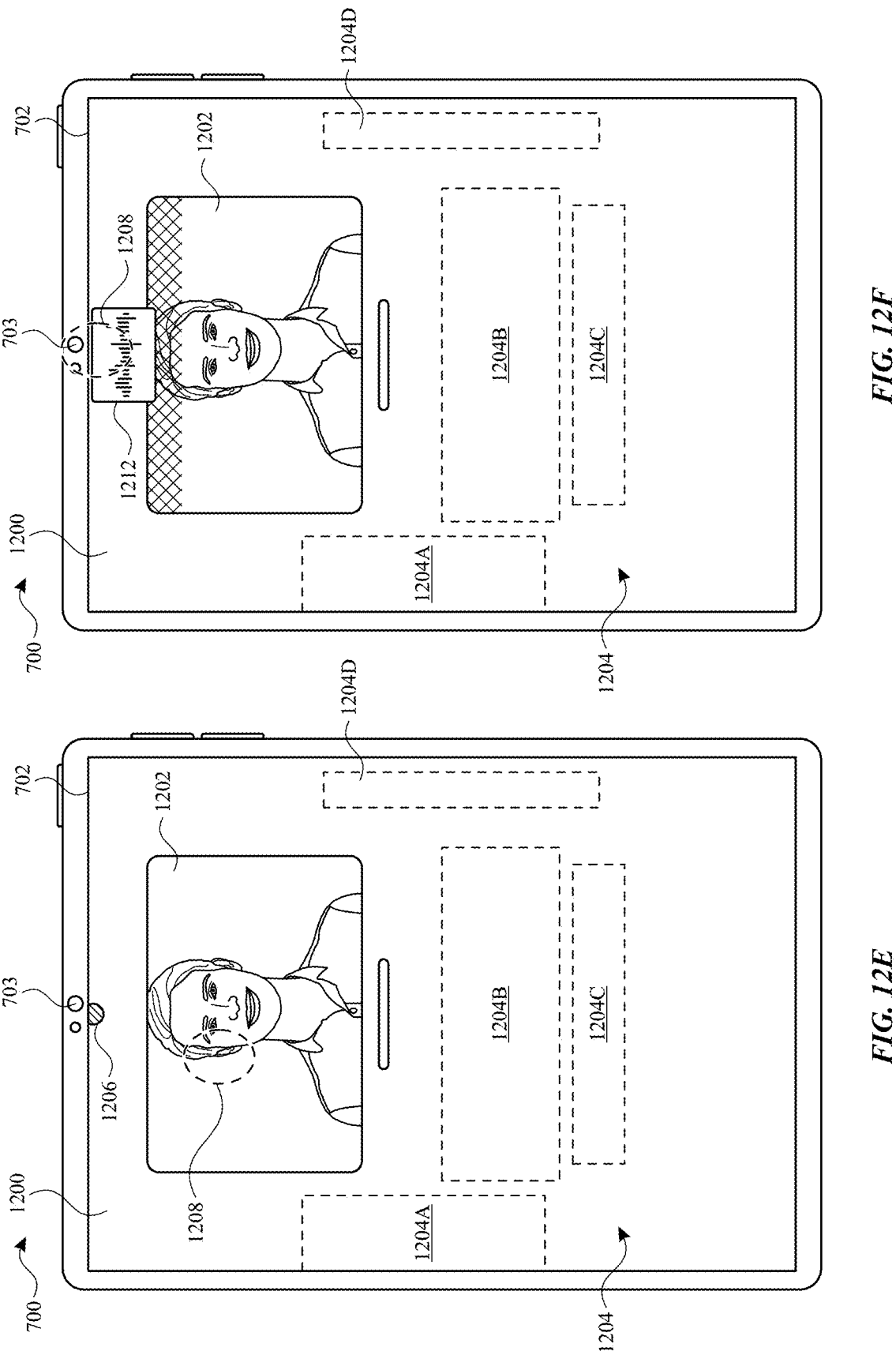

FIGS. 12E-12F depict an additional scenario in which computer system 700 is transmitting audio content without transmitting content based on the user's movements (e.g., only audio content and/or audio content without video content) into the real-time communication session. In FIG. 12E, because computer system 700 is transmitting audio content without transmitting content based on the user's movements, object 1206 is displayed in a different manner (e.g., a different color) than it was displayed in FIG. 12A. At FIG. 12E, computer system 700 detects that the user is looking at representation 1202, as indicated by gaze indication 1208. Accordingly, in FIG. 12E, based on a determination that the user is not looking at object 1206, computer system 700 does not display a self-view representation of the user of the computer system.

At FIG. 12F, computer system 700 detects that the user is now looking at a region in user interface 1200 corresponding to object 1206. In response to this determination (e.g., in response to a determination that the user looked at object 1206), computer system 700 replaces display of object 1206 with self-view representation 1212, as illustrated in FIG. 12F. In FIG. 12F, because the computer system 700 is transmitting audio content without transmitting content based on the user's movements in the real-time communication session, self-view representation 1212 is an audio wave representative of the audio content being transmitted into the real-time communication session (e.g., an audio wave the corresponds to and/or represents the actual audio content being transmitted).

Additional descriptions regarding FIGS. 12A-12F are provided below in reference to method 1300 described with respect to FIG. 13.

FIG. 13 is a flow diagram of an exemplary method 1300 for displaying a representation of a participant in a real-time communication session, in some embodiments. In some embodiments, method 1300 is performed at a computer system (e.g., computer system 101 in FIG. 1A, 700,750, and/or X700) (e.g., a smart phone, a smart watch, a tablet, a laptop, a desktop, a wearable device, and/or head-mounted device) that is in communication with one or more display generation components (e.g., display generation component 120 in FIGS. 1A, 3, and 4, 702, and/or X702) (e.g., a visual output device, a 3D display, a display having at least a portion that is transparent or translucent on which images can be projected (e.g., a see-through display), a projector, a heads-up display, and/or a display controller) and one or more input devices (e.g., I/O devices 206, input devices 125, sensors 190, hand tracking device 140, eye tracking device 130 (130A and/or 130B), sensors 703, and/or input device X703) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; and/or a biometric sensor (e.g., a fingerprint sensor, a face identification sensor, a gaze tracking sensor, and/or an iris identification sensor)). In some embodiments, method 1300 is governed by instructions that are stored in a non-transitory (or transitory) computer-readable medium and that are executed by one or more processors of a computer system, such as the one or more processors 202 of computer system 101 (e.g., control 110 in FIG. 1A). Some operations in method 1300 are, optionally, combined and/or the order of some operations is, optionally, changed.

The computer system (e.g., 700,750, and/or X700) displays (1302), via the one or more display generation components, a first user interface (e.g., 1200 in FIGS. 12A-12B) (e.g., a user interface corresponding to a real-time communication session that includes and/or involves the computer system and/or a user of the computer system (e.g., a real-time communication session that corresponds to and/or includes a graphical representation of the user of the computer system; and/or a real-time communication session into which a graphical representation of the user of the computer system is being transmitted (e.g., by the computer system))) that is associated with a graphical representation (e.g., 1210 and/or 1212) of a user of the computer system and is displayed without displaying the graphical representation of the user of the computer system (e.g., 1200 in FIGS. 12A-12B) (e.g., a photograph of the user of the computer system, a video of the user of the computer system (e.g., a live video stream of the user of the computer system), and/or a non-photographic visual representation of the user of the computer system (e.g., a virtual representation of the user of the computer system and/or an avatar representative of the user of the computer system (e.g., a still avatar and/or a moving avatar (e.g., an avatar that moves based on movements by the user of the computer system)))).

While displaying the first user interface that is associated with the graphical representation of the user of the computer system without displaying the graphical representation of the user of the computer system, the computer system detects (1304), via the one or more input devices, a gaze of the user (e.g., 1208) (e.g., detecting that the user is looking at a particular object, position, and/or location in the first user interface).

In response to detecting the gaze of the user: in accordance with a determination that a set of one or more criteria is met, the set of one or more criteria including a criterion that is met when the gaze of the user (e.g., 1208) is directed to a first location (e.g., 1206, and/or the location and/or position occupied by object 1206) in the first user interface (e.g., 1200) (e.g., the user is looking at the first location in the first user interface) (in some embodiments, the set of one or more criteria require that the gaze of the user is directed to a first location in the first user interface in order for the set of one or more criteria to be met), the computer system displays (1306), via the one or more display generation components, the graphical representation of the user (e.g., 1210 and/or 1212) in the first user interface (e.g., 1200 in FIG. 12C1, FIG. 12C2, and/or FIG. 12F).

In some embodiments, in response to detecting the gaze of the user (e.g., 1208), and in accordance with a determination that the set of one or more criteria is not met (e.g., the gaze of the user is not directed to the first respective location in the first user interface (e.g., the user is not looking at the first respective location in the first user interface)), the computer system forgoes displaying the graphical representation of the user (e.g., in FIGS. 12A, 12B, 12D, and/or 12E, self-view representations 1210 and/or 1212 are not displayed).

Displaying a graphical representation of a user in response to a user gaze directed at a first location in a user interface reduces the number of inputs needed to perform this operation and enables this operation to be performed without displaying additional controls. Furthermore, doing so also provides the user with feedback about a state of the device (e.g., that the device has detected the user gaze directed at the first location in the first user interface).

In some embodiments, the graphical representation of the user (e.g., 1210) includes (e.g., is or is based on) a video feed (e.g., 1210) (e.g., a live video feed; a streaming video; a video feed captured by one or more cameras in communication with the computer system; a video feed that includes and/or depicts the user of the computer system; and/or a video feed being transmitted by the computer system (e.g., into a real-time communication session and/or into an application)). Displaying a video feed of a user in response to a user gaze directed at a first location in a user interface reduces the number of inputs needed to perform this operation and enables this operation to be performed without displaying additional controls. Furthermore, doing so also provides the user with feedback about a state of the device (e.g., that the device has detected the user gaze directed at the first location in the first user interface).

In some embodiments, the graphical representation of the user (e.g., 1210) includes (e.g., is or is based on) an animated (e.g., drawn, virtual, rendered and/or non-photographic) avatar representative of the user (e.g., an avatar that is generated based on one or more images of the user, an avatar that is created based on one or more user selections, a virtual representation of the user of the computer system, a still avatar, and/or a moving avatar (e.g., an avatar that moves based on movements by the user of the computer system)). Displaying an animated avatar representative of a user in response to a user gaze directed at a first location in a user interface reduces the number of inputs needed to perform this operation and enables this operation to be performed without displaying additional controls. Furthermore, doing so also provides the user with feedback about a state of the device (e.g., that the device has detected the user gaze directed at the first location in the first user interface).

In some embodiments, the animated avatar representative of the user (e.g., an animated avatar depicted within self-view representation 1210) moves based on (e.g., in response to and/or in a manner consistent with) movements by the user of the computer system (e.g., as determined and/or measured by one or more cameras and/or one or more sensors in communication with the computer system). In some embodiments, the animated avatar representative of the user moves based on changes in a face of the user of the computer system (e.g., changes in facial expression and/or movement of one or more portions of the face of the user) (e.g., a face of the animated avatar moves based on changes in the face of the user of the computer system (e.g., a facial expression of the avatar changes based on changes in the facial expression of the user of the computer system)). In some embodiments, the animated avatar representative of the user moves based on movements of a head of the user of the computer system (e.g., a head of the avatar moves based on movements of the head of the user of the computer system). In some embodiments, the animated avatar representative of the user moves based on movements of one or more hands of the user of the computer system (e.g., one or more hands of the avatar and/or one or more components of the avatar move based on movements of the hands of the user of the computer system). In some embodiments, the animated avatar representative of the user moves within a virtual environment (e.g., 1204) (e.g., a virtual three-dimensional environment) based on movements by the user of the computer system. In some embodiments, the animated avatar representative of the user moves within a virtual environment (e.g., a virtual three-dimensional environment) based on movement by the user of the computer system within a physical environment (e.g., a physical three-dimensional environment) (e.g., movement by the user of the computer system from a first location in the physical environment to a second location in the physical environment).

Moving an avatar representative of a user based on movements made by the user reduces the number of inputs needed to perform this operation and enables this operation to be performed without displaying additional controls. Furthermore, doing so also provides the user with feedback about a state of the device (e.g., that the device has detected the movements by the user).

In some embodiments, the graphical representation (e.g., 1210) includes (e.g., is or includes) a static (e.g., non-moving and/or still) representation of the user (e.g., a photograph, a monogram, and/or a still image). Displaying a static representation of a user in response to a user gaze directed at a first location in a user interface reduces the number of inputs needed to perform this operation and enables this operation to be performed without displaying additional controls. Furthermore, doing so also provides the user with feedback about a state of the device (e.g., that the device has detected the user gaze directed at the first location in the first user interface).

In some embodiments, in response to detecting the gaze of the user (e.g., 1208): in accordance with a determination that the set of one or more criteria is not met (e.g., the gaze of the user is not directed to the first respective location (e.g., 1206 and/or a location and/or position occupied by object 1206) in the first user interface (e.g., 1200) (e.g., the user is not looking at the first respective location in the first user interface)), the computer system forgoes display of the graphical representation of the user (e.g., 1210 and/or 1212). Forgoing display of the graphical representation of the user when the one or more criteria is not met prevents the user interface from being cluttered with user interface elements that are not relevant to or needed by a user.

In some embodiments, while displaying, via the one or more display generation components (e.g., 702 and/or X702), the graphical representation of the user (e.g., 1210 and/or 1212) in the first user interface (e.g., 1200) (e.g., while the set of one or more criteria are met and/or while a second set of one or more criteria are not met), the computer system determines, via the one or more input devices (e.g., 703 and/or X703), that a second set of one or more criteria (e.g., a second set of one or more criteria that is different from the set of one or more criteria or the same as the set of one or more criteria) is met, the second set of one or more criteria including a second criterion that is met when the gaze of the user (e.g., 1208) is no longer directed to a second location (e.g., 1210, 1212, and/or the location and/or position occupied by self-view representation 1210 and/or 1212) (e.g., the same as or different from the first location) in the first user interface (e.g., the user is not looking at the second location in the first user interface) (in some embodiments, the second set of one or more criteria require that the gaze of the user is not directed to the second location in the first user interface in order for the second set of one or more criteria to be met).

In response to determining that the second set of one or more criteria is met (e.g., in response to determining that the gaze of the user is not directed to the second location in the first user interface), the computer system ceases display of the graphical representation of the user (e.g., 1210 and/or 1212) in the first user interface (e.g., 1200) (e.g., in FIG. 12D, in response to determining that the user is no longer looking at self-view representation 1210, computer system 700 ceases display of self-view representation 1210) (e.g., while maintaining display of the first user interface). In some embodiments, while displaying the graphical representation of the user in the first user interface, the computer system determines that the gaze of the user (e.g., 1208) is no longer directed to the first location and/or that the set of one or more criteria is no longer met and, in response, ceases to display the graphical representation of the user (e.g., 1210 and/or 1212). In some embodiments, while displaying, via the one or more display generation components, the graphical representation of the user (e.g., 1210 and/or 1212) in the first user interface (e.g., 1200), the computer system (e.g., 700 and/or X700) detects the gaze of the user (e.g., 1208). In response to detecting the gaze of the user: in accordance with a determination that the second set of one or more criteria is met (e.g., the user is not looking at the second location in the first user interface), the computer system ceases display of the graphical representation (e.g., 1210 and/or 1212) of the user in the first user interface (e.g., 1200 in FIG. 12D); and in accordance with a determination that the second set of one or more criteria is not met (e.g., the user is looking at the second location in the first user interface (e.g., 1208 in FIG. 12C1 and/or FIG. 12C2)), the computer system maintains display of the graphical representation (e.g., 1210) of the user in the first user interface (e.g., 1200 in FIG. 12C1 and/or FIG. 12C2). Ceasing display of the graphical representation of a user in response to a determination that the second set of one or more criteria is met reduces the number of inputs needed to perform this operation and enables this operation to be performed without displaying additional controls. Furthermore, doing so also provides the user with feedback about a state of the device (e.g., that the device has detected the second set of one or more criteria is met).

In some embodiments, the first location in the first user interface (e.g., 1206 and/or the location and/or region occupied by object 1206) occupies a first area of the first user interface; and the second location in the first user interface (e.g., 1210, 1212, and/or the location and/or region occupied by representations 1210 and/or 1212) occupies a second area of the first user interface that is larger than the first area (in some embodiments, the second area includes and/or surrounds the first area). Providing a larger gaze target for a user to maintain display of the graphical representation of the user prevents accidental or unwanted switching between displaying and not displaying the graphical representation of the user, thereby providing an improved control scheme for managing the view of the graphical representation of the user.

In some embodiments, the first location corresponds to a first object (e.g., 1206) displayed in the first user interface (e.g., 1200) (e.g., the first location occupies an area that includes the first object and/or occupies an area that is the same as the area occupied by the first object; and/or the first object is displayed at the first location). Displaying an object that a user can look at in order to display the graphical representation of the user enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, a respective appearance of the first object (e.g., 1206) provides a visual indication that one or more cameras associated with the computer system are recording, and when the one or more cameras associated with the computer system are not recording, the first object is not displayed with the respective appearance (e.g., the first object is not displayed or the first object is displayed with an appearance that is different from the respective appearance to indicate that the one or more cameras of the computer system are not recording) (e.g., object 1206 is displayed in a first manner in FIG. 12D because one or more cameras (e.g., 703) are recording, whereas object 1206 is displayed in a second manner in FIG. 12E because one or more cameras (e.g., 703) are not recording). In some embodiments, the computer system (e.g., 700) displays, within the first user interface (e.g., 1200), the first object (e.g., 1206), wherein: in accordance with a determination that one or more cameras associated with the computer system are recording (e.g., are capturing content and/or the computer system is transmitting camera content being captured by the one or more cameras), the first object is displayed in a first manner (e.g., with a first visual appearance, with a first color, with a first size, and/or with a first shape) (e.g., 1206 in FIG. 12D); and in accordance with a determination that the one or more cameras associated with the computer system are not recording (e.g., are not capturing content and/or the computer system is not transmitting content being captured by the one or more cameras), the first object is displayed in a second manner different from the first manner (e.g., with a second visual appearance, with a second color, with a second size, and/or with a second shape) (e.g., 1206 in FIG. 12E). Automatically changing the visual appearance of the first object based on whether or not one or more cameras are recording causes the device to automatically perform this operation, and also provides improved security/privacy by informing the user of when the one or more cameras are recording.

In some embodiments, displaying the first object (e.g., 1206) comprises: in accordance with a determination that the one or more cameras (e.g., 703) associated with the computer system (e.g., 700 and/or X700) are recording, the first object is displayed in a first color (e.g., includes the first color) (e.g., 1206 in FIG. 12D); and in accordance with a determination that the one or more cameras associated with the computer system are not recording, the first object is displayed in a second color (e.g., includes the second color) different from the first color (and, in some embodiments, the first object does not include the first color) (e.g., 1206 in FIG. 12E). Automatically changing the visual appearance of the first object based on whether or not one or more cameras are recording causes the device to automatically perform this operation, and also provides improved security/privacy by informing the user of when the one or more cameras are recording.

In some embodiments, the gaze of the user (e.g., 1208) is detected while displaying the first object (e.g., 1206) as part of the first user interface (e.g., 1200) without displaying the graphical representation (e.g., 1200 and/or 1212) of the user of the computer system. In some embodiments, in response to detecting the gaze of the user (e.g., 1208): in accordance with a determination that the set of one or more criteria is met, the computer system ceases display of the first object (e.g., in FIG. 12C1 and/or FIG. 12C2, object 1206 is not displayed). In some embodiments, in response to detecting the gaze of the user and in accordance with a determination that the set of one or more criteria is met, the computer system replaces display of the first object (e.g., 1206) with display of the graphical representation of the user (e.g., 1210 and/or 1212). In some embodiments, the first object is displayed at the first location and the graphical representation of the user is displayed at the first location. Automatically replacing display of the first object with display of the graphical representation of the user based on the gaze of the user causes the device to automatically perform this operation, reduces the number of inputs needed to perform this operation, and enables this operation to be performed without display additional controls.

In some embodiments, the graphical representation of the user (e.g., 1210) is displayed with an appearance that is based on a viewpoint that corresponds to the first location (e.g., 1206) (e.g., is positioned at and/or proximate to the first location) in the first user interface (e.g., the graphical representation is displayed in such a way that the user appears as the user would appear if the user was being photographed and/or filmed by a camera that is positioned at the first location (e.g., 1206)). Displaying a graphical representation of a user from a viewpoint that corresponds to the first location enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the graphical representation of the user (e.g., 1210) is displayed with an appearance that is based on the viewpoint of a virtual camera (e.g., a non-physical camera; and/or a camera within a virtual environment) that is positioned at a location that corresponds to the first location (e.g., 1206) (e.g., is positioned at and/or proximate to the first location) (e.g., the graphical representation is displayed in such a way that the user appears as the user would appear if the user was being photographed and/or filmed by a camera that is positioned at the first location). Displaying a graphical representation of a user from a viewpoint that corresponds to the first location enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the graphical representation of the user (e.g., 1210) is displayed from the viewpoint of a physical camera (e.g., 703) (e.g., a tangible and/or real camera) that is positioned at a location that corresponds to the first location (e.g., 1206) (e.g., is positioned at and/or proximate to (e.g., within a threshold distance of and/or less than a threshold distance from) the first location). Displaying a graphical representation of a user from a viewpoint that corresponds to the first location enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first user interface (e.g., 1200) is a real-time communication user interface that corresponds to (e.g., displays elements of and/or facilitates) a real-time communication session (e.g., audio communication, video communication, text-based communication, graphics-based communication, and/or virtual communication) between the user of the computer system and one or more participants in the real-time communication session different from the user of the computer system (e.g., a participant represented by representation 1202) (e.g., one or more users of one or more external computer system different from (e.g., separate from and/or remote from) the computer system). Displaying a graphical representation of a user within a real-time communication user interface in response to a user gaze directed at a first location in a user interface reduces the number of inputs needed to perform this operation and enables this operation to be performed without displaying additional controls. Furthermore, doing so also provides the user with feedback about a state of the device (e.g., that the device has detected the user gaze directed at the first location in the first user interface).

In some embodiments, displaying the first user interface (e.g., 1200) includes displaying representations (e.g., 1202) of the one or more other participants in the real-time communication session, wherein the one or more other participants are different from the user of the computer system (e.g., photographs, videos (e.g., live video streams), and/or non-photographic visual representations (e.g., virtual representations, avatar representations, and/or monograms) of the one or more participants in the real-time communication session different from the user of the computer system). In some embodiments, displaying the first user interface (e.g., 1200) includes displaying a first representation (e.g., 1202) of a first participant in the real-time communication session different from the user of the computer system. In some embodiments, displaying the first user interface further includes displaying a second representation of a second participant in the real-time communication session, wherein the second representation is different from the first representation and the second participant is different from the first participant and the user of the computer system (e.g., displaying an additional representation in addition to representation 1202 within user interface 1200 that is representative of a different participant in the real-time communication session). Displaying a graphical representation of a user within a real-time communication user interface in response to a user gaze directed at a first location in a user interface reduces the number of inputs needed to perform this operation and enables this operation to be performed without displaying additional controls. Furthermore, doing so also provides the user with feedback about a state of the device (e.g., that the device has detected the user gaze directed at the first location in the first user interface).

In some embodiments, displaying the graphical representation of the user (e.g., 1210 and/or 1212) in the first user interface comprises displaying the graphical representation of the user (e.g., 1210 and/or 1212) in the first user interface (e.g., 1200) concurrently with the representations of the one or more other participants (e.g., 1202) in the real-time communication session. Displaying a graphical representation of a user within a real-time communication user interface concurrently with representations of other participants in the real-time communication session in response to a user gaze directed at a first location in a user interface reduces the number of inputs needed to perform this operation and enables this operation to be performed without displaying additional controls. Furthermore, doing so also provides the user with feedback about a state of the device (e.g., that the device has detected the user gaze directed at the first location in the first user interface).

In some embodiments, displaying the graphical representation of the user (e.g., 1210 and/or 1212) in the first user interface (e.g., 1200) comprises displaying the graphical representation of the user (e.g., 1210 and/or 1212) in the first user interface (e.g., 1200) overlaid on (e.g., partially and/or completely overlaid on) at least one of the representations of the one or more other participants (e.g., 1202) in the real-time communication session. Displaying a graphical representation of a user within a real-time communication user interface concurrently with representations of other participants in the real-time communication session in response to a user gaze directed at a first location in a user interface reduces the number of inputs needed to perform this operation and enables this operation to be performed without displaying additional controls. Furthermore, doing so also provides the user with feedback about a state of the device (e.g., that the device has detected the user gaze directed at the first location in the first user interface).

In some embodiments, displaying the first user interface (e.g., 1200) without displaying the graphical representation of the user of the computer system (e.g., 1210 and/or 1212) includes displaying the representations of the one or more participants (e.g., 1202) with a first visual appearance (e.g., a first brightness, a first opacity, a first saturation, and/or a first color setting) (e.g., FIGS. 12A-12B). In response to detecting the gaze of the user (e.g., 1208): in accordance with a determination that the set of one or more criteria is met, the computer system displays the representations of the one or more participants (e.g., 1202) with a second visual appearance (e.g., 1202 in FIG. 12C1 and/or FIG. 12C2) (e.g., a second brightness, a second opacity, a second saturation, and/or a second color setting) different from the first visual appearance while displaying the graphical representation of the user of the computer system (e.g., 1208) (e.g., in FIG. 12C1 and/or FIG. 12C2, representation 1202 is displayed with the top portion slightly dimmed and/or otherwise visually modified). In some embodiments, in response to detecting the gaze of the user (e.g., 1208) and in accordance with a determination that the set of one or more criteria is met, the computer system visually de-emphasizes (e.g., dims, reduces opacity, overlays a color, and/or de-saturates) the representations of the one or more participants (e.g., 1202) (e.g., while displaying the graphical representation of the user in the first user interface). Automatically changing the visual appearance of the representations of the one or more participants in the real-time communication session when the graphical representation of the user is displayed allows for this operation to be performed automatically without further user input. Furthermore, doing so also provides the user with feedback about a state of the device (e.g., that the device has detected the user gaze directed at the first location in the first user interface).

In some embodiments, the first location (e.g., 1206) in the first user interface (e.g., 1200) does not overlap content being displayed within the real-time communication session (e.g., 1206 does not overlap representation 1202) (e.g., content being transmitted into the real-time communication session (e.g., by one or more participants in the real-time communication session) and/or representations of one or more participants in the real-time communication session) (e.g., the first location is positioned outside of real-time communication session content (e.g. representations of the one or more participants in the real-time communication session different from the user of the computer system)). In some embodiments, a first object (e.g., 1206) is displayed at the first location, and the first object does not overlap the content being displayed within the real-time communication session (e.g., representation 1202). In some embodiments, the first location in the first user interface does not overlap content being displayed within the real-time communication session in order to avoid accidental display and/or accidental triggering of the graphical representation of the user while the user is attempting to view and/or look at other content in the real-time communication session (e.g., attempting to look at representations of other participants in the real-time communication session and/or attempting to look at content shared within the real-time communication session). Providing a gaze target that does not overlap the content being displayed within the real-time communication session enhances the operability of the system and makes the user-system interface more efficient (e.g., by helping the user to provide proper inputs and reducing erroneous and/or inadvertent inputs) which, additionally, reduces power usage and improves battery life of the device by enabling the user to use the system more quickly and efficiently. For example, displaying a gaze target that does not overlap content being displayed within the real-time communication session helps to avoid accidental display and/or accidental triggering of the graphical representation of the user while the user is attempting to view and/or look at other content in the real-time communication session (e.g., attempting to look at representations of other participants in the real-time communication session and/or attempting to look at content shared within the real-time communication session).

In some embodiments, the computer system (e.g., 700 and/or X700) displays, via the one or more display generation components (e.g., 702 and/or X702), the graphical representation of the user (e.g., 1210 and/or 1212) in the first user interface (e.g., 1200). Subsequent to displaying the graphical representation of the user in the first user interface (e.g., while displaying the graphical representation of the user in the first user interface and/or after ceasing display of the graphical representation of the user in the first user interface), the computer system receives, via the one or more display generation components, one or more user inputs (e.g., one or more touch inputs, one or more keyboard inputs, one or more mouse inputs, one or more gestures, one or more air gestures, and/or one or more gaze inputs) corresponding to a request to change the graphical representation of the user (e.g., a request to change the representation of the user shown in self-view representation 1210) (e.g., one or more user inputs to modify and/or edit the graphical representation of the user and/or one or more user inputs to use a different graphical representation of the user). In response to receiving the one or more user inputs corresponding to the request to change the graphical representation of the user, the computer system displays, via the one or more display generation components, a second graphical representation of the user (e.g., a photograph of the user of the computer system, a video of the user of the computer system (e.g., a live video stream of the user of the computer system), and/or a non-photographic visual representation of the user of the computer system (e.g., a virtual representation of the user of the computer system and/or an avatar representative of the user of the computer system (e.g., a still avatar and/or a moving avatar (e.g., an avatar that moves based on movements by the user of the computer system)))) different from the graphical representation of the user in the first user interface (e.g., displaying, within self-view representation 1210, an avatar or different representation of the user, and/or displaying the second representation of the user within a different user interface (e.g., an avatar editing user interface, an avatar selection user interface, and/or avatar modification user interface)). In some embodiments, displaying the second graphical representation of the user comprises displaying a modified version of the graphical representation of the user (e.g., changing one or more characteristics and/or one or more portions of the graphical representation of the user (e.g., while maintaining one or more other characteristics and/or one or more other portions of the graphical representation of the user)). In some embodiments, displaying the second graphical representation of the user comprises displaying a second graphical representation of the user different from the graphical representation of the user (e.g., a different avatar, a different representation, and/or a different character). Allowing a user to modify the graphical representation of the user enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the set of one or more criteria includes a second criterion that is met when the gaze of the user (e.g., 1208) is directed to the first location (e.g., 1206 and/or the region occupied by object 1206) in the first user interface (e.g., 1200) for a threshold duration of time (e.g., a non-zero threshold duration of time, a threshold duration of time between 0 and 1 second, and/or a threshold duration of time between zero and 0.5 seconds) (e.g., the user is looking at the first location in the first user interface for the threshold duration of time (e.g., a continuous and/or uninterrupted threshold duration of time)). In some embodiments, the set of one or more criteria require that the gaze of the user is directed to the first location in the first user interface for the threshold duration of time in order for the set of one or more criteria to be met. In some embodiments, when the gaze of the user is directed to the first location in the first user interface for less than the threshold duration of time, the set of one or more criteria is not met, and the graphical representation of the user is not displayed. Displaying a graphical representation of a user in response to a user gaze directed at a first location in a user interface for a threshold duration of time reduces the number of inputs needed to perform this operation and enables this operation to be performed without displaying additional controls. Furthermore, doing so also provides the user with feedback about a state of the device (e.g., that the device has detected the user gaze directed at the first location in the first user interface). Doing so also enhances the operability of the system and makes the user-system interface more efficient (e.g., by helping to reduce erroneous and/or inadvertent inputs), which, additionally, reduces power usage and improves battery life of the device by enabling the user to use the system more quickly and efficiently.

In some embodiments, displaying the graphical representation of the user (e.g., 1210 and/or 1212) in the first user interface (e.g., 1200) comprises: in accordance with a determination that a third set of one or more criteria is met (e.g., only audio content corresponding to the user being transmitted by the computer system (e.g., into a real-time communication session), and/or the computer system is not capturing and/or transmitting video content corresponding to the user (e.g., into a real-time communication session)), displaying, via the one or more display generation components, a visual representation that changes based on changes in one or more audio parameters of speech from the user of the computer system (e.g., representation 1212 changes based on changes in one or more audio parameters of speech from the user of the computer system) (e.g., a visual representation (e.g., an audio waveform or other visual representation) that is representative of audio input being captured by and/or sensed by the computer system and/or one or more input devices in communication with the computer system; and/or a visual representation (e.g., an audio waveform or other visual representation) that is representative of audio content being transmitted by the computer system (e.g., into a real-time communication session)). In some embodiments, in accordance with a determination that the third set of one or more criteria is not met (e.g., video content corresponding to the user is being transmitted by the computer system (e.g., into a real-time communication session) and/or the computer system is capturing and/or transmitting video content corresponding to the user), the computer system forgoes display of the visual representation that changes based on changes in one or more audio parameters of speech from the user of the computer system (e.g., in FIG. 12C1 and/or FIG. 12C2, computer system 700 displays self-view representation 1210 instead of self-view representation 1212) (and, in some embodiments, displays a second graphical representation of the user different from the visual representation that changes based on changes in one or more audio parameters of speech from the user of the computer system within the first user interface). Displaying a visual representation that changes based on changes in one or more audio parameters of speech from the user of the computer system when only audio content is being transmitted by the computer system improves security and/or privacy by informing the user when audio content is being transmitted and/or when video content is being transmitted.

In some embodiments, the set of one or more criteria includes a criterion that is met when a first type of representation (e.g., a video of the user, an avatar representation of the user, and/or other graphical representation of the user) (e.g., the representation of the user shown in self-view representation 1210) is selected to represent the user of the computer system (e.g., the scenario depicted in FIGS. 12A-12C2). In some embodiments, in response to detecting the gaze of the user (e.g., 1208): in accordance with a determination that the first type of representation is not selected to represent the user of the computer system (e.g., the scenario depicted in FIGS. 12D-12E), the computer system forgoes displaying the graphical representation of the user (e.g., in FIG. 12E, computer system 700 forgoes displaying self-view representation 1210 (and, instead, displays self-view representation 1212)). In some embodiments, while displaying the first user interface (e.g., 1200) that is associated with the graphical representation of the user of the computer system without displaying the graphical representation of the user of the computer system, the computer system detects, via the one or more input devices, a second gaze of the user (e.g., 1208); and in response to detecting the second gaze of the user: in accordance with a determination that a first type of representation (e.g., a video of the user, an avatar representation of the user, and/or other graphical representation of the user) is selected to represent the user of the computer system (e.g., within a virtual environment, within an application, and/or within a real-time communication session), the computer system displays, via the one or more display generation components, the graphical representation of the user (e.g., 1210) in the first user interface (e.g., 1200) (e.g., the scenario depicted in FIGS. 12A-12C2); and in accordance with a determination that the first type of representation is not selected to represent the user of the computer system, the computer system forgoes display of the graphical representation of the user in the first user interface (e.g., in FIGS. 12E, computer system 700 forgoes displaying self-view representation 1210 (and, instead, displays self-view representation 1212)). Automatically displaying the graphical representation of the user when a first type of representation is selected, and forgoing display of the graphical representation of the user when a different type of representation is selected allows for these operations to be performed without display additional controls and without further user input.

In some embodiments, aspects/operations of methods 800, 900, 1100, and 1300 may be interchanged, substituted, and/or added between these methods. For example, the features recited in method 1300 can optionally be incorporated into the real-time communication sessions recited in methods 800, 900, and/or 1100. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components, the computer system comprising:

one or more processors; and memory storing one or more programs configured to be executed by the one or more processors, the one or more programs including instructions for:

displaying, via the one or more display generation components, representations of a plurality of participants in a real-time communication session in a spatial arrangement of tiles in a three-dimensional space, including concurrently displaying:

a representation of a first participant of the plurality of participants in a first tile in the spatial arrangement of tiles; and a representation of a second participant of the plurality of participants in a second tile in the spatial arrangement of tiles, wherein the second participant is different from the first participant and the second tile is different from the first tile;

while displaying the representations of the plurality of participants in the real-time communication session in the three-dimensional space, detecting activity associated with the first participant of the plurality of participants;

in response to detecting the activity associated with the first participant of the plurality of participants, modifying the representation of the first participant based on the activity, including moving the first tile relative to the second tile in the spatial arrangement of tiles;

while displaying the representations of the plurality of participants in the real-time communication session in the three-dimensional space, detecting movement, relative to the first participant, of a device being used by the first participant to participate in the real-time communication session; and in response to detecting the movement, relative to the first participant, of the device being used by the first participant to participate in the real-time communication session, moving the first tile forwards or backwards relative to the second tile in the spatial arrangement of tiles.

2. The computer system of claim 1, wherein modifying the representation of the first participant based on the activity includes moving the representation of the first participant in the first tile forward or backward relative to the representation of the second participant in the second tile.

3. The computer system of claim 1, wherein modifying the representation of the first participant based on the activity includes changing a size of the representation of the first participant relative to a size of the representation of the second participant.

4. The computer system of claim 1, wherein modifying the representation of the first participant based on the activity includes changing an angle of the representation of the first participant relative to an angle of the representation of the second participant.

5. The computer system of claim 1, wherein detecting the activity associated with the first participant includes detecting sounds from the first participant and/or movement of the representation of the first participant.

6. The computer system of claim 1, wherein the activity associated with the first participant is based on movement of the first participant relative to a point of reference corresponding to the real-time communication session.

7. The computer system of claim 6, wherein the movement of the first participant relative to the point of reference corresponding to the real-time communication session is a change in orientation of a face of the first participant relative to the point of reference corresponding to the real-time communication session and modifying the representation of the first participant includes tilting, based on the change in orientation, the representation of the first participant.

8. The computer system of claim 1, wherein the activity associated with the first participant is based on movement of a point of reference corresponding to the real-time communication session relative to the first participant.

9. The computer system of claim 8, wherein modifying the representation of the first participant based on the activity includes:

in accordance with the activity associated with the first participant including the point of reference corresponding to the real-time communication session moving closer to the first participant, moving the representation of the first participant forward relative to the representation of the second participant; and in accordance with the activity associated with the first participant including the point of reference corresponding to the real-time communication session moving farther from the first participant, moving the representation of the first participant backward relative to the representation of the second participant.

10. The computer system of claim 1, wherein displaying the representations of the plurality of participants in the real-time communication session in the spatial arrangement of tiles in the three-dimensional space includes displaying representations of a first subset of the plurality of participants in a first region and displaying representations of a second subset of the plurality of participants, different from the first subset of the plurality of participants, in a second region that is different from the first region, and wherein the one or more programs further include instructions for:

detecting activity associated with a respective participant of the plurality of participants; and in response to detecting the activity associated with the respective participant of the plurality of participants:

in accordance with a determination that a representation of the respective participant is of the first subset of the plurality of participants that is displayed in the first region, modifying the representation of the respective participant based on the activity associated with the respective participant; and in accordance with a determination that the representation of the respective participant is of the second subset of the plurality of participants that is displayed in the second region, forgoing modifying the representation of the respective participant based on the activity associated with the respective participant.

11. A non-transitory computer-readable storage medium storing one or more programs configured to be executed by one or more processors of a computer system that is in communication with one or more display generation components, the one or more programs including instructions for:

displaying, via the one or more display generation components, representations of a plurality of participants in a real-time communication session in a spatial arrangement of tiles in a three-dimensional space, including concurrently displaying:

a representation of a first participant of the plurality of participants in a first tile in the spatial arrangement of tiles; and a representation of a second participant of the plurality of participants in a second tile in the spatial arrangement of tiles, wherein the second participant is different from the first participant and the second tile is different from the first tile;

while displaying the representations of the plurality of participants in the real-time communication session in the three-dimensional space, detecting activity associated with the first participant of the plurality of participants;

in response to detecting the activity associated with the first participant of the plurality of participants, modifying the representation of the first participant based on the activity, including moving the first tile relative to the second tile in the spatial arrangement of tiles;

while displaying the representations of the plurality of participants in the real-time communication session in the three-dimensional space, detecting movement, relative to the first participant, of a device being used by the first participant to participate in the real-time communication session; and in response to detecting the movement, relative to the first participant, of the device being used by the first participant to participate in the real-time communication session, moving the first tile forwards or backwards relative to the second tile in the spatial arrangement of tiles.

12. The non-transitory computer-readable storage medium of claim 11, wherein modifying the representation of the first participant based on the activity includes moving the representation of the first participant in the first tile forward or backward relative to the representation of the second participant in the second tile.

13. The non-transitory computer-readable storage medium of claim 11, wherein modifying the representation of the first participant based on the activity includes changing a size of the representation of the first participant relative to a size of the representation of the second participant.

14. The non-transitory computer-readable storage medium of claim 11, wherein modifying the representation of the first participant based on the activity includes changing an angle of the representation of the first participant relative to an angle of the representation of the second participant.

15. The non-transitory computer-readable storage medium of claim 11, wherein detecting the activity associated with the first participant includes detecting sounds from the first participant and/or movement of the representation of the first participant.

16. The non-transitory computer-readable storage medium of claim 11, wherein the activity associated with the first participant is based on movement of the first participant relative to a point of reference corresponding to the real-time communication session.

17. The non-transitory computer-readable storage medium of claim 16, wherein the movement of the first participant relative to the point of reference corresponding to the real-time communication session is a change in orientation of a face of the first participant relative to the point of reference corresponding to the real-time communication session and modifying the representation of the first participant includes tilting, based on the change in orientation, the representation of the first participant.

18. The non-transitory computer-readable storage medium of claim 11, wherein the activity associated with the first participant is based on movement of a point of reference corresponding to the real-time communication session relative to the first participant.

19. The non-transitory computer-readable storage medium of claim 18, wherein modifying the representation of the first participant based on the activity includes:

in accordance with the activity associated with the first participant including the point of reference corresponding to the real-time communication session moving closer to the first participant, moving the representation of the first participant forward relative to the representation of the second participant; and in accordance with the activity associated with the first participant including the point of reference corresponding to the real-time communication session moving farther from the first participant, moving the representation of the first participant backward relative to the representation of the second participant.

20. The non-transitory computer-readable storage medium of claim 11, wherein displaying the representations of the plurality of participants in the real-time communication session in the spatial arrangement of tiles in the three-dimensional space includes displaying representations of a first subset of the plurality of participants in a first region and displaying representations of a second subset of the plurality of participants, different from the first subset of the plurality of participants, in a second region that is different from the first region, and wherein the one or more programs further include instructions for:

detecting activity associated with a respective participant of the plurality of participants; and in response to detecting the activity associated with the respective participant of the plurality of participants:

in accordance with a determination that a representation of the respective participant is of the first subset of the plurality of participants that is displayed in the first region, modifying the representation of the respective participant based on the activity associated with the respective participant; and in accordance with a determination that the representation of the respective participant is of the second subset of the plurality of participants that is displayed in the second region, forgoing modifying the representation of the respective participant based on the activity associated with the respective participant.

21. A method, comprising:

at a computer system that is in communication with one or more display generation components:

displaying, via the one or more display generation components, representations of a plurality of participants in a real-time communication session in a spatial arrangement of tiles in a three-dimensional space, including concurrently displaying:

a representation of a first participant of the plurality of participants in a first tile in the spatial arrangement of tiles; and a representation of a second participant of the plurality of participants in a second tile in the spatial arrangement of tiles, wherein the second participant is different from the first participant and the second tile is different from the first tile;

while displaying the representations of the plurality of participants in the real-time communication session in the three-dimensional space, detecting activity associated with the first participant of the plurality of participants;

in response to detecting the activity associated with the first participant of the plurality of participants, modifying the representation of the first participant based on the activity, including moving the first tile relative to the second tile in the spatial arrangement of tiles;

while displaying the representations of the plurality of participants in the real-time communication session in the three-dimensional space, detecting movement, relative to the first participant, of a device being used by the first participant to participate in the real-time communication session; and in response to detecting the movement, relative to the first participant, of the device being used by the first participant to participate in the real-time communication session, moving the first tile forwards or backwards relative to the second tile in the spatial arrangement of tiles.

22. The method of claim 21, wherein modifying the representation of the first participant based on the activity includes moving the representation of the first participant in the first tile forward or backward relative to the representation of the second participant in the second tile.

23. The method of claim 21, wherein modifying the representation of the first participant based on the activity includes changing a size of the representation of the first participant relative to a size of the representation of the second participant.

24. The method of claim 21, wherein modifying the representation of the first participant based on the activity includes changing an angle of the representation of the first participant relative to an angle of the representation of the second participant.

25. The method of claim 21, wherein detecting the activity associated with the first participant includes detecting sounds from the first participant and/or movement of the representation of the first participant.

26. The method of claim 21, wherein the activity associated with the first participant is based on movement of the first participant relative to a point of reference corresponding to the real-time communication session.

27. The method of claim 26, wherein the movement of the first participant relative to the point of reference corresponding to the real-time communication session is a change in orientation of a face of the first participant relative to the point of reference corresponding to the real-time communication session and modifying the representation of the first participant includes tilting, based on the change in orientation, the representation of the first participant.

28. The method of claim 21, wherein the activity associated with the first participant is based on movement of a point of reference corresponding to the real-time communication session relative to the first participant.

29. The method of claim 28, wherein modifying the representation of the first participant based on the activity includes:

in accordance with the activity associated with the first participant including the point of reference corresponding to the real-time communication session moving closer to the first participant, moving the representation of the first participant forward relative to the representation of the second participant; and in accordance with the activity associated with the first participant including the point of reference corresponding to the real-time communication session moving farther from the first participant, moving the representation of the first participant backward relative to the representation of the second participant.

30. The method of claim 21, wherein displaying the representations of the plurality of participants in the real-time communication session in the spatial arrangement of tiles in the three-dimensional space includes displaying representations of a first subset of the plurality of participants in a first region and displaying representations of a second subset of the plurality of participants, different from the first subset of the plurality of participants, in a second region that is different from the first region, the method further comprising:

detecting activity associated with a respective participant of the plurality of participants; and in response to detecting the activity associated with the respective participant of the plurality of participants:

in accordance with a determination that a representation of the respective participant is of the first subset of the plurality of participants that is displayed in the first region, modifying the representation of the respective participant based on the activity associated with the respective participant; and in accordance with a determination that the representation of the respective participant is of the second subset of the plurality of participants that is displayed in the second region, forgoing modifying the representation of the respective participant based on the activity associated with the respective participant.

\* \* \* \* \*